(12) United States Patent
Byun et al.

(10) Patent No.: US 7,102,726 B2
(45) Date of Patent: Sep. 5, 2006

(54) SYSTEM FOR FABRICATING LIQUID CRYSTAL DISPLAY AND METHOD OF FABRICATING LIQUID CRYSTAL DISPLAY USING THE SAME

(75) Inventors: Yong Sang Byun, Kumi-shi (KR); Moo Yeol Park, Taegu-kwangyokshi (KR); Sung Su Jung, Taegu-kwangyokshi (KR); Sung Chun Kang, Kumi-shi (KR); Jong Woo Kim, Kyongsangbuk-do (KR); Young Hun Ha, Kumi-shi (KR); Sang Seok Lee, Taegu-kwangyokshi (KR); Sang Ho Park, Pusan-kwangyokshi (KR); Hun Jun Choo, Kumi-shi (KR); Hyug Jin Kweon, Kumi-shi (KR); Kyung Su Chae, Kumi-shi (KR); Hae Joon Son, Kyongsangbuk-do (KR); Sang Sun Shin, Pohang-shi (KR); Jong Go Lim, Kyongsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/184,088

(22) Filed: Jun. 28, 2002

(65) Prior Publication Data

US 2003/0223030 A1 Dec. 4, 2003

(30) Foreign Application Priority Data

Mar. 15, 2002 (KR) ............... 10-2002-0014202
May 30, 2002 (KR) ............... 2002-30204
Jun. 24, 2002 (KR) ............... 10-2002-0035384

(51) Int. Cl.
*G02F 1/1341* (2006.01)

(52) U.S. Cl. ................................... 349/189

(58) Field of Classification Search ............... None
See application file for complete search history.

(56) References Cited

U.S. PATENT DOCUMENTS 3,978,580 A 9/1976 Leupp et al.

(Continued)

FOREIGN PATENT DOCUMENTS

EP 1 003 066 A1 5/2000

(Continued)

*Primary Examiner*—Frank G. Font
*Assistant Examiner*—T L. Rude
(74) *Attorney, Agent, or Firm*—McKenna Long & Aldridge LLP

(57) ABSTRACT

Disclosed is a system for fabricating a liquid crystal display using liquid crystal dropping and a method of fabricating a liquid crystal display using the same. The present invention includes a liquid crystal forming line dropping liquid crystals on the first substrate, a sealant forming line forming the sealant on the second substrate, and a bonding and hardening line bonding the two substrates to each other and hardening the sealant, printing a sealant, bonding the substrates each other, and hardening the sealant and an inspection process line of cutting the bonded substrates into panel units and grinding and inspecting the unit panels. And, the GAP process line includes And, the present invention includes the processes of dropping LC on a first substrate using a dispenser, forming a main UV hardening sealant on a second substrate, bonding the first and second substrates to each other in a vacuum state, UV-hardening the main UV hardening sealant, cutting the bonded substrates into cell units, grinding the cut substrates, and inspecting the grinded substrates finally.

39 Claims, 91 Drawing Sheets

U.S. PATENT DOCUMENTS

| | | |
|---|---|---|
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A * | 4/1995 | Abe ................. 141/7 |
| 5,499,128 A | 3/1996 | Hasegawa et al. |
| 5,507,323 A | 4/1996 | Abe |
| 5,511,591 A * | 4/1996 | Abe ................. 141/7 |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,678 A | 9/1999 | Ashida |
| 5,956,112 A | 9/1999 | Fujimori et al. |
| 6,001,203 A | 12/1999 | Yamada et al. |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,163,357 A | 12/2000 | Nakamura |
| 6,219,126 B1 | 4/2001 | von Gutfeld |
| 6,226,067 B1 | 5/2001 | Nishiguchi et al. |
| 6,236,445 B1 | 5/2001 | Foschaar et al. |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,414,733 B1 | 7/2002 | Ishikawa et al. |
| 6,531,329 B1 * | 3/2003 | Asakura et al. ................. 438/30 |
| 2001/0021000 A1 | 9/2001 | Egami |
| 2002/0080321 A1 * | 6/2002 | Sugimura et al. ........... 349/156 |
| 2004/0001177 A1 * | 1/2004 | Byun et al. ................. 349/187 |

FOREIGN PATENT DOCUMENTS

| | | |
|---|---|---|
| EP | 1003066 A1 | 5/2000 |
| JP | 51-65656 | 6/1976 |
| JP | 51-065656 | 6/1976 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62150219 A * | 7/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240607 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-061829 | 3/1997 |
| JP | 09-073075 | 3/1997 |
| JP | 09-073096 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |

| | | | | | |
|---|---|---|---|---|---|
| JP | 09230357 | 9/1997 | JP | 2001147437 | 5/2001 |
| JP | 09-281511 | 10/1997 | JP | 2001-154211 | 6/2001 |
| JP | 09281511 | 10/1997 | JP | 2001-166272 | 6/2001 |
| JP | 09311340 | 12/1997 | JP | 2001-166310 | 6/2001 |
| JP | 10-123537 | 5/1998 | JP | 2001154211 | 6/2001 |
| JP | 10-123538 | 5/1998 | JP | 2001-183683 | 7/2001 |
| JP | 10-142616 | 5/1998 | JP | 2001-201750 | 7/2001 |
| JP | 10123537 | 5/1998 | JP | 2001-209052 | 8/2001 |
| JP | 10123538 | 5/1998 | JP | 2001-209056 | 8/2001 |
| JP | 10142616 | 5/1998 | JP | 2001-209057 | 8/2001 |
| JP | 10-177178 | 6/1998 | JP | 2001-209058 | 8/2001 |
| JP | H10-174924 | 6/1998 | JP | 2001-209060 | 8/2001 |
| JP | 10-221700 | 8/1998 | JP | 2001-215459 | 8/2001 |
| JP | 10221700 | 8/1998 | JP | 2001-222017 | 8/2001 |
| JP | 10-282512 | 10/1998 | JP | 2001-235758 | 8/2001 |
| JP | 10282512 | 10/1998 | JP | 2001-255542 | 9/2001 |
| JP | 10-333157 | 12/1998 | JP | 2001-264782 | 9/2001 |
| JP | 10-333159 | 12/1998 | JP | 2001255542 | 9/2001 |
| JP | 11-014953 | 1/1999 | JP | 2001264782 | 9/2001 |
| JP | 11014953 | 1/1999 | JP | 2001-272640 | 10/2001 |
| JP | 11-038424 | 2/1999 | JP | 2001-281675 | 10/2001 |
| JP | 11038424 | 2/1999 | JP | 2001-281678 | 10/2001 |
| JP | 11-064811 | 3/1999 | JP | 2001-282126 | 10/2001 |
| JP | 11064811 | 3/1999 | JP | 2001-305563 | 10/2001 |
| JP | 11-109388 | 4/1999 | JP | 2001-330837 | 11/2001 |
| JP | 11109388 | 4/1999 | JP | 2001-330840 | 11/2001 |
| JP | 11-133438 | 5/1999 | JP | 2001330840 | 11/2001 |
| JP | 11-142864 | 5/1999 | JP | 2001-356353 | 12/2001 |
| JP | 11-174477 | 7/1999 | JP | 2001-356354 | 12/2001 |
| JP | 11174477 | 7/1999 | JP | 2001356354 | 12/2001 |
| JP | 11-212045 | 8/1999 | JP | 2002-014360 | 1/2002 |
| JP | 11212045 | 8/1999 | JP | 2002-023176 | 1/2002 |
| JP | 11-248930 | 9/1999 | JP | 2002014360 | 1/2002 |
| JP | H11-262712 | 9/1999 | JP | 2002023176 | 1/2002 |
| JP | H11-264991 | 9/1999 | JP | 2002-049045 | 2/2002 |
| JP | 11-326922 | 11/1999 | JP | 2002049045 | 2/2002 |
| JP | 11-344714 | 12/1999 | JP | 2002-079160 | 3/2002 |
| JP | 11344714 | 12/1999 | JP | 2002-080321 | 3/2002 |
| JP | 2000-002879 | 1/2000 | JP | 2002-082340 | 3/2002 |
| JP | 2000-029035 | 1/2000 | JP | 2002-090759 | 3/2002 |
| JP | 2000029035 | 1/2000 | JP | 2002-090760 | 3/2002 |
| JP | 2000-056311 | 2/2000 | JP | 2002082340 | 3/2002 |
| JP | 2000-066165 | 3/2000 | JP | 2002090759 | 3/2002 |
| JP | 2000-066218 | 3/2000 | JP | 2002090760 | 3/2002 |
| JP | 2000-093866 | 4/2000 | JP | 2002-107740 | 4/2002 |
| JP | 2000-137235 | 5/2000 | JP | 2002-122870 | 4/2002 |
| JP | 2000-147528 | 5/2000 | JP | 2002-122872 | 4/2002 |
| JP | 3000-147528 | 5/2000 | JP | 2002-122873 | 4/2002 |
| JP | 2000-193988 | 7/2000 | JP | 2002107740 | 4/2002 |
| JP | 2000-241824 | 9/2000 | JP | 2002122872 | 4/2002 |
| JP | 2000-284295 | 10/2000 | JP | 2002122873 | 4/2002 |
| JP | 2000-292799 | 10/2000 | JP | 2002-131762 | 5/2002 |
| JP | 2000-310759 | 11/2000 | JP | 2002-139734 | 5/2002 |
| JP | 2000-310784 | 11/2000 | JP | 2002-156518 | 5/2002 |
| JP | 2000-338501 | 12/2000 | JP | 2002-169166 | 6/2002 |
| JP | 2001-005401 | 1/2001 | JP | 2002-169167 | 6/2002 |
| JP | 2001-005405 | 1/2001 | JP | 2002-182222 | 6/2002 |
| JP | 2001-013506 | 1/2001 | JP | 2002080321 | 6/2002 |
| JP | 2001-033793 | 2/2001 | JP | 2002-202512 | 7/2002 |
| JP | 2001-042341 | 2/2001 | JP | 2002-202514 | 7/2002 |
| JP | 2001-051284 | 2/2001 | JP | 2002-214626 | 7/2002 |
| JP | 2001-066615 | 3/2001 | JP | 2002202512 | 7/2002 |
| JP | 2001-091727 | 4/2001 | JP | 2002202514 | 7/2002 |
| JP | 2001-117105 | 4/2001 | JP | 2002214626 | 7/2002 |
| JP | 2001-117109 | 4/2001 | JP | 2002-229042 | 8/2002 |
| JP | 2001117105 | 4/2001 | JP | 2002-236276 | 8/2002 |
| JP | 2001-133745 | 5/2001 | JP | 2002-258299 | 8/2002 |
| JP | 2001-133794 | 5/2001 | JP | 2002-236292 | 9/2002 |
| JP | 2001-133799 | 5/2001 | JP | 2002-277865 | 9/2002 |
| JP | 2001-142074 | 5/2001 | JP | 2002-277866 | 9/2002 |
| JP | 2001-147437 | 5/2001 | JP | 2002-277881 | 9/2002 |
| JP | 2001133794 | 5/2001 | JP | 2002-287156 | 10/2002 |
| JP | 2001142074 | 5/2001 | JP | 2002-296605 | 10/2002 |

| | | | | | | |
|---|---|---|---|---|---|---|
| JP | 2002-311438 | 10/2002 | | JP | 2002-341356 | 11/2002 |
| JP | 2002-311440 | 10/2002 | | JP | 2002-341357 | 11/2002 |
| JP | 2002-311442 | 10/2002 | | JP | 2002-341358 | 11/2002 |
| JP | 2002-323687 | 11/2002 | | JP | 2002-341359 | 11/2002 |
| JP | 2002-323694 | 11/2002 | | JP | 2002-341362 | 11/2002 |
| JP | 2002-333628 | 11/2002 | | KR | 2000-0035302 | 6/2000 |
| JP | 2002-333635 | 11/2002 | | KR | 2000-0035302 A1 | 6/2000 |
| JP | 2002-333843 | 11/2002 | | | | |
| JP | 2002-341329 | 11/2002 | | | | |
| JP | 2002-341355 | 11/2002 | | | | |

* cited by examiner

Pixel area

Pixel area

SYSTEM FOR FABRICATING LIQUID CRYSTAL DISPLAY AND METHOD OF FABRICATING LIQUID CRYSTAL DISPLAY USING THE SAME

This application claims the benefit of the Korean Application No. P2002-30204 filed on May 30, 2002.

BACKGROUND OF THE INVENTION

1. Field of the Invention

The present invention relates to a liquid crystal display, and more particularly, to a system for fabricating a liquid crystal display using liquid crystal dropping and a method of fabricating a liquid crystal display using the same.

2. Discussion of the Related Art

As information society develops, demands for various types of displays increase. Lately, many efforts are made to study and develop various panel displays such as LCD (liquid crystal display), PDP (plasma display panel), ELD (electroluminescent display), VFD (vacuum fluorescent display), and the like. And, some of such panel displays are already used for various devices and appliances.

With characteristic advantages of excellent image quality, lightness, slim size, and low power consumption, LCD, one of the panel devices, has been widely used so as to replace CRT (cathode ray tube) as a mobile image display. Besides the mobile usage for a monitor of a notebook computer, LCD is also developed as a monitor for computer, television, or the like so as to receive and display broadcasting signals.

In spite of various technical developments to perform a role as an image display in various fields, an effort to improve image quality of LCD inevitably becomes contrary to the above characteristics and advantages in some aspects. In order to use LCD for various fields as a general image display, the development of LCD depends on the facts that the characteristics of lightness, slim size, and low power consumption are maintained and that image of high quality including definition, brightness, large-scaled area, and the like is realized properly.

Such an LCD is mainly divided into a liquid crystal display panel displaying an image thereon and a driving unit applying a drive signal to the liquid crystal display panel, in which the liquid crystal display panel includes first and second glass substrates bonded to each other so as to have a predetermined space therebetween and a liquid crystal layer injected between the first and second glass substrates.

Namely, the first and second glass substrates are bonded to each other so as to provide a predetermined space therebetween using a spacer, and then liquid crystals (hereinafter abbreviated LC) are injected in the space.

In this case, the liquid crystals are injected in a manner that the a vacuum state is maintained between the two substrates, a liquid crystal injection inlet is dipped in a liquid crystal solution, and the liquid crystals are injected in the space by osmotic pressure. After completion of the liquid crystal injection, the liquid crystal injection inlet is sealed with a sealant.

Yet, such a general liquid crystal injection method for fabricating a liquid crystal display has the following disadvantages or problems.

First of all, it takes too much time for liquid crystal injection to reduce productivity since the liquid crystals are injected therein by maintaining the vacuum state between the two substrates.

Secondly, in fabricating a large-sized liquid crystal display, the liquid crystal injection method fails to fill completely an inside of the panel with liquid crystals so as to bring about failure.

Finally, the process becomes so complicated to waste process time as well as requires a plurality of liquid crystal injection instruments to fail to save a space.

Eventually, many efforts are made to study and develop LCD fabrication methods using liquid crystal dropping. One of such methods is disclosed in Japanese Patent Laid-Open No. 2000-147528 as follows.

FIGS. 1A to 1F illustrate cross-sectional views of an LCD process using liquid crystal dropping.

Referring to FIG. 1A, a UV hardening type sealant 1 is coated on a, first glass substrate 3 on which a thin film transistor array is formed, and then liquid crystals 2 are dropped on an inside (thin film transistor array) of the sealant 1. In this case, the sealant 1 is formed thereon without a liquid crystal injection inlet.

The first glass substrate 3 is mounted on a table 4 in a vacuum container C which is movable in a horizontal direction, and an entire face of a lower surface of the first glass substrate 3 is fixed by vacuum suction using a first sucking instrument 5.

Referring to FIG. 1B, an entire face of a lower surface of a second glass substrate 6 on which a color filter array is formed is fixed by vacuum suction using a second sucking instrument 7, and the vacuum container C is closed for providing a vacuum state. The second sucking instrument 7 is then moved downward in a vertical direction so as to adjust a distance between the first and second glass substrates 3 and 6, while the table 4 on which the first glass substrate 3 is mounted is moved in a horizontal direction so as to adjust locations of the first and second glass substrates 3 and 6 preliminarily.

Referring to FIG. 1C, the second sucking instrument 7 is moved downward so as to contact the second glass substrate 6 with the liquid crystals 2 or sealant 1.

Referring to FIG. 1D, the table 4 on which the first glass substrate 3 is mounted is moved in a horizontal direction so as to match the positions of the first and second glass substrates 3 and 6 with each other.

Referring to FIG. 1E, the second sucking instrument 7 is moved downward in a vertical direction so as to bond the second glass substrate 6 to the first glass substrate 3 through the sealant 1 as well as pressurize the first glass substrate 3.

Referring to FIG. 1F, the bonded first and second glass substrates 3 and 6 are taken out of the vacuum container C, and then the sealant 1 is hardened by irradiating UV rays thereon so as to complete a liquid crystal display.

Yet, the LCD fabrication method using liquid crystal dropping according to the related art has the following disadvantages or problems.

First, the sealant and liquid crystals are formed and dropped on the same substrate, respectively so as to require a relative long process time.

Second, the sealant is coated on the first substrate as well as the liquid crystals are dropped on the first substrate, while no process is carried out on the second substrate. Hence, there is unbalance between processes for the first and second substrates, thereby failing to operate a product line effectively.

Third, because the sealant is coated on the first substrate as well as the liquid crystals are dropped on the first substrate, it is unable to clean the substrate coated with the sealant in a cleaning equipment (USC). Hence, the sealant bonding the substrates to each other is unable to be cleaned to remove particles therefrom, thereby bringing about failure caused by the particles in the sealant on bonding.

Fourth, when the first and second substrates are being bonded to each other, a sealant pattern is metamorphosed by being pressurized by an external force.

Fifth, it is difficult to drop a precise amount of the liquid crystals on dropping, excessive charge of the liquid crystals makes the liquid crystals run down, and insufficient charge of the liquid crystals varies a cell gap so as to affect an image quality.

SUMMARY OF THE INVENTION

Accordingly, the present invention is directed to a system for fabricating a liquid crystal display using liquid crystal dropping and a method of fabricating a liquid crystal display using the same that substantially obviate one or more problems due to limitations and disadvantages of the related art.

An object of the present invention is to provide a system for fabricating a liquid crystal display using liquid crystal dropping and method of fabricating a liquid crystal display using the same enabling to reduce a process time and improve a productivity.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

Figure 28A:
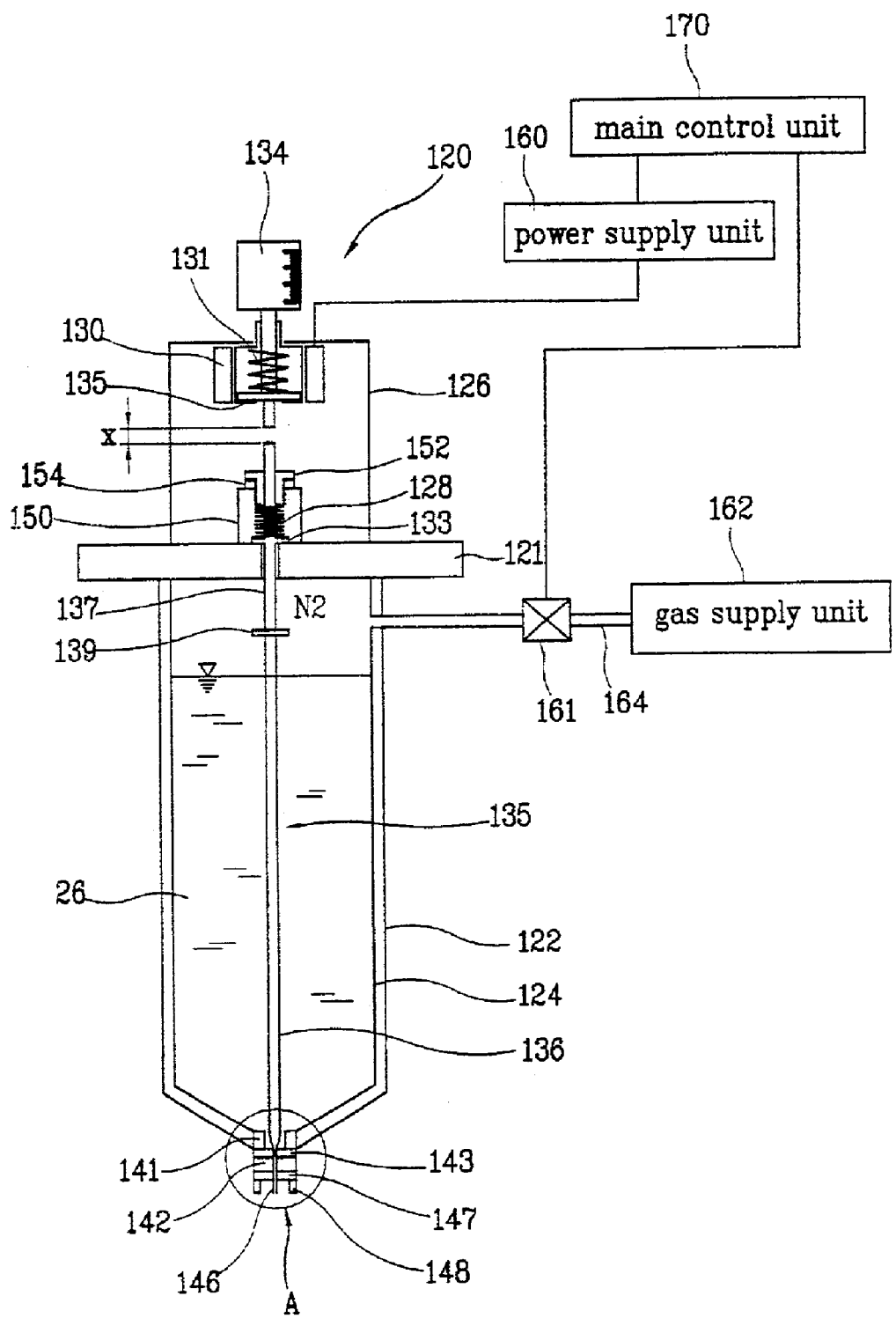
FIG. 28 illustrates a dispensing device according to the present invention, which includes FIG. 28A illustrating a cross-sectional view when LC is not dropped yet, FIG. 28B illustrating a cross-sectional view when LC is being dropped, and FIG. 28C illustrating a disassembled bird's-eye view.
Figure 28B:
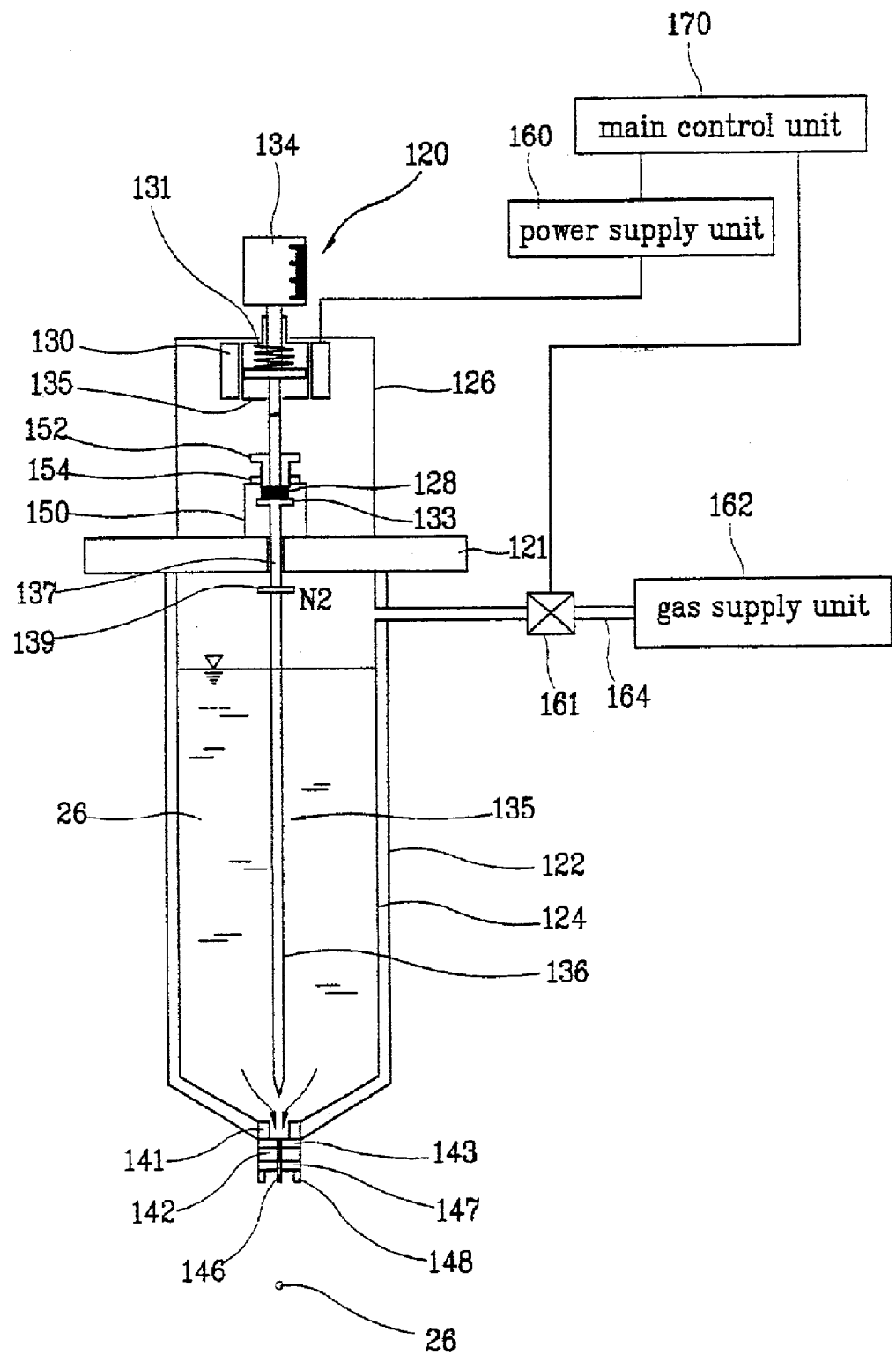
Figure 29A:
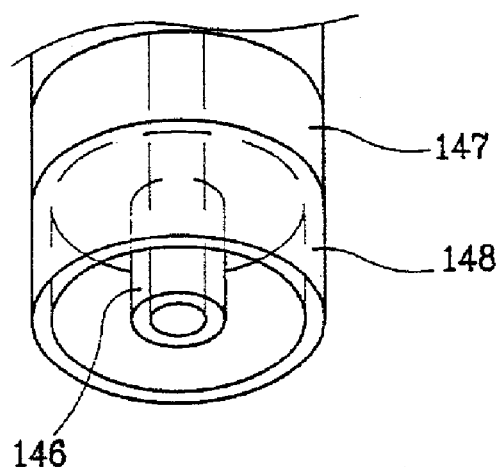
Figure 29B:
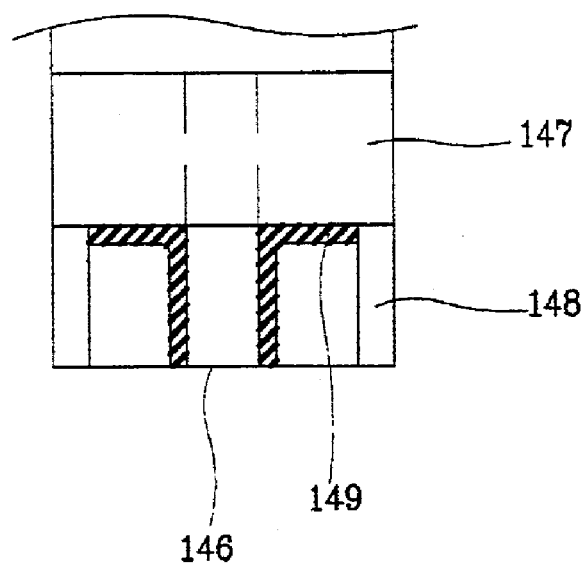
Figure 30:
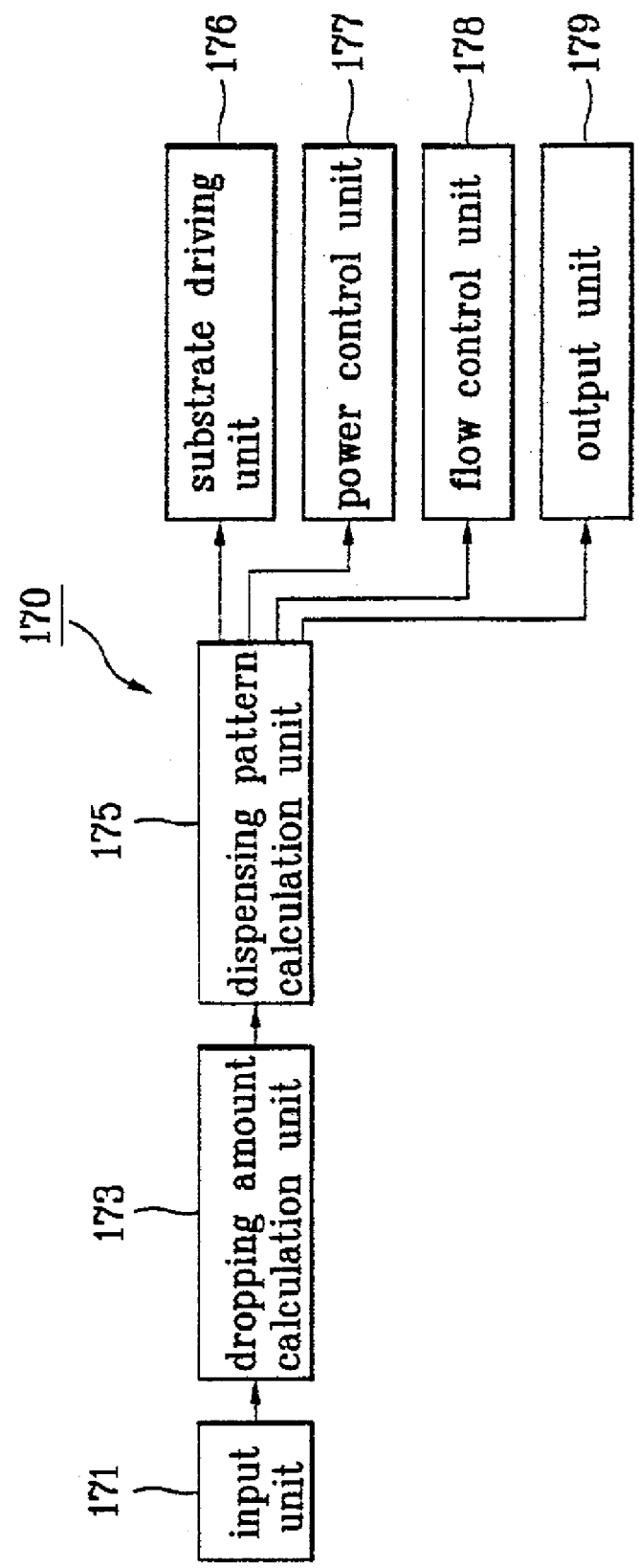
Figure 31:
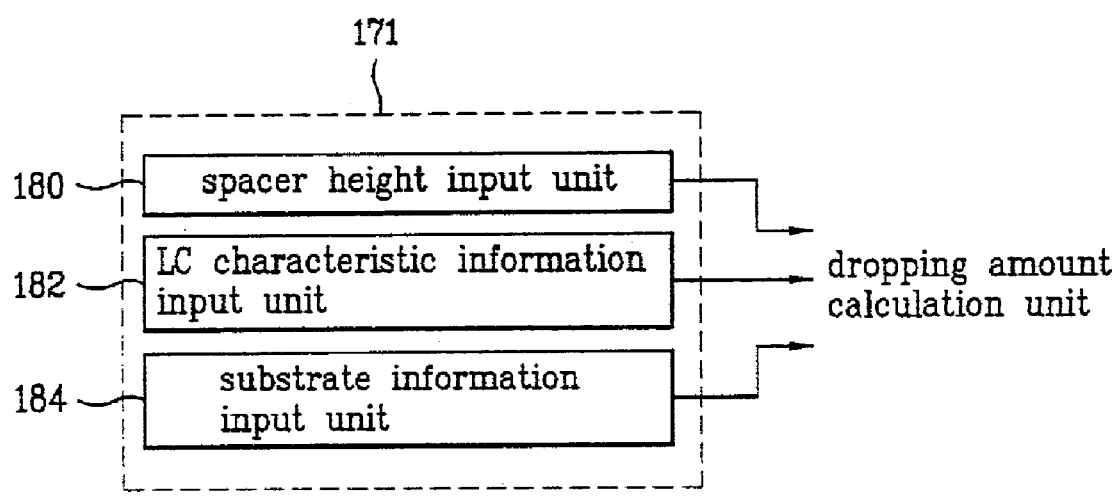
Figure 32:
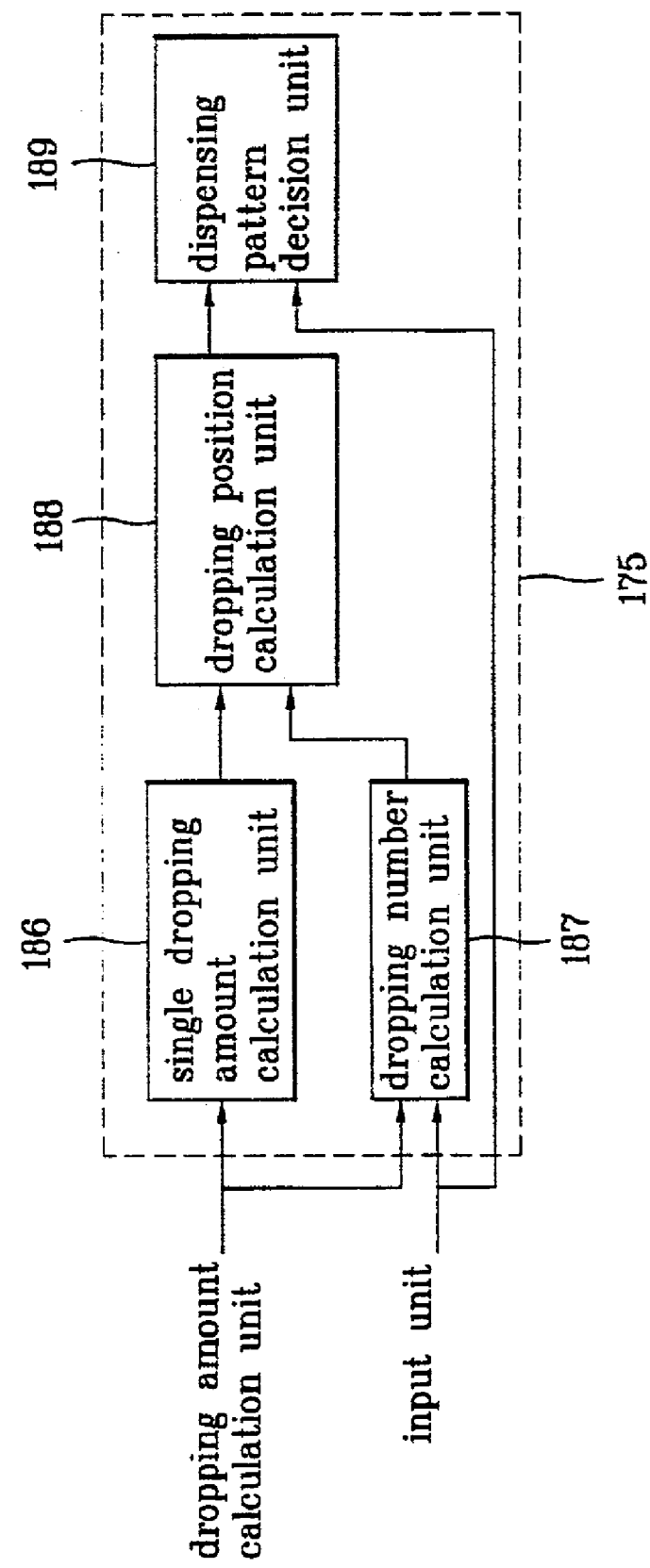
Figure 33:
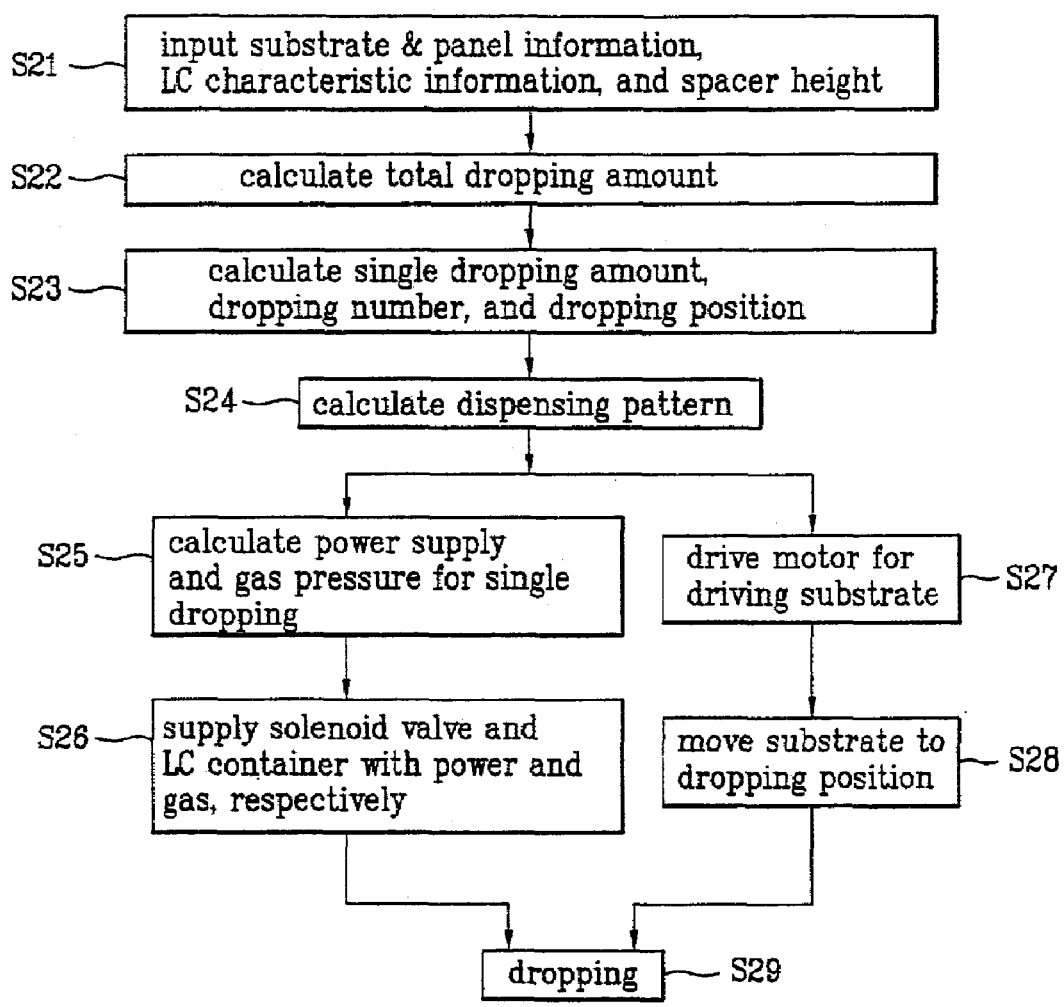
Figure 34:
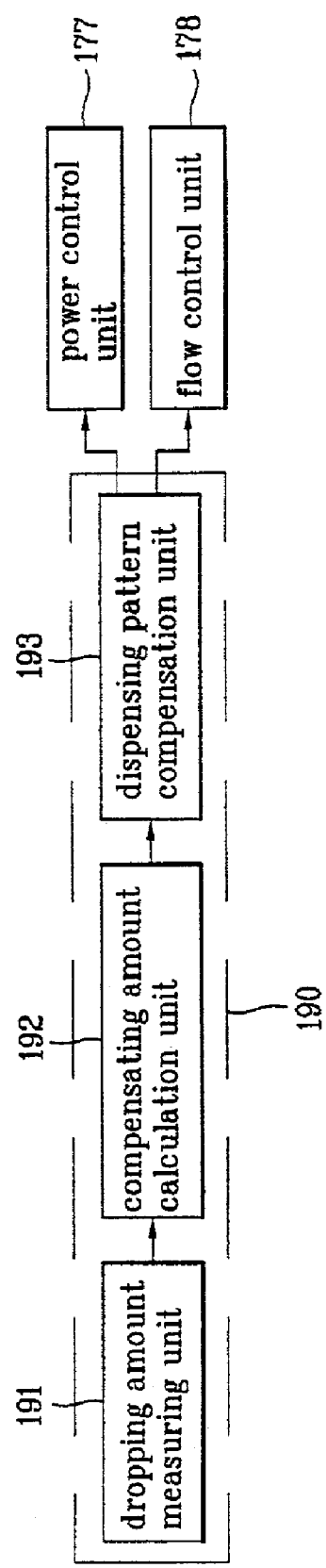
Figure 35:
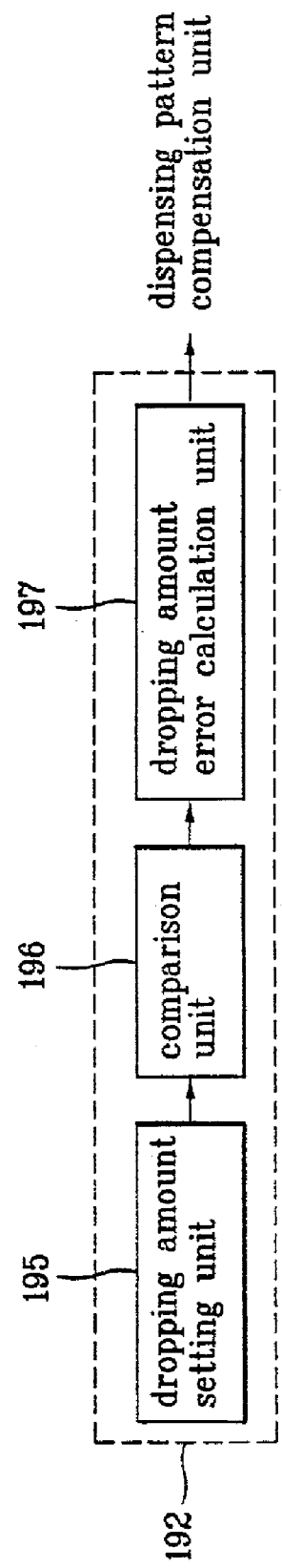
Figure 36:
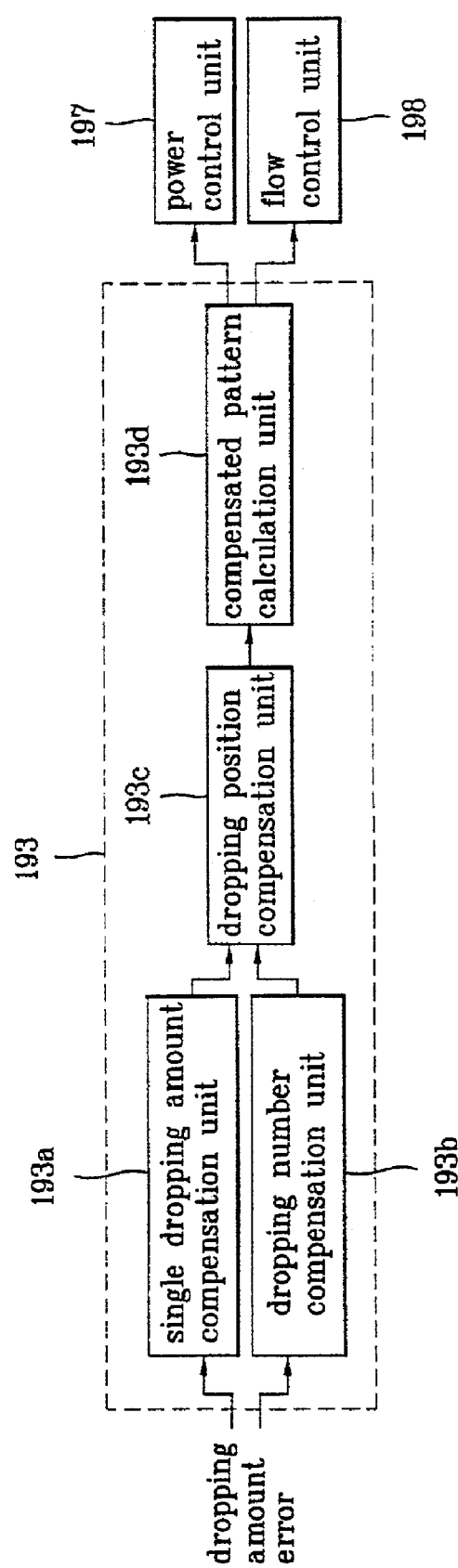
Figure 37:
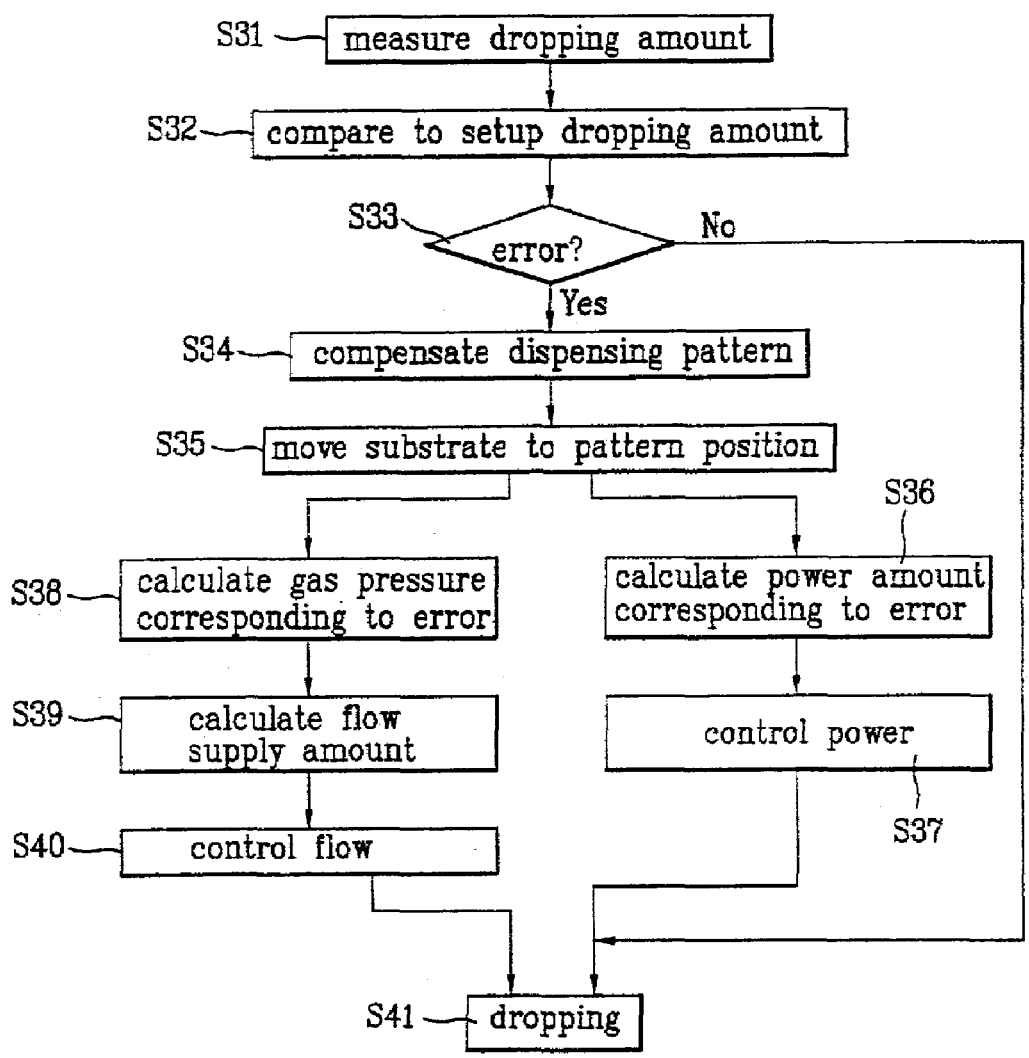
Figure 38A:
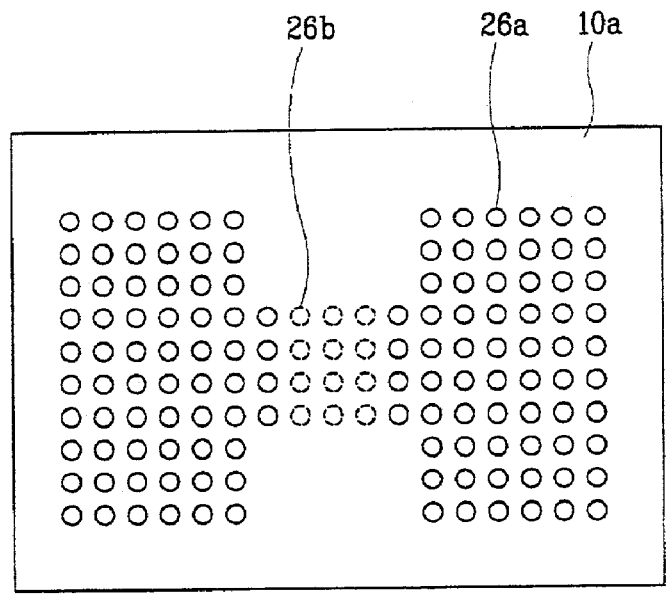
Figure 38B:
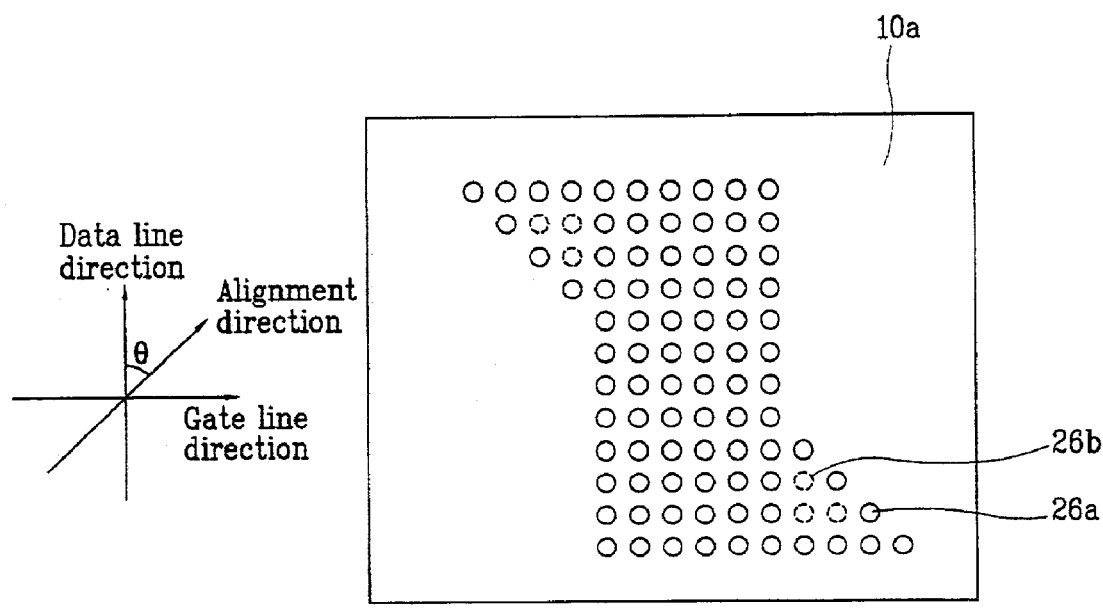
Figure 38C:
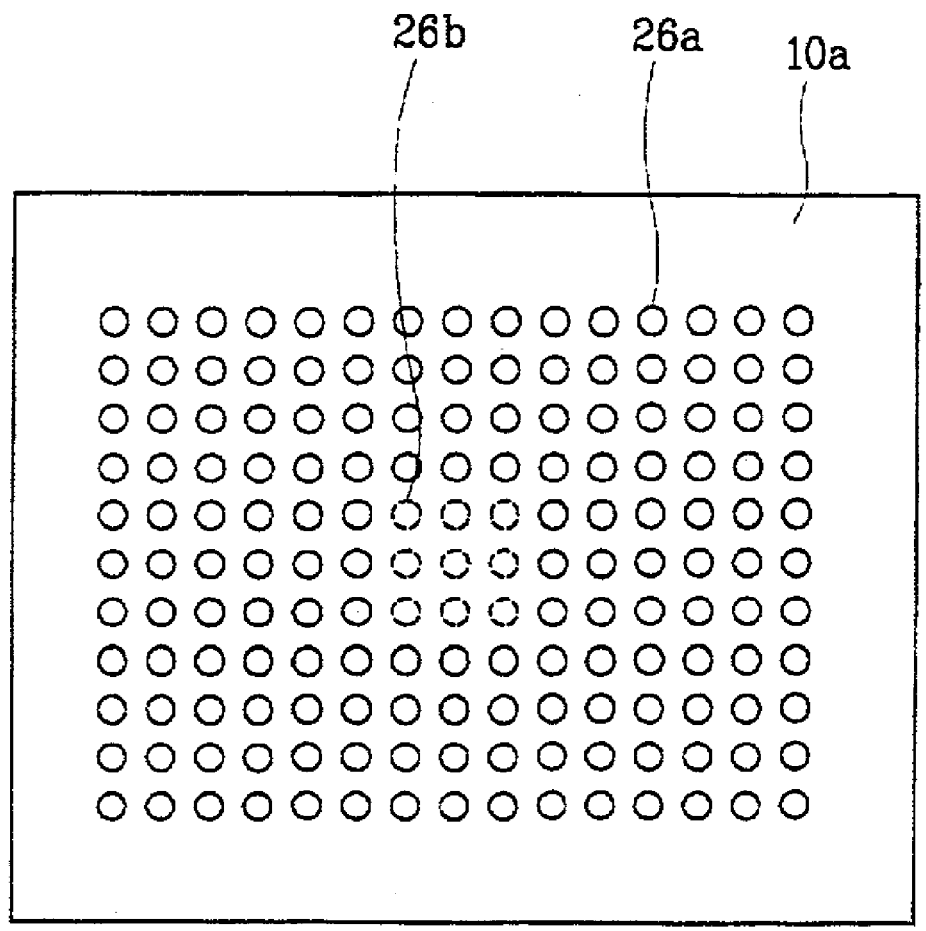
Figure 39:
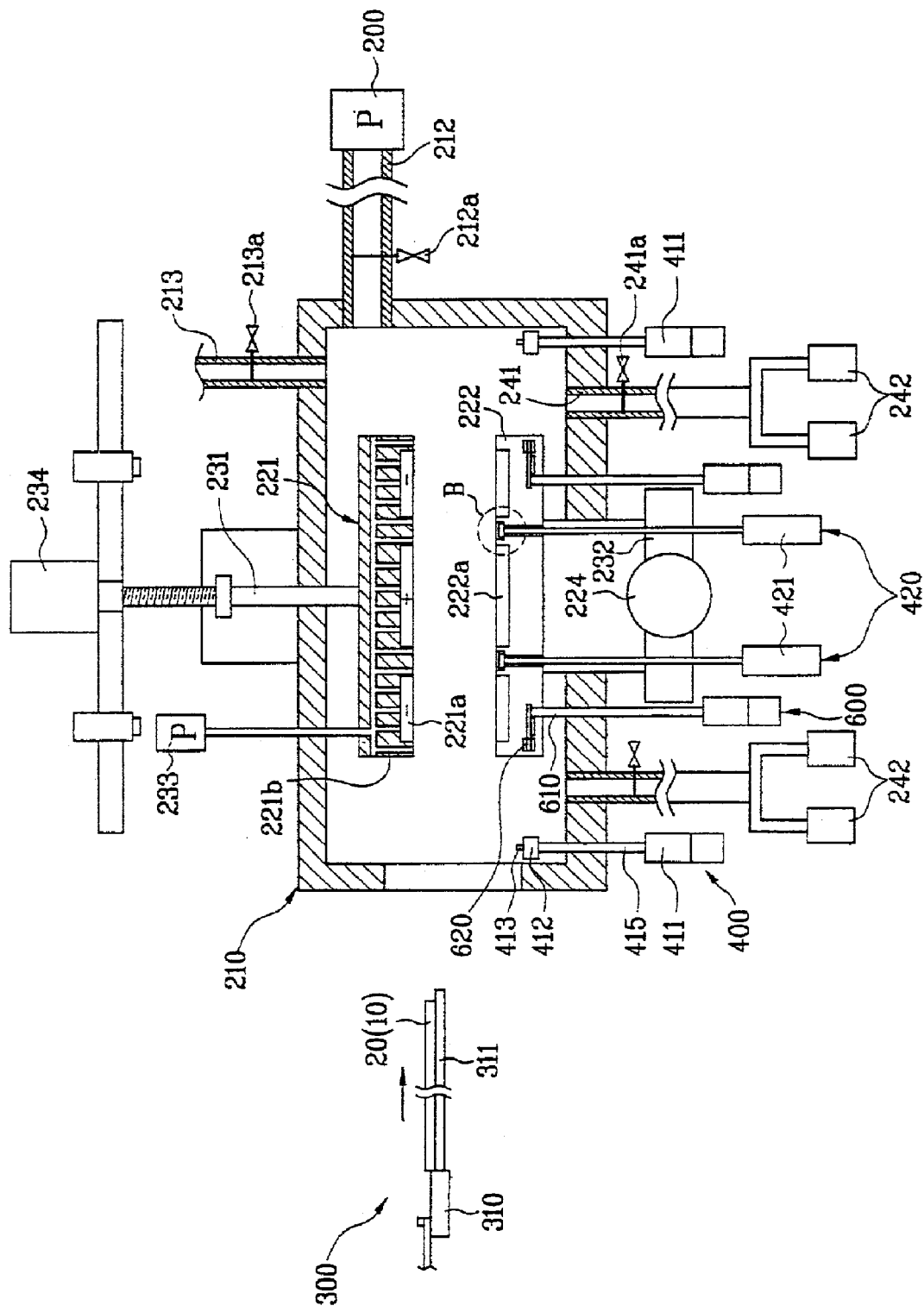
Figure 40:
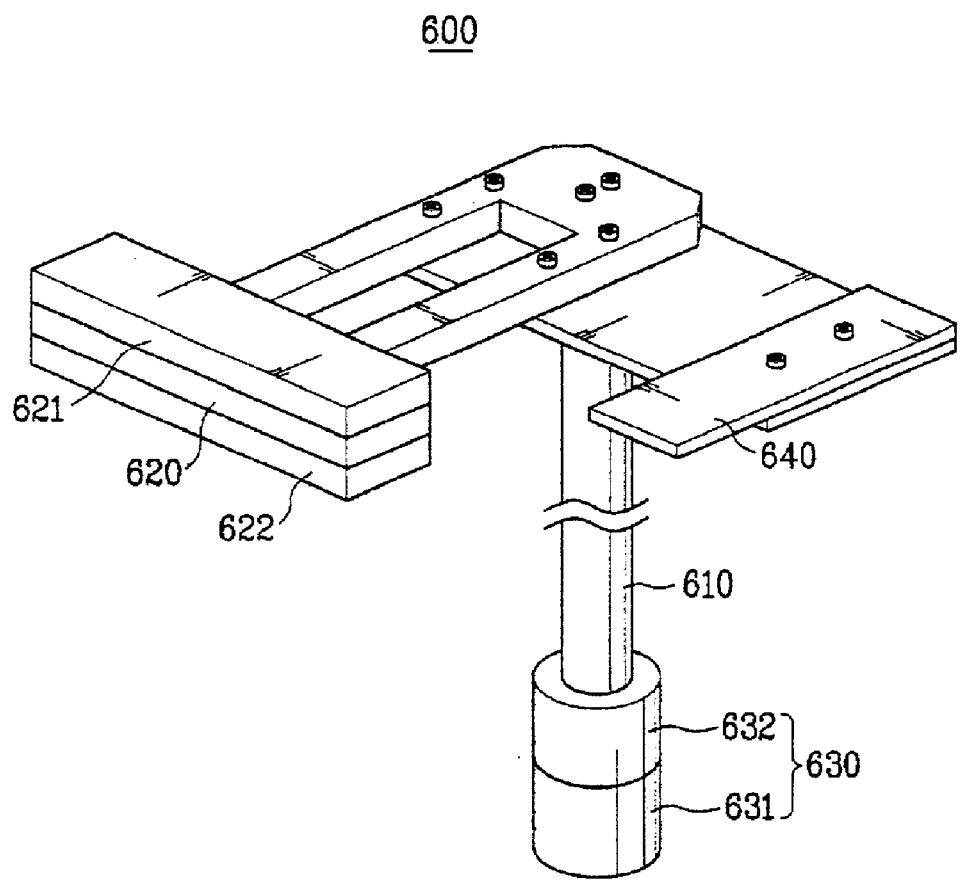
Figure 41:
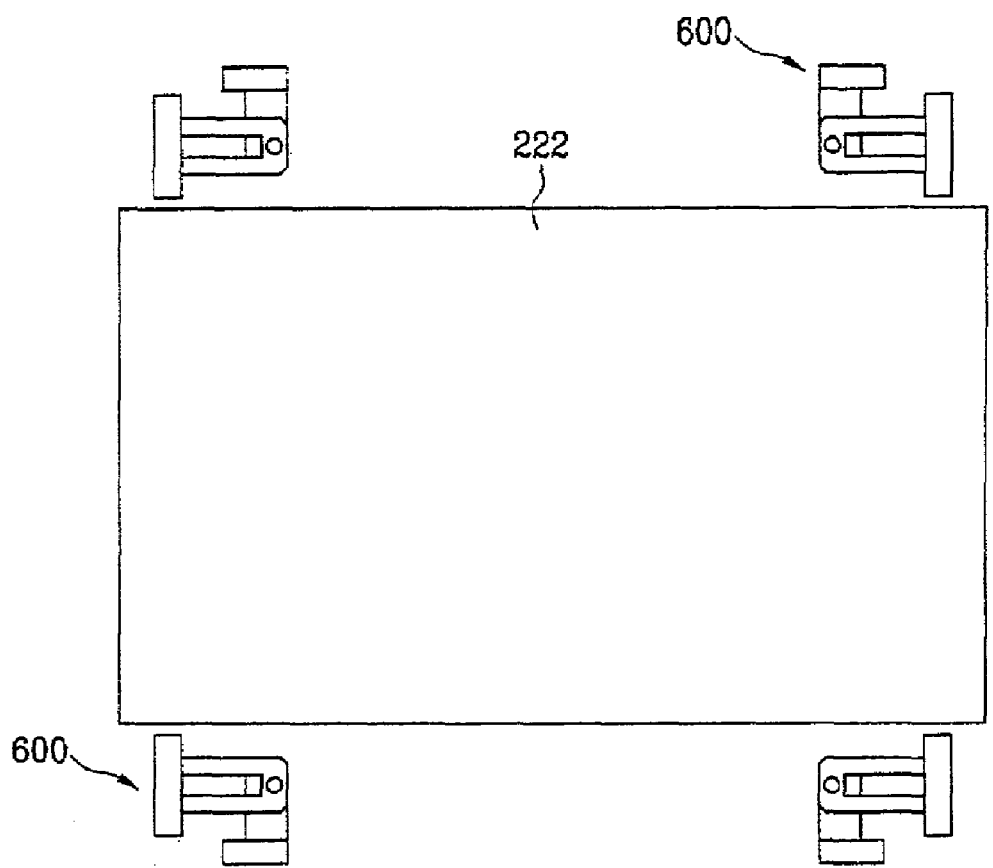
Figure 42:
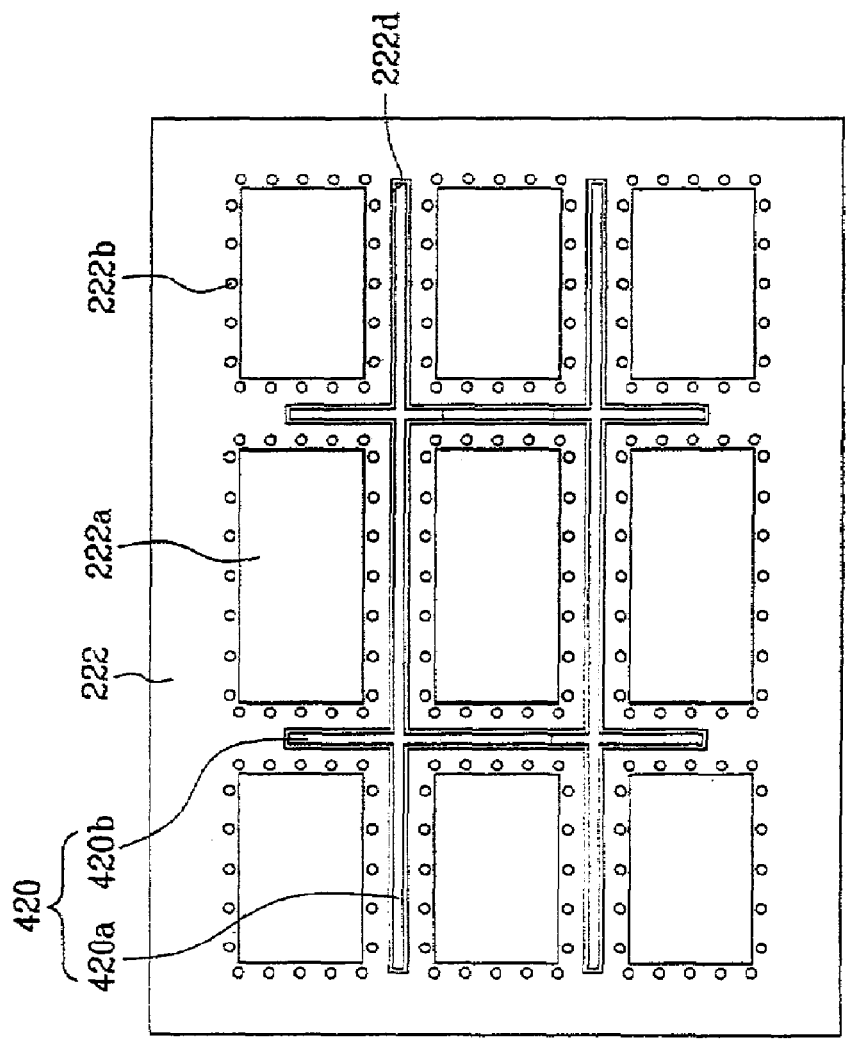
Figure 42:
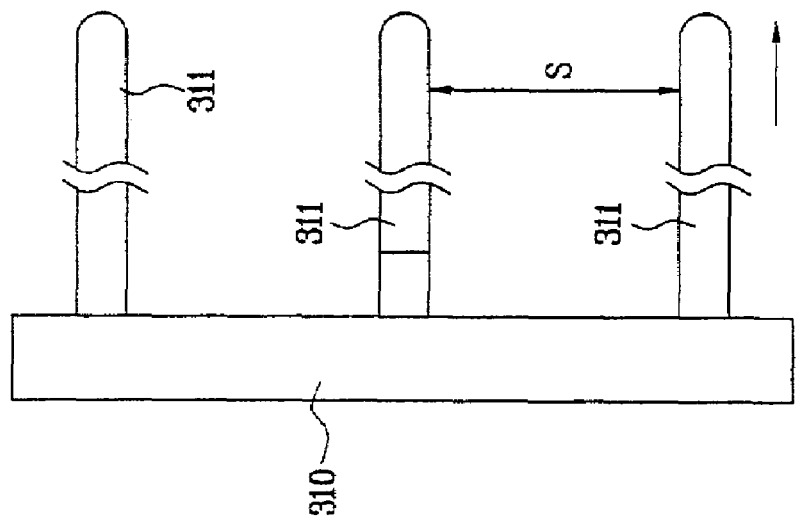
Figure 43A:
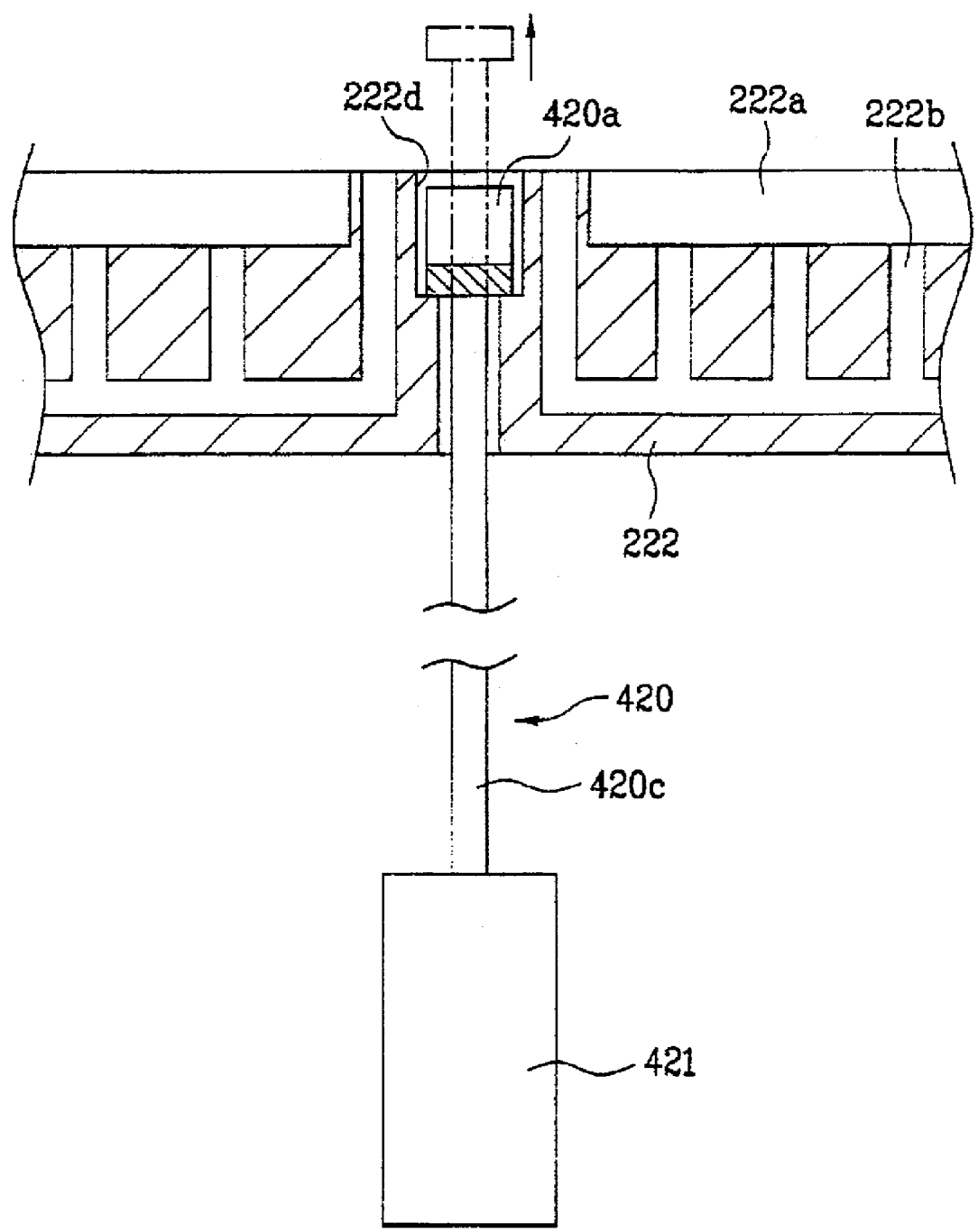
Figure 43B:
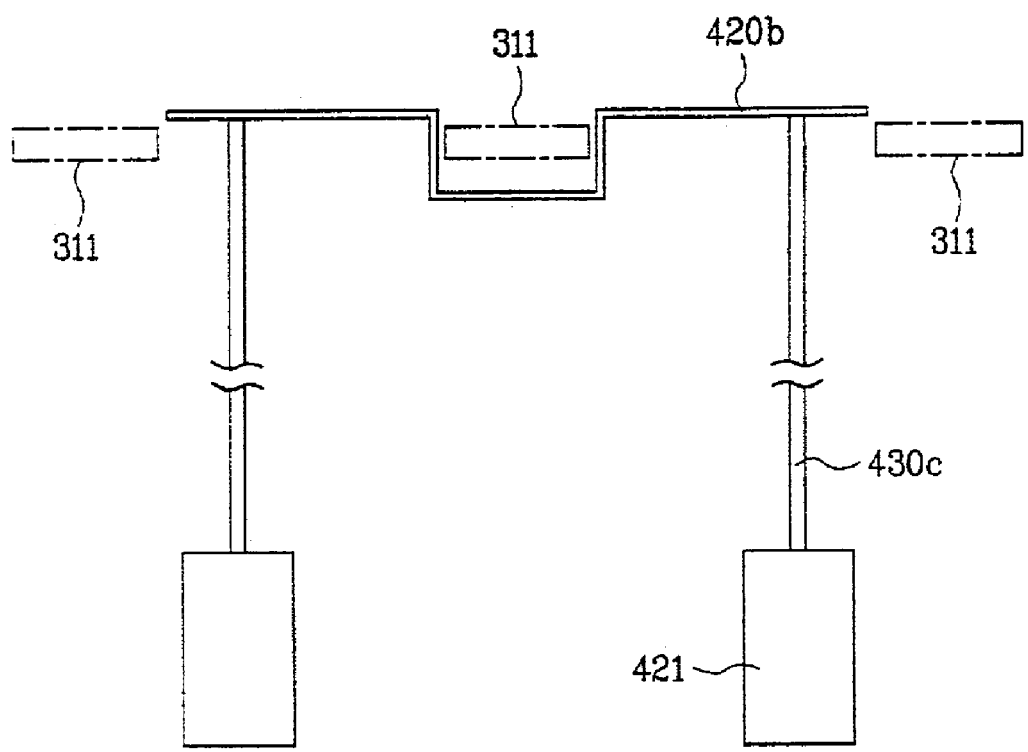
Figure 44:
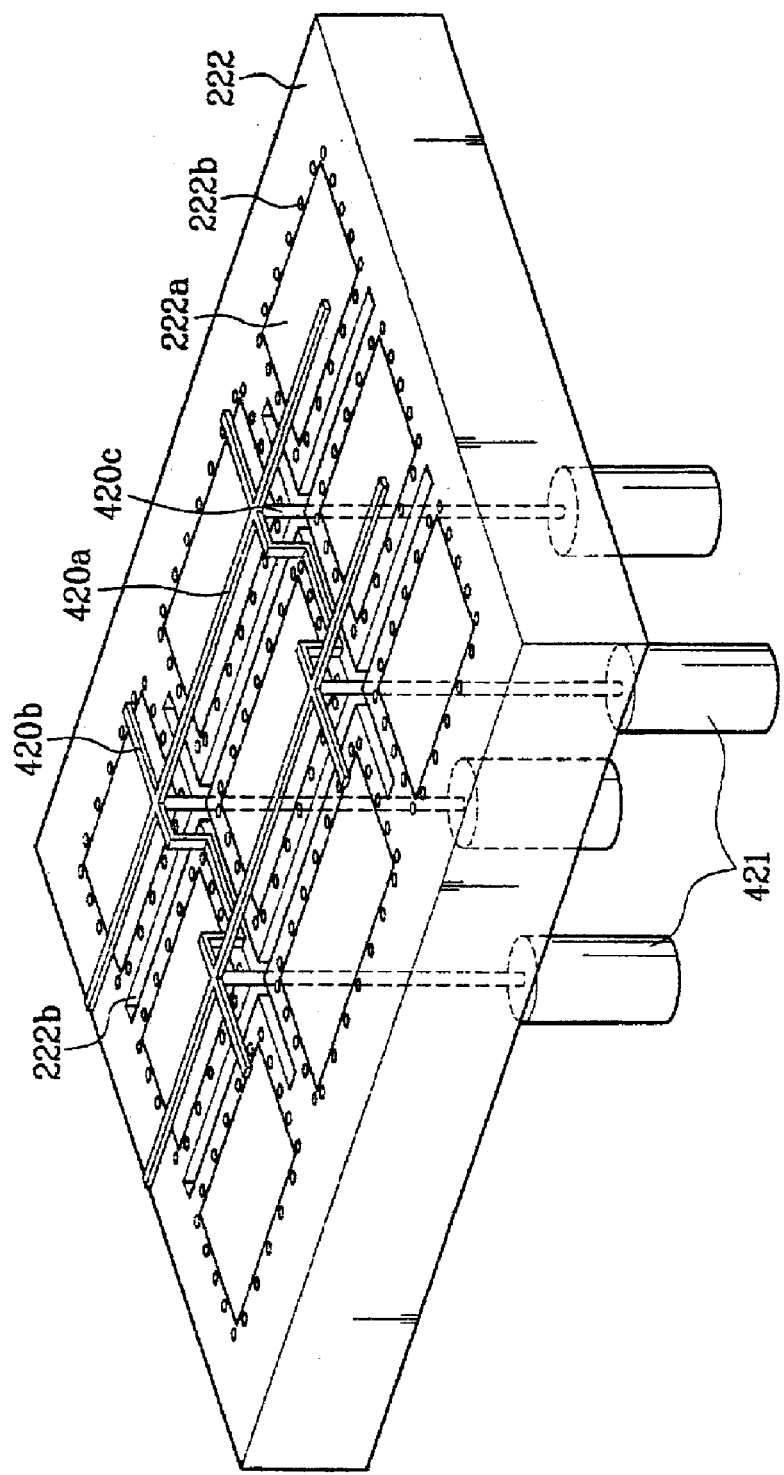
Figure 45:
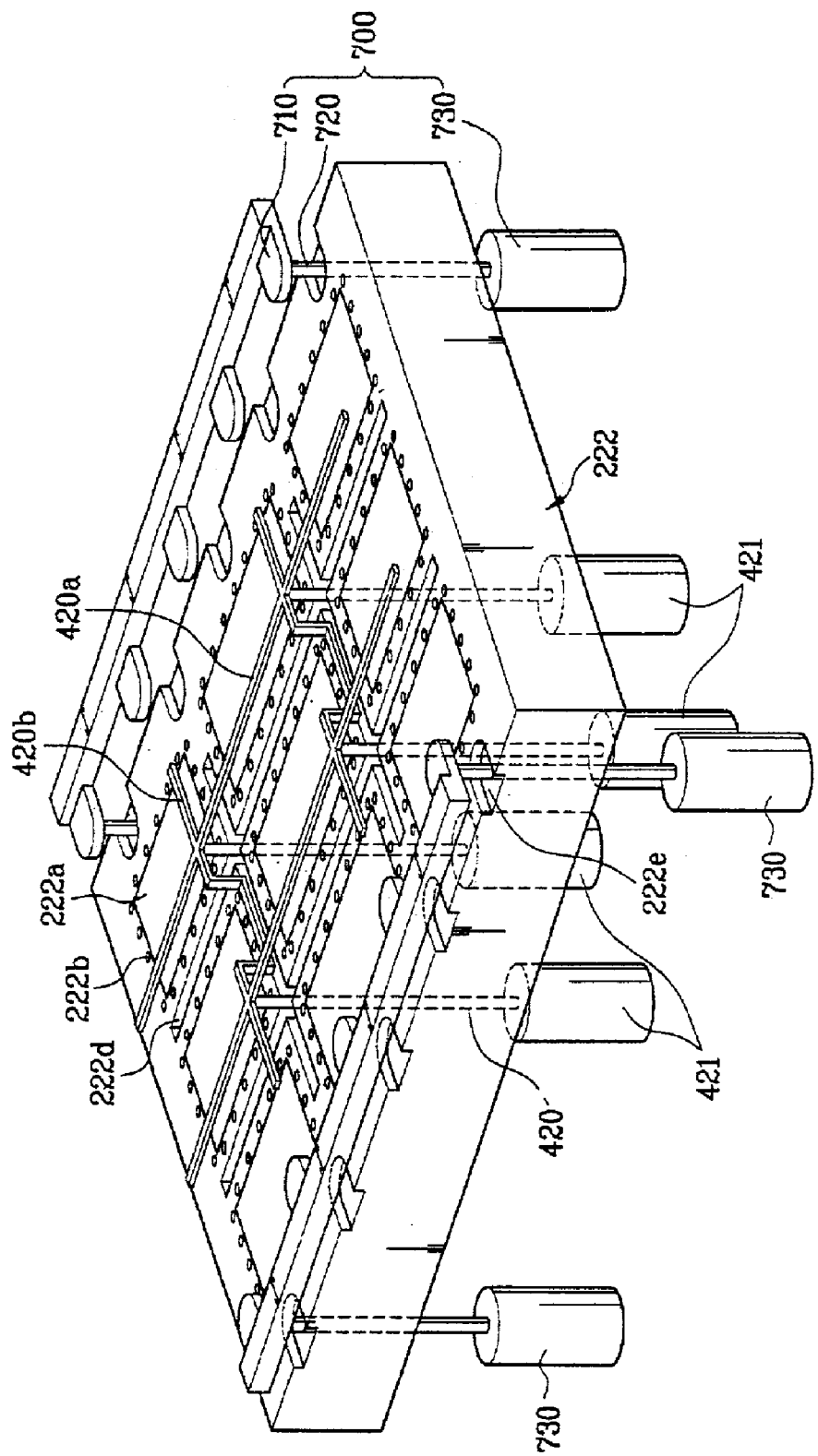
Figure 46:
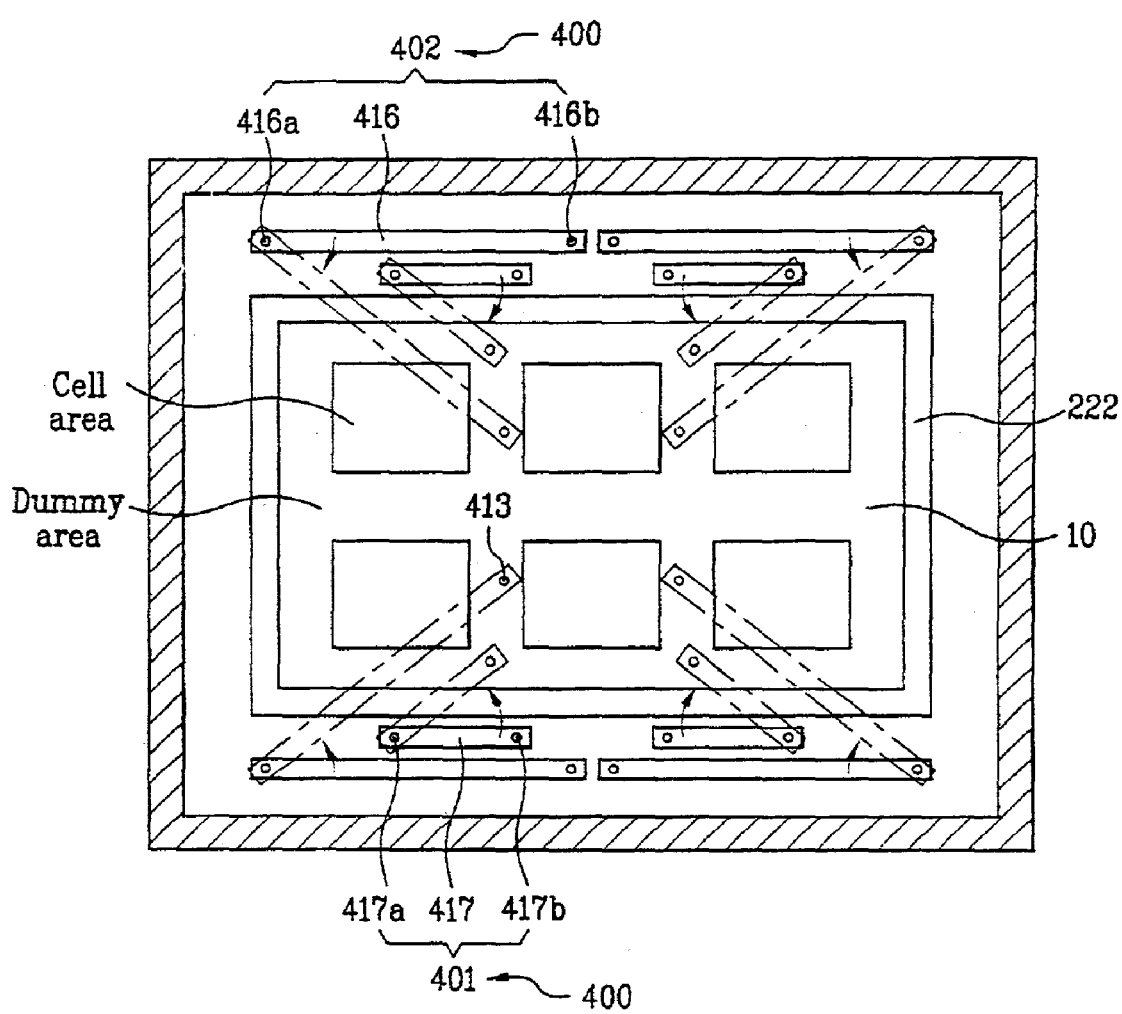
Figure 47:
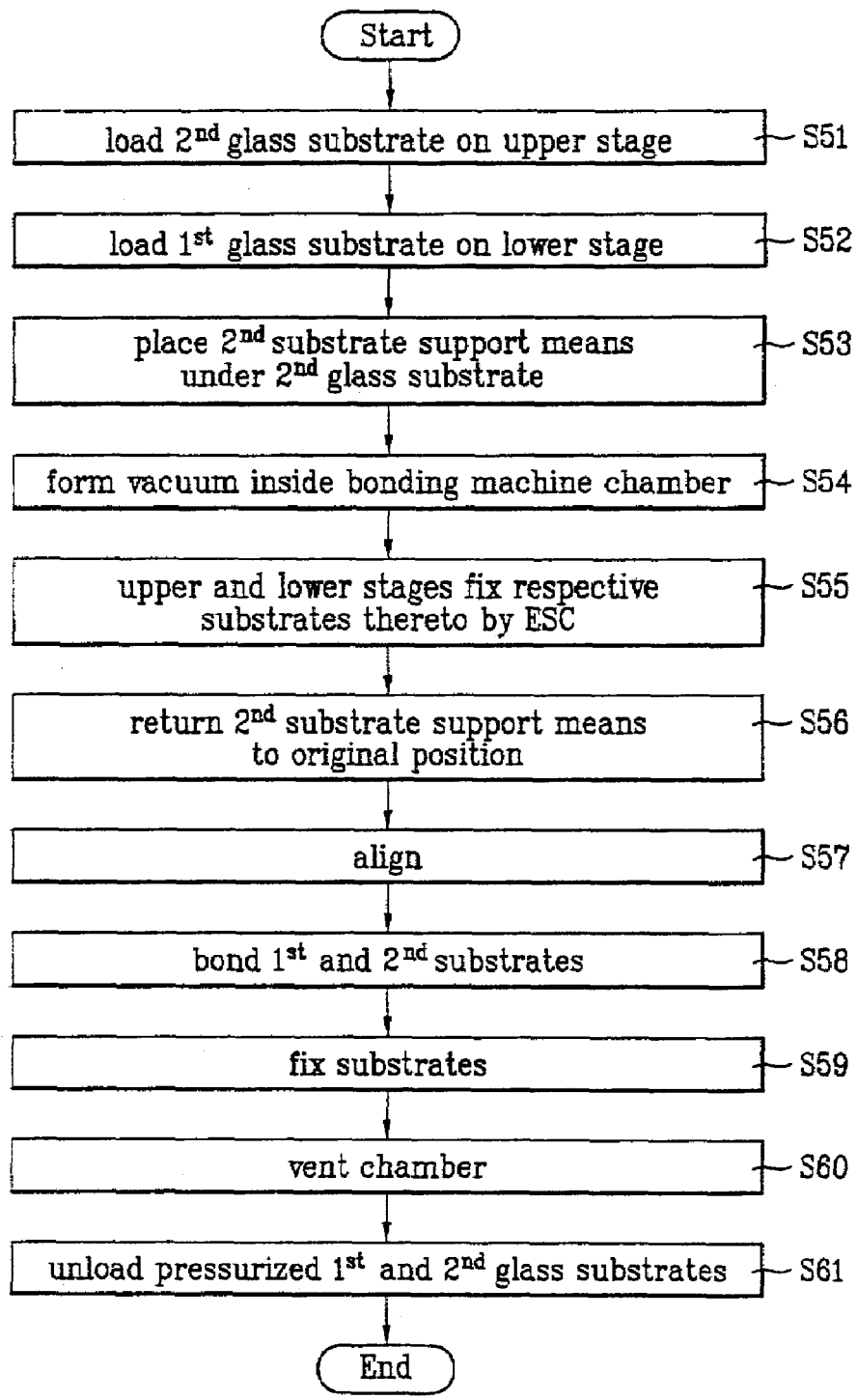
Figure 49A:
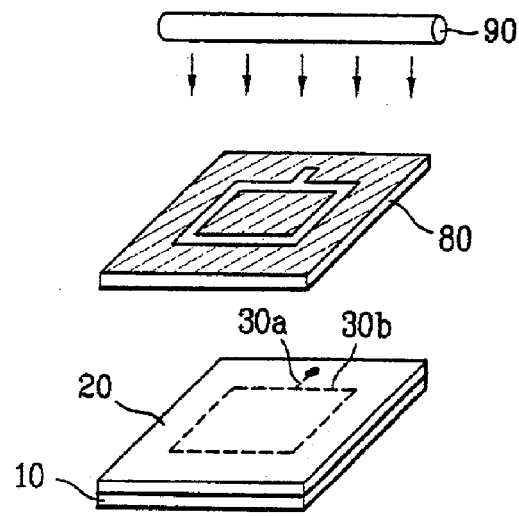
Figure 49B:
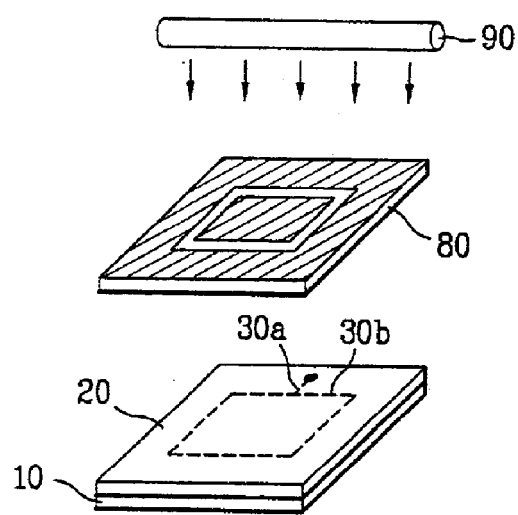
Figure 50:
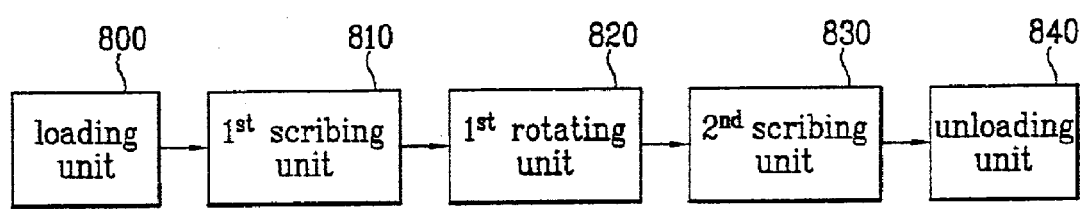
Figure 52:
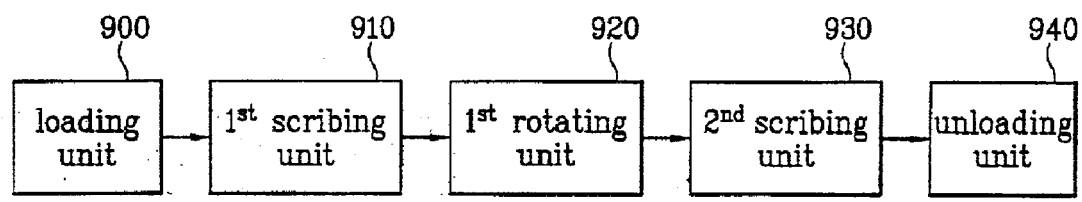
Figure 53A:
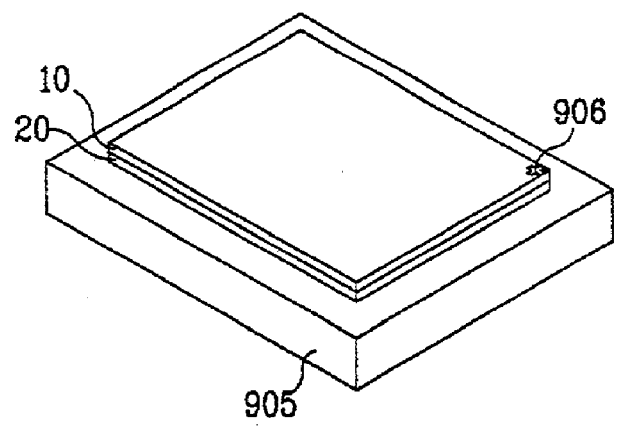
Figure 53B:
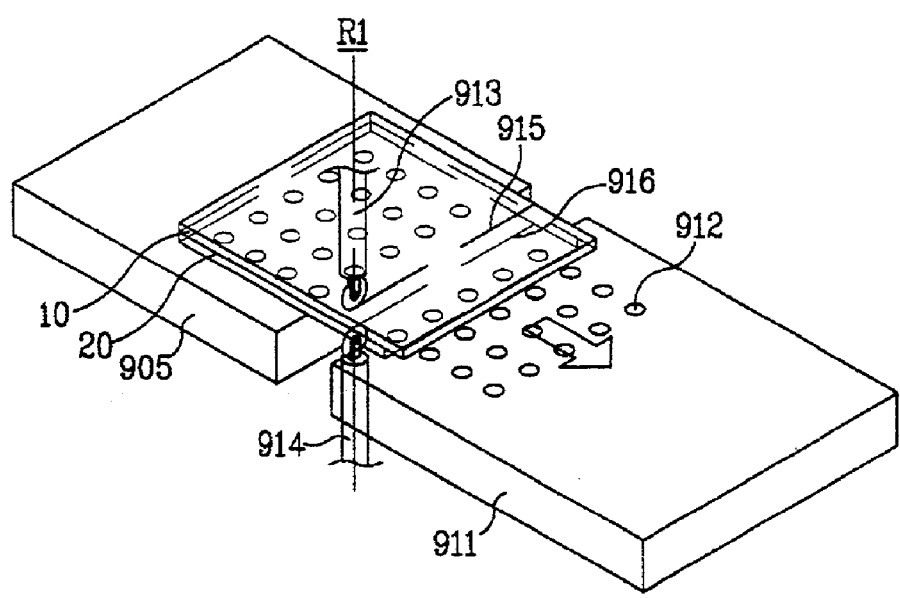
Figure 53C:
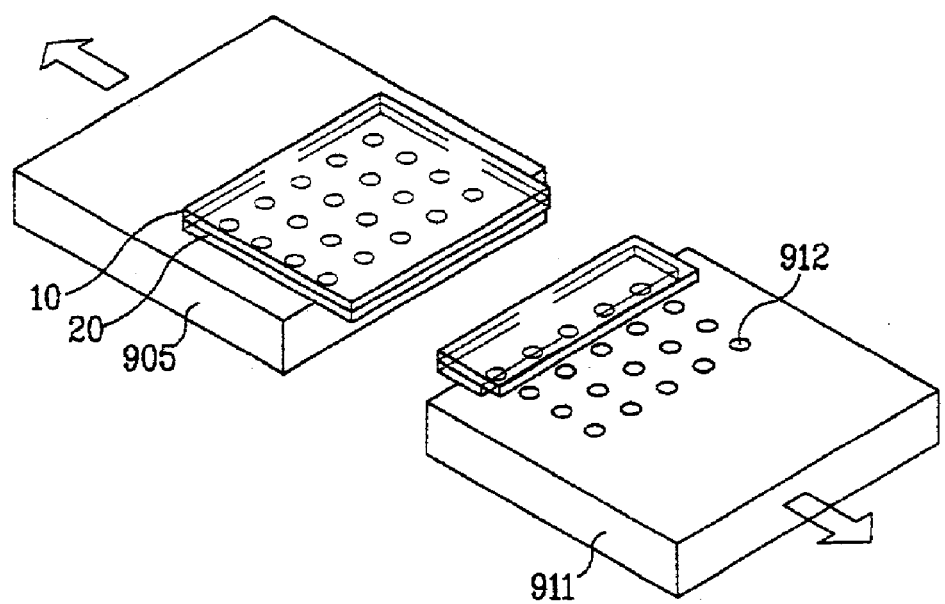
Figure 53D:
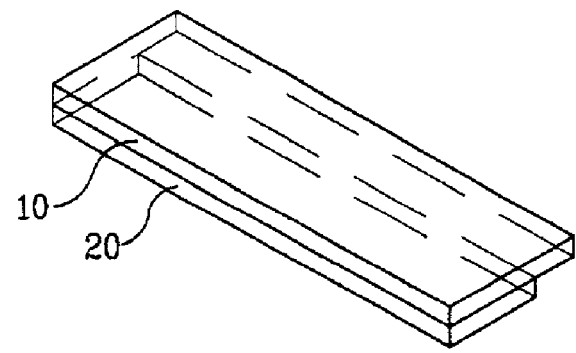
Figure 53E:
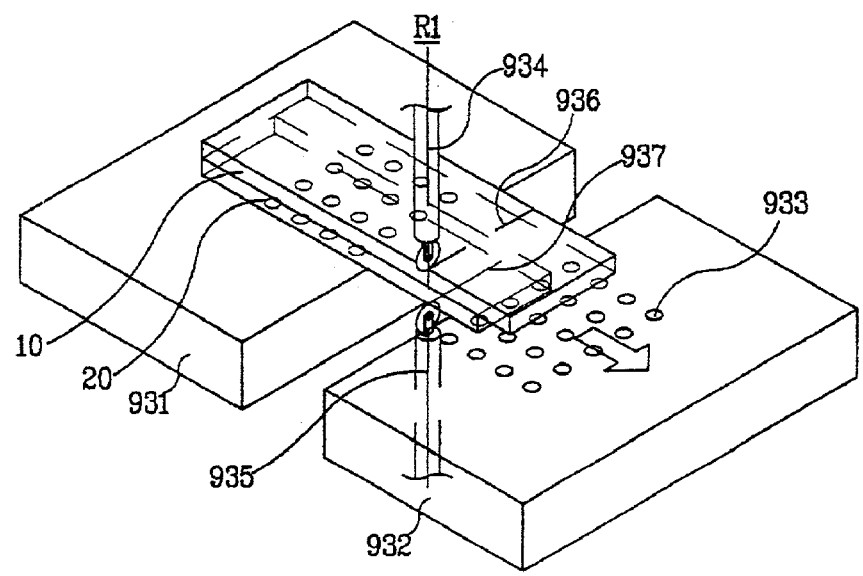
Figure 53F:
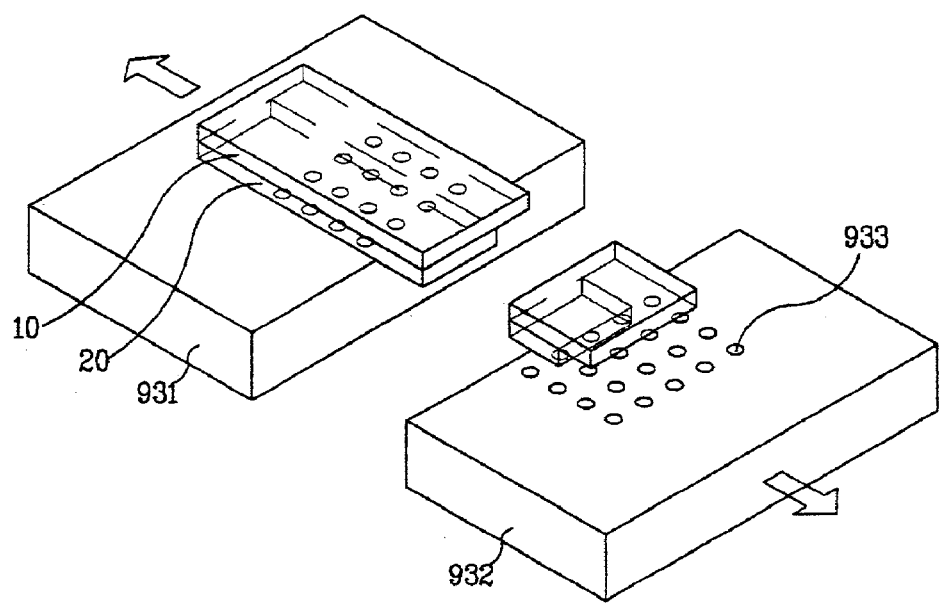
Figure 53G:
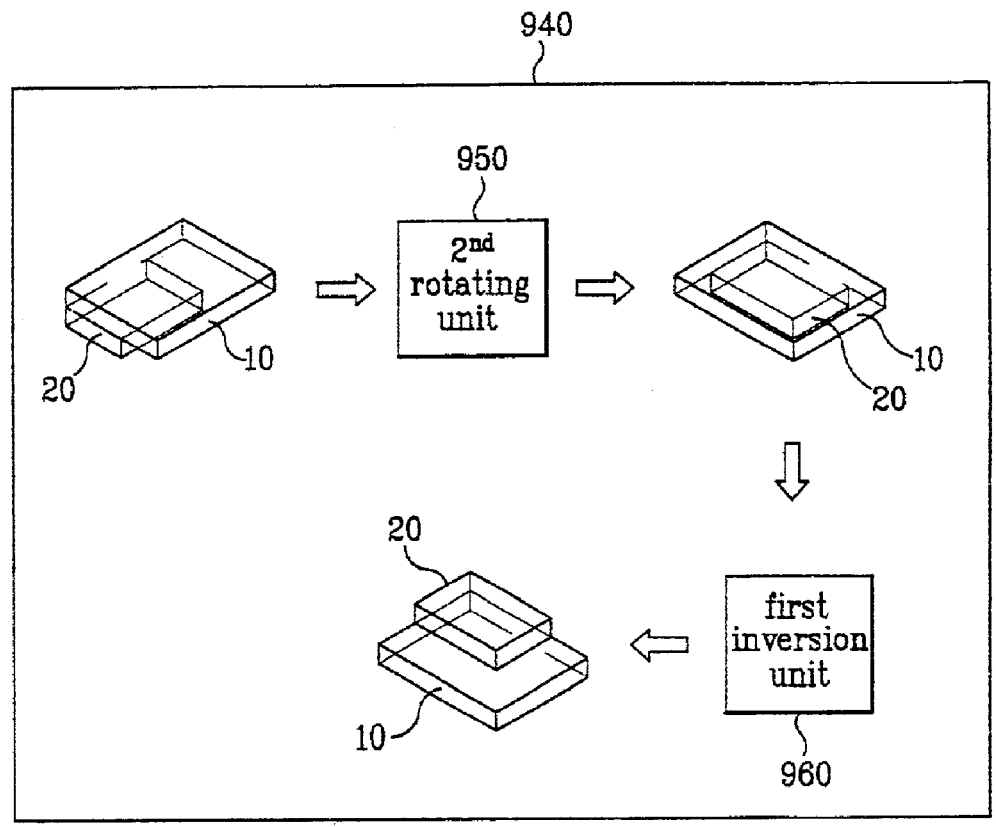
Figure 54:
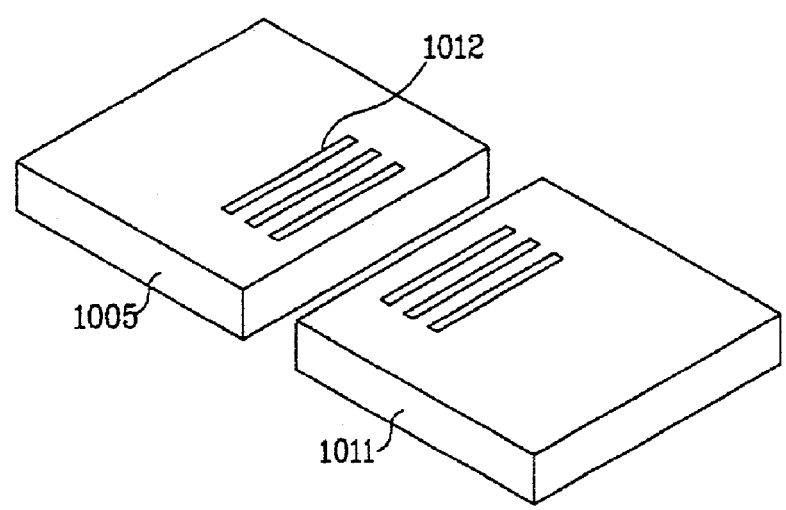
Figure 55A:
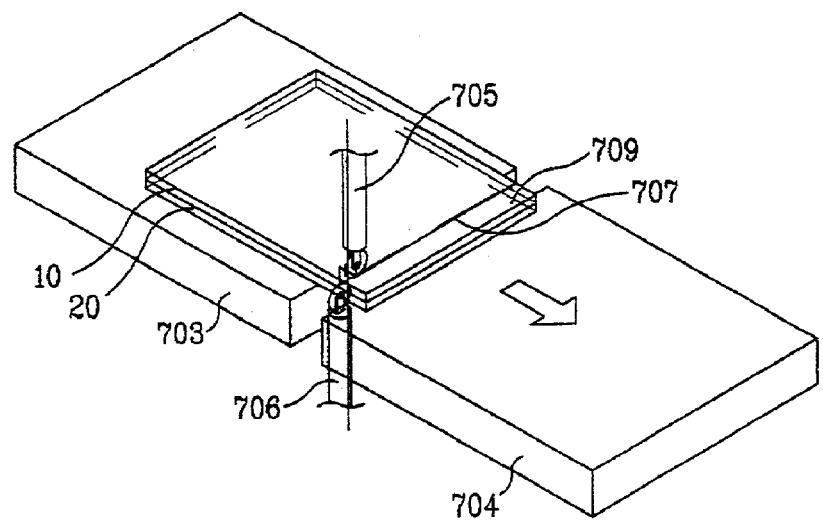
Figure 55B:
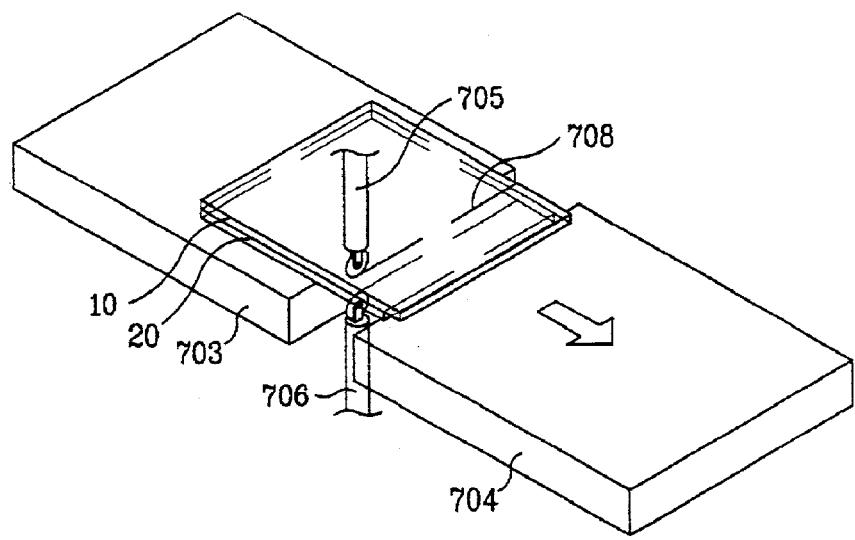
Figure 57A:
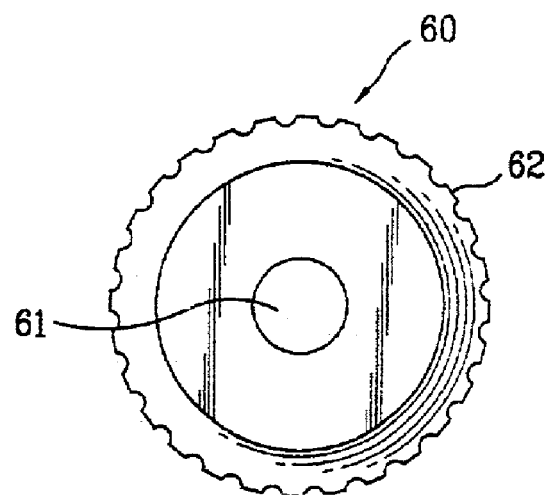
Figure 57B:
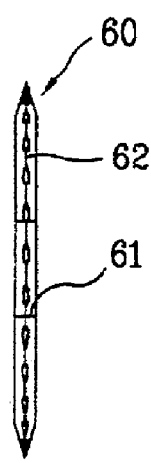
Figure 58:
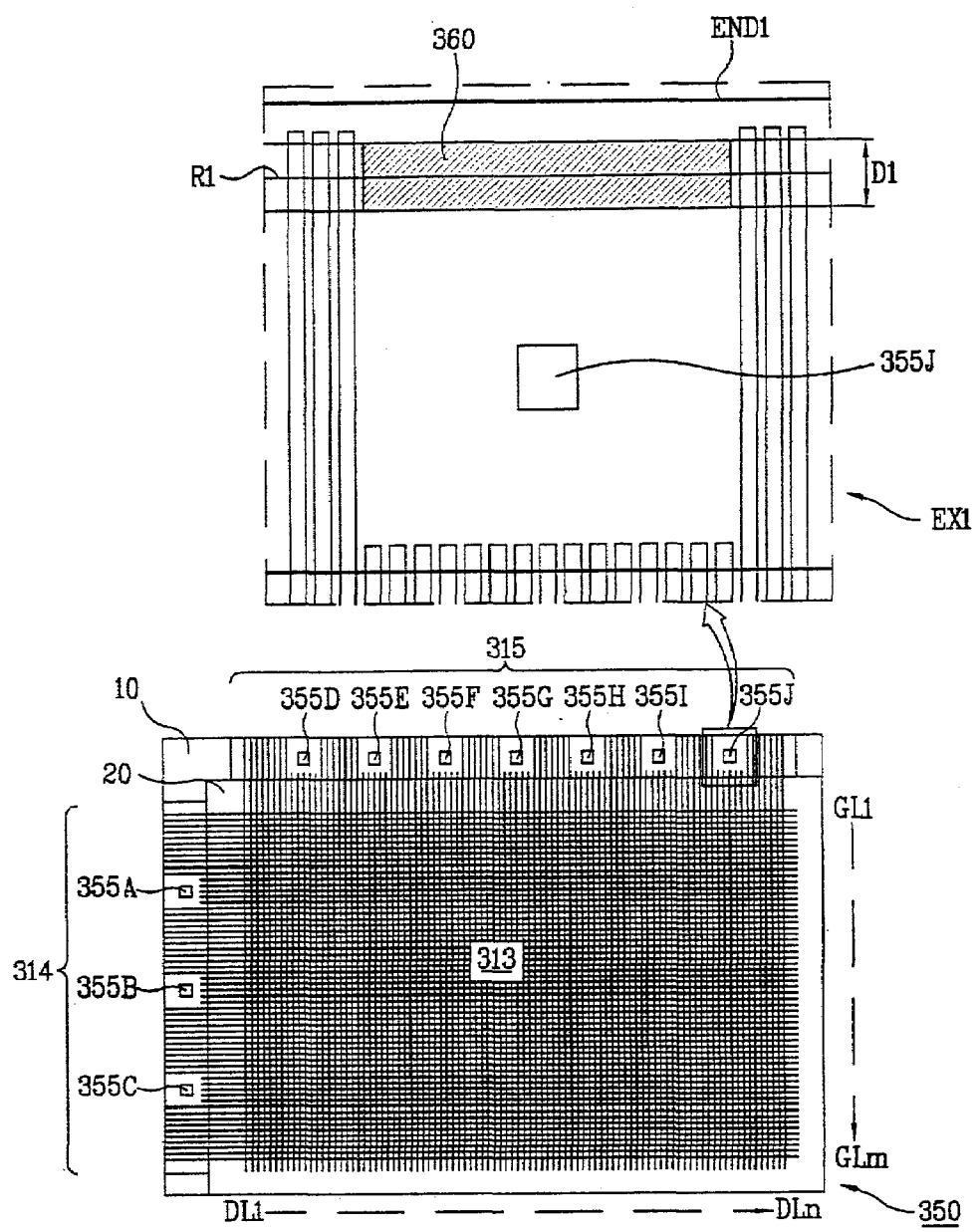
Figure 59:
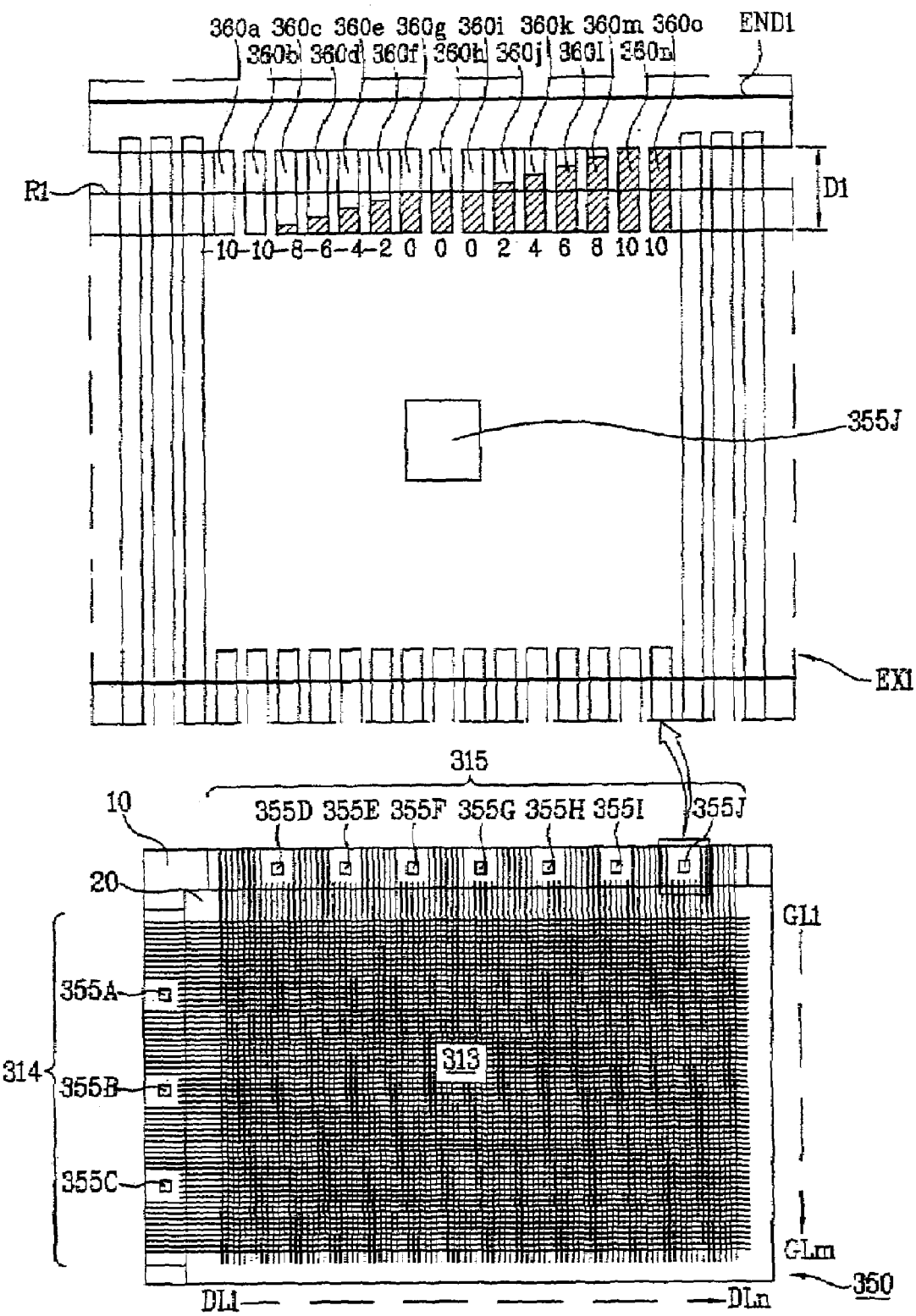
Figure 60:
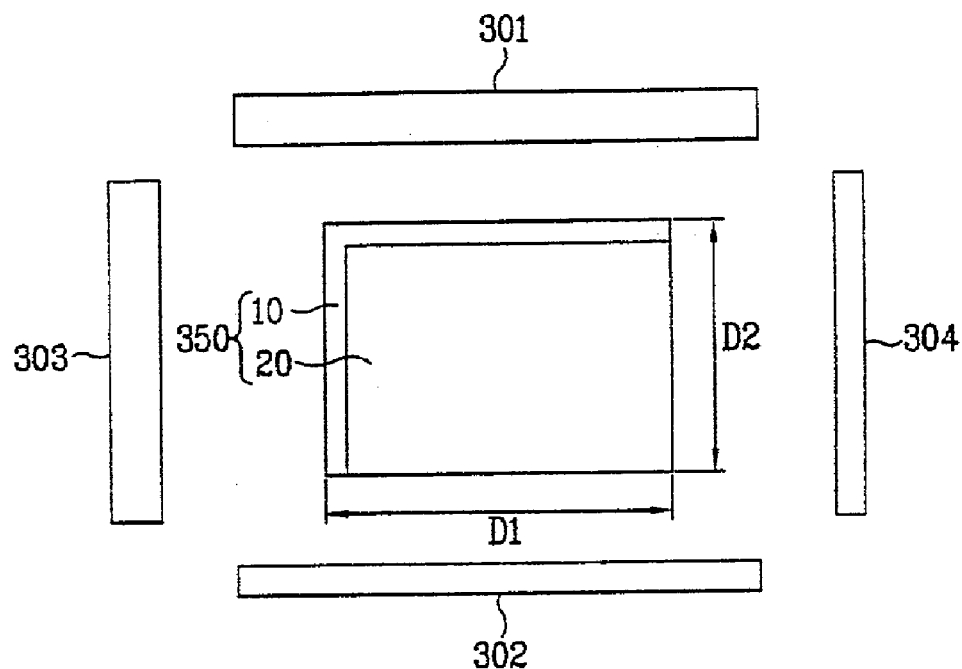
Figure 61A:
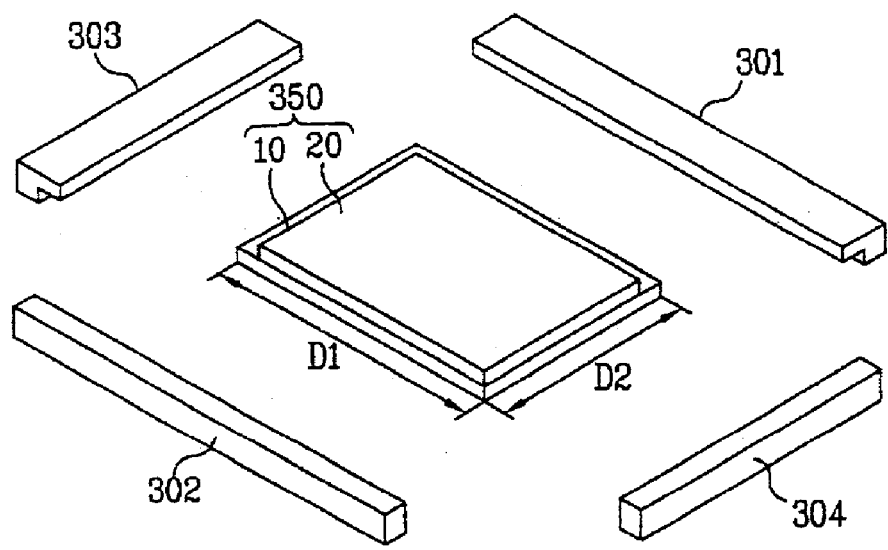
Figure 61B:
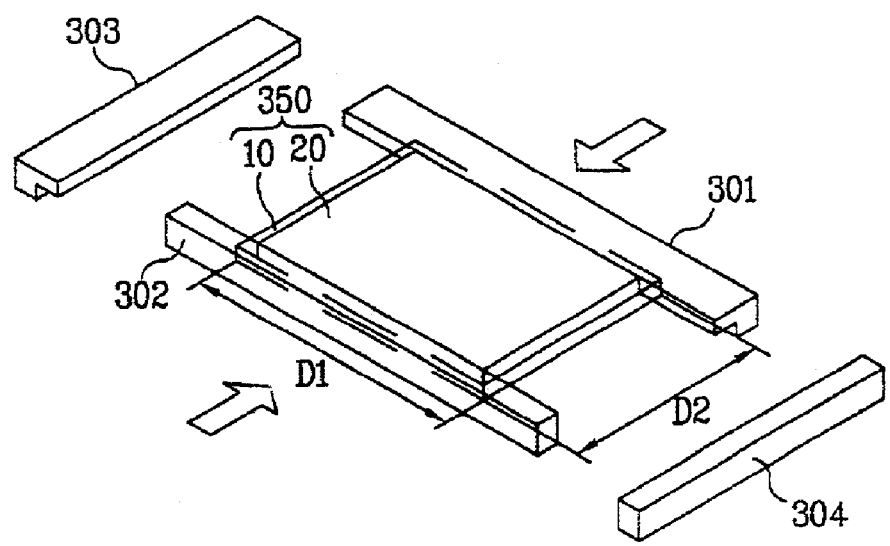
Figure 61C:
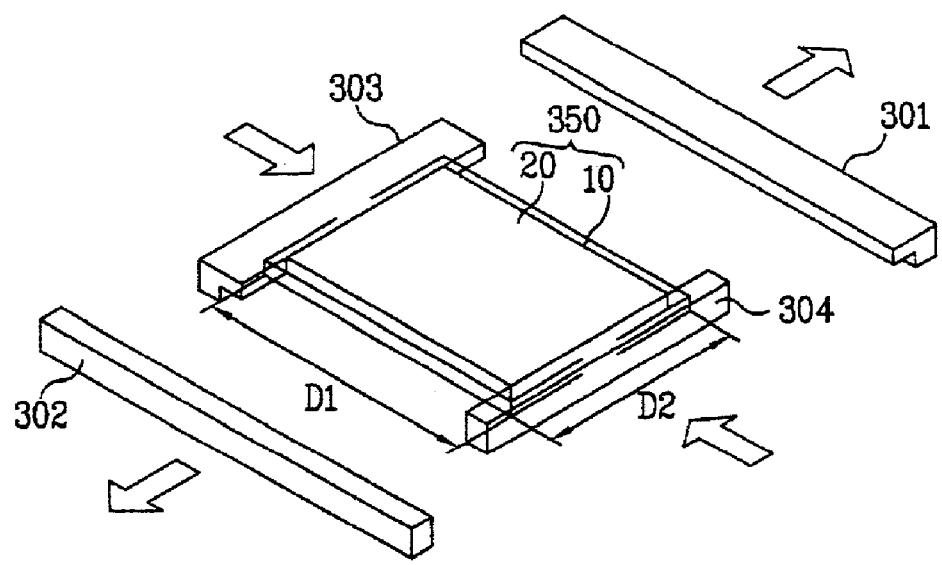
Figure 62:
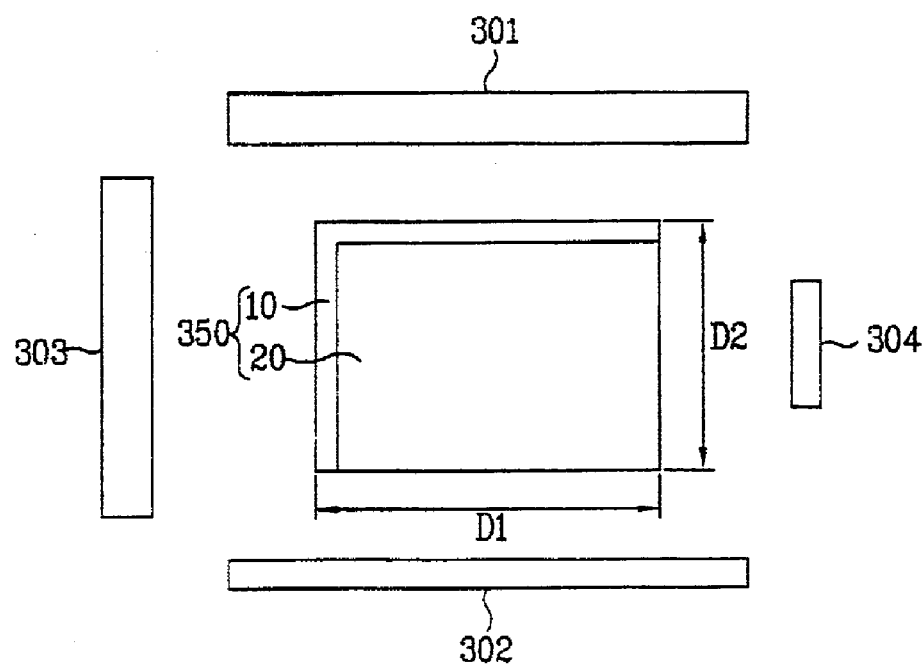
Figure 63A:
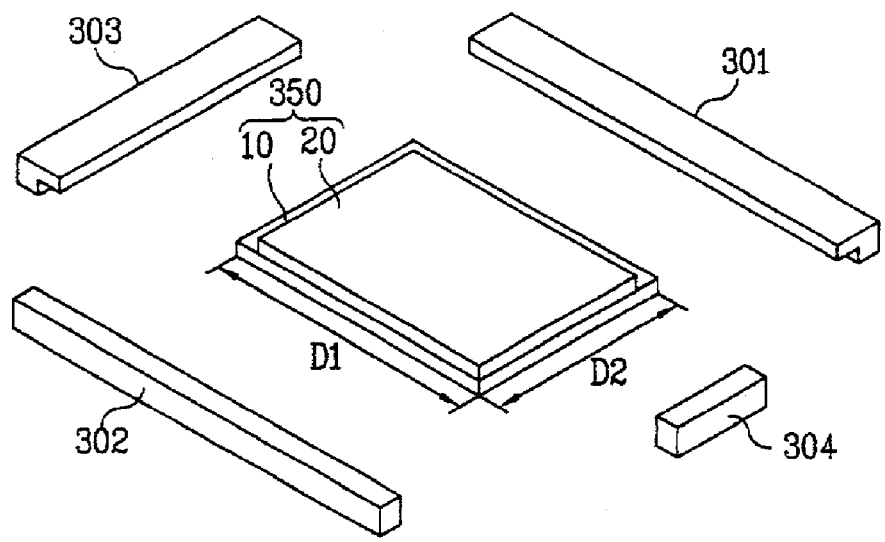
Figure 63B:
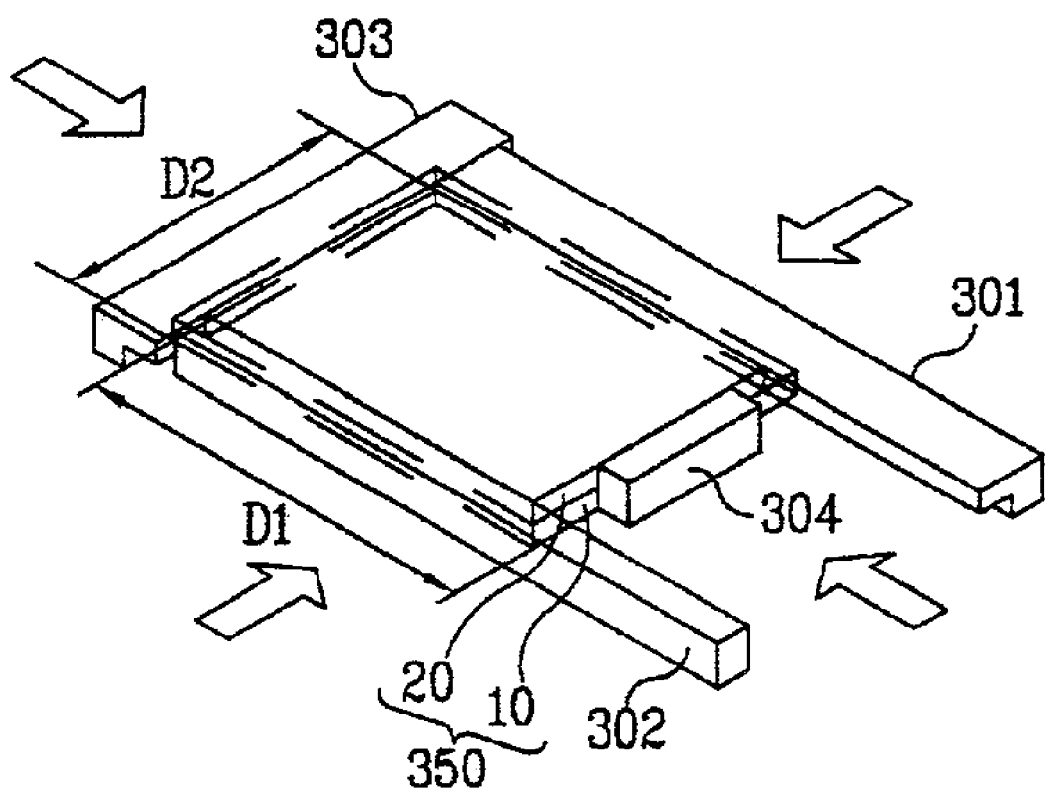
Figure 64:
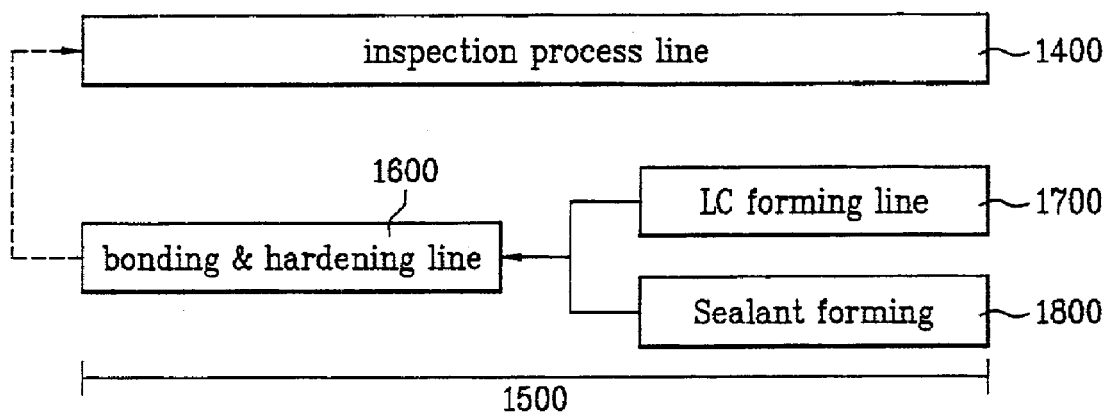
Figure 65:
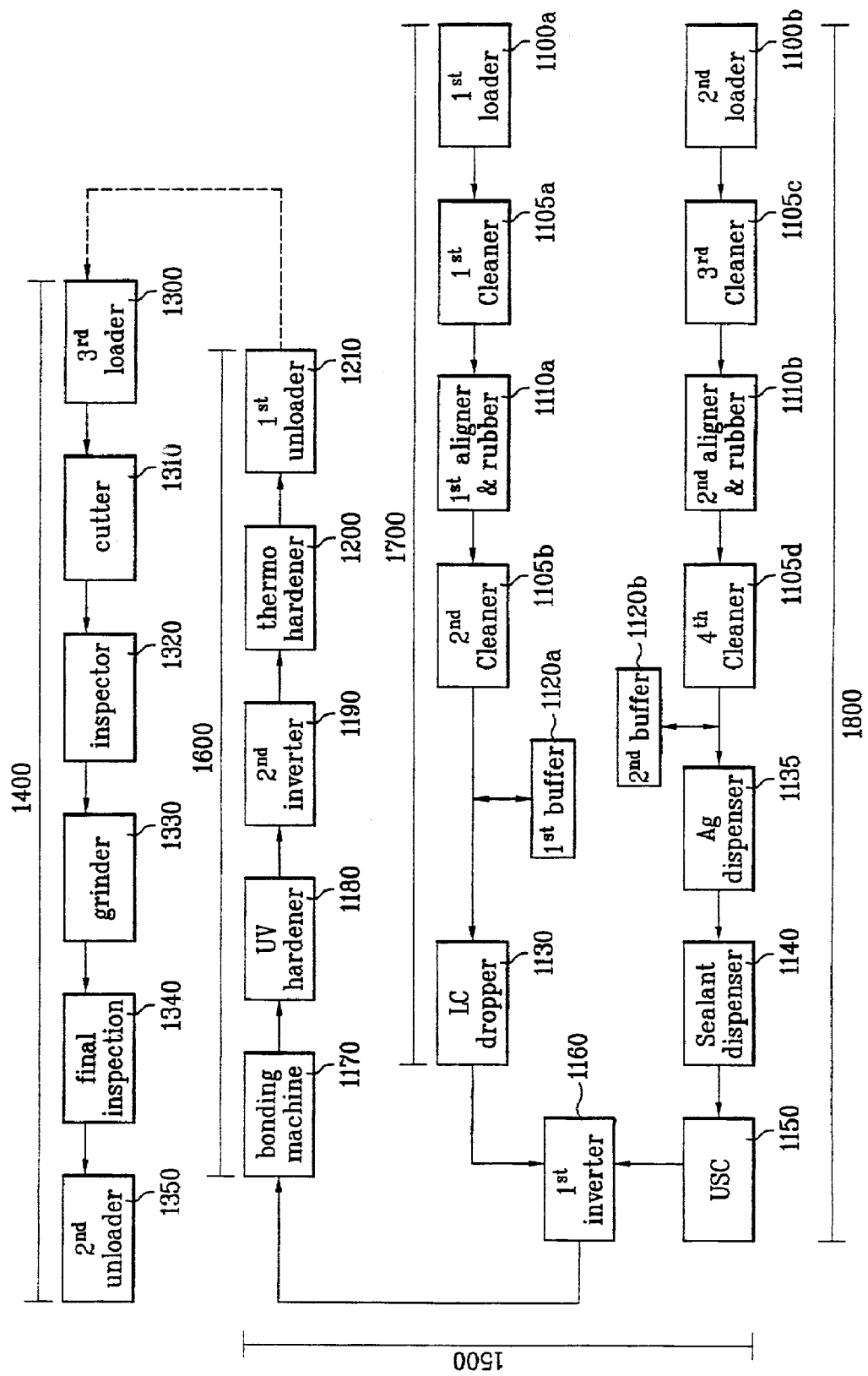
Figure 66A:
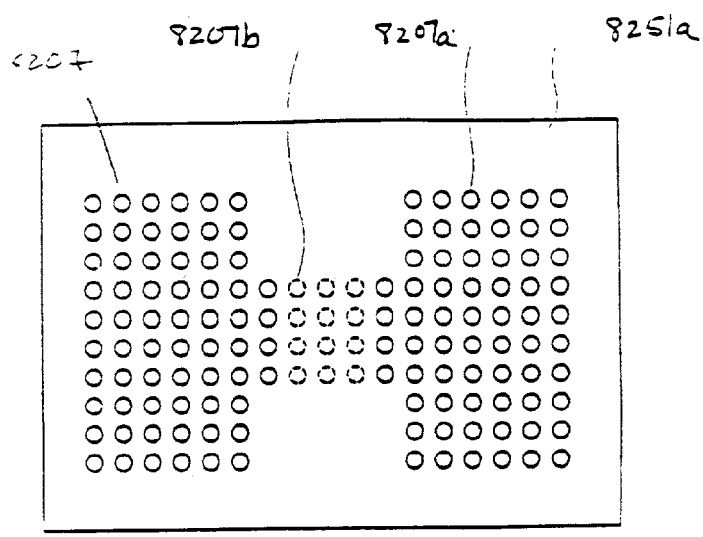
Figure 66B:
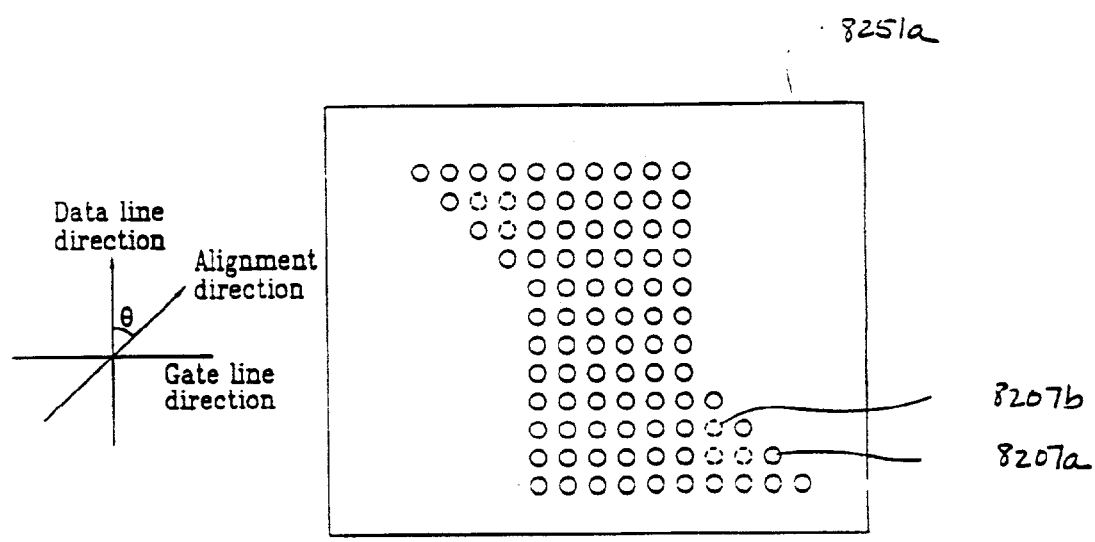
Figure 66C:
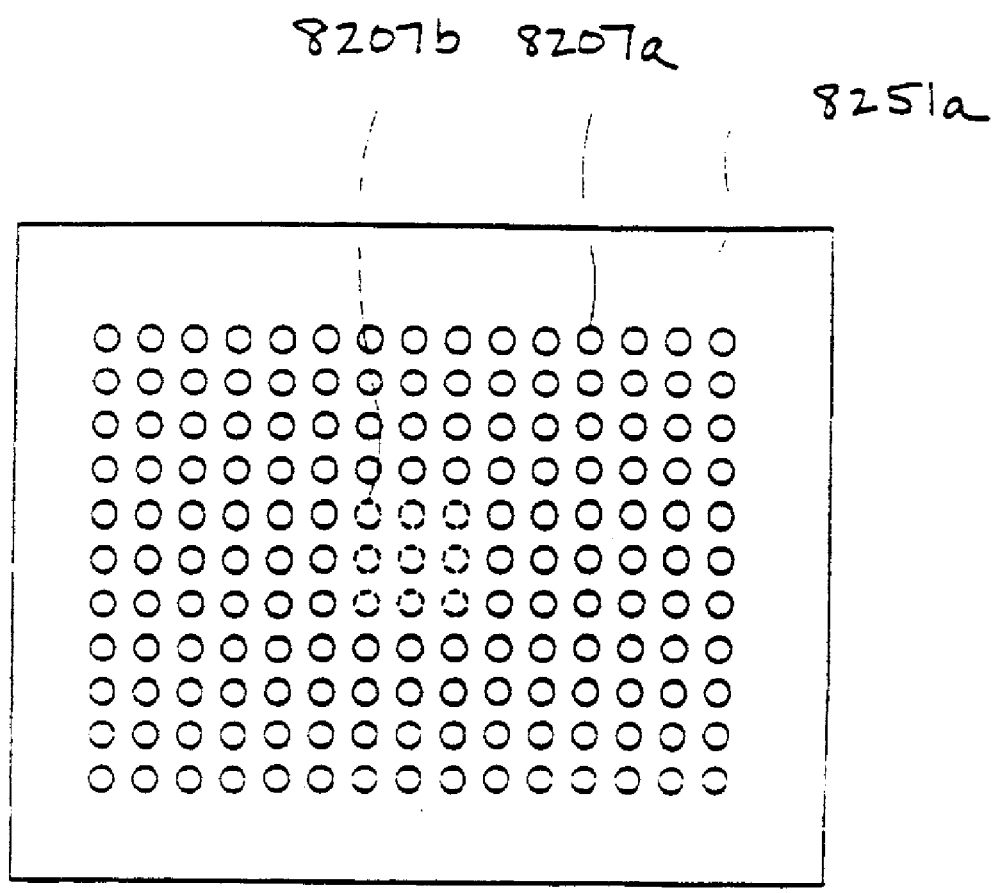
Figure 66D:
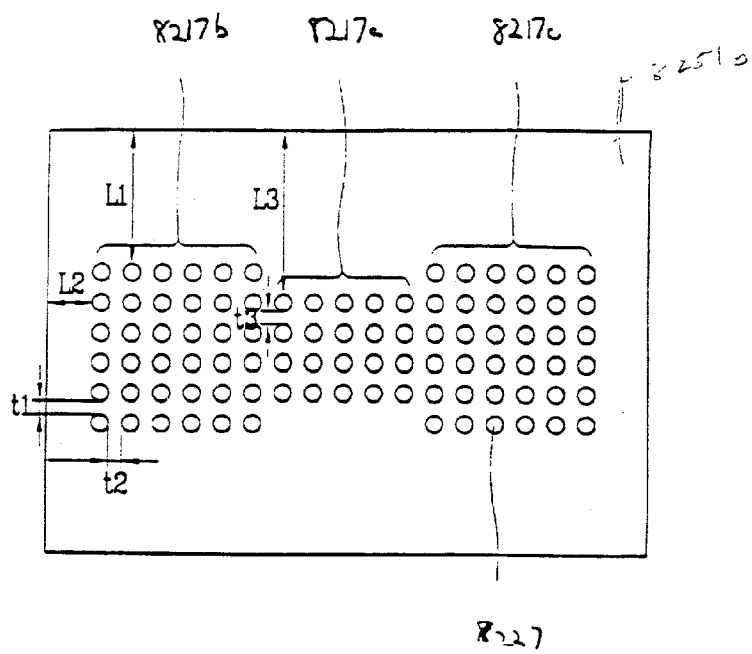
Figure 66E:
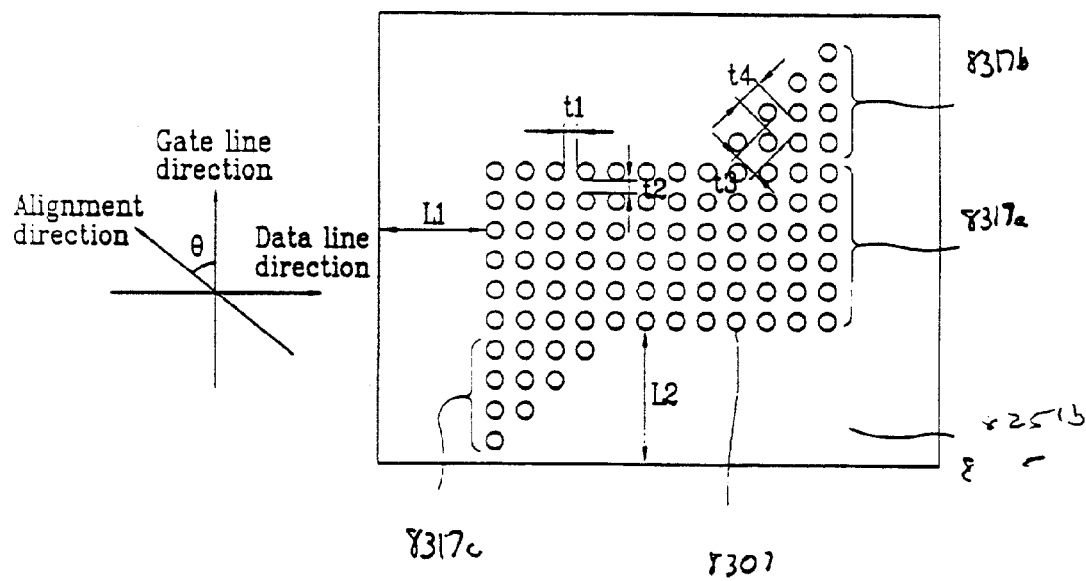
Figure 66F:
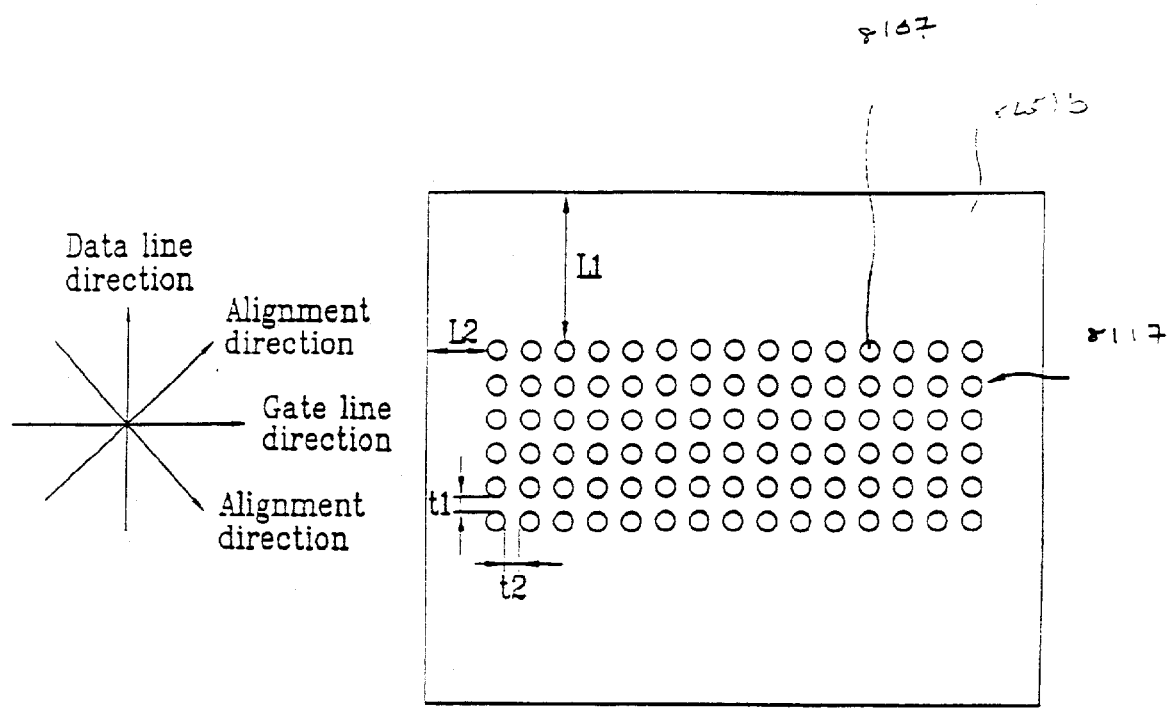
Figure 66G:
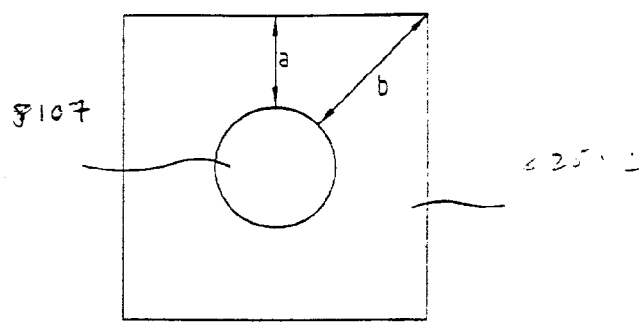
Figure 66H:
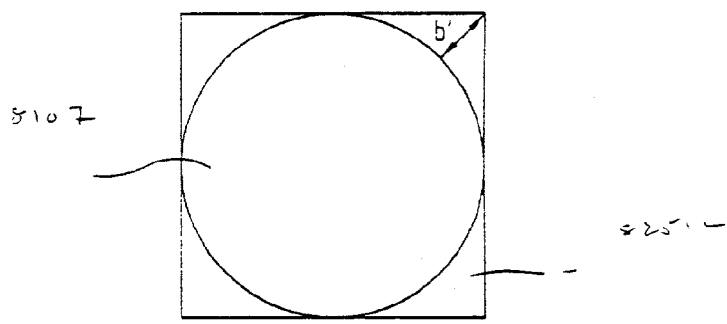
Figure 66I:
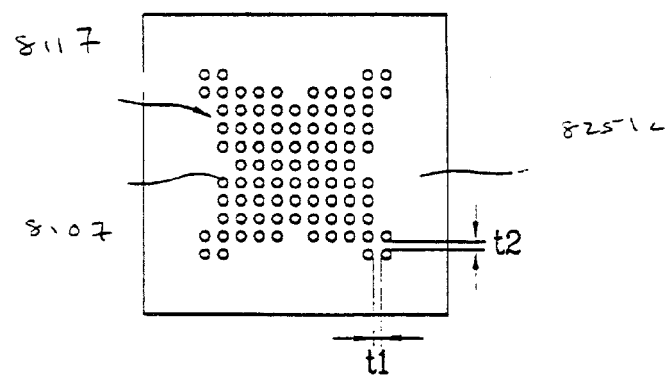
Figure 66J:
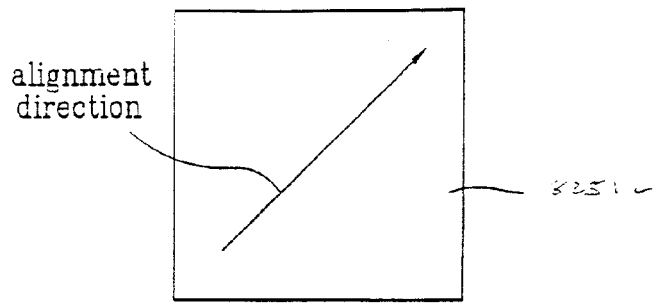
Figure 66K:
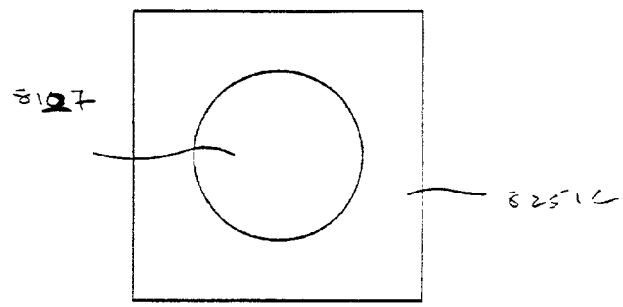
Figure 66L:
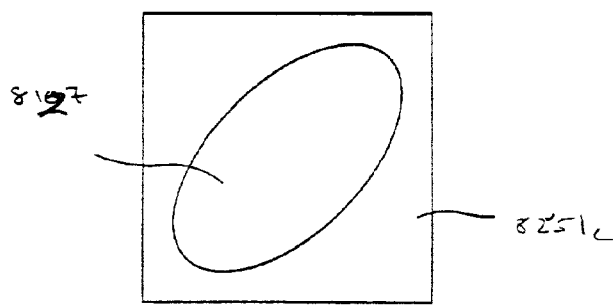
Figure 66M:
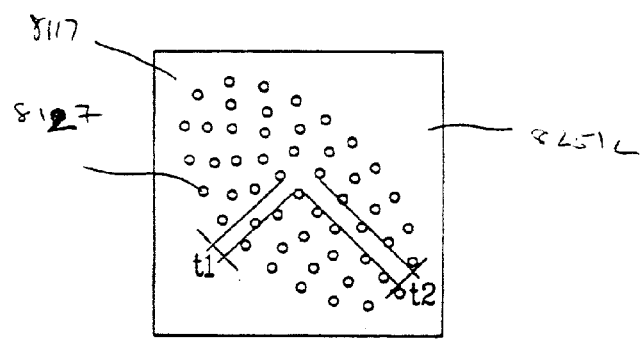
Figure 66N:
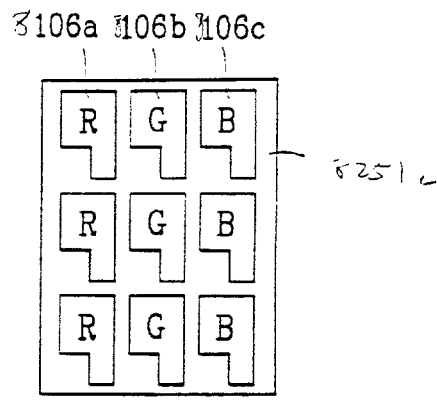
Figure 66O:
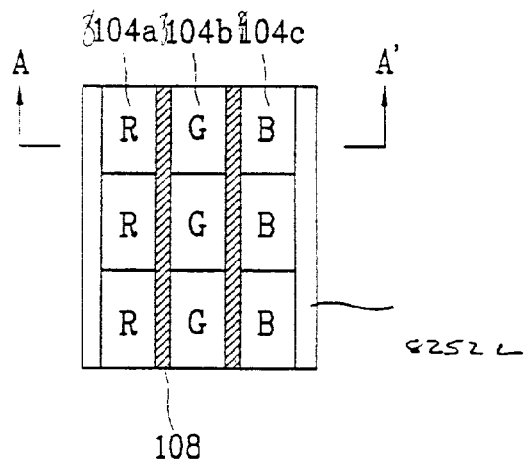
Figure 66P:
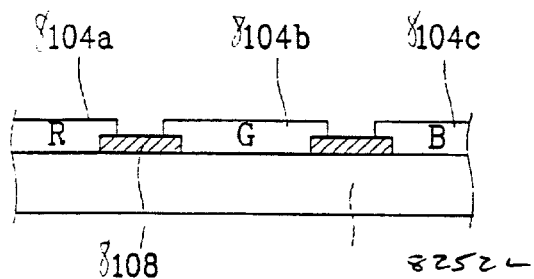
Figure 66Q:
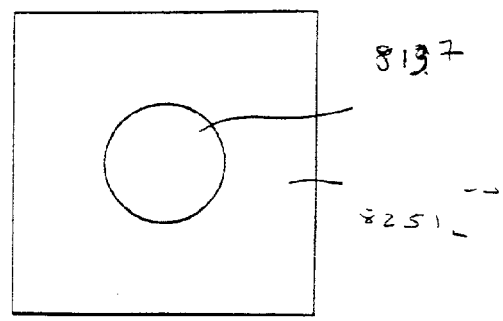
Figure 66R:
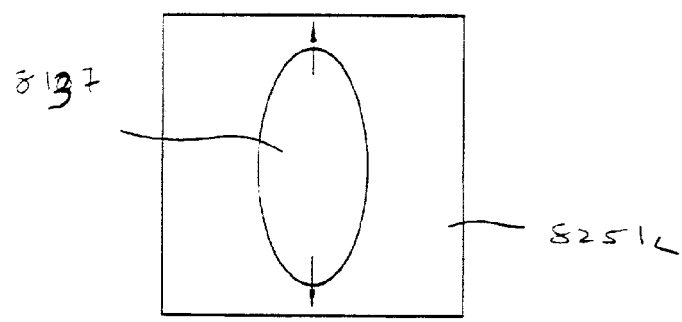

FIG. 29 illustrates a magnified view of a part 'A' in FIG. 28A, which includes FIG. 29A illustrating a bird's-eye view and FIG. 29B illustrating a cross-sectional view;

FIG. 30 illustrates detailed constitutions of main control units in FIGS. 28A and 28B;

FIG. 31 illustrates a detailed constitution of an input unit in FIG. 30;

FIG. 32 illustrates a detailed constitution of a dropping pattern calculation unit in FIG. 30;

FIG. 33 illustrates a flowchart of an LC dropping method according to the present invention;

FIG. 34 illustrates a detailed constitution of a compensation control unit included in the main control units in FIG. 28A and FIG. 28B;

FIG. 35 illustrates a detailed constitution of a compensation amount calculation unit in FIG. 34;

FIG. 36 illustrates a detailed constitution of a dropping pattern compensation unit in FIG. 34;

FIG. 37 illustrates a flowchart of a compensation method of LC dropping amount according to the present invention;

FIGS. 38A to 38C illustrate layouts of LC dropping positions according to the present invention;

FIG. 39 illustrates a schematic diagram of a vacuum bonding machine for LCD according to the present invention;

FIG. 40 illustrates a bird's-eye view of an auxiliary process means according to the present invention;

FIG. 41 illustrates a layout of a loaded state of an auxiliary process means according to the present invention;

FIG. 42 illustrates a schematic layout of a lower stage receiving a first substrate support means according to the present invention;

FIG. 43A illustrates a magnified cross-sectional view of a part 'B' in FIG. 39;

FIG. 43B illustrates a constitutional state diagram of a first support installed in a direction vertical to loading/unloading directions of a first substrate and viewed from the loading/unloading directions of the first substrate;

FIG. 44 illustrates a schematic bird's-eye view of the first substrate support means in FIG. 42 for explaining an operational state thereof;

FIG. 45 illustrates a schematic drawing of a lower sage to which a clamping means is applied according to the present invention;

FIG. 46 illustrates a schematic diagram of a vacuum bonding machine to which a second support means is applied according to the present invention;

FIG. 47 illustrates a flowchart of an LCD bonding process according to the present invention;

FIGS. 48A to 48E illustrate cross-sectional views of an LC dropping type LCD fabrication process according to the present invention;

FIG. 49A and FIG. 49B illustrate bird's-eye views for a UV-hardening step in an LCD fabrication process according to the present invention;

FIG. 50 illustrates an exemplary block diagram of a cutter of a liquid crystal display panel according to an embodiment of the present invention;

FIGS. 51A to 51G illustrate detailed exemplary diagrams of a sequential process carried out in each of the blocks in FIG. 50;

FIG. 52 illustrates an exemplary block diagram of a cutter of a liquid crystal display panel according to another embodiment of the present invention;

FIGS. 53A to 53G illustrate detailed exemplary diagrams of a sequential process carried out in each of the blocks in FIG. 52;

FIG. 54 illustrates another exemplary diagram of suction holes formed at surfaces of first to fourth tables in FIGS. 53A to 53G respectively;

FIG. 55A and FIG. 55B illustrate detailed exemplary diagrams of first and second scribing processes applied thereto through the embodiments according to the present invention;

FIGS. 56A to 56F illustrate detailed exemplary diagrams of a sequential scribing process according to a further embodiment of the present invention;

FIG. 57A and FIG. 57B illustrate exemplary embodiments of cutting wheels used in cutting a liquid crystal display panel according to the present invention;

FIG. 58 illustrates an exemplary diagram of a grinded amount detecting pattern of a liquid crystal display panel according to an embodiment of the present invention;

FIG. 59 illustrates an exemplary diagram of a grinded amount detecting pattern of a liquid crystal display panel according to another embodiment of the present invention;

FIG. 60 illustrates an inspecting device of a liquid crystal display panel according to an embodiment of the present invention;

FIGS. 61A to 61C illustrate exemplary diagrams of an inspection method of a unit liquid crystal display panel using the inspecting device in FIG. 60 according to an embodiment of the present invention sequentially;

FIG. 62 illustrates an inspecting device of a liquid crystal display panel according to another embodiment of the present invention;

FIG. 63A and FIG. 63B illustrate exemplary diagrams of an inspection method of a unit liquid crystal display panel using the inspecting device in FIG. 62 according to another embodiment of the present invention sequentially;

FIG. 64 illustrates a schematic diagram of an LCD fabrication system using liquid crystal dropping according to the present invention;

FIG. 65 illustrates a detailed block diagram of the respective parts in FIG. 64;

FIGS. 66A to 66F illustrate exemplary patterns for dropping liquid crystal on a substrate according to the present invention;

FIGS. 66G–66I illustrate exemplary diagrams for explaining a shape of a liquid crystal panel;

FIGS. 66J–66M illustrate exemplary dispensing patterns;

FIGS. 66N–O illustrate substrates;

FIG. 66P illustrates a cross-sectional view along a line A–A' of FIG. 66O;

FIGS. 66Q–66R illustrates a liquid crystal drop; AND

FIGS. 66S–66V illustrates exemplary dispensing patterns.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1A:
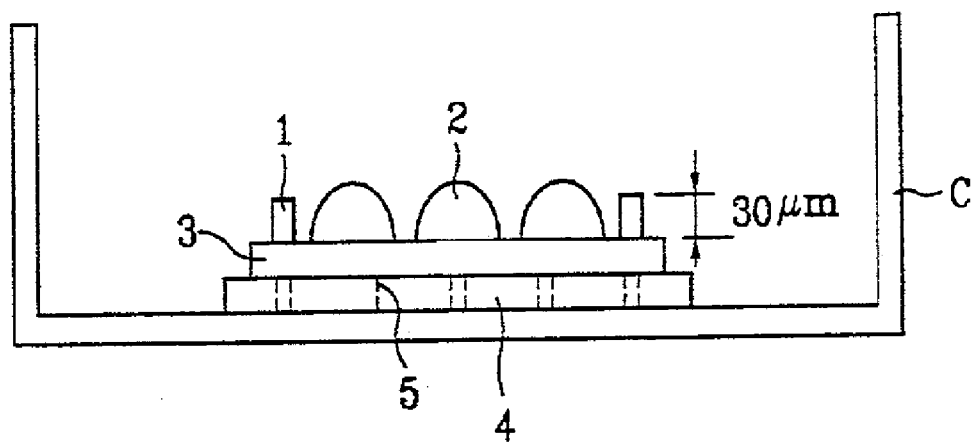
FIGS. 1A to 1F illustrate cross-sectional views of diagrams in an LCD process using liquid crystal dropping according to a related art.
Figure 1B:
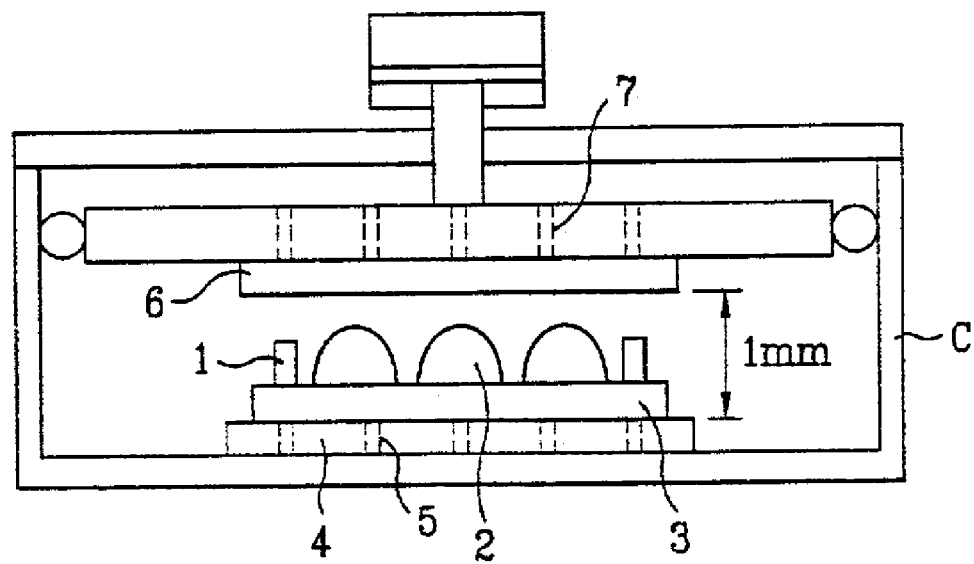
Figure 1C:
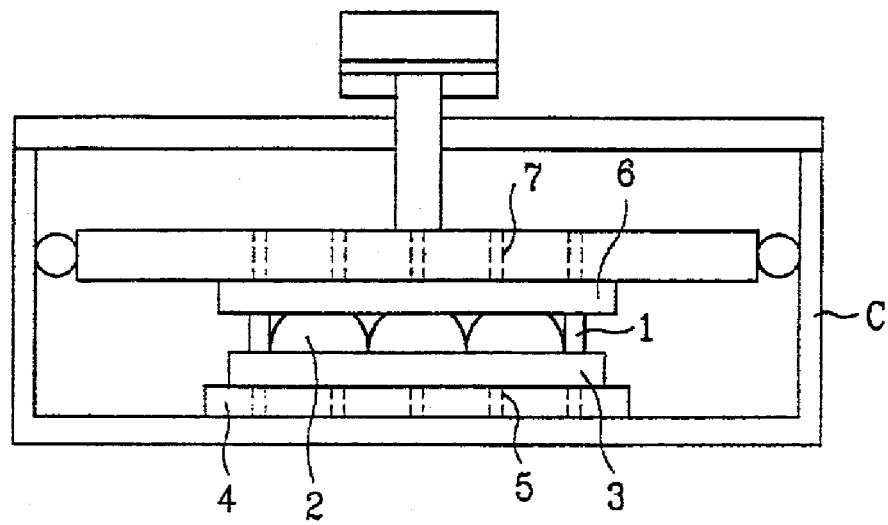
Figure 1D:
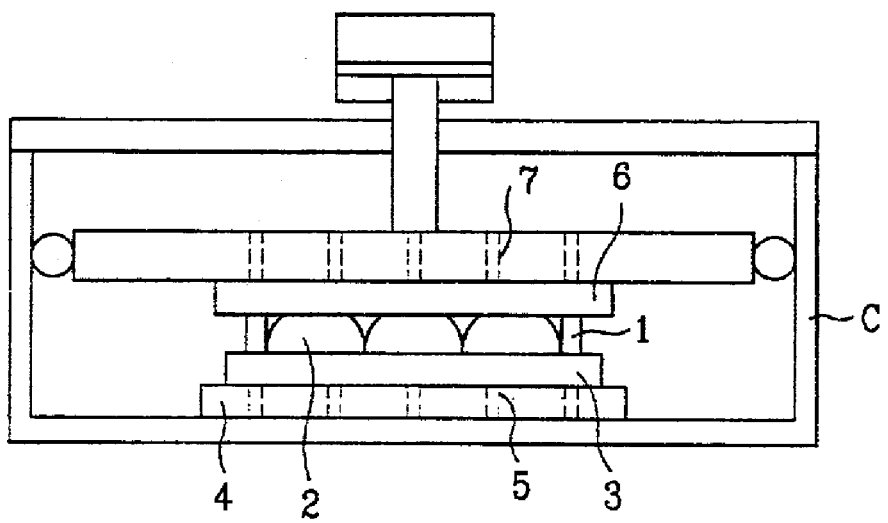
Figure 1E:
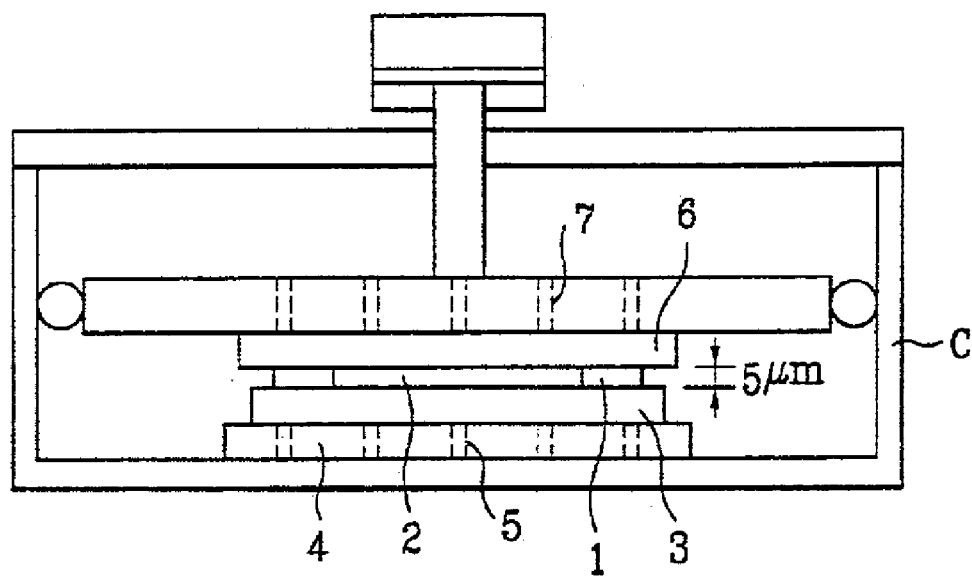
Figure 1F:
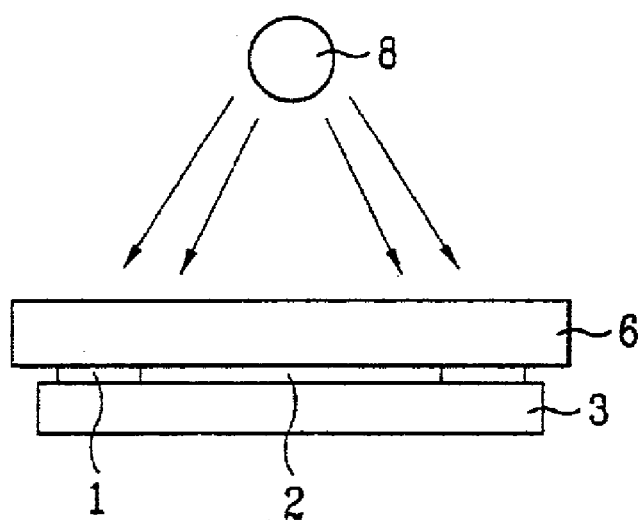
Figure 2:
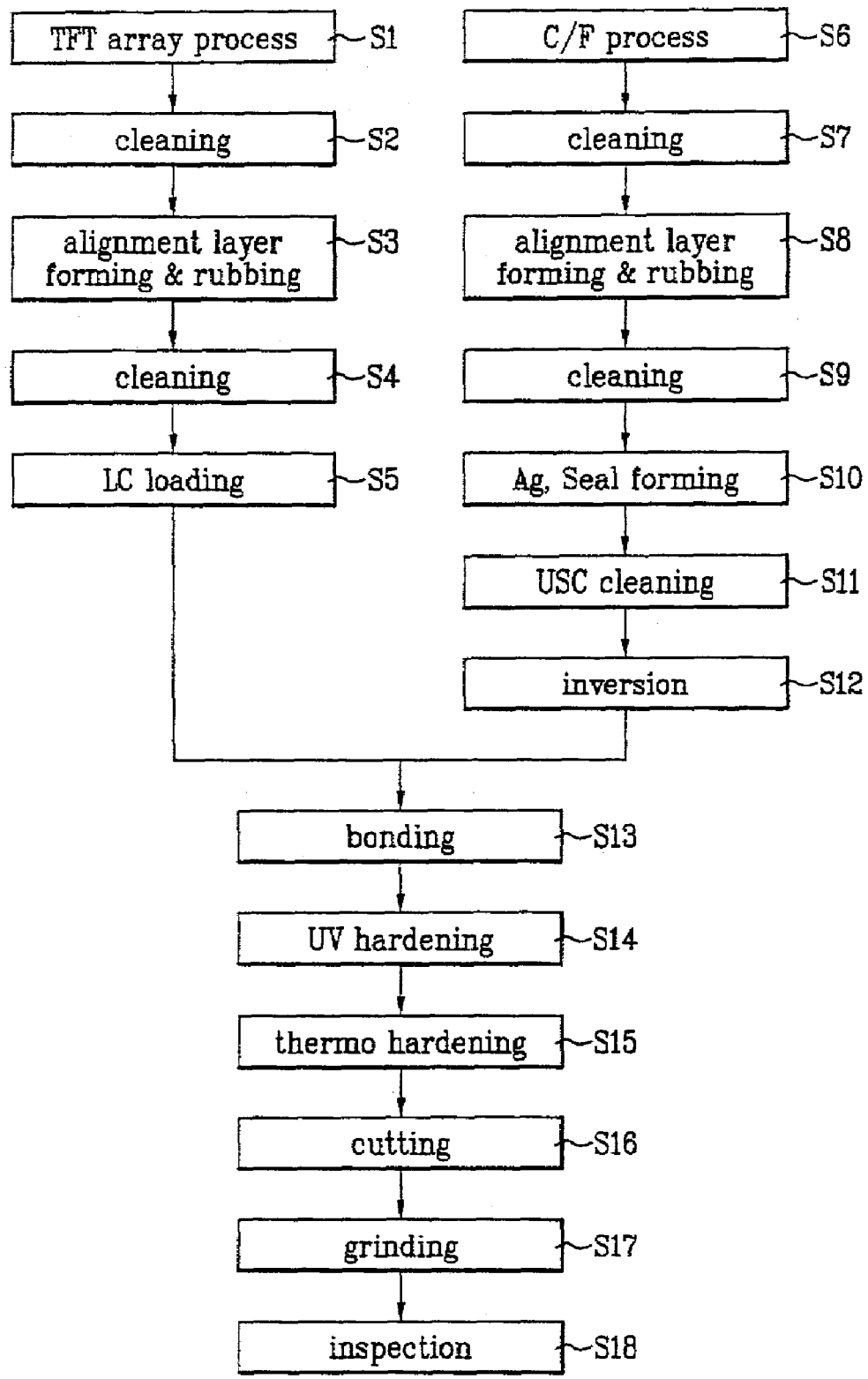
FIG. 2 illustrates a flowchart of an LCD fabrication method using LC dropping according to the present invention.

FIG. 2 illustrates a flowchart of an LCD fabrication method using LC dropping according to the present invention.

Referring to FIG. 2, a TFT array including gate lines, data lines, thin film transistors, and pixel common electrodes is formed on a first substrate (S1). And, a color filter array including black matrix layers and color filter layers or common electrodes is formed on a second substrate (S6). In this case, each of the substrates has an area greater than at least 1000×1200 mm², and a plurality of panels can be arranged on each of the substrates instead of one panel in accordance with a size of a liquid crystal display panel.

In order to coat each of the substrates with an alignment layer, the above-formed first and second substrates are cleaned in a cleaning device, respectively (S2, S7).

Alignment layers are coated on the first and second substrates, respectively. A rubbing process is then carried out so as to determine an alignment direction (S3, S8). In this case, instead of the rubbing process, a photo-alignment layer is formed as the alignment layer and photo-alignment is carried out thereon using non-polarized lights, polarized lights, partially-polarized lights, or the like.

In order to remove particles and the like generated from the alignment process, the first and second substrates are cleaned (S4, S9).

Subsequently, liquid crystals are dropped on each active area of the panels of the first substrate (S5), and a sealant is printed on each edge portion of the respective panels of the second substrate (S10). In this case, a UV hardening resin is used as the sealant in a sealant hardening process as an after-process since a thermo hardening resin as the sealant runs down during heating so as to contaminate the liquid crystals. Besides, when the common electrode is formed on the second substrate, Ag dots are formed so as to connect the first and second substrates electrically.

In order to remove the particles generated from the sealant or Ag dot process, the second substrate on which the sealant or Ag dots is formed is cleaned using a USC (ultra sonic cleaning) equipment (S11). Namely, it is able to clean the second substrate on which liquid crystals fail to be dropped, thereby enabling to prevent failure due to the particles previously.

One of the two substrates is inverted so as to bond the first and second substrates to each other (S12). As the second substrate is coated with the sealant instead of the dropped liquid crystals in the present invention, the second substrate is inverted.

And, the first and second substrates are loaded in a vacuum bonding machine so as to bond the first and second substrates to each other (S13).

When UV & thermo hardening resin is used as the sealant, the sealant in the bonded substrates is hardened using UV rays (S14), and then hardened completely using heat (S15). Besides, the sealant can be hardened using UV rays only. On UV hardening, the dropped liquid crystals fail to be contacted with the sealant. Instead, the dropped liquid crystals spreads between the bonded substrates up to the portion being coated with the sealant after thermo hardening has been achieved (i.e. the sealant has been completely hardened). Namely, the liquid crystals spread 70~80% on UV hardening and 20~30% on thermo hardening, thereby being distributed between the bonded substrates evenly.

The bonded substrates which are completely hardened are cut into unit panels (S16). In this case, scribing and breaking processes are carried out simultaneously.

After the substrates divided into the unit panels have been grinded (S17), final inspection is carried out thereon so as to make a shipment. In this case, a shorting bar is removed during the grinding process.

A method of fabricating a liquid crystal display according to the present invention is explained in detail by unit processes as follows. Namely, unit processes for TFT and color filter arrays, alignment layers, and rubbing (S1–S3, S6–S8) are explained in the following description.

Figure 3A:
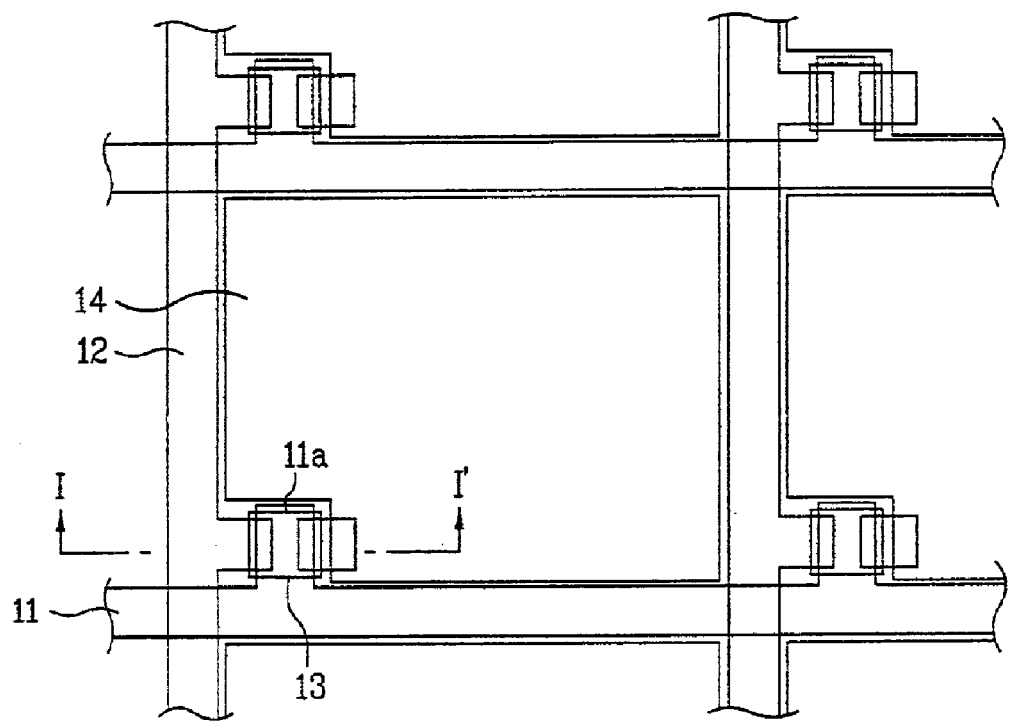
FIG. 3A illustrates a layout of a TN mode LCD according to the present invention.
Figure 3B:
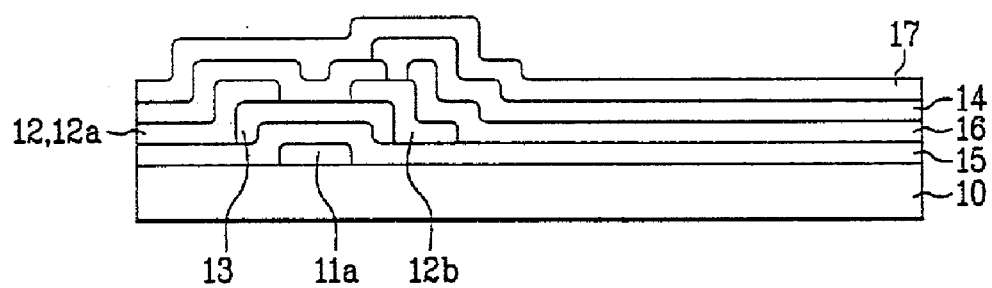
FIG. 3B illustrates a cross-sectional view of a first substrate on a line I–I' in FIG. 3A.
Figure 3C:
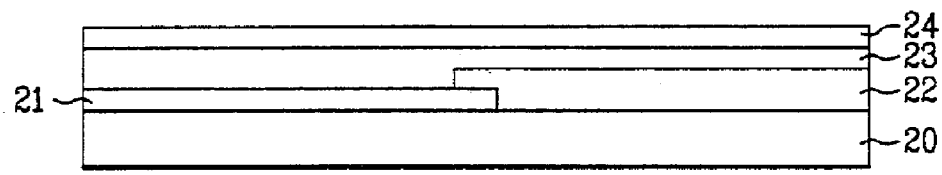
FIG. 3C illustrates a cross-sectional view of a second substrate on a line I–I' in FIG. 3A.

FIG. 3A illustrates a layout of a TN mode LCD according to the present invention, FIG. 3B illustrates a cross-sectional view of a first substrate on a line I–I' in FIG. 3A, and FIG. 3C illustrates a cross-sectional view of a second substrate on a line I–I' in FIG. 3A.

First of all, a TFT array process is explained in the following.

Referring to FIG. 3B, a gate line 11 is formed on a first substrate 10 using Al, Cr, Mo, Al alloy, or the like so as to be arranged in one direction and have a predetermined interval from a gate electrode 11a. A gate insulating layer 15 is formed on an entire face of the substrate including the gate electrode 11a and gate line 11 using silicon nitride ($SiN_x$), silicon oxide ($SiO_x$), BCB (benzocyclobutene), acryl resin, or the like, and an island-like semiconductor layer 13 is formed on the gate insulating layer 15 over the gate electrode 11a using a-Si and n+ a-Si. In this case, the gate insulating layer 15 and semiconductor layer 13 of a-Si and n+ a-Si can be deposited successively thereon. Source and drain electrodes 12a and 12b are formed at both sides of the semiconductor layer 13 using Al, Cr, Mo, Al alloy, Cu, or the like, respectively. And, a data line 12 is formed on the gate insulating layer 15 in a direction vertical to the gate line 11. A passivation layer 16 is formed using silicon nitride ($SiN_x$), silicon oxide ($SiO_x$), BCB (benzocyclobutene), acryl resin, or the like so as to have a contact hole exposing the drain electrode 12b. And, a pixel electrode 14 is formed in a pixel area surrounded by the gate and data lines 11 and 12 crossing with each other. After completion of such a process, the substrate is cleaned. A first alignment layer 17 is coated on an entire surface of the substrate using polyamide or polyimide based compound, polyvinyl alcohol, polyamic acid, or the like, and then a rubbing process is carried out thereon.

Secondly, a color filter array process is explained in the following.

A black matrix layer 21 is formed on a second substrate 20 so as to prevent lights except the pixel area, and a color filter layer 22 including R, G, and B to realize colors is formed on a portion corresponding to each of the pixel areas. And, a common electrode 23 is formed on a surface of the second substrate 20 using ITO (indium tin oxide), IZO (indium zinc oxide), or the like. After the substrate has been cleaned, a second alignment layer 24 is coated on an entire surface of the substrate using polyamide or polyimide based compound, polyvinyl alcohol, polyamic acid, or the like, and then a rubbing process is carried out thereon.

Also, TFT and color filter array processes in an IPS (in-plane switching) mode liquid crystal display are explained as follows.

Figure 4A:
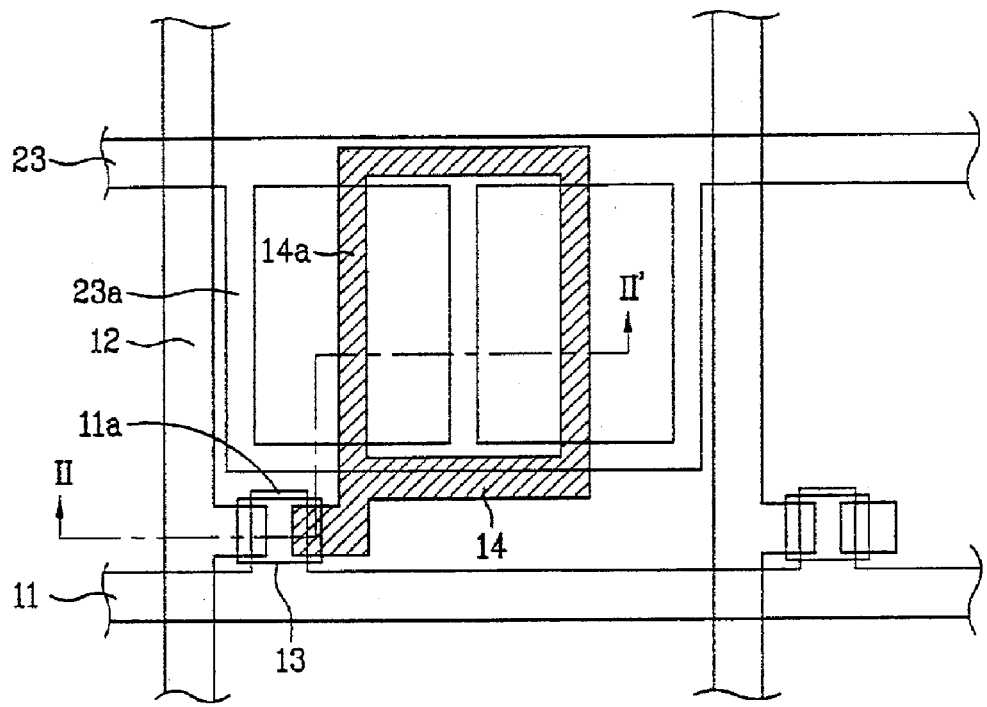
FIG. 4A illustrates a layout of an IPS mode LCD according to the present invention.
Figure 4B:
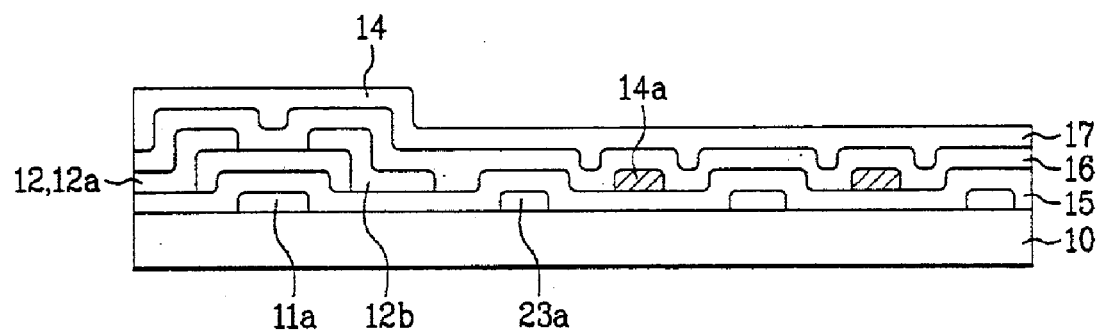
FIG. 4B illustrates a cross-sectional view of a first substrate on a line II–II' in FIG. 4A.
Figure 4C:
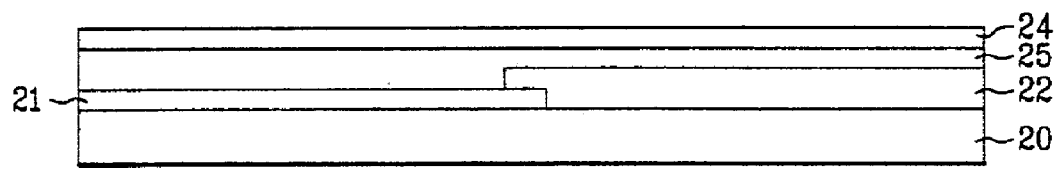
FIG. 4C illustrates a cross-sectional view of a second substrate on a line II–II' in FIG. 4A.

FIG. 4A illustrates a layout of an IPS mode LCD according to the present invention, FIG. 4B illustrates a cross-sectional view of a first substrate on a line II–II' in FIG. 4A, and FIG. 4C illustrates a cross-sectional view of a second substrate on a line II–II' in FIG. 4A.

First of all, a TFT array process is explained in the following.

Referring to FIG. 4B, a gate line 11 is formed on a first substrate 10 using Al, Cr, Mo, Al alloy, or the like so as to be arranged in one direction and have a predetermined interval from a gate electrode 11a, and simultaneously, a common line 23 having a plurality of common electrodes 23a is formed in a pixel area in a direction running parallel with the gate line 11. A gate insulating layer 15 is formed on an entire face of the substrate including the gate line 11 and common line 23 using silicon nitride ($SiN_x$), silicon oxide (SiO$_x$), BCB (benzocyclobutene), acryl resin, or the like, and an island-like semiconductor layer 13 is formed on the gate insulating layer 15 over the gate electrode 11a using a-Si and n+ a-Si. In this case, the gate insulating layer 15 and semiconductor layer 13 of a-Si and n+ a-Si can be deposited successively thereon. Source and drain electrodes 12a and 12b are formed at both sides of the semiconductor layer 13 using Al, Cr, Mo, Al alloy, Cu, or the like, respectively. And, a data line 12 is formed on the gate insulating layer 15 in a direction vertical to the gate line 11. A passivation layer 16 is formed using silicon nitride (SiN$_x$), silicon oxide (SiO$_x$), BCB (benzocyclobutene), acryl resin, or the like so as to have a contact hole exposing the drain electrode 12b. And, a pixel electrode 14 is formed in a pixel area surrounded by the gate and data lines 11 and 12 crossing with each other so that a data electrode 14a lies between the common electrodes 23a. After the substrate is cleaned, a first alignment layer 17 is coated on an entire surface of the substrate using polyamide or polyimide based compound, polyvinyl alcohol, polyamic acid, or the like, and then a rubbing process is carried out thereon.

Besides, the common and data electrodes 23a and 14a can be formed of metal at the same layer of the gate electrode 11a or the source and drain electrodes 12a and 12b. Instead, the common and data electrodes 23a and 14a can be formed on the passivation layer 16 at the same layer using ITO, IZO, or the like as a transparent electrode. Moreover, the common electrode 23 may be formed of metal as the same layer for the source and drain electrodes 12a and 12b, while the data electrode 14a may be formed on the passivation layer 16 with the transparent electrode. Therefore, the present invention enables to be applied to various structures of IPS mode.

Secondly, a color filter array process is explained in the following.

Referring to FIG. 4C, a black matrix layer 21 is formed on a second substrate 20 so as to cut off lights except the pixel area, and a color filter layer 22 including R, G, and B to realize colors is formed on a portion corresponding to each of the pixel areas. Then, an overcoat layer 25 is formed on an entire surface of the second substrate 20. After the substrate has been cleaned, a second alignment layer 24 is coated on an entire surface of the substrate using polyamide or polyimide based compound, polyvinyl alcohol, polyamic acid, or the like, and then a rubbing process is carried out thereon.

In this case, before the second alignment layer 24 is formed on the second substrate 20, a column spacer is formed so as to maintain a cell gap between the first and second substrates 10 and 20 that will be bonded to each other. In case of the liquid crystal injection method according to the related art, a ball spacer is widely used as the spacer. Yet, the liquid crystal dropping method mainly uses a patterned or column spacer, which is for the following reason. Generally, the liquid crystal dropping method is used for fabricating a large-sized liquid crystal display panel. If the ball spacers are used, it is difficult to scatter or distribute the ball spacers evenly on a substrate. Besides, the scattered ball spacers come into conglomeration on the substrate, thereby becoming one of the reasons causing a cell gap failure of a liquid crystal display panel. Therefore, the column spacer is formed at a setup position in the liquid crystal dropping method form, thereby enabling to overcome the above-mentioned problem.

Various embodiments according to the present invention are described as follows.

FIRST EMBODIMENT

Figure 5:
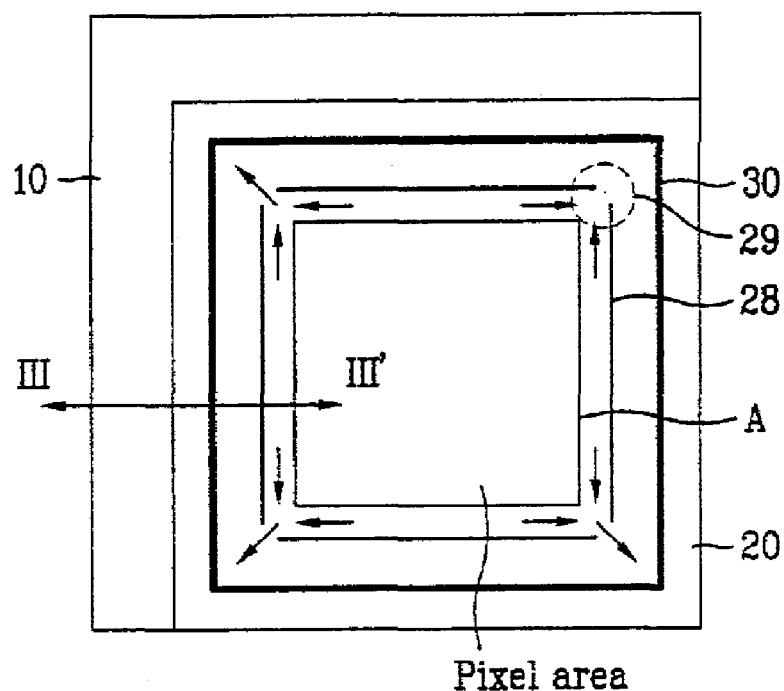
FIG. 5 illustrates a layout of an LCD for explaining a column spacer according to a first embodiment of the present invention.

FIG. 5 illustrates a layout of an LCD for explaining a column spacer according to a first embodiment of the present invention.

Referring to FIG. 5, a liquid crystal display according to a first embodiment of the present invention includes first and second substrates 10 and 20, and a UV hardening sealant 30 is formed at a periphery area between the substrates 10 and 20.

And, a column spacer (not shown in FIG. 5) is formed in a pixel area (a line 'A' is a virtual line to distinguish the pixel area). And, a dummy column spacer 28 for controlling a liquid crystal flow is formed inside the UV hardening sealant 30 in a dummy area of the pixel area periphery.

And, a liquid crystal layer (not shown in the drawing) is formed between the substrates 10 and 20.

In this case, the column spacer 27 is formed to have the same level of a cell gap between the first and second substrates 10 and 20 so as to maintain the cell gap.

Moreover, the dummy column spacer 28 is formed to have the same height of the column spacer, and an opening 29 is formed in at least one corner area. In the drawing, there are four openings 29 are formed at corner areas, respectively. And, the number of the openings 29 can be adjusted.

The above-explained dummy column spacer 28 works as a moving path of liquid crystals, thereby preventing the formation of an area failing to be filed with liquid crystals completely as well as the liquid crystals from being contaminated by the UV hardening sealant 30.

Namely, the liquid crystals, as indicated in the drawing by arrows, move along the dummy column spacer 28 up to the corner areas of the substrate through the openings 29 so as to prevent the corner areas from being charged insufficiently with the liquid crystals.

Moreover, the dummy spacer 28 at the area failing to have the opening 29 plays role as a dam enabling to prevent the liquid crystals from meeting with the UV hardening sealant 30 directly, thereby preventing the contamination.

Various embodiments according to the present invention are described in the following by referring to cross-sectional views shown in FIGS. 6A to 6C along a cutting line III–III' in FIG. 5.

Figure 6A:
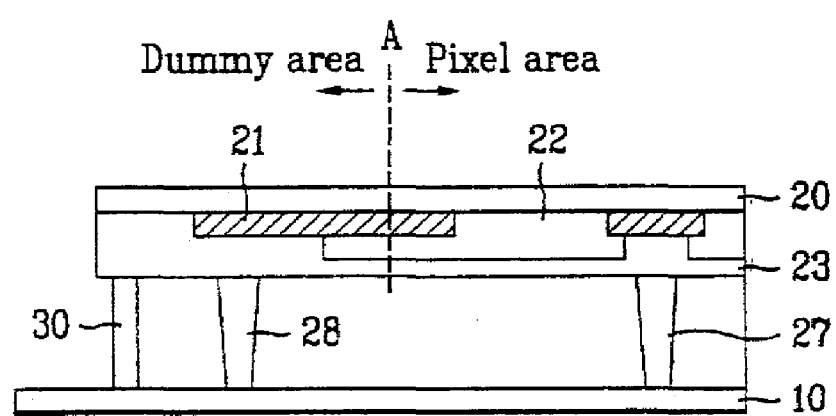
FIGS. 6A to 6C illustrate cross-sectional views of various embodiments on a line III–III' in FIG. 5.

On a second substrate 20, as shown in FIG. 6A, successively formed are a black matrix layer 21, a color filter layer 22, and a common electrode 23.

On a first substrate 10 formed are gate and data lines, thin film transistor, and pixel electrode which are not shown in the drawing.

And, a column spacer 27 is formed in a pixel area on the second substrate 20 so as to have the same height of a cell gap.

The column spacer 27 is formed at a gate line forming area or a data line forming area. Hence, The column spacer 27 is formed on the common electrode 23 over the black matrix layer 21 formed on the second substrate 20 so as to prevent light from leaking from the gate or data line.

And, a dummy column spacer 28 is formed in a dummy area on the second substrate 20 so as to be as tall as the column spacer 27.

The dummy column spacer 28 can be formed at any area inside a UV hardening sealant 30 in the dummy area except a pixel area. Namely, the dummy column spacer 28 is formed on the common electrode 23 failing to have a color filter layer 22 underneath in the drawing. Yet, it is also able to form the dummy column spacer 28 on the common electrode 23 having the color filter layer 22 underneath.

The column spacer 27 and dummy column spacer 28 are preferably formed of photosensitive organic resin.

Moreover, an overcoat layer may be added between the color filter layer 22 and common electrode 23 on the second substrate 20. And, alignment layers (not shown in the drawing) are formed on the first substrate 10 and the second substrate including the dummy column spacer 28.

Figure 6B:
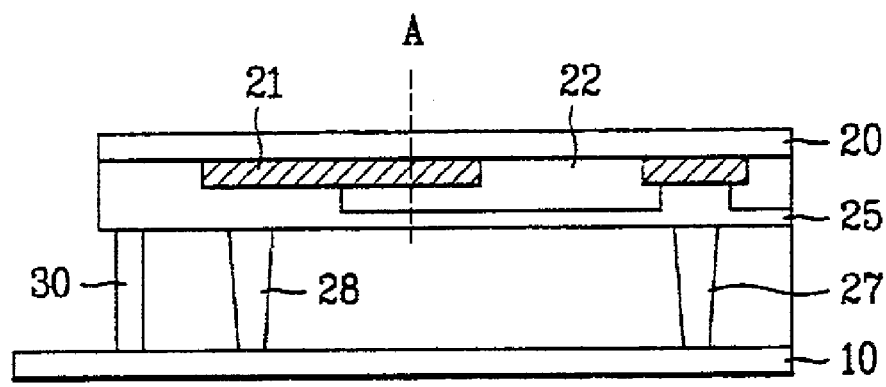

FIG. 6B illustrates a cross-sectional view of a liquid crystal display according to another embodiment of the present invention, in which an over coat layer 25 is formed on a second substrate 20 in the liquid crystal display in FIG. 6A instead of being formed on the common electrode 23 thereof.

A liquid crystal display shown in FIG. 6B relates to the so-called IPS (in-plane switching) mode liquid crystal display, in which a common electrode is formed on the first substrate 10.

Most of the elements of the liquid crystal display are the same of those of the liquid crystal display in FIG. 6A except that the column spacer 27 and dummy column spacer 28 are formed on the overcoat layer 25.

Figure 6C:
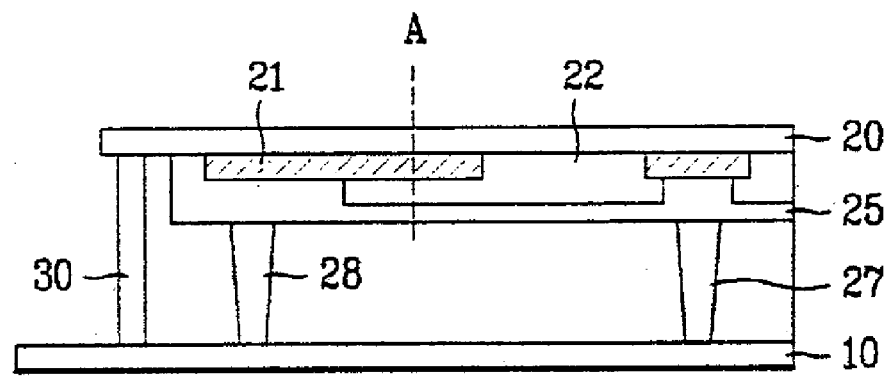

FIG. 6C illustrates a cross-sectional view of a liquid crystal display according to a further embodiment of the present invention, in which an overcoat layer 25 is formed on a black matrix layer 21 so as not to be formed on a sealant 30 in the above-described liquid crystal display in FIG. 6B. And, the rest elements of the liquid crystal display are the same of the liquid crystal display in FIG. 6B.

SECOND EMBODIMENT

Figure 7:
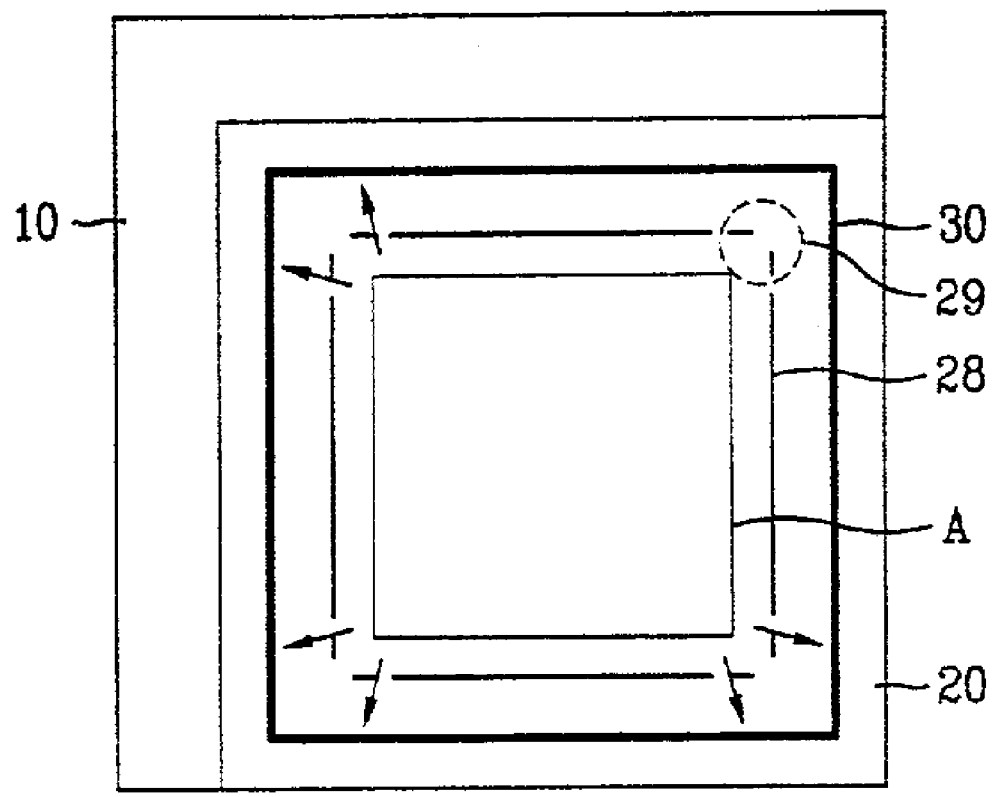
FIG. 7 illustrates a layout of an LCD for explaining a column spacer according to a second embodiment of the present invention.

FIG. 7 illustrates a layout of an LCD for explaining a column spacer according to a second embodiment of the present invention.

Referring to FIG. 7, a second embodiment of the present invention relates to a liquid crystal display including a dummy column spacer 28 so that a plurality of openings 29 are formed at each of the corner areas of a substrate.

A plurality of the openings 29 are formed so that liquid crystals enable to move to the corner areas of the substrate to prevent insufficient charge of the liquid crystals.

The openings 29 are formed at one of the corner areas at least so as to be formed consecutively or discontinuously.

And, the rest elements of the liquid crystal display are the same of the liquid crystal display according to the first embodiment of the present invention.

THIRD EMBODIMENT

Figure 8:
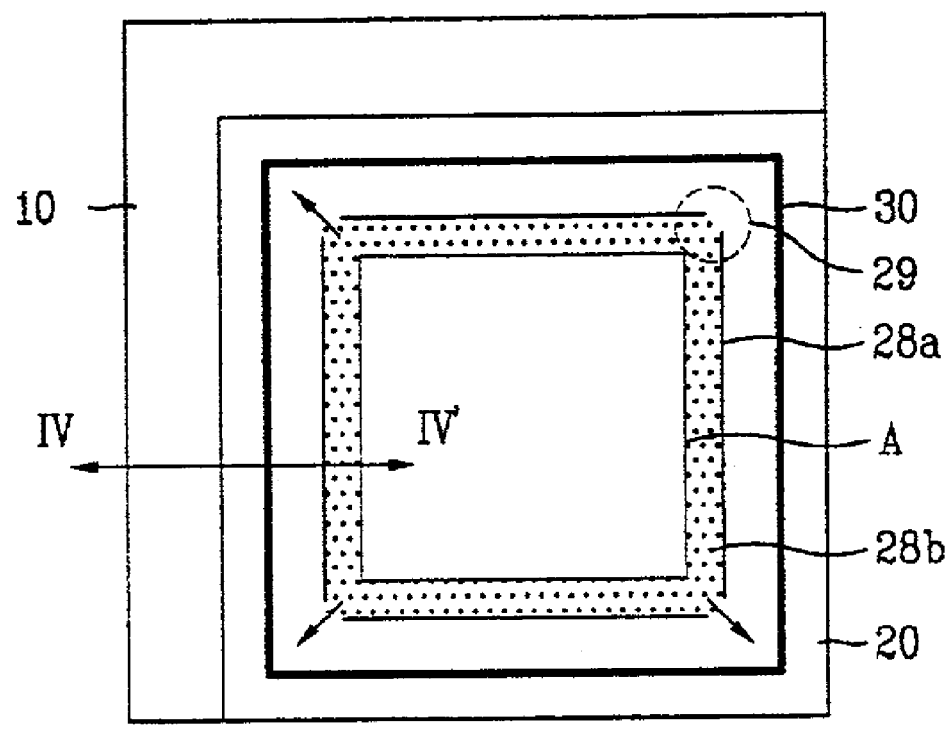
FIG. 8 illustrates a layout of an LCD for explaining a column spacer according to a third embodiment of the present invention.

FIG. 8 illustrates a layout of an LCD for explaining a column spacer according to a third embodiment of the present invention.

Referring to FIG. 8, in a third embodiment of the present invention, a column spacer (not shown in FIG. 8) is formed in a pixel area (a line 'A' indicates a virtual line to distinguish the pixel area), and first and second dummy column spacers 28a and 28b are formed inside a UV hardening sealant 30 in a dummy area of a periphery of the pixel area so as to control a flow of liquid crystals. The first and second dummy column spacers 28a and 28b are formed as tall as the column spacer. And, an opening 29 is formed at a corner area at least.

Namely, a dotted-line type second dummy column spacer 28b is formed in the dummy area inside the first dummy column spacer 28a so as to assist the liquid crystal flow control.

Thus, the dotted-line type second dummy column spacer 28b is formed additionally inside the first dummy column spacer 28a so that the liquid crystals enable to move along a space of the second dummy column spacer 28b as well as the first dummy column spacer 28a. Therefore, it is able to control the flow of liquid crystals more smoothly.

Figure 9A:
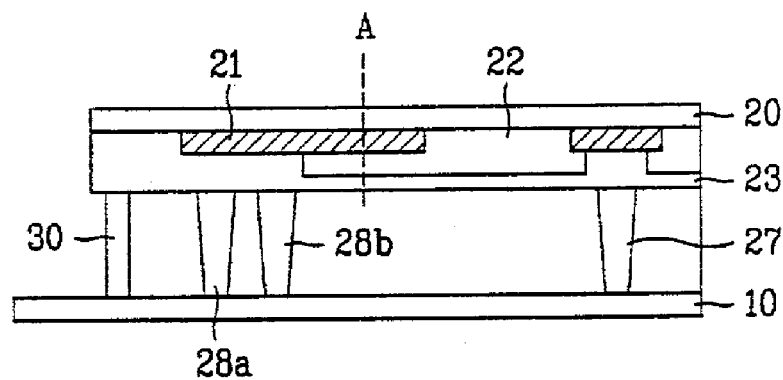
FIGS. 9A to 9C illustrate cross-sectional views of various embodiments on a line IV–IV' in FIG. 8.
Figure 9B:
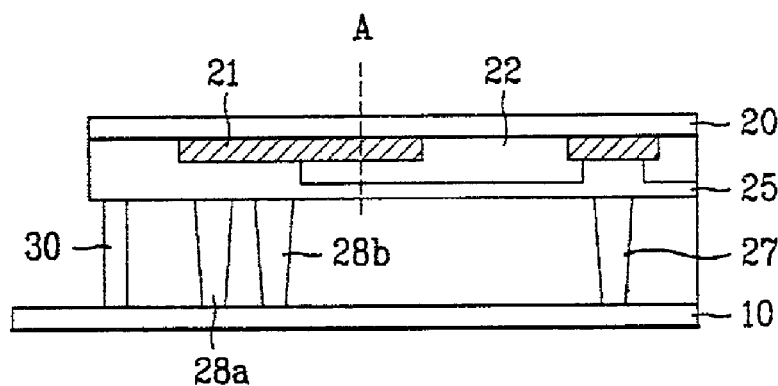
Figure 9C:
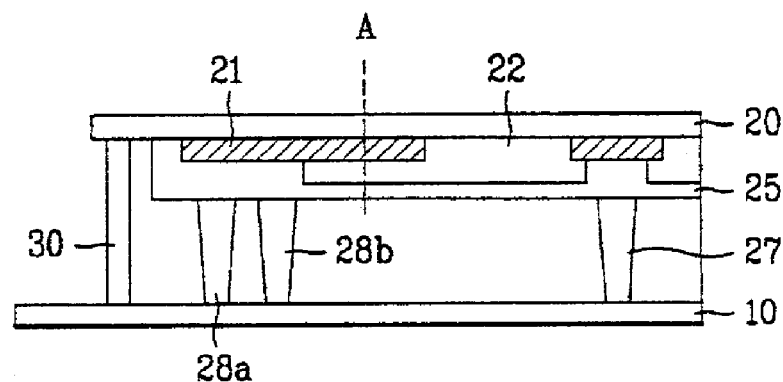

FIGS. 9A to 9C illustrate cross-sectional views of various embodiments on a line IV–IV'(corresponding to an area failing to have the openings 29 of the first and second dummy column spacers 28a and 28b) in FIG. 8.

On a second substrate 20, as shown in FIG. 9A, successively formed are a black matrix layer 21, a color filter layer 22, and a common electrode 23.

On a first substrate 10 formed are gate and data lines, a thin film transistor, and a pixel electrode which are not shown in the drawing.

And, a column spacer 27 is formed in a pixel area on the second substrate 20 so as to have the same height of a cell gap.

A first dummy column spacer 28a is formed in a dummy area on the second substrate 20 so as to be as tall as the column spacer 27.

And, a dotted-line type second dummy column spacer 28b is formed in the dummy area inside the first dummy column spacer 28a so as to be as tall as the column spacer 27.

There is only one of the dotted-line type second dummy column spacers shown in FIG. 9A. Yet, a plurality of the dotted-line type second dummy column spacers can be formed. Besides, the dotted-line type second dummy column spacer 28b can be formed in any portion in the dummy area.

The column spacer 27, first dummy column spacer 28a, and second dummy column spacer 28b are preferably formed of photosensitive organic resin.

Moreover, an overcoat layer may be added between the color filter layer 22 and common electrode 23 on the second substrate 20. And, alignment layers (not shown in the drawing) are formed on the first substrate 10 and the second substrate 20 including the first dummy column spacer 28a and the dotted-line type second dummy column spacer 28b.

FIG. 9B illustrates a cross-sectional view of a liquid crystal display according to another embodiment of the present invention, in which an over coat layer 25 is formed on the second substrate 20 in the liquid crystal display in FIG. 9A instead of the common electrode 23 thereof.

A liquid crystal display shown in FIG. 9B relates to the so-called IPS (in-plane switching) mode liquid crystal display, in which a common electrode is formed on a first substrate 10.

Most of the elements of the liquid crystal display are the same of those of the liquid crystal display in FIG. 9A except that the column spacer 27, first dummy column spacer 28a, and dotted-line type second dummy column spacer 28b are formed on the overcoat layer 25.

FIG. 9C illustrates a cross-sectional view of a liquid crystal display according to a further embodiment of the present invention, in which an overcoat layer 25 is formed on a black matrix layer 21 so as not to be formed on a sealant 30 in the above-described liquid crystal display in FIG. 9B. And, the rest elements of the liquid crystal display are the same of the liquid crystal display in FIG. 9B.

FOURTH EMBODIMENT

Figure 10:
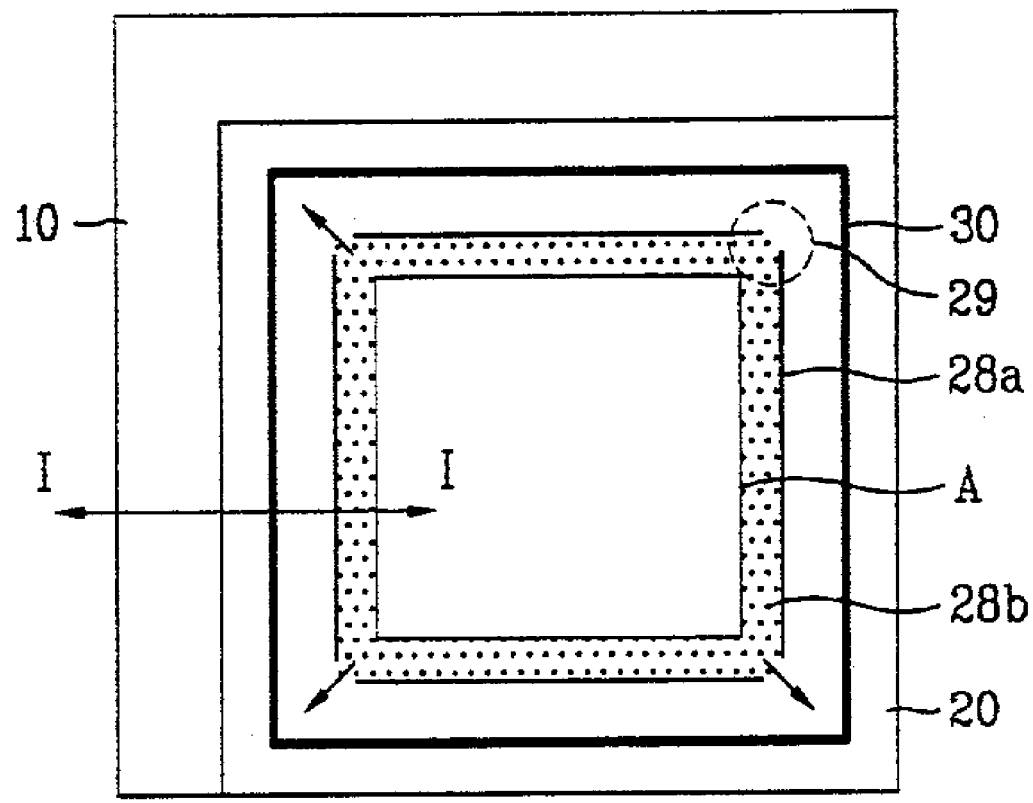
FIG. 10 illustrates a layout of an LCD for explaining a column spacer according to a fourth embodiment of the present invention.

FIG. 10 illustrates a layout of an LCD for explaining a column spacer according to a fourth embodiment of the present invention.

Referring to FIG. 10, a fourth embodiment of the present invention relates to a liquid crystal display including a first dummy column spacer 28a so that a plurality of openings 29 are formed at each of the corner areas of a substrate.

The openings 29 are formed at one of the corner areas at least so as to be formed continuously or discontinuously.

And, the rest elements of the liquid crystal display are the same of the liquid crystal display according to the third embodiment of the present invention.

FIFTH EMBODIMENT

Figure 11:
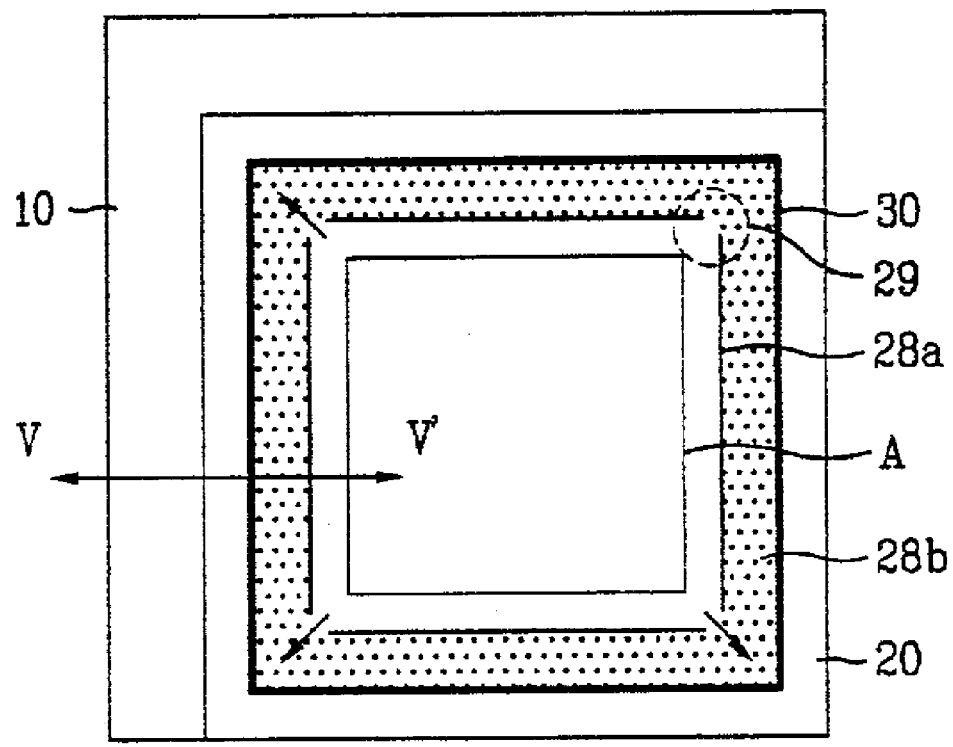
FIG. 11 illustrates a layout of an LCD for explaining a column spacer according to a fifth embodiment of the present invention.

FIG. 11 illustrates a layout of an LCD according to a fifth embodiment of the present invention, in which a dotted-line type second dummy column spacer 28b is formed at an outside of a first dummy column spacer 28a in a dummy area instead of an outside of the first dummy column spacer 28a.

Figure 12A:
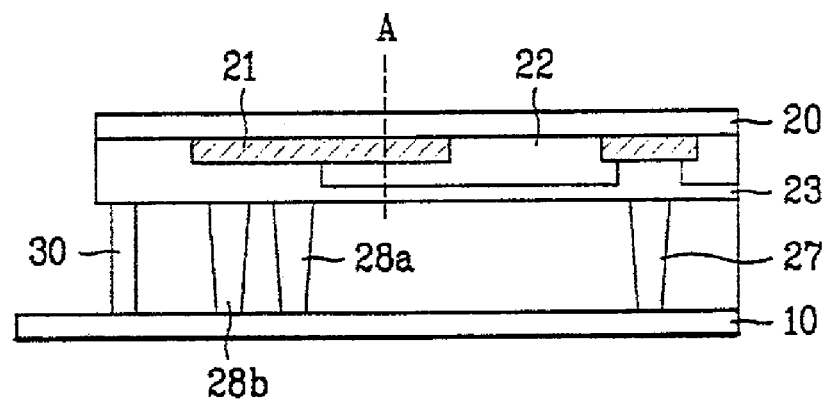
FIGS. 12A to 12C illustrate cross-sectional views of various embodiments on a line V–V' in FIG. 11.
Figure 12B:
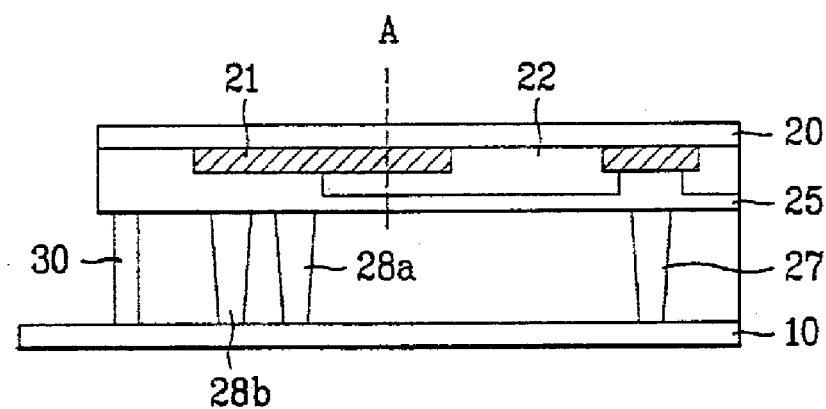
Figure 12C:
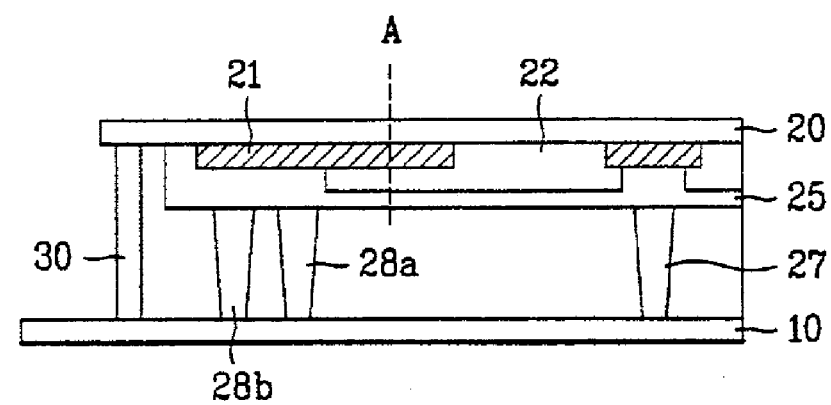

The rest elements are the same of those described in the third embodiment of the present invention, which is easily comprehended by referring to FIGS. 12A to 12C as cross-sectional views of various embodiments along a line V–V' in FIG. 11.

SIXTH EMBODIMENT

Figure 13:
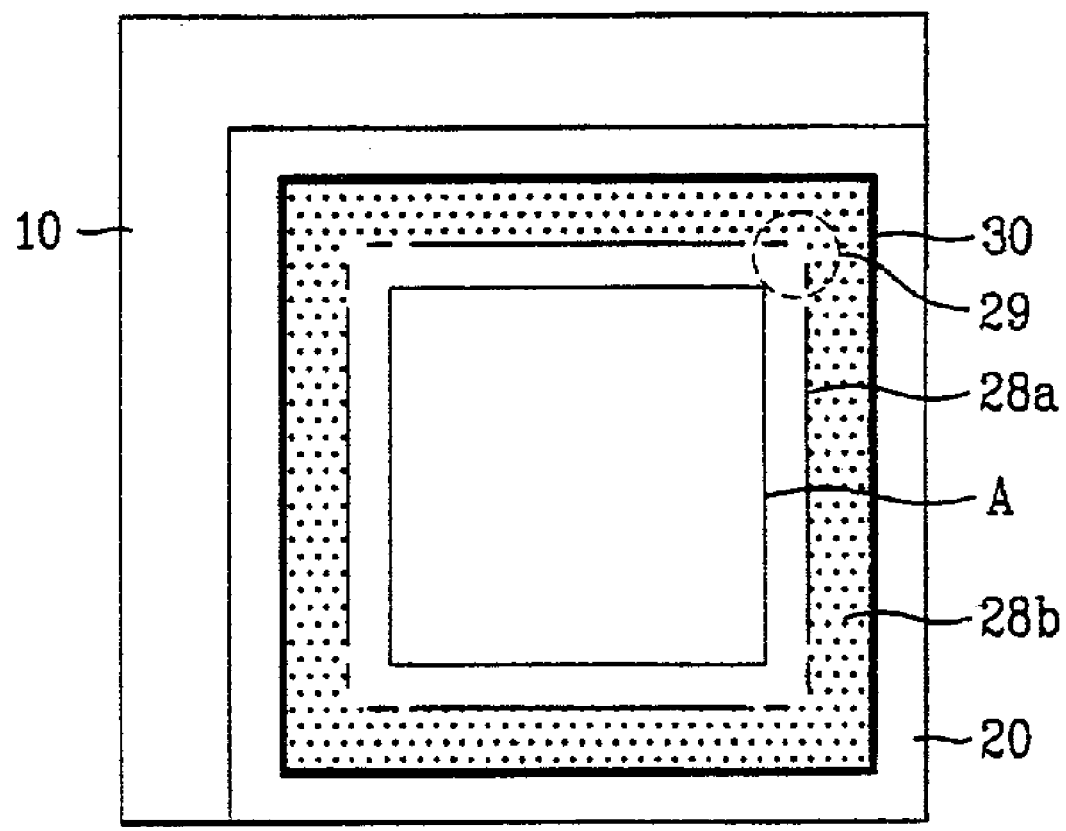
FIG. 13 illustrates a layout of an LCD for explaining a column spacer according to a sixth embodiment of the present invention.

FIG. 13 illustrates a layout of an LCD for explaining a column spacer according to a sixth embodiment of the present invention.

Referring to FIG. 13, a sixth embodiment of the present invention relates to a liquid crystal display including a first dummy column spacer 28a so that a plurality of openings 29 are formed at each of the corner areas of a substrate.

The openings 29 are formed at one of the corner areas at least so as to be formed consecutively or discontinuously.

And, the rest elements of the liquid crystal display are the same of the liquid crystal display according to the fifth embodiment of the present invention.

SEVENTH EMBODIMENT

Figure 14A:
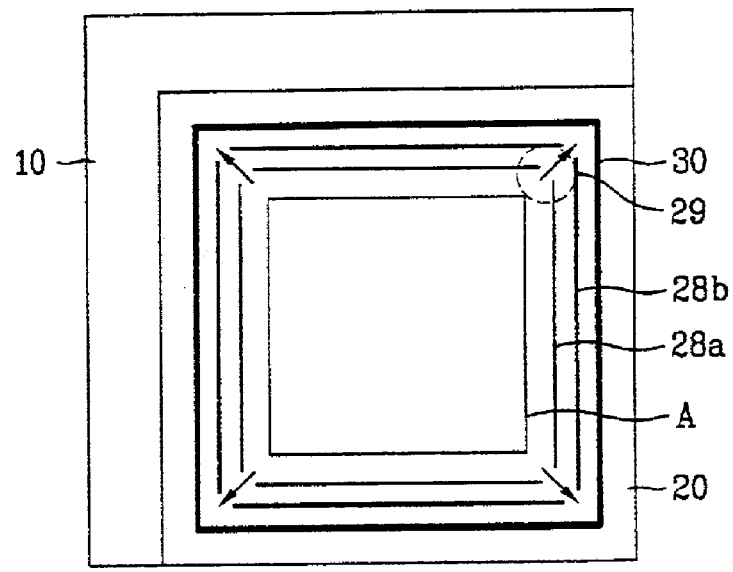
FIG. 14A and FIG. 14B illustrate layouts of an LCD for explaining a column spacer according to a seventh embodiment of the present invention.
Figure 14B:
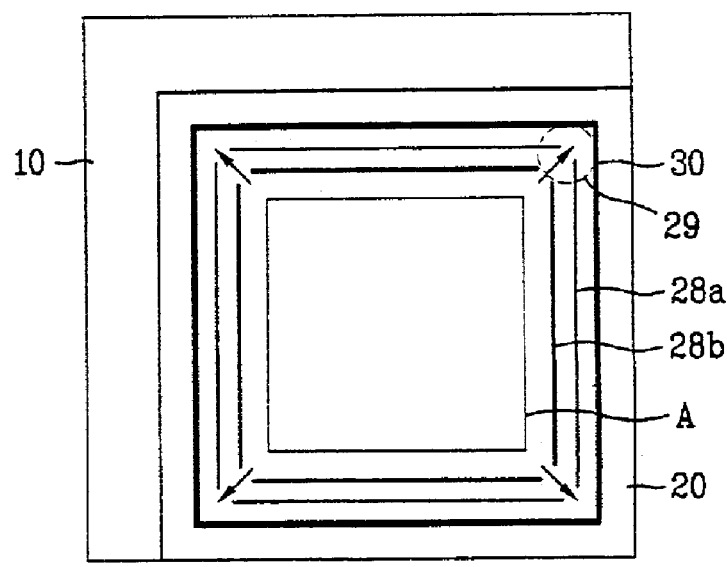

FIG. 14A and FIG. 14B illustrate layouts of an LCD for explaining a column spacer according to a seventh embodiment of the present invention, in which a second dummy column spacer 28b is formed at an inside or outside of a first dummy column spacer 28a in a dummy area.

Namely, the dummy column spacers are formed doubly so as to control a flow of liquid crystals.

In this case, a plurality of openings can be formed at one, at least, of the corner areas of the first dummy column spacer 28a and/or second dummy column spacer 28b so as to be formed consecutively or discontinuously.

The first and second dummy column spacers 28a and 28b can be modified variously as the structures of the above-described first and second dummy column spacers 28a and 28b.

EIGHTH EMBODIMENT

Figure 15:
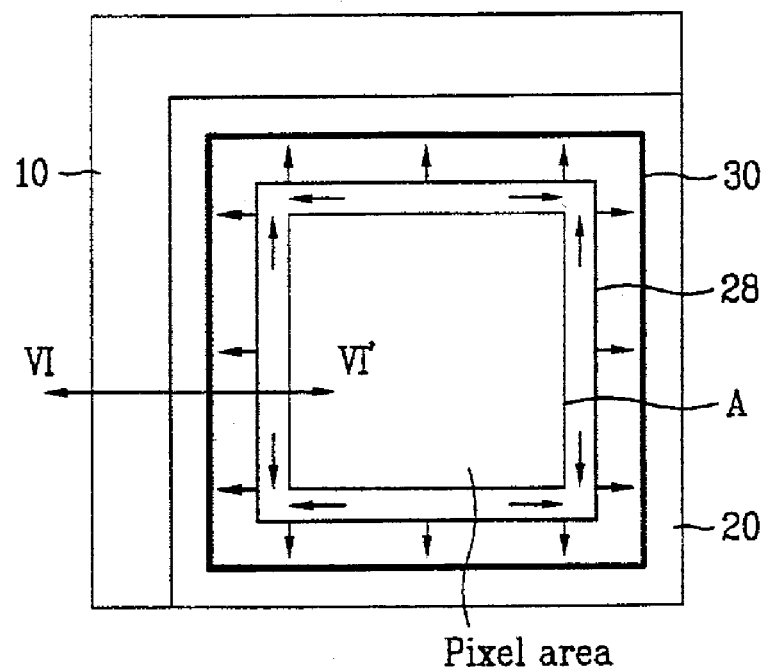
FIG. 15 illustrates a layout of an LCD for explaining a column spacer according to an eighth embodiment of the present invention.

FIG. 15 illustrates a layout of an LCD for explaining a column spacer according to an eighth embodiment of the present invention.

Referring to FIG. 15, a liquid crystal display according to an eighth embodiment of the present invention includes first and second substrates 10 and 20, and a UV hardening sealant 30 is formed at a periphery area between the substrates 10 and 20.

And, a column spacer (not shown in FIG. 15) is formed in a pixel area (a line 'A' is a virtual line to distinguish the pixel area). And, a dummy column spacer 28 for controlling a liquid crystal flow is formed inside the UV hardening sealant 30 in a dummy area of the pixel area periphery.

And, a liquid crystal layer (not shown in the drawing) is formed between the substrates 10 and 20.

In this case, the column spacer is formed to have the same height of a cell gap between the first and second substrates 10 and 20 so as to maintain the cell gap.

Moreover, the dummy column spacer 28 is formed to have the same height of the column spacer, and a formed location of the dummy column spacer 28 is adjusted to be left apart from the first substrate 10 with a predetermined interval so as to play role of controlling a liquid crystal flow with the interval. Besides, the dummy column spacer 28 itself becomes a moving path of liquid crystals so as to prevent the formation of an area failing to be filed with liquid crystals completely.

Namely, the liquid crystals, as indicated in the drawing by arrows, move along the dummy column spacer 28 so as to prevent the corner areas from being charged insufficiently with the liquid crystals. Moreover, the liquid crystals move to the interval between the dummy spacer 28 and first substrate 10 so that the liquid crystal flow is controlled in accordance with a liquid crystal amount.

Figure 16A:
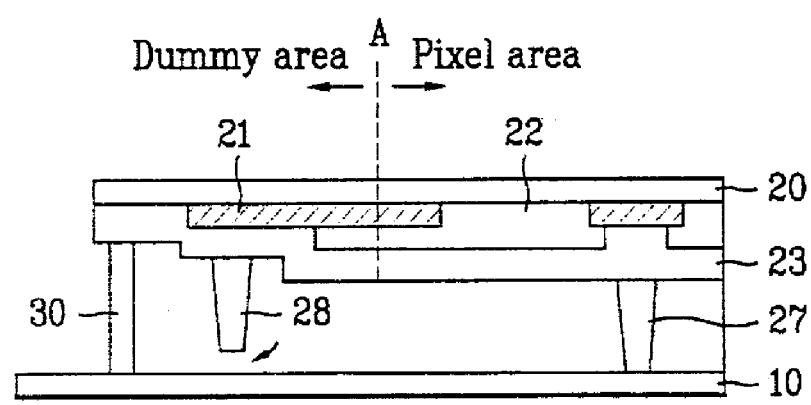
FIGS. 16A to 16D illustrate cross-sectional views of various embodiments on a line VI–VI' in FIG. 15.
Figure 16B:
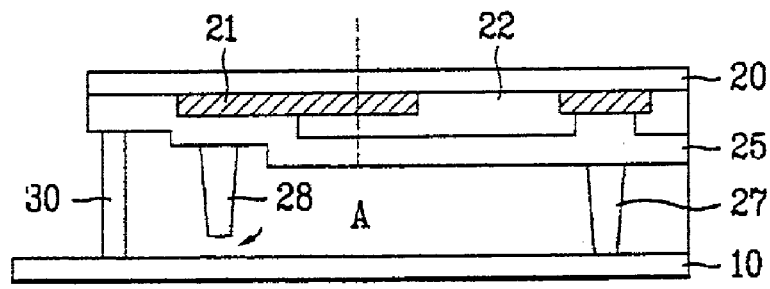
Figure 16C:
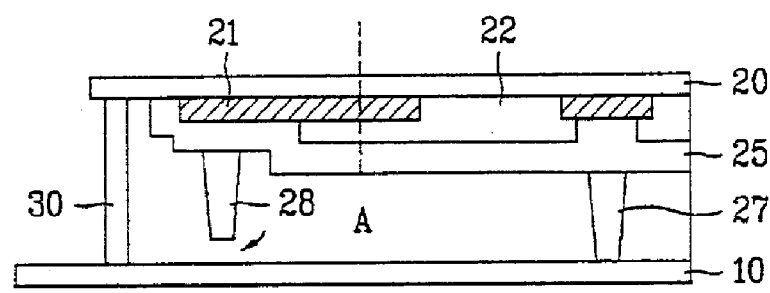

In this case, the location of forming the dummy column spacer 28 is adjusted so as to be left apart from the first substrate 10 with a predetermined interval, which is explained through FIGS. 16A to 16C according to various embodiments along a line VI–VI' in FIG. 15.

On a second substrate 20, as shown in FIG. 16A, successively formed are a black matrix layer 21, a color filter layer 22, and a common electrode 23.

On a first substrate 10 formed are gate and data lines, a thin film transistor, and a pixel electrode which are not shown in the drawing.

And, a column spacer 27 is formed in a pixel area on the second substrate 20 so as to have the same height of a cell gap.

The column spacer 27 is formed at a gate line forming area or a data line forming area. Hence, The column spacer 27 is formed on a common electrode 23 over the black matrix layer 21 formed on the second substrate 20 so as to prevent light from leaking from the gate or data line.

And, a dummy column spacer 28 is formed in a dummy area on the second substrate 20 so as to be as tall as the column spacer 27.

More specifically, as the dummy column spacer 28 is formed on the common electrode 23 over the black matrix layer 21 in the dummy area, there occurs a step difference as tall as the color filter layer 22 so that the dummy column spacer 28 becomes left apart from the first substrate as wide as the interval.

The column spacer 27 and dummy column spacer 28 are preferably formed of photosensitive organic resin.

Besides, an overcoat layer may be added between the color filter layer 22 and common electrode 23 on the second substrate 20. And, alignment layers (not shown in the drawing) are formed on the first substrate 10 and the second substrate including the dummy column spacer 28.

FIG. 16B illustrates a cross-sectional view of a liquid crystal display according to another embodiment of the present invention, in which an over coat layer 25 is formed on a second substrate 20 in the liquid crystal display in FIG. 6A instead of being formed on the common electrode 23 thereof.

A liquid crystal display shown in FIG. 6B relates to the so-called IPS (in-plane switching) mode liquid crystal display, in which a common electrode is formed on the first substrate 10.

The rest elements of the liquid crystal display are the same of those of the liquid crystal display in FIG. 16A, in which a dummy column spacer 28 formed on the overcoat layer 25 is left apart from the first substrate 10 as well.

FIG. 16C illustrates a cross-sectional view of a liquid crystal display according to a further embodiment of the present invention, in which an overcoat layer 25 is formed on a black matrix layer 21 so as not to be patterned to be formed on a sealant 30. And, the rest elements of the liquid crystal display are the same of the liquid crystal display in FIG. 16B.

Figure 16D:
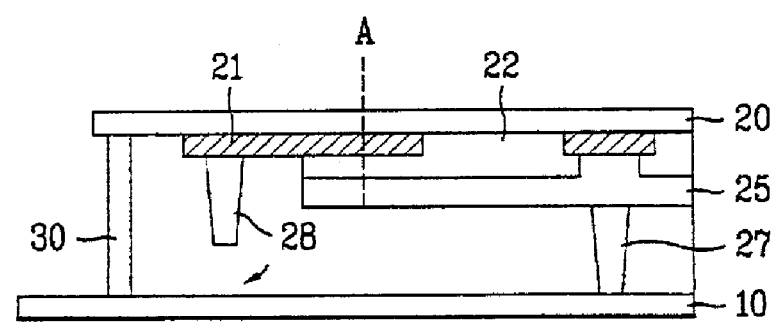

FIG. 16D illustrates a liquid crystal display according to another further embodiment of the present invention, in which an overcoat layer 25 in the above-described liquid crystal display in FIG. 16B is patterned so as not to be formed on a predetermined area of a black matrix layer 21.

Consequently, the dummy column spacer 28 is formed not on the overcoat layer 25 but on the black matrix layer 21, whereby an interval from a first substrate 10 increases.

Meanwhile, the overcoat layer 25 is patterned so as to be formed on a color filter layer 22 only in the drawing. Yet, the overcoat layer 25 can be formed on the black matrix layer 21 where the dummy column spacer 28 fails to be formed.

NINTH EMBODIMENT

Figure 17A:
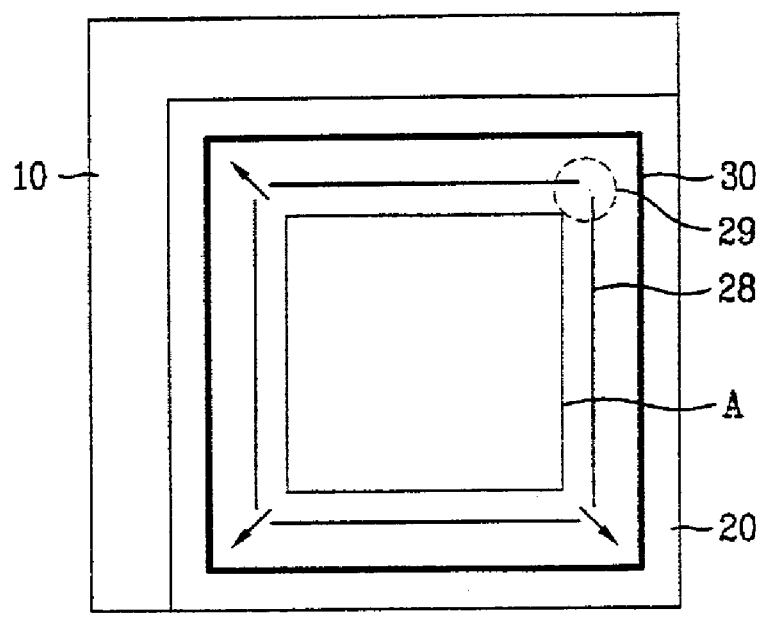
FIG. 17A and FIG. 17B illustrate layouts of an LCD for explaining a column spacer according to a ninth embodiment of the present invention.
Figure 17B:
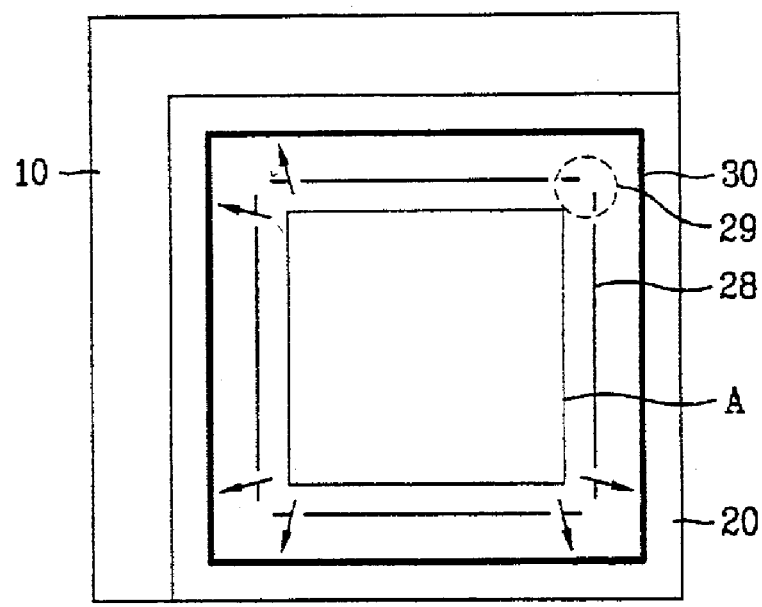

FIG. 17A and FIG. 17B illustrate layouts of an LCD for explaining a column spacer according to a ninth embodiment of the present invention.

Referring to FIG. 17A, openings 29 are formed at a dummy column spacer 28 in corner areas of a substrate.

Therefore, liquid crystals enable to move to the corner areas of the substrate more smoothly so as to prevent an insufficient charge. The openings 29 can be formed at one of the corner areas of the substrate at least.

Besides, the dummy column spacer 28 is formed at various locations so as to be left apart from a first substrate and the like, which is the same of the above-described eighth embodiment.

Referring to FIG. 17B, a plurality of openings 29 are formed at a dummy column spacer 28 in corner areas of a substrate so as to maximize a liquid crystal flow. The openings 29 can be formed continuously or discontinuously.

TENTH EMBODIMENT

Figure 18:
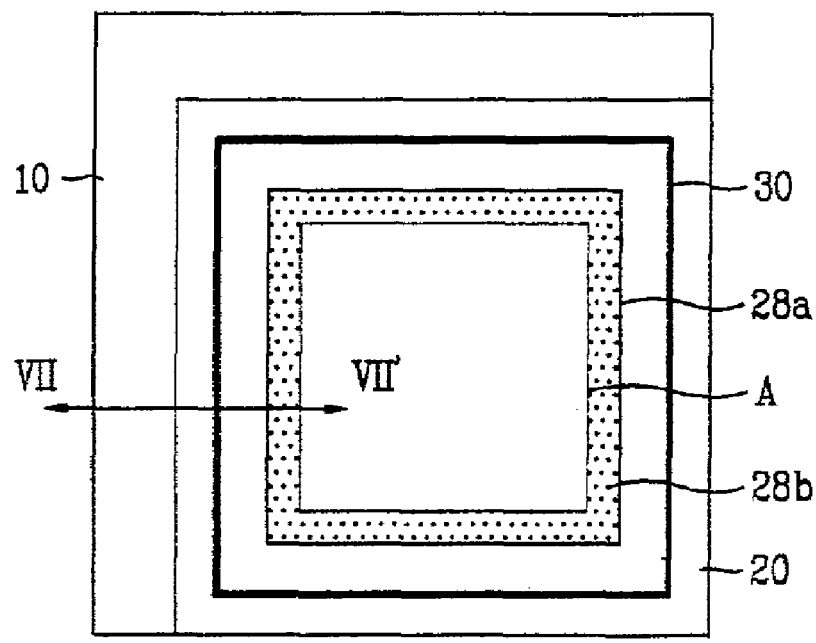
FIG. 18 illustrates a layout of an LCD for explaining a column spacer according to a tenth embodiment of the present invention.

FIG. 18 illustrates a layout of an LCD for explaining a column spacer according to a tenth embodiment of the present invention.

Referring to FIG. 18, a liquid crystal display according to a tenth embodiment of the present invention includes first and second substrates 10 and 20, and a UV hardening sealant 30 is formed at a periphery area between the substrates 10 and 20.

And, a column spacer (not shown in FIG. 18) is formed in a pixel area (a line 'A' is a virtual line to distinguish the pixel area). And, a first dummy column spacer 28a for controlling a liquid crystal flow is formed inside the UV hardening sealant 30 in a dummy area of the pixel area periphery.

Moreover, a dotted-line type second dummy column spacer 28b is formed in the dummy area inside the first dummy column spacer 28a so as to assist to control the liquid crystal flow.

And, a liquid crystal layer (not shown in the drawing) is formed between the substrates 10 and 20.

In this case, the first dummy column spacer 28a, as mentioned in the foregoing description, is left apart from the first substrate 10 with a predetermined interval so as to play role of controlling the liquid crystal flow with the interval. Meanwhile, if a liquid crystal dropping amount is excessive, liquid crystals pass through the first dummy column spacer 28a so as to meet the UV hardening sealant.

Therefore, the dotted-line type second dummy column spacer 28 is formed additionally inside the first dummy column spacer 28a so as to adjust the flow of the excessively dropped liquid crystals properly.

Meanwhile, the dotted-line type second dummy column spacer 28b may, or may not be left apart from the first substrate 10 in accordance with its location of formation.

FIGS. 19A to 19H illustrate cross-sectional views of various embodiments along a line VII–VII' in FIG. 18.

Figure 19A:
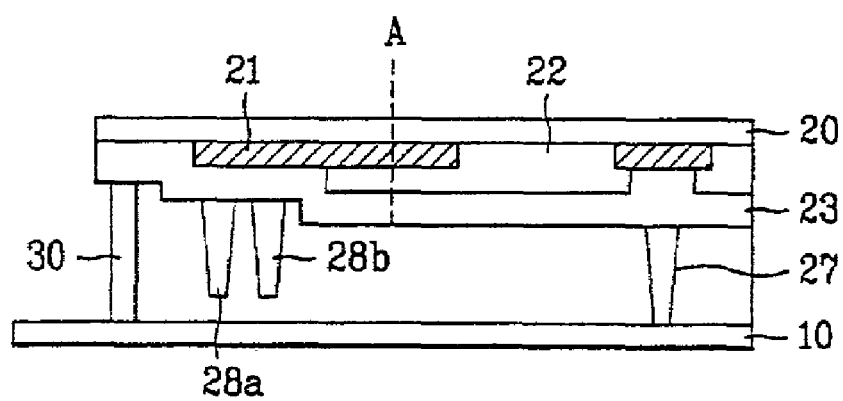
FIGS. 19A to 19H illustrate cross-sectional views of various embodiments on a line VII–VII' in FIG. 18.

On a second substrate 20, as shown in FIG. 19A, successively formed are a black matrix layer 21, a color filter layer 22, and a common electrode 23.

On a first substrate 10 formed are gate and data lines, a thin film transistor, and a pixel electrode which are not shown in the drawing.

And, a column spacer 27 is formed in a pixel area on the second substrate 20 so as to have the same height of a cell gap.

A first dummy column spacer 28a is formed in a dummy area on the second substrate 20, and more specifically, on the common electrode 23 over the black matrix layer 21 in the dummy area so as to be as tall as the column spacer 27.

And, a dotted-line type second dummy column spacer 28b is formed in the dummy area inside the first dummy column spacer 28a, and more specifically, on the common electrode 23 over the black matrix layer 21 in the dummy area so as to be as tall as the column spacer 27. There is only one of the dotted-line type second dummy column spacers 28b in FIG. 19A. Instead, a plurality of the dotted-line type dummy column spacers 28b can be formed thereof.

Therefore, the first dummy column spacer 28a and dotted-line type second dummy column spacer 28b become left apart from the first substrate 10 by a step difference as high as the color filter layer 22.

Figure 19B:
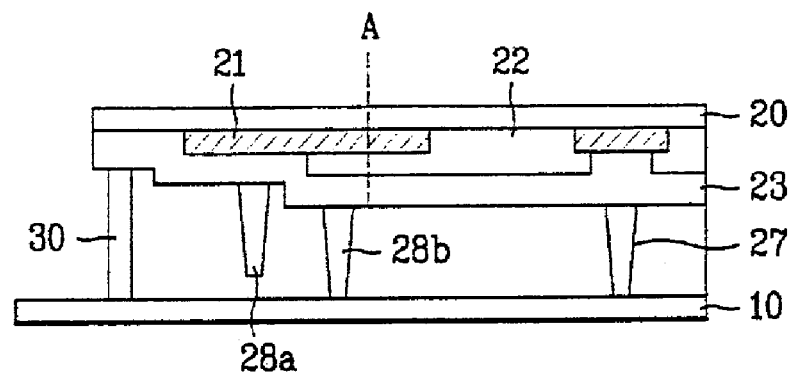

FIG. 19B illustrates a cross-sectional view of a liquid crystal display according to another embodiment of the present invention, in which a dotted-line type second dummy column spacer 28b is formed not on the common electrode 23 over the black matrix layer 21 but on the common electrode 23 over the color filter layer 22.

Consequently, the dotted-line type second dummy column spacer 28b has not step difference so as to be contacted with the first substrate 10, whereby liquid crystals are unable to move under the dotted-line type second dummy column spacer 28b but able to move between the first dummy column spacers 28a.

Figure 19C:
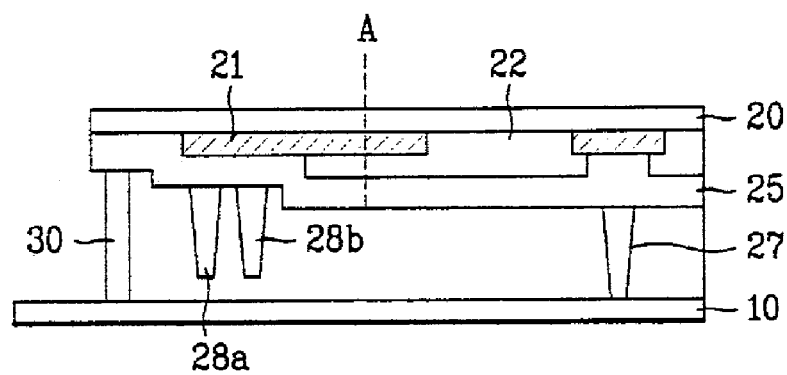
Figure 19D:
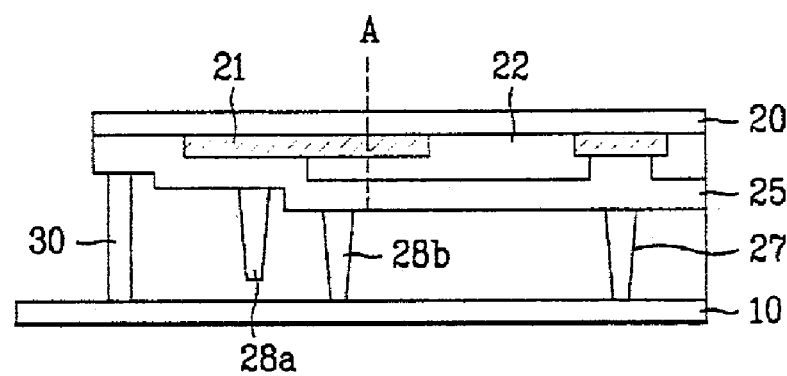

FIG. 19C and FIG. 19D illustrate cross-sectional views of liquid crystal displays according to further embodiments of the present invention, in which overcoat layers 25, instead of common electrodes 23, are formed on the second substrate 20 in the above-described liquid crystal displays in FIG. 19A and FIG. 19B, respectively.

Namely, IPS (in-plane switching) mode liquid crystal displays are described, in which common electrodes are formed on first substrates, respectively.

Figure 19E:
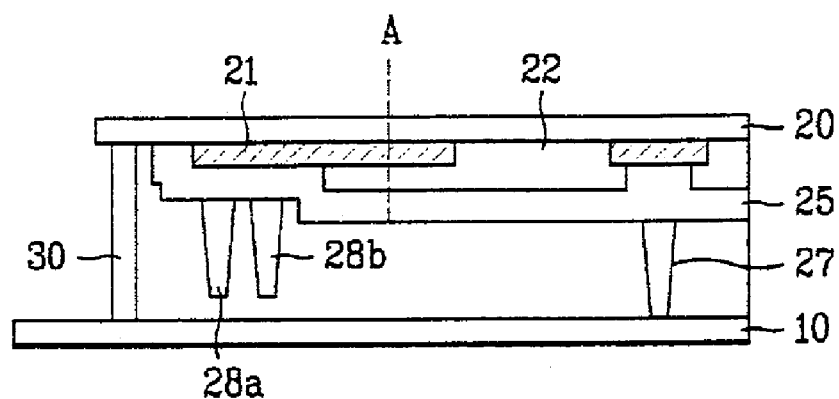
Figure 19F:
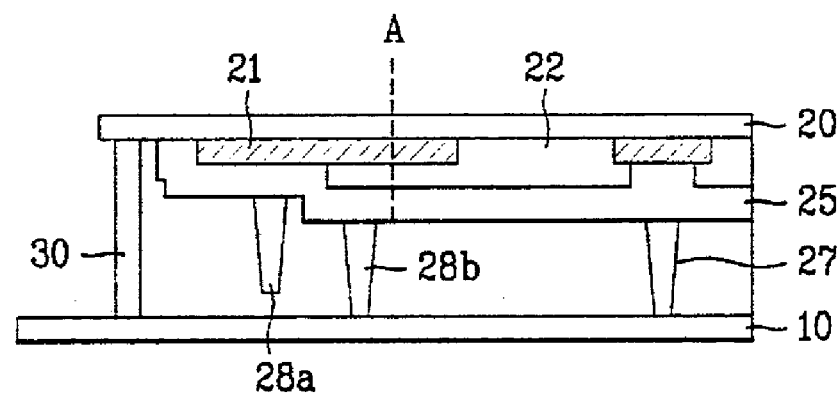

FIG. 19E and FIG. 19F illustrate liquid crystal displays according to another further embodiments of the present invention, in which overcoat layers 25 in the above-described liquid crystal displays in FIG. 19C and FIG. 19D are formed on black matrix layers 21 to be patterned so as not to be formed on sealants 30, respectively.

Figure 19G:
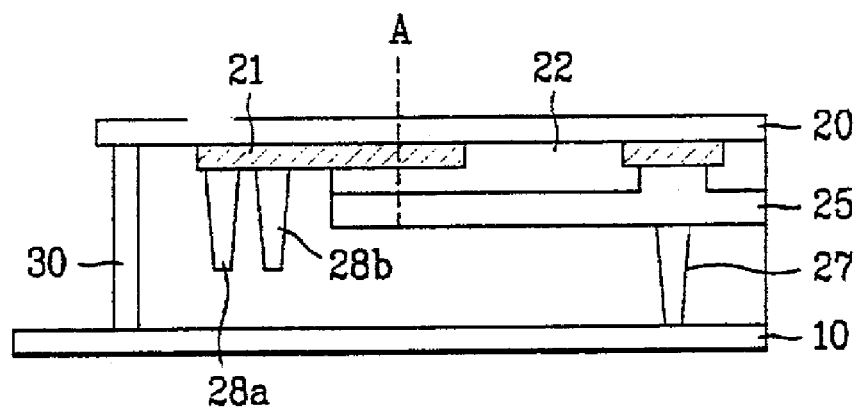
Figure 19H:
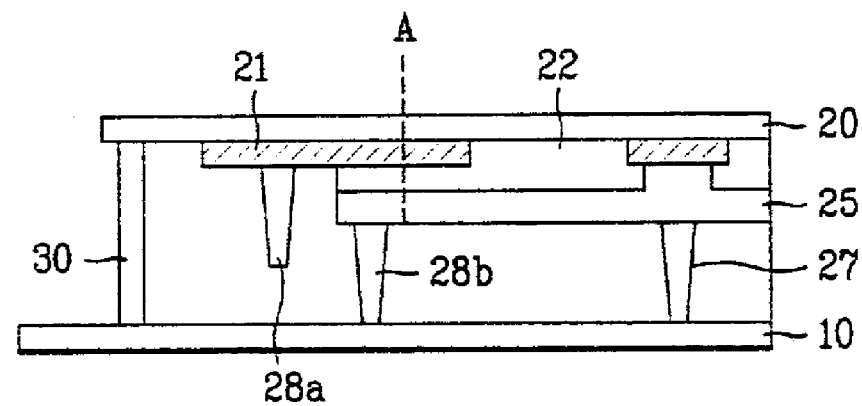

FIG. 19G and FIG. 19H illustrate liquid crystal displays according to another further embodiments of the present invention, in which overcoat layers 25 in the above-described liquid crystal displays in FIG. 19C and FIG. 19D are patterned so as not to be formed on predetermined areas of the black matrix layers 21, respectively.

Consequently, the first dummy column spacer 28a and/or dotted-line type second dummy column spacer 28b are/is formed not on the overcoat layer 25 but on the black matrix layer 21, whereby an interval or distance from a first substrate 10 increases.

ELEVENTH EMBODIMENT

Figure 20A:
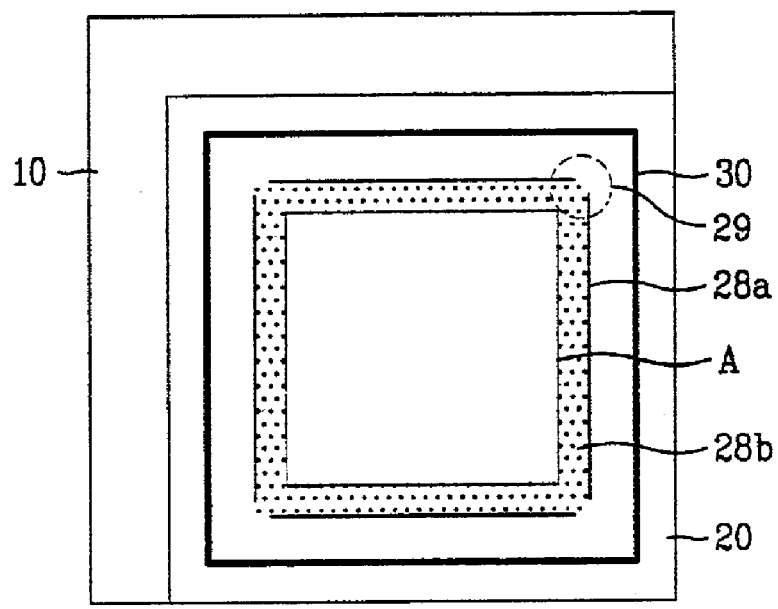
FIG. 20A and FIG. 20B illustrate layouts of an LCD for explaining a column spacer according to an eleventh embodiment of the present invention.
Figure 20B:
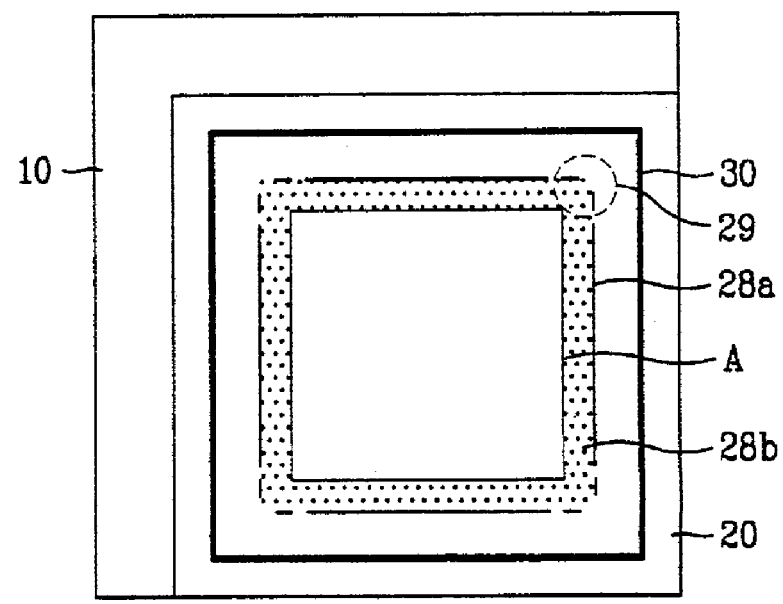

FIG. 20A and FIG. 20B illustrate layouts of LCD according to an eleventh embodiment of the present invention, in which elements of the embodiment are the same of those of the liquid crystal display according to the tenth embodiment of the present invention except that openings 29 are formed at a first dummy column spacer 28a in corner areas of a substrate.

Referring to FIG. 20B, a plurality of the openings 29 are formed at the first dummy column spacer 28a so as to maximize a liquid crystal flow.

TWELFTH EMBODIMENT

Figure 21:
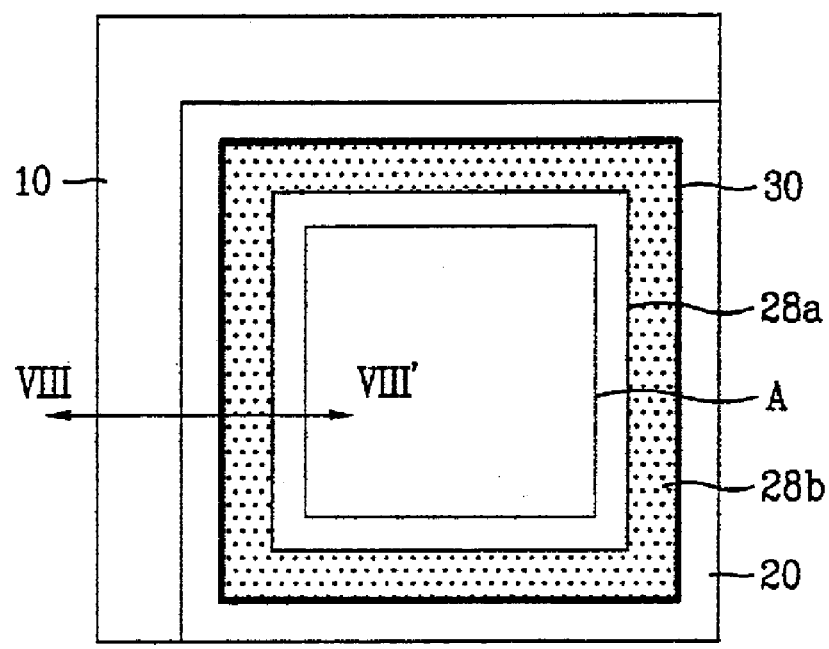
FIG. 21 illustrates a layout of an LCD for explaining a column spacer according to a twelfth embodiment of the present invention.

FIG. 21 illustrates a layout of an LCD for explaining a column spacer according to a twelfth embodiment of the present invention, in which a dotted-line type second dummy column spacer 28b is formed not inside a first dummy column spacer 28a but outside the first dummy column spacer 28a.

Effects are the same of those described in the eleventh embodiment of the present invention.

Figure 22A:
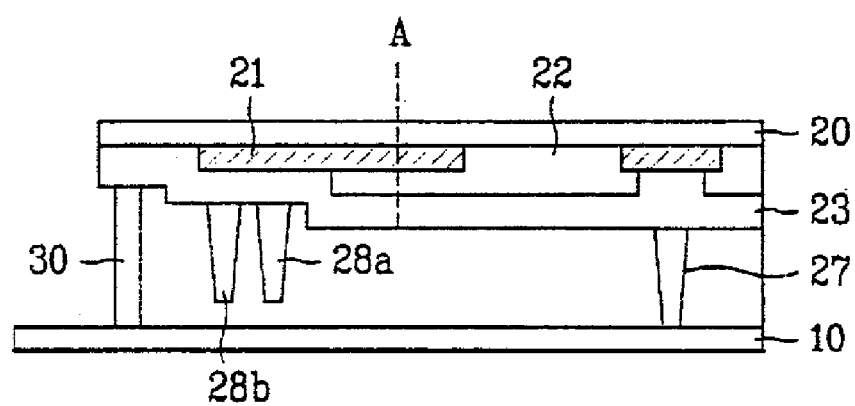
FIGS. 22A to 22D illustrate cross-sectional views of various embodiments on a line VIII–VIII' in FIG. 18.
Figure 22B:
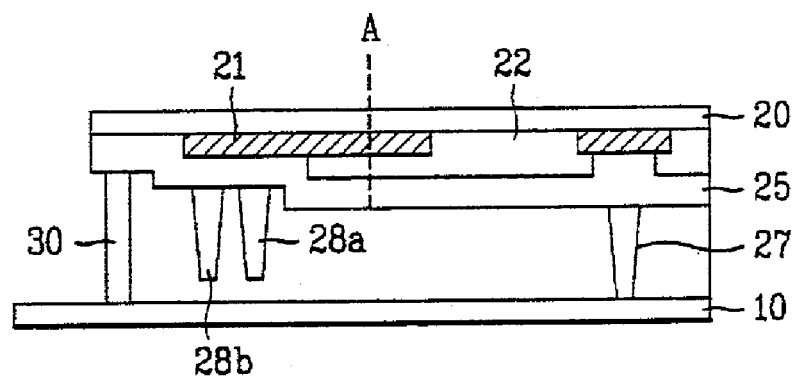
Figure 22C:
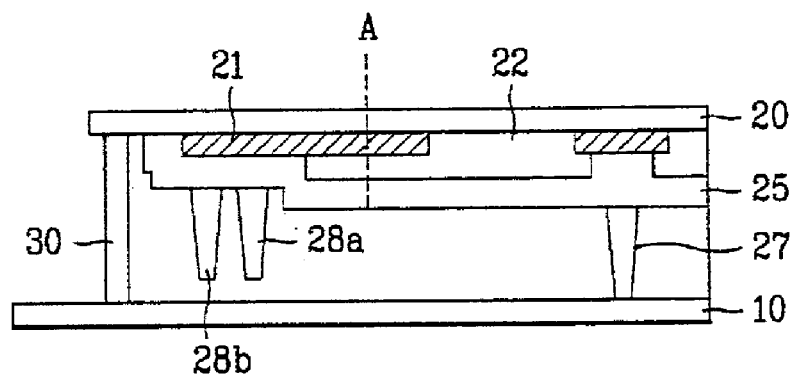

In this case, locations at which the first dummy column spacers 28a and dotted-line type dummy column spacers 28b are formed are shown in FIGS. 22A, 22B, and 22C.

Figure 22D:
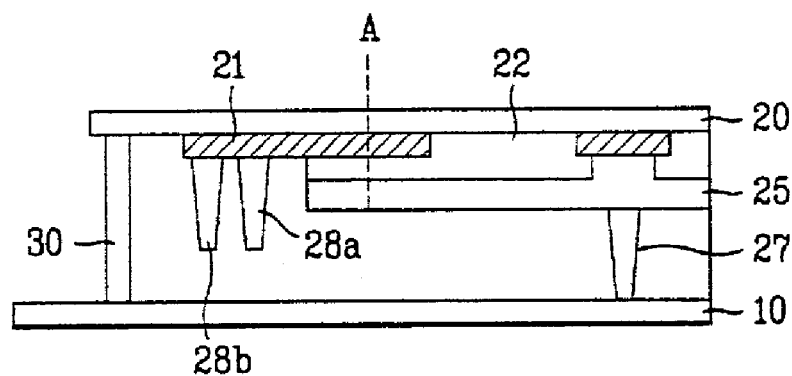

Namely, the first and second dummy column spacers 28a and 28b are formed on common electrodes 23 over a black matrix layers 21 in a dummy areas in FIG. 22A, overcoat layers 25 over black matrix layers 21 in the dummy areas in FIG. 22B and FIG. 22C, or a black matrix layer 21 in a dummy area in FIG. 22D.

THIRTEENTH EMBODIMENT

Figure 23A:
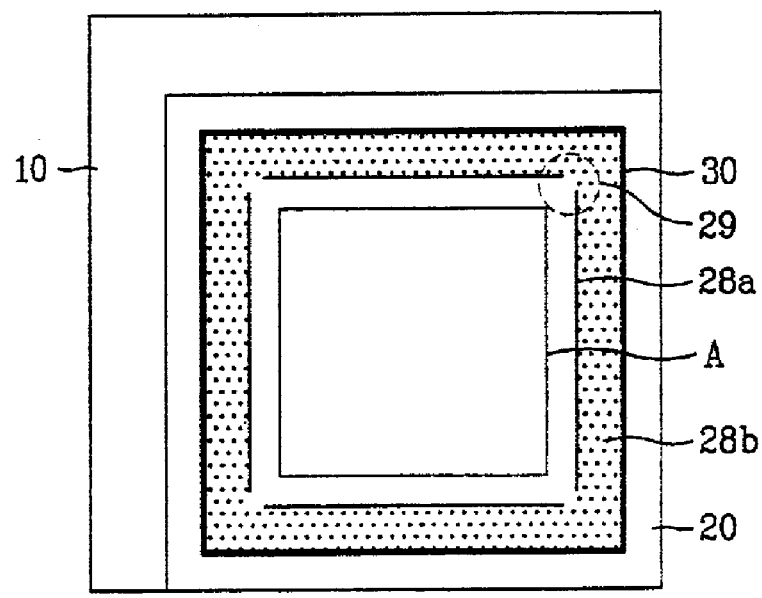
FIG. 23A and FIG. 23B illustrate layouts of an LCD for explaining a column spacer according to a thirteenth embodiment of the present invention.
Figure 23B:
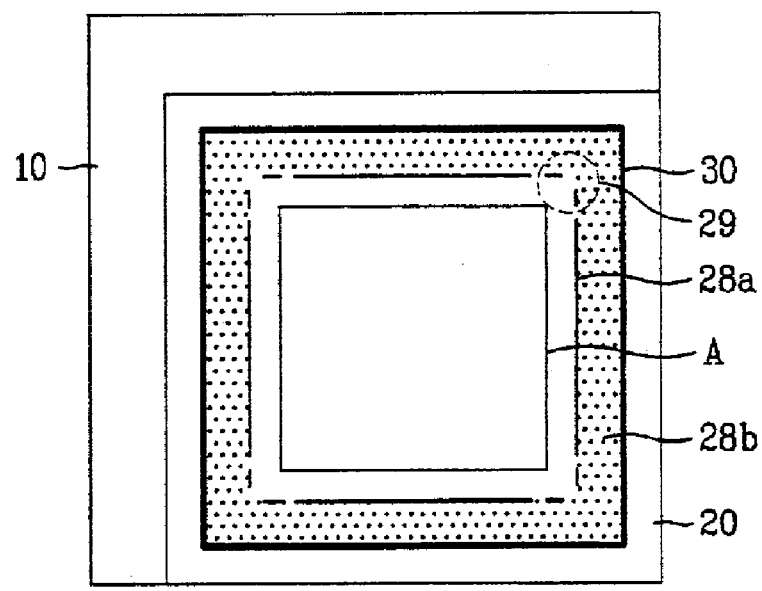

FIG. 23A and FIG. 23B illustrate layouts of LCD according to a thirteenth embodiment of the present invention, in which elements of the embodiment are the same of those of the liquid crystal display according to the twelfth embodiment of the present invention except that openings 29 are formed at a first dummy column spacer 28a in corner areas of a substrate.

Referring to FIG. 23B, a plurality of the openings 29 are formed at the first dummy column spacer 28a so as to maximize a liquid crystal flow.

FOURTEENTH EMBODIMENT

Figure 24A:
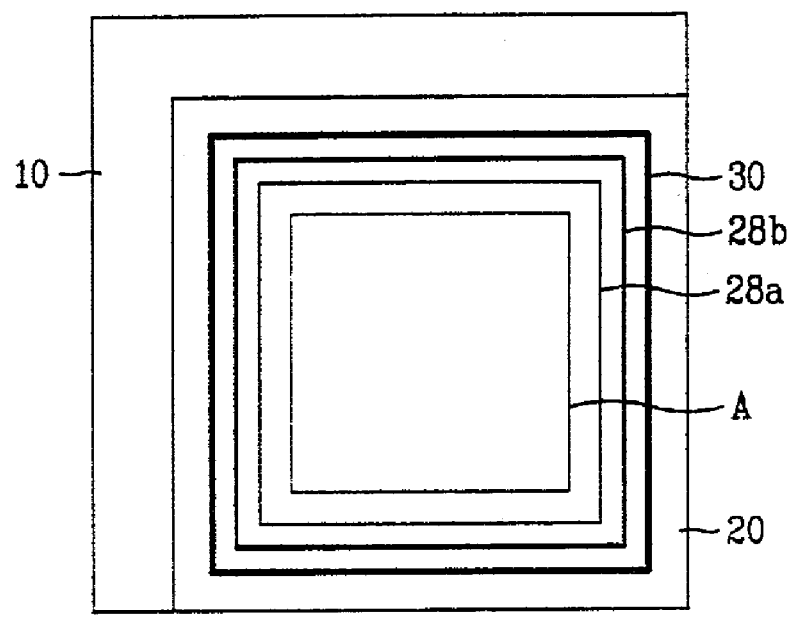
FIG. 24A and FIG. 24D illustrate layouts of an LCD for explaining a column spacer according to a fourteenth embodiment of the present invention.
Figure 24B:
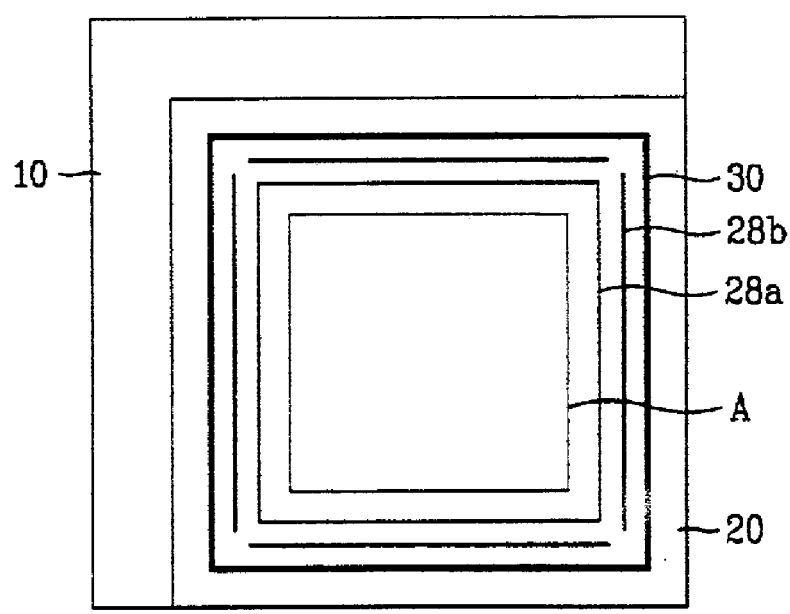
Figure 24C:
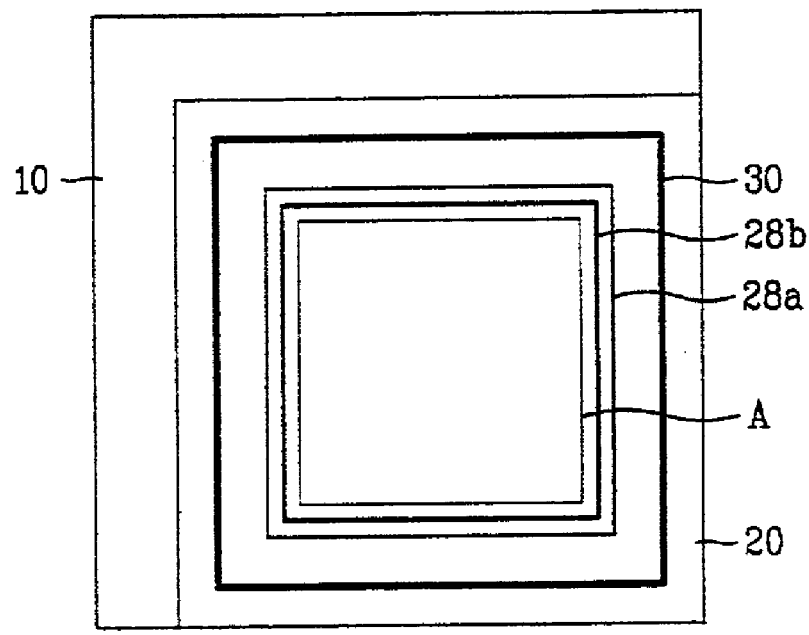
Figure 24D:
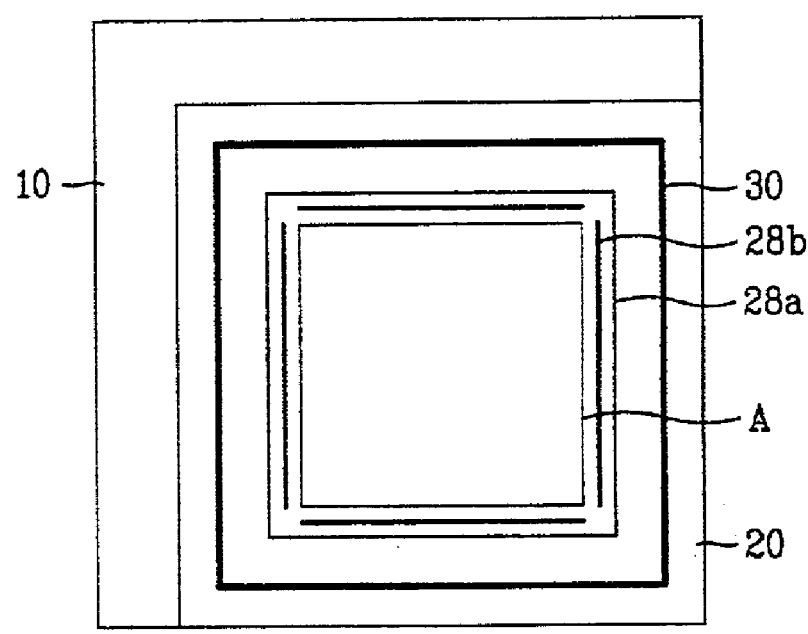

FIG. 24A and FIG. 24D illustrate layouts of an LCD for explaining a column spacer according to a fourteenth embodiment of the present invention, in which second dummy column spacers 28b are formed in dummy areas inside or outside first dummy column spacers 28a, respectively.

In this case, FIG. 24A and FIG. 24B relate to liquid crystal displays having the second dummy column spacers 28b in the dummy areas outside the first dummy column spacers 28a. And, FIG. 24C and FIG. 24D relate to liquid crystal displays having the second dummy column spacers 28b in the dummy areas inside the first dummy column spacers 28a, respectively.

Moreover, FIG. 24B or FIG. 24D shows that openings are formed at one of corner areas of the second dummy column spacer 28b at least on a substrate. In this case, a plurality of the openings can be formed continuously or discontinuously.

Moreover, openings can be formed at one of corner areas of the first dummy column spacer 28a on a substrate at least.

Forming locations of the first and second dummy column spacers 28a and 28b can be modified as those of the above-described first dummy column spacer 28a and doted-line type second dummy column spacer 28b, and the first and second dummy column spacers 28a and 28b are not limited to the above-described liquid crystal modes but are applicable to various modes such as vertical alignment mode, polysilicon mode, ferroelectric liquid crystal mode, OCB (optically compensated birefringence mode), and the like.

After completion of the TFT and color filter array processes (S1, S2) in accordance with the respective modes, cleaning processes (S2, S7) are carried out before forming alignment layers on the respective substrates. And, alignment layer and rubbing processes (S1–S3, S6–S8) are carried out thereon respectively.

Thereafter, cleaning processes (S4, S9) are carried out so as to remove particles generated from the alignment and rubbing processes.

A unit process (S10) for printing Ag dots and a sealant on the color filter array substrate is explained as follows.

First of all, in case of TN mode, as not shown in the drawing, after Ag (silver) has been formed like dots at a periphery part of the second substrate 20, the first and second substrates 10 and 20 are bonded to each other so as to apply a voltage to the common electrode 23 on the second substrate 20.

On the other hand, an IPS (in-plane switching) mode liquid crystal display needs no formation of the Ag dots since the common electrode and the pixel electrode are formed on the first substrate so as to induce a transversal electric field.

Figure 25:
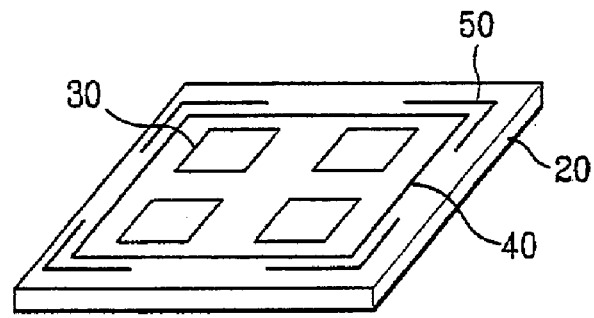
FIG. 25 illustrates a layout for a sealant forming process according to an embodiment of the present invention.

FIG. 25 illustrates a layout for a sealant forming process according to an embodiment of the present invention.

A plurality of main UV hardening sealants 30 are formed on edges of each panel on the second substrate 20 like a closed pattern, and a first dummy UV hardening sealant 40 is formed on a peripheral dummy area of each of the main UV hardening sealants 30 like a closed pattern. And, a second dummy UV hardening sealant 50 is coated on each corner of a periphery area of the first dummy UV hardening sealant 40.

In the drawing, the second dummy UV hardening sealants 50 are formed like a '☐' figure at the periphery area of both sides of corners of the first dummy UV hardening sealant 40. Instead, the second dummy UV hardening sealant 50 can be formed like a straight line at the periphery area of one side of each corner of the first dummy UV hardening sealant 40, or like a closed figure at the periphery area of the first dummy UV hardening sealant 40.

There are a screen-printing method, a dispensing method, and the like in coating the sealant. As a screen becomes contacted with a substrate, the screen printing method may cause damage on an alignment layer and the like on the substrate. Besides, if the substrate becomes large-sized, the screen printing method brings about too much loss. Thus, the dispensing method is preferable in such a case.

Preferably, monomer or oligomer having both ends bonded to acrylic functional groups is mixed with an initiator so as to be used for the main UV hardening sealant 30 and the first and second dummy UV hardening sealants 40 and 50. And, preferably, monomer or oligomer, which has one end bonded to an acrylic functional group and the other end bonded to an epoxy functional group, is mixed with an initiator so as to be used for the main UV hardening sealant 30 and the first and second dummy UV hardening sealants 40 and 50. When the monomer or oligomer, which has both ends bonded to acrylic functional groups and is mixed with the initiator, is used, the sealant is hardened by UV rays. On the other hand, when the monomer or oligomer, which has one end bonded to an acrylic functional group and the other end bonded to an epoxy functional group and is mixed with an initiator, the sealant is hardened by UV rays and heat.

A method of forming the main UV hardening sealant 30 is explained in detail as follows.

Figure 26A:
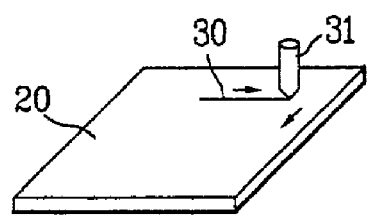
FIG. 26A and FIG. 26B illustrate bird's-eye views of forming a main UV-hardening type sealant according to a first embodiment of the present invention.
Figure 26B:
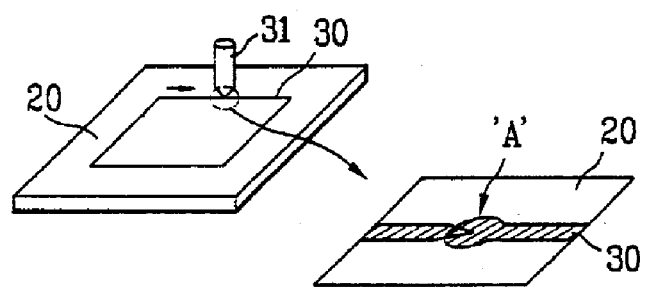
Figure 27:
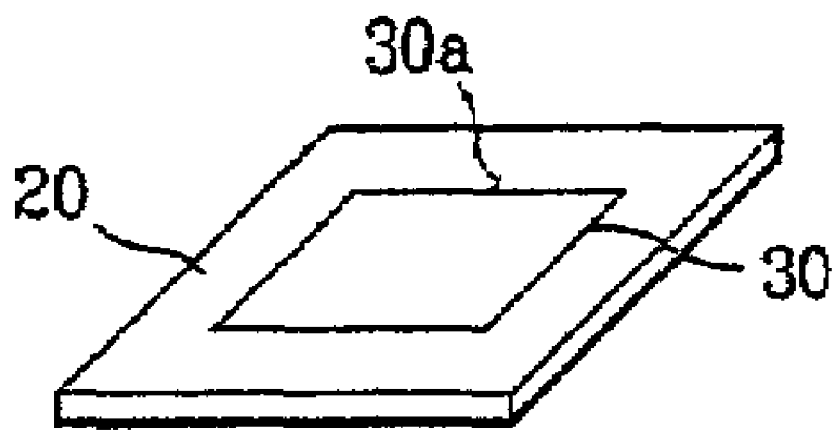
FIG. 27 illustrates a bird's-eye view of forming a main UV-hardening type sealant according to a second embodiment of the present invention.

FIG. 26A and FIG. 26B illustrate bird's-eye views of forming a main UV hardening type sealant according to a first embodiment of the present invention, and FIG. 27 illustrates a bird's-eye view of forming a main UV hardening type sealant according to a second embodiment of the present invention.

Since a liquid crystal dropping method needs no injection hole for injecting liquid crystals, as shown in FIG. 26A and FIG. 26B, a main UV hardening sealant 30 is formed on a second substrate 20 like a pattern having no injection inlet using a dispensing device 31.

Yet, viscosity of the main UV hardening sealant 30 is high so as to conglomerate at a tip of a nozzle of the dispensing device 31. The conglomerate sealant makes the sealant distributed excessively at a start point (cf. area 'A' in FIG. 26B).

The excessively distributed main UV hardening sealant, as shown in FIG. 26B, becomes spread excessively on both sides of an active area (central part of substrate) and a dummy area (periphery of substrate) in a following bonding process, whereby the sealant spread on the active area contaminates liquid crystals and the other sealant spread on the dummy area penetrates into a cell cutting line to make a cell cutting process difficult.

In order to facilitate the cell cutting process and not to contaminate the liquid crystals in the bonding process by forming the main UV hardening sealant having more uniform density, the main UV hardening sealant is printed in a following manner.

Referring to FIG. 27, after an auxiliary UV hardening sealant 30a has been formed at an edge (dummy area) of each panel of the second substrate 20 using the dispensing method, a main UV hardening sealant 30 is formed successively so as to be like a close type having no injection inlet.

The auxiliary UV hardening sealant 30a is for preventing the bad influence due to the sealant conglomerating at the tip of the nozzle in the dispensing device so as to be formed at any place in the dummy area of the substrate. And, it is enough that the auxiliary UV hardening sealant 30a is formed prior to the main UV hardening sealant 30. Moreover, the auxiliary UV hardening sealant 30a can be formed like a straight line or a curved line.

Thus, the Ag dot and sealant forming process (S10) is completed.

Subsequently, the second substrate 20 on which the sealant is coated is cleaned in a ultra sonic cleaner (USC) so as to remove particles generated from the process (S11). Namely, the second glass substrate 13, on which liquid crystals are not dropped but the sealant is formed, can be cleaned.

In a first substrate 10 on which the liquid crystals 26 are dropped and the second substrate 20 formed with the sealants 30, 40, and 50, the portion on which the liquid crystals are dropped and the other portion coated with the sealants face upward in the front ends. In order to bond the first substrate 10 on which the liquid crystals 26 are dropped and the second substrate 20 formed with the sealants 30, 40, and 50 to each other, one of the substrates 10 and 20 should be inverted. Yet, it is unable to invert the substrate on which the liquid crystals are dropped. Hence, the second substrate 20 formed with the sealants is inverted so that the portion formed with the sealants 30, 40, and 50 face downward (S12).

In this case, the inversion, as not shown in the drawing, is carried out in a manner that the second substrate 20 is loaded on a table of an inverter for pre-alignment, the second substrate 20 is clamped to the table to adhere thereto, the table is revolved for inversion, and the inverted second substrate 20 is transferred to a vacuum bonding chamber.

A liquid crystal dropping process is explained as follows.

Figure 28C:
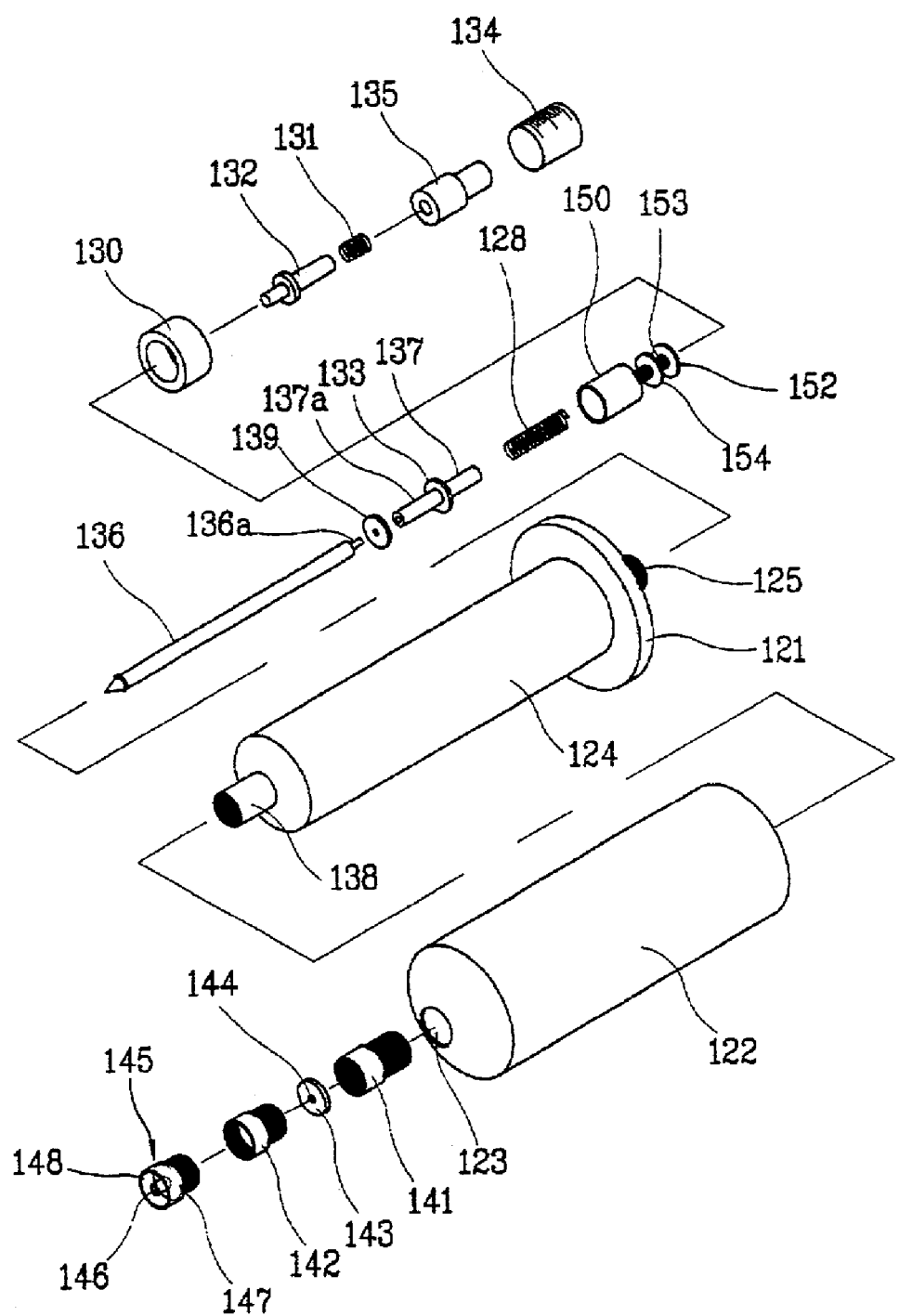

FIG. 28 illustrates a dispensing device according to the present invention, which includes FIG. 28A illustrating a cross-sectional view when LC is not dropped yet, FIG. 28B illustrating a cross-sectional view when LC is being dropped, and FIG. 28C illustrating a disassembled bird's-eye view.

In a dispensing device 120, as shown in the drawings, a cylindrical liquid crystal container 124 is received in a case 122. The liquid crystal container 124 is made of polyethylene and charged with liquid crystals 26 inside. And, the case 122 is made of stainless steel and receives the liquid crystal container 124 inside. Generally, polyethylene has an excellent forming characteristic so as to form a container having a demanded figure with ease, and fails to be reacted with the liquid crystals filling a container so as to be used for the liquid crystal container 124. Yet, polyethylene is vulnerable to strength so as to be easily distorted by an external weak impact. Specifically, the liquid crystal container 124 made of polyethylene is distorted so that it is unable to drop the liquid crystals 26 on a precise location, thereby being received in the case made of stainless steel. A gas supply pipe 164 is formed at an upper part of the liquid crystal container 124 so as to be connected to an external gas supply unit 162. Gas such as nitrogen is supplied from the external gas supply unit 162 through the gas supply pipe 164. Hence, an area of the liquid crystal container 124 failing to be charged with the liquid crystals becomes filled with the gas so as to pressurize the liquid crystals to let the liquid crystals be dropped.

An opening 123 is formed at a lower end of the case 122. When the liquid crystal container 124 is received in the case 122, a protrusion 138 formed at a lower end of the liquid crystal container 124 is inserted in the opening 123 so that the liquid crystal container 124 is coupled with the case 122. Moreover, the protrusion 138 becomes coupled with a first coupling unit 141. A nut is formed at the protrusion 138 and a bolt is formed at one side of the first coupling unit 141. Hence, the protrusion 138 and the first coupling unit 141 are coupled with each other by the nut and bolt.

A nut is formed at the other end of the first coupling unit 141 and a bolt is formed at one end of a second coupling unit 142. Hence, the first and second coupling units 141 and 142 are coupled with each other. In this case, a needle sheet 143 is placed between the first and second coupling units 141 and 142. The needle sheet 143 becomes coupled between the first and second coupling units 141 and 142 when the bolt of the second coupling unit 142 is inserted in the nut of the first coupling unit 141. A discharging hole 144 is formed at the needle sheet 143 so that liquid crystals filling the liquid crystal container 124 are discharged through the second coupling unit 142 and discharging hole 144.

And, a nozzle 145 is coupled with the second coupling unit 142. The nozzle 145 is for dropping a small amount of the liquid crystals 26 charged in the liquid crystal container 124, and includes a support portion 147 having a bolt to be coupled with the nut at one end of the second coupling unit 142 so as to couple the nozzle 145 with the second coupling unit 142, a discharging portion 146 protruding from the support portion 147 so as to dispense a small amount of the liquid crystals on a substrate, and a protecting wall 148 formed at an exterior of the support portion 147 so as to protect the discharging portion 146.

A discharging pipe extending from the discharging hole 144 of the needle sheet 143 is formed inside the support portion 147 so as to be connected to the discharging portion 146. Generally, the discharging portion of the nozzle 145 has a very small diameter (for controlling a dispensing amount of fine liquid crystals) and protrudes from the support portion 147.

Hence, the discharging portion 146 having the minute diameter is easily affected by an external force on handling such that the nozzle 145 is assembled/disassembled to/from the second coupling unit 142. For instance, if the discharging portion 146 is distorted or broken when the nozzle 145 is coupled with the second coupling unit 142, the diameter of the discharging portion 146 is changed so as to be unable to control an amount of liquid crystals being dispensed on the substrate. Besides, the liquid crystals become splashed to the broken area so as to be dropped on an unwanted location. Further, if the dispensing liquid crystals are splashed to a sealing area (area coated with sealant so as to bond upper and first substrates to each other) due to the breakage of the discharging portion 146, the sealant on the area to which the liquid crystals are splashed is blown up so as to generate a failure of a liquid crystal display panel.

The protecting wall 148 for the discharging portion 146 prevents the discharging portion 146 of the nozzle 145 from being broken by the above-like external force. Namely, a wall having a predetermined height, as shown in the drawing, is formed at a circumference of the discharging portion 146 so as to prevent the external force from being applied to the discharging portion 146.

FIG. 29 illustrates a magnified view of a part 'A' in FIG. 28A, which includes FIG. 29A illustrating a bird's-eye view and FIG. 29B illustrating a cross-sectional view. Since a protecting wall 148 is formed around the circumference of the discharging portion 146 of the nozzle 145 so as to be as almost tall as the discharging portion 146, and preferably, taller than the discharging portion 146, the nozzle 145 is prevented from being distorted or broken by tools such as a coupling tool and the like when the nozzle 145 is treated for assembly or disassembly.

Moreover, an overall size of the nozzle 145 increases due to the protecting wall 148. Since a size of the nozzle is very minute generally, handling for assembling/disassembling the nozzle 145 to/from the second coupling unit 142 is difficult using a tool or the like. Yet, the size of the nozzle 145 is increased by forming the protecting wall 148 in the present invention, thereby enabling to provide easy assembly/disassembly of the nozzle 145.

The protecting wall 148 can be formed of any material enabling to protect the discharging portion 146 from the external force, and may be formed of stainless steel, hard metal alloy, or the like having excellent strength.

Referring to FIG. 29B, a material having a high contact angle for liquid crystals such as a fluoro resin 149 is coated around a periphery of the discharging portion 146 of the nozzle 145, which is for the following reason.

The contact angle is an angle made when thermodynamic equilibrium of liquid is achieved at a solid surface. Such a contact angle is a barometer indicating wettability of a solid surface. The nozzle 145 is made of metal having a low contact angle in general. Since metal has high wettability (i.e. hydrophilic) and high surface energy, liquid crystals tend to spread over a surface of the nozzle instead of forming a drop figure (which means that the contact angle is high) at an end of the discharging portion 146 of the nozzle when the liquid crystals are dropped (dispensed) through the nozzle 145 made of metal. And, as the liquid droppings are repeated, the liquid crystals having spread over the surface of the nozzle 145 become conglomerate.

The phenomenon of liquid crystals spreading over the surface of the nozzle 145 makes a precise liquid crystal dropping impossible. Even though the liquid crystal amount discharged through the discharging portion 146 of the nozzle 145 is controlled by adjusting a pressure applied to the liquid crystals and a time for opening the discharging hole 144, the discharged liquid crystals spread over the nozzle surface in part. Hence, the amount substantially dropped on the substrate becomes smaller that that discharged through the discharging portion 146. It is a matter of course that the discharge amount can be controlled by considering the liquid crystal amount spreading over the surface of the nozzle 145. Yet, it is substantially impossible to calculate the amount of liquid crystals having spread over the surface of the nozzle 145.

Moreover, an amount of the liquid crystals conglomerating by the repletion of the liquid crystal droppings can be added to that discharged through the discharging portion 146 of the nozzle 145, whereby the amount of liquid crystals dropped on the substrate may exceed a setup amount. In other words, the amount of liquid crystals, which are dropped at the low contact angle as a metal characteristic from the nozzle made of metal, becomes irregular.

On the other hand, when the fluoro resin layer 149 having a high contact angle is coated around the nozzle 145, and specifically, around the discharging portion 146 of the nozzle, the liquid crystals 26 discharged through the discharging portion 146 of the nozzle 145 fail to spread over the surface of the nozzle 145 but for a perfect drop form owing to low wettability (hydrophobic) and low surface energy of the fluoro resin layer 149. Consequently, the designed precise amount of the liquid crystals can be dropped on the substrate.

The fluoro resin layer (i.e. Teflon) is coated on the surface of the nozzle 145 by dipping or spraying. The fluoro resin layer 149 is coated around the discharging portion 146 only in FIG. 29B. Yet, the fluoro resin layer 149 can be coated on an entire surface of the nozzle 145 including the protecting wall 148. Fluoro resin has characteristics of anti-abrasion, heat-resistant, chemical proof, etc. as well as high contact angle, thereby enabling to prevent the nozzle 145 from being broken or distorted by an external force more effectively.

A needle 135 is inserted in the liquid crystal container 124 so that one end of the needle 135 is contacted with the needle sheet 143. The end of the needle 135 contacted with the needle sheet 143 has a cone shape so as to be inserted into the discharging hole 144 of the needle sheet 143 to plug up the discharging hole 144. The needle 135 includes first and second needles 136 and 137 which are separable. The first needle 136, as shown in FIG. 29, has one end like a cone coming into contact with the needle sheet 143 and the other end at which a protrusion 136a is formed. Moreover, a recess 137a in which the protrusion 136a of the first needle 136 is inserted is formed at one end of the second needle 137.

The protrusion 136a of the first needle 136 is inserted in the recess 137a of the second needle 137, and then fixed by a fixing means 139 so as to couple the first and second needles 136 and 137 with each other. The fixing means 139 is made of metal having a ring-shape of which portion is open. Since a ring type inner circumference is formed to be smaller than diameters of the first and second needles 136 and 137 respectively, the coupling portions of the first and second needles 136 and 137 are inserted inside the ring so as to be fixed thereto by elasticity. In this case, a recess and a protrusion may be formed at the first and second needles 136 and 137, respectively so that the protrusion of the second needle 137 is inserted in the recess of the first needle 136 to be fixed by the fixing means 139.

The reason why the needle 135 is formed to be separable is as follows. One end of the needle 135 comes into contact with the needle sheet 143 so as to open or close the discharging hole 144, whereby the needle 135 plays important role of dropping liquid crystals on a substrate. And, the needle 135 is constituted with one set. In other words, if one of the needle 135 and needle sheet 143 is broken to be replaced, both of the needle and needle sheet 135 and 143 should be replaced. Meanwhile, the needle 135 moves periodically upward and downward so as to drop the liquid crystals on the substrate. Such periodic movement gives an impact on the needle 135 continuously. Besides, compared to a length of the needle 135, the needle 135 has a very small diameter. Hence, possibility of breakage or distortion of the needle 135 increases. The distortion or breakage of the needle 135 brings about a gap generated from failing to plug up the discharging hole 144 when the conical end of the needle 135 is inserted in the discharging hole. Liquid crystals come into dropping on the substrate through such a gap. Hence, the broken or distorted needle 135 has to be replaced. Yet, constituting a single set, the expensive needle 135 and needle set 143 should be replaced simultaneously.

On the other hand, when the needle 135 includes the separable first and second needles 136 and 137 according to the present invention, the expense can be saved by replacing the distorted or broken needle only. Moreover, if the second needle 137 is distorted or broken, the expense can be more saved than that of the entire replacement of the needle 135 and needle sheet 143, which is because the first needle 136 and needle sheet 143 need not be replaced but the second needle 137 is replaced only.

In the drawing, the protrusion 136a and recess 137a are formed at the first and second needles 136 and 137, respectively so as to be coupled with each other and fixed by the fixing means 139. Yet, the present invention is not limited to such a specific structure which is just exemplary for explaining the present invention. Further, the needle according to the present invention can be coupled through various methods. For instance, the first and second needles 136 and 137 can be coupled with each other by coupling just the protrusion and the recess with each other without the fixing means, forming bolt and nut at the first and second needles 136 and 137 respectively so as to be coupled with each other, and the like.

Moreover, a first spring 128 is loaded on the other end of the needle 135 located at the upper case of the dispensing device 120. The first spring 128 is received in a cylindrical first spring receiving unit 150. A bolt 125, as shown in FIG. 28C, is formed at a support portion 121 formed at an upper part of the liquid crystal container 124 so as to support the liquid crystal container 124 to the case 122, and a nut is formed at the first spring receiving unit 150. Hence, the first spring receiving unit 150 is fixed to the support portion 121. An opening at which a nut is formed, as failing to be shown in the drawing in detail, is formed at an upper part of the first spring receiving unit 150, and a tension controlling unit 152 is inserted through the opening so as to control a tension of the first spring 128. Since a bolt 1 is formed at the tension controlling unit 152, a length of the bolt 153 of the tension controlling unit 152 inserted in the first spring receiving unit 150 can be adjusted. And end of the tension controlling unit 152 inserted in the first spring receiving unit 150, i.e. an end of the bolt 153, becomes contacted with the first spring 128. Hence, the first spring 128 is fixed between the fixing means 139 at the needle 136 and the bolt 153.

In the drawing, a numeral '154' indicates a fixing plate making the tension controlling unit 152 fixed thereto. When the fixing plate 154, as shown in FIG. 28A, fails to adhere closely to the first spring receiving unit 150, the tension controlling unit 152 enables to rotate so as to enable adjustment of tension. Yet, if the fixing plate 154, as shown in FIG. 28B, adheres closely to the first spring receiving unit 150, the tension controlling unit 152 becomes fixed so as to be set up as a corresponding tension.

As mentioned in the above description, the tension of the first spring 128 can be set up by a length of the tension controlling unit 152 inserted in the first spring receiving unit 150 since the first spring 128 is fixed to be installed between the fixing means 139 and tension controlling unit 152. For instance, if the length of the bolt 153 inserted in the first spring receiving unit 150 is shortened by operating the tension controlling unit 152 (i.e. length of the bolt 153 protruding out of the upper part of the first spring receiving unit 150), the length of the first spring 128 is elongated so as to reduce the tension. If the length of the bolt 153 is shortened, the tension increases. Therefore, it is able to control preferably the tension of the first spring 128 by manipulation of the tension controlling unit 152.

A magnetic bar 132 is loaded on an upper part of the needle 135 so as to leave an interval x from the needle 135. And, a second spring 131 is installed at the magnetic bar 132. As shown in the drawing, the second spring 131 is received in a second spring receiving unit 135 fixed to the upper case 126, and the magnetic bar 132 is inserted in the second spring receiving unit 135 so as to be movable. Hence, elastic force of the second spring 131 is applied to the magnetic bar 132.

The magnetic bar 132 is made of ferromagnetic or soft magnetic material, and a cylindrical solenoid coil 130 is installed outside the second spring receiving unit 135. The solenoid coil 130 is connected to a power supply unit 160 so that a power is applied thereto. As the power is applied thereto, a magnetic force is generated from the magnetic bar 132. The needle 135 comes into contact with the magnetic bar 132 by the magnetic force. And, if the power supply is cut off, the needle 135 returns to its original position by the elasticity of the first spring 128 installed at the end of the needle 135. Hence, the discharging hole 144 formed at the needle sheet 143 becomes opened or closed by the upward and downward movements of the needle 135.

The control of the upward and downward movements of the needle 135, i.e. the control of a time taken to open/close the discharging hole 144, is affected by the second spring 131 installed at the magnetic bar 132. Once a magnetic force is generated from the magnetic bar 132 by the power supply applied to the solenoid coil 130 so that the needle 135 is lifted upward to touch the magnetic bar 132 to push upward, the magnetic bar 132 is lifted upward as soon as the second spring 137 is compressed by the moving-upward magnetic bar 132. If the magnetic bar 132 loses its magnetic force as the power supply applied to the solenoid coil is cut off, the elastic force of the compressed second spring 137 is applied to the magnetic bar 132 so that the magnetic bar 132 pushes the needle 135 downward.

Thus, descent of the needle 135 is made swiftly by the first and second springs 128 and 131, thereby enabling to control the liquid crystal dropping more effectively. Specifically, the movement of the needle 135 by the first and second springs 128 and 131 enables to prevent the dropping failure caused by the friction between the first needle 136 and the liquid crystals effectively, which is explained in detail as follows.

Generally, viscosity of liquid crystals is much higher than that of liquid. Hence, when the needle 135 moves in the liquid crystals, the movement of the needle 135 becomes delayed by the friction between a surface of the needle 135 and liquid crystals. On dropping liquid crystals, it is able to calculate a precise open time by adding the delay of the needle 135 movement by the friction as a variable for calculating the open time of the discharging hole 144 of the needle sheet 143. Yet, the amount of liquid crystals filling the liquid crystal container 124 is reduced as the liquid crystals are dropped, whereby the delay time of the needle 135 is reduced. Hence, it is difficult to carry out the exact amount dropping of liquid crystals since the open time of the discharging hole 144 is reduced as well.

Yet, if the movement of the needle 135 is controlled by the two springs 128 and 131 according to the present invention, a descending speed of the needle 135 becomes so fast as to disregard the friction between the surface of the needle 135 and the liquid crystals. Hence, it is able to maintain a uniform open time of the discharging hole 144, thereby enabling to carry out the liquid crystal dropping with the exact amount.

The magnetic bar 132 is made of ferromagnetic or soft magnetic material, and the cylindrical solenoid coil 130 is installed outside the second spring receiving unit 135. The solenoid coil 130 is connected to a power supply unit 160 so that a power is applied thereto. As the power is applied thereto, a magnetic force is generated from the magnetic bar 132. The needle 135 comes into contact with the magnetic bar 132 by the magnetic force. And, if the power supply is cut off, the needle 135 returns to its original position by the elasticity of the first and second springs 128 and 131 installed at the needle 135 and magnetic bar 132, respectively. Hence, the discharging hole 144 formed at the needle sheet 143 becomes opened or closed by the upward and downward movements of the needle 135.

The end of the first needle 136 comes into contact with the needle sheet 143 repeatedly as the power is/fails to be applied to the solenoid coil 130. Hence, a possibility of breakage exists since the end of the first needle 136 and the needle sheet 143 are exposed to continuous impact due to the repeated contacts. Therefore, it is preferable that the end of the first needle 136 and needle sheet 143 are made of a shock-resistant material such as hard metal so as to prevent the breakage caused by the impact.

Referring to FIG. 28B, as the discharging hole 144 of the needle sheet 143 becomes open, a gas (i.e. nitrogen gas) supplied to the liquid crystal container 124 pressurizes the liquid crystals so as to drop the liquid crystals 26 from the nozzle 145. In this case, an amount of the dropped liquid crystals varies in accordance with the time for opening the discharging hole 144 and the pressure applied to the liquid crystals, and the open time depends on the interval x between the needle 135 and magnetic bar 132, the magnetic force of the magnetic bar 132 generated from the solenoid coil 130, and the tensions of the first and second springs 128 and 131 installed at the needle 135 and magnetic bar 132 respectively. The magnetic force of the magnetic bar 132 can be adjusted in accordance with a winding number of the solenoid coil 130 installed around the magnetic bar 132 or a size of the power applied to the solenoid coil 130, and the interval x between the needle 135 and magnetic bar 132 can be adjusted by a gap controlling unit 134 installed at the end of the magnetic bar 132.

Moreover, the tension of the first spring 128 is adjusted by the tension controlling unit 152. If a length of the first spring 128 set up as a specific length is adjusted to be modified by the tension controlling unit 152, the tension is changed with a force corresponding to the modified length difference so as to enable to vary a restoring speed of the needle 135. Therefore, it is able to control the open time of the discharging hole 144 of the needle sheet 143. Thus, it is able to drop the demanded amount of liquid crystals on the substrate by controlling the tension of the first spring 128 arbitrarily by controlling the tension controlling unit 152. And, such a tension of the first spring 128 can be controlled arbitrarily in a manner that a user operates the tension controlling unit 152 directly.

Moreover, the interval x between the needle 135 and magnetic bar 132 can be set up by the user as well. In other words, the user can adjust arbitrarily the open time of the discharging hole 144 of the needle sheet 143 by the interval z and the springs 128 and 131.

On the other hand, the size of the power supply applied to the solenoid coil 130 and the amount of the nitrogen gas supplied to the liquid crystal container 124 are determined by a main control unit 170 controlling the power supply unit 160 and a flow control valve 161 installed at a gas supply pipe 164 connected to the gas supply unit 162 so as to supply the liquid crystal container 124 with the gas. In other words, the power supply amount and the gas influx are determined not by a user's direct operation but by a control of the main control unit 170, in which the power supply amount and gas influx amount are calculated based on input data.

The main control unit 170, as shown in FIG. 30, includes an input unit 171 inputting various kinds of information, a dropping amount calculation unit 173 calculating a dropping amount of liquid crystals to be dropped on an entire substrate based on the input data, a dispensing pattern calculation unit 175 calculating a dispensing pattern of the liquid crystals based on the dropping amount of the liquid crystals calculated by the dropping amount calculation unit 173, a substrate driving unit 176 driving the substrate based on the dispensing pattern calculated by the dispensing pattern calculation unit 175, a power control unit 177 controlling the power supply unit 160 so as to supply the solenoid coil 130 with a power corresponding to the dropping amount of the liquid crystals to be dropped based on the dispensing pattern calculated by the dispensing pattern calculation unit 175, a flow control unit 178 controlling the flow control valve 161 so as to supply the liquid crystal container 124 with a gas having an amount corresponding to the dropping amount of the liquid crystals to be dropped from the gas supply unit 162 based on the dispensing pattern calculated by the dispensing pattern calculation unit 175, and an output unit 179 outputting the input data, calculated dropping amount, calculated dispensing pattern, a present status of liquid crystal dropping, and the like.

The input unit 171, as shown in FIG. 31, includes a spacer height input unit 180 inputting a height of a spacer formed at a substrate, a liquid crystal characteristic information input unit 182 inputting information about characteristics of the liquid crystal such as viscosity, and a substrate information input unit 184 inputting a size of a liquid crystal display panel to be fabricated and various kinds of information about the substrate.

Even though the dropping amount of the liquid crystals, which is set up when the height of the column spacer formed actually on a color filter substrate is different from a setup cell gap, is dropped on the substrate, the amount of the liquid crystals filing the actually fabricated liquid crystal display panel would be different from an optimal amount of the liquid crystals (because a difference is generated from the cell gap due to the height of the actually formed column spacer). If the dropping amount of the liquid crystals which are substantially dropped is smaller than the optimal dropping amount, for instance, black brightness is troubled in a normally black mode liquid crystal display or white brightness is troubled in a normally white mode liquid crystal display.

Moreover, if the dropping amount of the substantially dropped liquid crystals is greater than the optimal dropping amount, a gravity failure is brought about when a liquid crystal display panel is fabricated. The gravity failure is generated since a volume of the liquid crystal layer formed inside the liquid crystal display panel increases due to a temperature increase, whereby the cell gap of the liquid crystal display panel increases to move the liquid crystals downward due to gravity. Hence, the cell gap of the liquid crystal display panel becomes irregular, thereby degrading a quality of the liquid crystal display.

In order to overcome such a problem, the main control unit 170 compensates the dropping amount of the liquid crystals dropped on the substrate by the height of the spacer formed on the substrate as well as calculates the dropping amount of the liquid crystals. In other words, the dropping amount of the liquid crystals currently calculated is compared to that calculated based on the height of the spacer, and then liquid crystals amounting to the corresponding difference is added or subtracted so as to be dropped on the substrate.

The height of the spacer is inputted in a spacer forming process of a TFT or color filter process. Namely, in the spacer forming process, the height of the spacer is measured so as to be transferred to the dropping amount calculation unit 173 through the spacer height input unit 180 as well as the spacer is formed. A spacer forming line is separated from a liquid crystal dropping line. Hence, the measured height of the spacer is inputted to the spacer height input unit 180 through wire or wireless.

The liquid crystal characteristic information input unit 182 or the substrate information input unit 184 inputs data through a general operating mans such as a keyboard, mouse, touch panel, or the like, in which substrate information such as a size of a liquid crystal display panel to be fabricated, a substrate size, and the number of panels formed on the substrate and liquid crystal characteristic information are inputted by a user. The output unit 179 informs the user of various information, and includes various outputting devices such as a display including CRT (cathode ray tube) and LCD and a printer.

The dropping amount calculation unit 173 calculates a total dropping amount of the liquid crystals which will be dropped on an entire substrate having a plurality of liquid crystal display panels formed thereon as well as the dropping amount of the liquid crystals which will be dropped on the liquid crystal display panel, and provides the dispensing pattern calculation unit 175 with the calculated dropping amounts.

The dispensing pattern calculation unit 175, as shown in FIG. 32, includes a single dropping amount calculation unit 186 calculating a single dropping amount of liquid crystals dropped on a specific position on a substrate based on the dropping amount calculated in the dropping amount calculation unit 173, a dropping number calculation unit 187 calculating the number of droppings which will be dropped on the substrate, a dropping position calculation unit 188 calculating a position of liquid crystals dropped on the substrate based on the single dropping amount calculated in the single dropping amount calculation unit 186 and the dropping number calculated in the dropping number calculation unit 187, and a dispensing pattern decision unit 189 deciding the dispensing pattern of the liquid crystals in accordance with the calculated dropping position.

The single dropping amount calculation unit 186 calculates a single dropping amount of liquid crystals based on the calculated total dropping amount. In other words, the single dropping amount has a close relation to the total dropping amount as well as the dropping number.

The dropping number calculation unit 187 calculates the dropping number to be dropped on one panel based on an input of the total dropping amount, an area of the panel, and characteristics of the liquid crystals and substrate. In a general dropping method, the liquid crystals dropped on the substrate spreads over the substrate by the pressure applied thereto when upper and lower substrates are bonded to each other. Such a spread of the liquid crystals depends on liquid crystal characteristics such as viscosity of liquid crystals and structures of the substrate on which the liquid crystals will be dropped such as arrangement or disposition of pattern and the like. Hence, an area on which the singly dropped liquid crystals spread over is determined by the above characteristics. Considering such an are, the dropping number of liquid crystals to be dropped on the panel is calculated. Moreover, the number to be dropped on the entire substrate is calculated in accordance with the dropping number of the panel.

The dropping position calculation unit 188 calculates a dropping position of liquid crystals based on the dropping number of liquid crystals dropped on the panel, the dropping amount of liquid crystals dropped singly, a pitch between the dropped liquid crystal drops, and a spreading characteristic of liquid crystals. Specifically, the spreading characteristic of liquid crystals is important in judging whether the liquid crystals reach the sealant on bonding substrates. Hence, the dropping position calculation unit 188 considers the spreading characteristic of liquid crystals so as to calculate the dropping position in order to prevent the liquid crystals from being contacted with the sealant before the sealant is hardened. Generally, factors determining the spreading characteristic of liquid crystals include a shape of panel, a pattern of a device formed on the panel, and a rubbing direction (alignment direction) for an alignment layer of the panel.

Thus, the dropping position calculation unit 188 considers such factors so as to calculate the dropping position of liquid crystals.

As a liquid crystal display panel is generally rectangular, a distance to a corner is farther than a distance to a side. Hence, a distance of spreading liquid crystals increases. Moreover, gate lines cross with data lines on a first substrate (TFT substrate) 10 of a liquid crystal display panel, and a color filter layer is arranged along a data line direction on a second substrate (color filter layer) 20. Such a device pattern forms a step difference inevitably. The step difference becomes an interrupting factor of the liquid crystal spread, whereby a liquid crystal spreading speed in a device pattern direction is higher than that in a vertical direction. Substantially, the liquid crystal spreading speed of the first substrate on which the data and gate lines cross with each other is not affected greatly. Yet, the color filter layer on the color filter substrate affects the spreading speed of liquid crystals.

Another factor having influence on the dropping position of liquid crystals is alignment for aligning adjacent liquid crystal molecules in a specific direction by giving an alignment regulating force or a surface fixing force to an alignment layer. And, the alignment is carried out by rubbing the alignment layer in a specific direction using a soft cloth. Minute grooves aligned in a specific (rubbing) direction are formed on the alignment layer by such a rubbing, and the liquid crystal molecules are aligned by the grooves in a specific direction. As the spreading speed of the liquid crystals in an alignment direction becomes greater than that in another direction, the dropping position of liquid crystals is calculated by considering such a fact.

As mentioned in the above description, the dropping position of liquid crystals depends on a shape of a panel and pattern and alignment directions of a device formed on a liquid crystal display panel.

FIG. 38A and FIG. 38B illustrate layouts of LC dropping patterns determined in accordance with the dropping positions of liquid crystals calculated by the above factors. FIG. 38A illustrates a dropping pattern of liquid crystals of a TN (twisted nematic) mode liquid crystal display panel, FIG. 38B illustrates a dropping pattern of liquid crystals of an IPS (in plane switching) mode liquid crystal display panel, and FIG. 38C illustrates a dropping pattern of liquid crystals of a VA (vertical alignment) mode liquid crystal display panel.

In case of a TN mode, alignment directions of alignment layers formed on first and second substrates are vertical to each other. As the spreading speeds of liquid crystals in vertical directions are cancelled out from each other on bonding the substrates actually, the alignment directions of the alignment layers fail to have influence on the spread of liquid crystals. Therefore, the factors affecting the dropping pattern of liquid crystals substantially on bonding the substrates are the shape of the panel and the direction of devices formed on the panel. As the liquid crystal spreading distance in a diagonal direction is greater than that in a vertical direction of the substrate due to the factor of substrate shape, liquid crystals 26 should be dropped longer toward a corner side of a rectangular panel 10a rather than a side of the panel 10a. Moreover, since the liquid crystal spreading speed in a gate line direction of the panel is slower than that in a data line direction due to the pattern (including patterns on color filter and TFT substrates) formed on the substrate, liquid crystals should be dropped so as to be longer in the gate line direction rather than the data line direction.

An optimal liquid crystal dropping (dispensing) pattern considering the above factors, as shown in FIG. 38A, is formed like a dumbbell shape in a manner that a dispensing pattern is aligned in a gate line direction with a predetermined width in a central area of the panel 10a and the other dispensing pattern is aligned like a rectangle in both side areas.

When liquid crystals are dropped so as to have the dumbbell shape, the drop-like liquid crystals which are being dropped should maintain a uniform interval (dispensing or dropping pitch) with each other. This is because the liquid crystals having been dropped on the substrate spread at a predetermined distance so as to come into contact with adjacent liquid crystals before the substrate bonding. If the liquid crystals fail to be contacted with the adjacent before the substrate bonding, dropping traces of liquid crystals remain on the substrate. And, the dropping traces cause the failure of a liquid crystal display panel. The dropping pitch of liquid crystals is not fixed but varies in accordance with a single dropping amount of liquid crystals dropped on the substrate singly or a spreading speed of liquid crystals. The dropping pitch of liquid crystals is about 9~17 mm in a TN or VA mode liquid crystal display panel or about 8~13 mm in an IPS mode liquid crystal display panel. And, viscosity of the liquid crystals is 10~40 cps.

In case of IPS mode, an alignment direction of an alignment layer faces a direction different from a gate line or a data line direction at an angle $\theta$, which is about 10~20°. In other words, in IPS mode, the spread of liquid crystals depends greatly on the alignment direction as well as the shape of liquid crystal display panel and the direction of device pattern. Hence, it is preferable that, as shown in FIG. 38B, a lightning-like dispensing pattern is formed. Namely, a dispensing pattern having a central area and tail areas in a direction opposite to an alignment direction of an alignment layer. In this case, the term 'lightning-like' is used for convenience of explanation and is not intended to limit a shape of the dispensing pattern of the present invention. Moreover, the 'tail area' means a portion of the dispensing pattern extending in a direction opposite (substantially vertical to the alignment direction) to the alignment direction of the alignment layer and is not intended to limit a specific shape of the dispensing pattern of the present invention as well.

Moreover, the dispensing pattern is not limited to the above-mentioned mode. When alignment is not carried out in a vertical alignment mode, liquid crystals are preferably dropped so as to have a rectangular shape at a central portion of a substrate 10 or a dumbbell shape in FIG. 38A. And, the alignment direction may be determined by a protrusion for electric field distortion formed on a first or second substrate 10 or 20, a slit formed at a common or pixel electrode, or a pattern of an auxiliary electrode formed on the first substrate 10. If photo-alignment is applied thereto instead of rubbing, the alignment direction is determined by a light irradiating direction.

In the dispensing device according to the present invention, as mentioned in the above description, liquid crystals are automatically dropped on the substrate after a user calculates the dispensing pattern of liquid crystals based on various data. A liquid crystal dropping method using the above-constituted dispensing device is explained as follows.

FIG. 33 illustrates a flowchart of an LC dropping method according to the present invention. If a user, as shown in the drawing, operates a keyboard, mouse, or touch panel so as to input information and of a liquid crystal display panel, other characteristic information of the liquid crystal display panel through the input unit 171, and a height (i.e. cell gap) of a spacer measured in a previous process (S21), the dropping amount calculation unit 173 calculates a total dropping amount of liquid crystals which will be dropped on a substrate (or panel)(S22). Subsequently, the single dropping amount calculation unit 186 and dropping number calculation unit 187 calculate a single dropping amount and a dropping number, respectively. The dropping position calculation unit 188 then calculates a dropping position of liquid crystals based on the single dropping amount and dropping number so as to calculate a dispensing pattern of liquid crystals(S23, S24).

A substrate disposed under the dispensing device 120 is moved in x and y directions by a motor. The dispensing pattern calculation unit 175 calculates a position on which the liquid crystals will be dropped based on the inputted dropping amount, characteristic information of liquid crystals, and substrate information, and then moves the substrate so that the dispensing device 120 is disposed at the setup dropping position by actuating the motor based on the calculated position on which the liquid crystals will be dropped (S27, S28).

When the substrate is moved, the electric power control unit 177 and flow control unit 178 calculate a power and a gas pressure corresponding to an open time of the discharging hole 144 and the single dropping amount of liquid crystals based on the calculated single dropping amount of liquid crystals (S25), and then control the power supply unit 160 and flow control valve 161 so as to supply the solenoid coil 130 with the power and the liquid crystal container 124 with nitrogen corresponding to the calculated gas pressure. Thus, the liquid crystals start to be dropped on the setup position(S26, S29).

The single dropping amount is determined by the power amount of the power supply applied to the solenoid coil 130 and the supply quantity of nitrogen applied to the liquid crystal container 124 to pressurize the liquid crystals. The dropping amount of liquid crystals can be adjusted by varying the above two factors. Instead, the dropping amount can be controlled by fixing one of the two factors and varying the other as well. In other words, the power amount applied to the solenoid coil 130 is varied only, while a flow of nitrogen supplied to the liquid crystal container 124 is fixed as the setup amount, so as to drop a demanded amount of the liquid crystals on the substrate. Moreover, the power amount applied to the solenoid coil 130 is fixed to be a setup value, while a flow of nitrogen supplied to the liquid crystal container 124 is varied, so as to drop a demanded amount of the liquid crystals on the substrate.

Meanwhile, the single dropping amount of liquid crystals dropped on a specific position of a substrate can be determined by adjusting a tension of the first spring 128 or the interval x between the needle 135 and magnetic bar 132. Yet, the adjustment of the tension of the first spring 128 or the interval x can be carried out randomly by a simple user's operation, which is preferably set up previously on dropping the liquid crystals.

When liquid crystals are dropped on a substrate, a dropping amount of the liquid crystals which are being dropped is a very minute amount of several mg. It is very difficult to drop the minute amount precisely. Besides, the setup amount is easily changed by various factors. Hence, it is necessary to compensate the dropping amount of liquid crystals to be dropped so as to drop the exact amount of liquid crystals on the substrate all the time. Such a compensation is carried out by a compensation control unit included in the main control unit 170 shown in FIG. 28A.

The compensation control unit 190, as shown in FIG. 34, includes a dropping amount measuring unit 191 measuring a dropping amount of liquid crystals, a compensating amount calculation unit 192 calculating a compensation amount of liquid crystals by comparing the measured dropping amount to a setup dropping amount, and a dispensing pattern compensation unit 193 calculating a new dispensing pattern by compensating an initially calculated dispensing pattern as the compensating amount calculated by the compensating amount calculation unit 192.

Although not shown in the drawing, a weigher for measuring a weight of liquid crystals precisely is installed at (or outside) the dispensing device so as to measure the weight of liquid crystals periodically or non-periodically. Generally, an minute amount of liquid crystals weighs several mg, whereby there is limit to measuring the minute amount. In the present invention, the dropping amounts of a fixed dropping number, ex. 10, 50, or 100, are measured so as to calculate a single dropping amount.

Referring to FIG. 35, the compensating amount calculation unit 192 includes a dropping amount setting unit 195 setting up the dropping amount calculated by the single dropping amount calculation unit 186 in FIG. 32 as a current dropping amount, a comparison unit 196 comparing the setup dropping amount to a dropping amount measured by the dropping amount measuring unit 191 in FIG. 34 so as to calculate a difference value therebetween, and a dropping amount error calculation unit 197 calculating an error value of the dropping amount of liquid crystals corresponding to the amount compared by the comparison unit 196.

And, the dispensing pattern compensation unit 193, as shown in FIG. 36, includes a single dropping amount compensation unit 193a calculating a single compensating amount based on the dropping amount error calculated by the compensating amount calculation unit 192 in FIG. 34, a dropping number compensation unit 193b calculating a compensated dropping number based on the dropping amount error, a dropping position compensation unit 193c calculating the dropping position, and a compensated pattern calculation unit 193d calculating a compensated dispensing pattern of liquid crystals based on the single compensating amount and compensated dropping number calculated in the single dropping number compensation unit 193a, dropping amount compensation unit 193b, and dropping position compensation unit 193c.

The compensated dispensing pattern calculated by the compensated dispensing pattern calculation unit 193d includes the compensated single dropping amount and compensated dropping number. Hence, the power control unit 197 calculates an electric power corresponding to the compensated dropping amount so as to output a signal corresponding to the calculated electric power to the power supply unit 160, and the power supply unit 160 supplies the solenoid coil 130 with the electric power corresponding to the dropping amount compensated in accordance with the signal. Moreover, the flow control unit 198 calculates a pressure corresponding to the compensated dropping amount so as to out a corresponding signal to the flow control valve 161, and the flow control valve 161 supplies the dispensing device 120 with a gas flow corresponding to the dropping amount compensated in accordance with the inputted signal.

FIG. 37 illustrates a flowchart of a compensation method of LC dropping amount according to the present invention. Referring to FIG. 37, after the liquid crystal droppings of the setup number have been carried out, a dropping amount of liquid crystals which are being dropped is measured using a weigher(S31). Subsequently, the measured dropping amount is compared to the set up measuring amount so as to judge whether an error value of the dropping amount exists or not(S32, S33).

If there is no error value, it is judged that the dropping amount of the liquid crystals which are being dropped is equal to the setup amount so as to keep on the dropping. If there exists the error value, an error amount is calculated (single dropping amount error and dropping error number) so as to compensate the dispensing pattern in the dispensing pattern compensation unit 193 to calculate a new dispensing pattern(S34). After the substrate has been moved to a dropping position determined by the compensated dispensing pattern(S35), a power amount error corresponding to the dropping amount error is calculated so as to calculate a compensated power amount, and the power control unit 197 is controlled to supply the solenoid coil 130 with the calculated power amount from the power supply unit 160 so as to drop the compensated amount of liquid crystals on the dropping position(S36, S37, S41).

Moreover, the compensated pattern calculation unit 193d calculates a gas pressure error corresponding to the dropping amount error(S38). Thereafter, a flow supply amount corresponding to the gas pressure error is calculated to calculate a compensated flow supply amount. And, a corresponding gas is supplied from the gas supply unit 162 to the liquid crystal container 124 by controlling the flow control valve 161 so as to drop the compensated amount of liquid crystals on the compensated dropping position(S39, S40, S41).

The above-described processes of compensating the dropping amount of liquid crystals are repeated. Whenever the liquid crystal droppings of the setup number are ended, the above compensation process is repeated so as to drop the exact amount of liquid crystals on the substrate.

Generally, the compensation of the dropping amount of liquid crystals, as mentioned in the forgoing description, is achieved by compensating the single dropping amount by controlling the power supply unit 160 and flow control valve 161. Since the single dropping amount of liquid crystals is very minute, it is very difficult to adjust the single dropping amount precisely. It is a matter of course that both of the single dropping amount and the dropping number should be compensated in order to compensate the dropping amount of liquid crystals exactly, which is more difficult. Therefore, for a simpler compensation of the dropping amount, the dropping amount of liquid crystals can be compensated by compensating the dropping number of liquid crystals only. 'Compensating the dropping number of liquid crystals' means that the dispensing pattern is compensated by calculating a new dropping position for the setup dispensing pattern.

In case that the dispensing pattern is compensated by compensating the dropping number, the basic dispensing pattern is not modified. Since the calculated (or setup) dispensing pattern includes all the factors required for the liquid crystal dropping, the calculation of new dispensing pattern is so difficult as well. Therefore, when the dropping amount of liquid crystals is compensated in the present invention, the dropping amount is compensated using the previously calculated dispensing pattern of liquid crystals. When liquid crystals are initially dropped(before compensation), the liquid crystals are not dropped on all of the dispensing pattern of liquid crystals. The dispensing patterns 26a made by solid lines in FIG. 38A, FIG. 38B, and FIG. 38C are compensated dispensing patterns, while another dropping patterns 26b made by dotted lines are dispensing patterns which will be compensated. Namely, when the measure dropping amount is smaller that the setup dropping amount(i.e. liquid crystal amount is increased), the dotted lines indicate the additional dispensing patterns 26b to be compensated. And, liquid crystals are additionally dropped on theses positions. Moreover, when the measured dropping amount exceeds the setup dropping amount, the dotted-line dispensing patterns among the setup dispensing patterns are removed so as to stop dropping the liquid crystals on the corresponding dispensing patterns 26b.

In the above description, the liquid crystals 26 are dropped on the first substrate 10 as a TFT array substrate, while the Ag dots and sealant 30 are coated on the second substrate 20 as a color filter array substrate. Yet, in accordance with a mode of liquid crystal display, the liquid crystals 26 can be dropped on the second substrate 20 as a color filter array substrate, while the Ag dots and sealant 30 are formed on the first substrate 10 as a TFT array substrate.

As a liquid crystal display panel is generally rectangular, the distance to a corner of the panel is greater than a distance to any one side of the panel. As a result, the distance the liquid crystal has to travel to the corner is greater than the distance the liquid crystal has to travel to the sides of the panel. In addition, step differences (e.g., device heights) occur because of device patterns on the substrates. For example, the gate line crossing with data lines on a first substrate (TFT substrate) of a liquid crystal display panel and a color filter layer arranged along a data line direction on a second substrate (color filter layer). These step differences interrupt the spreading of the liquid crystal such the liquid crystal spreading speed in a device pattern direction is greater than in a direction perpendicular to the device pattern direction. The liquid crystal spreading speed of the first substrate on which the data and gate lines cross with each other is not affected greatly. However, the color filter layer on the color filter substrate affects the spreading speed of liquid crystal.

Another factor having influence on the dropping position of liquid crystal is alignment for aligning adjacent liquid crystal molecules in a specific direction by giving an alignment regulating force or a surface fixing force to an alignment layer. The alignment is provided by rubbing the alignment layer in a specific direction using a soft cloth or by photolithography. Minute grooves aligned in a specific (rubbing) direction are formed on the alignment layer by such a rubbing, and the liquid crystal molecules are aligned by the grooves in a specific direction. Because the spreading speed of the liquid crystal in an alignment direction is greater than that in another direction, the dropping position of liquid crystal is calculated by considering such a fact.

As mentioned in the above description, the dropping position of liquid crystal depends on a shape of a panel and pattern and alignment directions of a device formed on a liquid crystal display panel.

FIGS. 66A to 66C illustrate layouts of LC dropping patterns determined in accordance with the dropping positions of liquid crystal calculated by the above factors. FIG. 66A illustrates a dropping pattern of liquid crystal of a TN (twisted nematic) mode liquid crystal display panel. FIG. 66B illustrates a dropping pattern of liquid crystal of an IPS (in plane switching) mode liquid crystal display panel. FIG. 66C illustrates a dropping pattern of liquid crystal of a VA (vertical alignment) mode liquid crystal display panel.

In case of a TN mode, the alignment directions of alignment layers formed on first and second substrates are perpendicular to each other. As a result when bonding the substrates, the alignment directions of the alignment layers have a minimal influence on the overall spreading rate of the liquid crystal between the substrates. The factors that affect the spreading rate of the liquid crystal are the shape of the panel and the location of devices formed on the panel. Referring to the figures, because of the rectangular shape of the panel, the distance the liquid crystal has to travel to the any corner of the panel is greater than the distance the liquid crystal has to travel to any side of the panel. Therefore, the liquid crystal 8207 should be applied to substantially cover regions near the corners of the rectangular panel 8251a. In other words, the liquid crystal as applied need not substantially cover the regions near the side of the panel 8251a, as liquid crystal will fill these regions during spreading. In addition, due to the patterns formed on the substrate (including patterns on color filter and TFT substrates), the rate at which the liquid crystal spreads in a gate line direction is slower than the rate at which the liquid crystal spreads in the data line direction. Therefore, the liquid crystal should be applied to more substantially cover the area in the gate line direction versus the area in the data line direction.

An optimal liquid crystal dropping (dispensing) pattern considering the above factors is a dumbbell shape, as shown in FIG. 66A. For example, such dispensing pattern has a predetermined width in a gate line direction in a central area of the panel 8251a and includes rectangular patterns on each side of the central area of the panel 8251a.

When liquid crystal is dropped to have the dumbbell shape, the drops of liquid crystal should be dropped at a uniform interval (dispensing or dropping pitch) with respect to each other. This is because the dropped liquid crystal on the substrate spreads a predetermined distance from its dropping point so as to come into contact with adjacent liquid crystal drops before the substrate bonding. If the liquid crystal does not contact the adjacent liquid crystal drops before the substrates are bonded, traces of liquid crystal will remain on the substrate. These traces may cause the failure of a liquid crystal display panel.

The dropping pitch of liquid crystal is not fixed, but can be varied in accordance with the amount of liquid crystal in a single drop and the spreading speed of liquid crystal. The dropping pitch of liquid crystal is about 9 to about 17 mm in a TN or VA mode liquid crystal display panel or about 8 to about 13 mm in an IPS mode liquid crystal display panel. Viscosity of the liquid crystal is about 10 to about 40 cps.

In IPS mode the alignment direction is different from both the gate line direction and the data line direction by an angle θ (see FIG. 66B). The angle θ as measured from the data line is about 10~20°. In other words, in IPS mode, the spread of liquid crystal depends greatly on the alignment directions on the alignment layers on respective substrates, as well as the shape of liquid crystal display panel and the configuration of the device patterns. Hence, it is preferable that, as shown in FIG. 66B, a lightning-like dispensing pattern is formed. Namely, a dispensing pattern having a central area and tail areas in a direction opposite to an alignment direction. In this case, the term 'lightning-like' is used for convenience of explanation and is not intended to limit a shape of the dispensing pattern of the present invention. Moreover, the 'tail area' means a portion of the dispensing pattern extending in a direction opposite to the alignment direction (e.g., substantially perpendicular to the alignment direction). Again, the term 'tail area' is used for convenience of explanation and is not intended to limit the specific shape of the dispensing pattern of the present invention.

In a vertical alignment mode the formation of an alignment direction is not necessary. Thus, the liquid crystal can be dispensed to have a generally rectangular shape at a central portion of a substrate 8251a or a dumbbell shape as shown in FIG. 66A. Moreover, an alignment direction may be determined according to distortion of an electric field caused by a protrusion, rib, or frame formed on a first or second substrate 8251 or 8252, or a slit formed at a common or pixel electrode, or a pattern of an auxiliary electrode formed on the first substrate 8251 or second substrate 8252. If photo-alignment is utilized instead of rubbing of an alignment layer, the alignment direction is determined by the light irradiating direction.

In the dispensing device according to the present invention, as mentioned in the above description, liquid crystal is automatically dropped on the substrate after a user calculates the dispensing pattern of liquid crystal based on various data.

The present invention considers the factors having influence on the extent that the liquid crystal drops spread. These factors include substrate shape, rubbing direction of an alignment layer, and the patterns formed on the substrate. The above-explained factors affect the dispensing of the liquid crystal.

The substrate shape, rubbing direction, and patterns formed on the substrate should be considered when calculating the dispensing pattern to utilize. When the alignment direction is formed by a method other than rubbing, the factors having influence on the liquid crystal dispensing pattern may vary. For instance, when the alignment direction is formed utilizing a photo-alignment method, the photo-irradiation direction or the polarization direction of irradiated light may be considered as being a factor having influence on the dispensing pattern.

The following explanation is for embodiments according to the present invention, to which the above factors are substantially applied so as to represent dispensing patterns of liquid crystal displays of various modes.

FIG. 66F generally illustrates a dispensing pattern 8117 of a TN mode liquid crystal display (LCD). In the case of a TN mode LCD, alignment directions of alignment layers formed on the first and second substrates are perpendicular to each other. As a result of this orientation the effect that the alignment direction have when bonding the substrates is minimized. Rather, the factors that significantly affect the spreading rate of the liquid crystal include the shape of the panel and the location of devices formed on the panel.

Device patterns on the substrate form step differences. For example, a color filter layer arranged along the data line creates step differences in the gate line direction. Accordingly, the color filter affects the spreading rate of the liquid crystal such that the spreading rate of liquid crystal is greater in the data line direction than in the gate line direction.

As liquid crystal panels are generally rectangular, the distance from the center to any corner of the panel is greater than the distance to any one side of the panel. Accordingly, rectangular dispensing pattern 117 may be arranged on the panels. The rectangular dispensing pattern still may not be adequate, however, because the spreading rate of the liquid crystal in the data line direction is greater than in the data line direction.

Therefore, as illustrated in FIG. 66F, the dimensions of the dispensing pattern 8117 in the data line direction may be made smaller than the dimensions of the dispensing pattern 8117 in the gate line direction in order to compensate for the aforementioned anisotropic spreading rate.

In one aspect of the present invention, the dispensing pattern 8117 may be formed such that an interval L1 between the dispensing pattern 8117 in the data line direction and a side of the liquid crystal panel 8105 is greater than the other interval L2 between the dispensing pattern in the gate line direction and the side of the liquid crystal panel 8105. That is, the distance L1 should be greater than the distance L2 (L1>L2).

The dispensing pitch is an interval between adjacent liquid crystal drops 8107 of the dispensing pattern 8117 and influences the spreading rate of the liquid crystal. Generally the liquid crystal drops 8107, arranged within the dispensing pattern 8117, spread isotropically and merge into adjacent liquid crystal drops. As a result, the liquid crystal drops 8107 merge together so as to cover the substrate prior to the bonding of the substrates. However, dropping traces occur if the liquid crystal drops arranged on the substrate do not come into contact with adjacent liquid crystal drops prior to the bonding of the substrates. Dropping traces are a significant reason for the degradation of the liquid crystal panels.

An important factor in preventing the degradation of the liquid crystal panel as well as uniformly distributing the liquid crystal drops is the dispensing pitch. The dispensing pitch of liquid crystal drops depends on the viscosity of the liquid crystal drops and more specifically, on the single dropping amount of liquid crystal drops arranged on the substrate.

For example, in the TN mode liquid crystal display of the present invention, the dispensing pitch is preferably set up as about 9–17 mm. As explained in detail above, the spreading rate of the liquid crystal drops is greater in the data line direction than in the gate line direction. Accordingly, the dispensing pitch t1 in the data line direction should be set up to be greater than t2 in the gate line direction (t1>t2).

In addition, the spreading of the liquid crystal drops 8107 arranged on the substrate may be influenced by the application of pressure to the substrates. The liquid crystal drops arranged on the substrate are spread across the substrate by pressure generated from bonding the upper and lower substrates together. Ideally when bonding the substrates pressure may be uniformly applied to the substrates. However, typically the pressure applied to the central area of the substrate is greater than the pressure applied to the circumferential area of the substrate. Therefore, the liquid crystal drops are arranged in a rectangular dispensing pattern, as shown in FIG. 66F. The liquid crystal reaches the sealant before the liquid crystal drops is hardened because the central portion of the rectangular shape spreads faster in the data line direction (by mutual effect of the speed increasing pattern and pressure).

Although the effect of the pressure differentials may be negligible, such problems should be overcome to remove the degradation of the liquid crystal display. In order to overcome these pressure problems the dispensing pattern of liquid crystal drops as shown in FIG. 66D is utilized.

Referring to the figure, the dispensing pattern 217 is formed so that a middle portion of the rectangular dispensing pattern is removed in part as shown in the data line direction. In other words, the width of the middle area (width along the data line direction) is smaller that the rest. Forming the dispensing pattern 8217 this way effectively prevents the degradation of liquid crystal display.

As shown in the figure, the dispensing pattern 8217 has a "dumbbell shape." The term "dumbbell shape" is used for convenience of explanation, and is not intended to limit the shape of the dispensing pattern in the present invention. The term "dumbbell-shaped dispensing pattern" means a shape formed by removing a partial middle portion of the dispensing pattern in the data line direction of an initial rectangular dispensing pattern, that is having a narrow width in the data line direction.

In the middle area of the dumbbell-shaped dispensing pattern 8217 is a first dispensing pattern 8217a, which has a width narrower in the data line direction than the widths of the second or third dispensing patterns 8217b or 8217c, respectively. The distance L3 between the first dispensing pattern 8217a and a side of a liquid crystal panel 8205 is greater than distance L1 of the second or third dispensing pattern 8217b or 8217c (L3>L1).

The dispensing pitches t1, t2, and t3 of the dumbbell-shaped dispensing pattern 8217 are formed such that dispensing pitch t1 of the second or third dispensing pattern 8217b or 8217c in the data line direction is longer than dispensing pitch t2 in the gate line direction and dispensing pitch t3 of the first dispensing pattern 8217a in the data line direction is longer than that dispensing pitch p1 of the second or third dispensing pattern 8217b or 8217c.

The rectangular dispensing pattern having a narrow width in the data line direction (dumbbell-shaped dispensing pattern) is utilized for a TN mode liquid crystal display. Thus, enabling prompt and uniform distribution of liquid crystal drops across the substrate.

As explained in detail above for TN mode liquid crystal displays the alignment directions have minimal influence on the overall spreading of the liquid crystal. Accordingly, the dispensing patterns are formed ignoring the affect of the alignment directions. Similarly, the same techniques can be utilized in the VA mode liquid crystal displays. In general VA mode liquid crystal display have no specific alignment direction. The dispensing pattern of the VA mode liquid crystal display can be formed similar to the dispensing pattern used in the TN mode liquid crystal display. That is, a rectangular or dumbbell-shaped dispensing pattern as shown in FIG. 66D or FIG. 66F can be utilized. Therefore, the corresponding explanation of the dispensing pattern of the VA mode liquid crystal display is skipped.

FIG. 66E generally illustrates a dispensing pattern 8317 of an IPS (in-plane switching) mode liquid crystal display. The alignment direction of an alignment layer in an IPS mode liquid crystal display is formed in one direction. As shown in the figure, the alignment direction is formed at an angle θ measured counter-clockwise from the gate line direction. The dispensing pattern 8317 in an IPS mode liquid crystal display depends on the shape of a liquid crystal panel, pattern shape, and the alignment direction.

The dispensing pattern 8317 of the IPS mode liquid crystal can be divided into parts. A first dispensing pattern 8317a in the middle of the dispensing pattern 8317 extends in along the data line direction. Because of the various patterns formed on the substrate the spreading rate of liquid crystal drops in the gate line direction is faster than that the spreading rate in the data line direction. Accordingly, the distance L1 between the dispensing pattern 8317a and a side of a liquid crystal panel is greater than the distance L2 between the dispensing pattern 8317a and the side of the liquid crystal panel (L1>L2).

The spread speed of liquid crystal drops in the data line direction in the TN or VA mode liquid crystal display shown in FIG. 66D or FIG. 66F is faster than that in the gate line direction. Yet, the spread speed of liquid crystal drops in the gate line direction in the IPS mode liquid crystal display is faster. The corresponding reason is explained as follows.

In case of a TN or VA mode liquid crystal display, a color filter layer is arranged along a data line direction and a step difference is formed along a gate line direction. Yet, in an IPS mode liquid crystal display, a color filter layer is arranged along a gate line direction and a step difference is formed along a data line direction. Hence, the dropped liquid crystal drops spread faster along the gate line direction in the IPS mode liquid crystal display. The arrangement of the color filter layer according to the mode is for using effectively a glass plate (i.e. substrate) on which a plurality of liquid crystal panels are formed. In other words, the color filter layer is formed along the gate or data line direction in accordance with the mode of the liquid crystal display in a method of fabricating a liquid crystal display using liquid crystal dropping. It is a matter of course that the arrangement direction of the color filter layer is not limited to a specific direction. More important thing is not whether a direction of a dispensing pattern established in the IPS mode liquid crystal display is an x or y direction but that the dispensing pattern extends in a direction having a slow flow speed of liquid crystal drops (or a direction of step difference of the color filter layer).

Therefore, the first dispensing pattern 8317a extends in the data line direction in the IPS mode liquid crystal display, which is just one of examples for an extending direction of the dispensing pattern, Instead, the first dispensing pattern 8317 can extend in any direction having a slow flow speed of liquid crystal drops.

Besides, the second dispensing patterns 8317b and 8317c extend from both ends of the first dispensing pattern 8317 in directions opposite to each other, respectively. The extending directions of the second dispensing patterns 8317b and 8317c are vertical to the alignment direction. Each of the spread speeds of liquid crystal drops in these directions is slower than the spread speed in the alignment direction, which is compensated by the second dispensing patterns 8317b and 8317c.

The factors having influence on the spread speed of liquid crystal drops in the IPS mode liquid crystal display are the shape of the pattern and the alignment direction. Hence, the two factors should be considered so as to establish the dispensing pitches.

Namely, a pitch t1 in the data line direction, a pitch t2 in the gate line direction, a pitch t3 in the alignment direction, and a pitch t4 in the direction vertical to the alignment direction should be established. Generally, the pitch of the dispensing pattern 8217 of liquid crystal drops of the IPS mode liquid crystal display is about 8–13 mm.

Considering the difference between the spread speeds of liquid crystal drops due to pattern, the pitch t1 in the gate line direction is formed grater than that t2 in the data line direction. Considering the spread speed in the alignment direction, the pitch t3 in the alignment direction should be established to be greater than that t4 in the direction vertical to the alignment direction.

The above-established dispensing pattern of liquid crystal drops has a shape like a lightning facing the data line direction. In other words, the dispensing pattern includes a middle portion on a liquid crystal panel and tail portions in directions opposite to the alignment direction of the alignment layer. In this case, the term "lightning," is used for convenience of explanation, and does not limit the scope of the shape of the dispensing pattern of the present invention.

The substrates are bonded to each other after the liquid crystal drops have been dropped along the above-established dispensing pattern from a liquid crystal dispenser. Therefore, the dropped liquid crystal drops are distributed uniformly on the entire substrate.

The above dispensing pattern is calculated before the liquid crystal drops are dropped. A nozzle is moved along the calculated dispensing pattern so as to drop the liquid crystal drops. The dispensing pattern of liquid crystal drops may be calculated by the shape of the substrate or the shape of a pattern formed on the substrate. The dispenser, although not shown in the drawing, may be connected to a control system so as to carry out the dropping of the dispensing pattern and liquid crystal drops by the control of the control system.

Various kinds of information about a substrate such as substrate area, number of panels formed on the substrate, dropping amount of liquid crystal drops, shape of substrate or panel, rubbing direction carried out on an alignment layer formed on the substrate, shape of pattern formed on the substrate, and the like are inputted to the control system. The control system calculates a total dropping amount of liquid crystal drops to be dropped on the panel or substrate, a dropping number, a single dropping amount, a dispensing pattern based on the inputted information so as to control a driving means (not shown in the drawing) for driving the liquid crystal dispenser and substrate in order to drop the liquid crystal drops on a predetermined position.

In one aspect of the present invention, the dispensing patterns illustrated in FIGS. 66D–66F may be compensated if the dropping amount in the calculated dispensing pattern is different than a dropping amount in the actual dispensing pattern. By compensating the dispensing pattern, the actual shape of the actual dispensing pattern does not change from the calculated dispensing pattern. Accordingly, compensation dispensing patterns, similar to those discussed with reference to FIGS. 66A to 66C, may be provided in the dispensing patterns illustrated in FIGS. 66D to 66F.

Additionally, while referring to FIGS. 66G to 66S, the position of liquid crystal drops is an important factor that causes fatal failure or degradation of liquid crystal panels. As previously discussed, liquid crystal panels may be fabricated by dropping liquid crystal material on upper or lower substrates and bonding the upper and lower substrates together so as to evenly distribute the liquid crystal material over the substrates. Bonding of the upper and lower substrates may be completed by hardening a sealant after the distribution of the liquid crystal layer. However, as the liquid crystal drops spread between the substrates prior to hardening of the sealant, the liquid crystal contacts the sealant. Deleteriously, the unhardened sealant may break upon contact with the liquid crystal, and thereby degrades the integrity of the liquid crystal panel. If the sealant fails to break, particles in the sealant flow into and contaminate the liquid crystal material, and thereby degrades the integrity of the liquid crystal panel.

Degradation of the liquid crystal panel integrity may also originate from a difference between a calculated dropping position and an actual dropping position or a miscalculated dropping position.

Calculation of liquid crystal dropping positions involves determining the number of liquid crystals dropped on a panel, amount of liquid crystal material in a single liquid crystal drop, a pitch between the liquid crystal drops, and a spreading characteristic of liquid crystal drops. The spreading characteristic of liquid crystal drops may be analyzed to determine whether the liquid crystals will contact the sealant when the substrates are bonded to each other. Accordingly, the liquid crystal dropping positions should be calculated considering the spreading characteristic of liquid crystals in order to prevent the liquid crystals from reaching the sealant before the hardening of the sealant.

If an area on a substrate containing liquid crystal drops is too small, liquid crystal drops may be prevented from contacting the unhardened sealant however an excess amount of time is required to allow the liquid crystal drops to evenly distribute over the entire surface of the substrate.

If an area on the substrate containing liquid crystal drops is too large, liquid crystal drops undesirably contact the unhardened sealant. Accordingly, consideration of liquid crystal panel integrity and fabrication time requirements must be made in calculating the positions of liquid crystal drops.

According to the principles of the present invention, the liquid crystal drops are positioned such that they may be distributed (e.g., spread) over about 70% of the entire area of the substrate prior to hardening the sealant and distributed (e.g., spread) over about 30% of the entire area of the substrate upon thermo-hardening of the sealant. The spreading speed of liquid crystal drops may be increased during thermo-hardening of the sealant.

The spreading characteristics of liquid crystal drops relate to the viscosity of liquid crystal material. Accordingly, factors determining the spreading characteristics of liquid crystal drops in liquid crystal displays of various sizes and modes includes substrate geometry (e.g., panel shape, size, etc.), a device pattern formed on the panel, and an alignment direction (e.g., rubbing direction) of an alignment layer on the panel. According to the principles of the present invention, the aforementioned factors may be considered such a pattern of liquid crystal drops may be used to efficiently distribute liquid crystal across the substrate.

FIGS. 66G–66I illustrates the relationship between liquid crystal panel geometry and spreading characteristics of liquid crystal material. As shown in FIG. 66G, when a circular liquid crystal drop 8107 is dropped on, for example a lower substrate 8251c of a square liquid crystal panel, a difference between a first distance "a" from the liquid crystal drop 8107 to a side and a second distance "b" from the liquid crystal drop 8107 to a corner is generated. As shown in FIG. 66H, assuming the spreading speed of liquid crystal drop is isotropic on the lower substrate 8251c, the liquid crystal 8107 reaches the side leaving a distance "b'" between the liquid crystal drop 8107 and the corner. Consequently, no liquid crystal is distributed to the area between the liquid crystal drop 8107 and the corner of the lower substrate 8251c.

Referring to FIG. 66I, a dispensing pattern 8117 including bubble type liquid crystal drops 8107 is shown. The liquid crystal drops 8107 may be dispensed on, for example, a lower substrate 8251c of a square liquid crystal panel such that corner portions of the dispensing pattern include a rectangular extension and pitches t1 and t2 that are equal to each other in x and y directions. Assuming an isotropic liquid crystal spreading speed, the liquid crystal drops in the dispensing pattern 8117 may be evenly distributed across the lower substrate 8251c upon bonding the substrates and prior to hardening the sealant. Accordingly, the liquid crystal drops, spread during a bonding process, are brought to equal distances from the corners and sides of the substrate 8251c.

It is, however, noted that the dispensing pattern 8117 need not necessarily be limited to any specific shape but may be modified in accordance with the shape of the substrate. For example, if the substrate is rectangular, the dispensing pattern of liquid crystals dropped on the substrate may also have a rectangular shape having that extends to corner areas such that distances between distributed liquid crystal drops and sides of a substrate and distances between distributed liquid crystal drops and corners of substrate are the same.

As mentioned above, an alignment direction of an alignment layer influences the shape of a particular dispensing pattern. Alignment layers provide an alignment regulating force or surface fixing force to align adjacent liquid crystal molecules in a specific direction. Alignment may be achieved by rubbing the alignment layer with a smooth cloth in a specific direction (e.g., rubbing direction) to produce micro grooves arranged in the rubbing direction.

FIGS. 66J–66M illustrates the relationship between alignment direction of an alignment layer and spreading characteristics of liquid crystal material. As shown in 66J, when an alignment direction of an alignment layer is provided in the arrow direction, grooves are formed on the alignment layer along the alignment direction. Referring to FIG. 66K, when, for example, a circular liquid crystal drop 8127 are provided on a lower substrate 8251c of a square liquid crystal panel, a spreading speed of the dropped liquid crystals increases in the rubbing direction because the liquid crystals spread through the grooves on the alignment layer. Accordingly, the liquid crystal drop 8127 may be distributed as an oval shape with a long axis parallel to the alignment direction.

Referring to FIG. 66M, a dispensing pattern 8117 including bubble type liquid crystal drops 8107 is shown. The liquid crystal drops 8127 may be dispensed on, for example, a lower substrate 8251c of a square liquid crystal panel. Liquid crystal drops 8127 may be provided in a oval shaped dispensing pattern 8117. The short axis of the oval shaped dispensing pattern 8117 is parallel with the alignment direction of the alignment layer. The long axis of the oval shaped dispensing pattern 8117 is transverse to the alignment direction of the alignment layer. In one aspect of the present invention, the oval shaped dispensing pattern 8117 has a long-axis-directional pitch t1 smaller than a short-axis-directional pitch t2. Therefore, the liquid crystal drops may be distributed uniformly across the entire substrate 8115 upon bonding the substrates together.

As mentioned above, patterns formed on a substrate influence the distribution shape of a particular dispensing pattern. Patterns generate step differences on the substrate. Step differences interrupt the flow of liquid crystal material within the liquid crystal drops in their distribution to anisotropically affect the spreading speed of liquid crystal drops.

Referring to FIG. 66N, lower substrate 8251c of a liquid crystal panel containing TFTs includes a plurality of red (R), green (G), blue (B) pixels, 8106a to 8106c arranged in a matrix. Although not shown in the drawing, the pixels 106a to 106c may be defined by a plurality of gate and data lines arranged horizontally and vertically. A driving device and a pixel electrode (not shown) may be formed in each of the pixels 8106a to 8106c. Referring to FIG. 66O, R, G, B color filters 8104a to 8104c may be formed on an upper substrate 8103. The R, G, and B color filters 8104a, 8104b, and 8104c correspond to the pixels 8106a to 8106c formed on the lower substrate 8155, respectively. Moreover, a black matrix 8108 may be formed between the color filters 8104a to 8104c of the upper substrate 8252c. The black matrix 8108 prevents light from leaking to a non-display area of a liquid crystal display and is arranged adjacent areas between the pixels 8106a to 8106c so as to prevent light from leaking through the areas.

FIG. 66P illustrates a cross-sectional view along a cutting line A–A' in FIG. 66O. Referring to FIG. 66P, a plurality of black matrixes 8108 may be formed on the upper substrate 8252c having a width greater than an interval between the pixels. Color filters 8104a to 8104c may be formed in the pixel area between the black matrixes 8108. In this case, color filters 8104a to 8104c may partially overlap the black matrixes 8108 but not each other. Hence, a predetermined-high step difference may be generated on the black matrixes 8108. Color filters 8104a to 8104c may be arranged along a data line so that step differences is generated by color filters 8104a to 8104c.

Step differences interrupt the spread of liquid crystals. Moreover, step differences provide grooves that are aligned a direction of the data line, thereby spreading of liquid crystal drops may be made smoother. When liquid crystal drops are distributed on a substrate upon pressurizing upper and lower substrates, the step difference induces anisotropic spreading speeds in directions of gate and data lines. As shown in FIG. 66Q, when a circular-shaped liquid crystal 8137 is dropped on a central area of a substrate 8251c, the spreading speeds in directions of the data and gate line are different from each other. For example, the spreading speed in the direction of the data line is faster than the spreading speed in the direction of the gate line because no step difference exists along the data line direction. Accordingly, the circular liquid crystal drop 8137 shown in FIG. 66Q may be transformed into an oval shaped liquid crystal drop 8137 having long and short axes in the data and gate line directions, respectively, as shown in FIG. 66R after the substrate have been bonded.

Figure 66S:
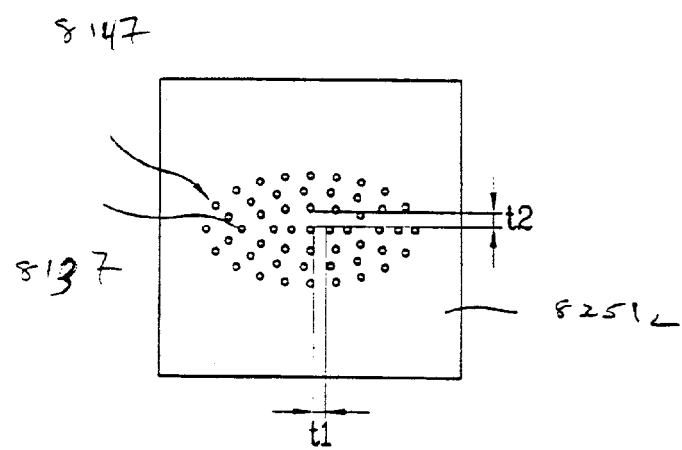

Referring to FIG. 66S, a dispensing pattern 8147 including bubble type liquid crystal drops 8251c is shown. The liquid crystal drops 8137 may be dispensed on, for example, a lower substrate 8251c of a square liquid crystal panel. Liquid crystal drops 8137 may be provided in an oval shaped dispensing pattern 8147. The short axis of the oval shaped dispensing pattern 8147 parallel to a data line direction. The long axis of the oval shaped dispensing pattern 8147 is parallel to the gate line direction. In one aspect of the present invention, the pitches of the oval shaped dispensing pattern 8147 has a gate-line-directional pitch t2 is greater than a data-line-directional pitch t1. Therefore, the liquid crystal drops may be distributed uniformly across the entire substrate 8251c upon bonding the substrates together.

Patterns influencing the distribution shape of dispensing patterns may include the lower substrate 8251c containing TFT substrate as well as the upper substrate 8103. For example, any number of gate and data lines may be formed on the lower substrate 8251c of a TN (twisted nematic) mode liquid crystal display. In one example, a liquid crystal display having 600×800 pixels may includes include 600 gate lines and 800 data lines. Accordingly, the number of the step differences in a gate line direction outnumbers the number of step differences in a data line direction. Therefore, the step differences interrupt the spread of liquid crystals in the gate line direction so as to slow down the spreading speed of liquid crystals in the gate line direction. However, various insulating layers (e.g., organic or inorganic, etc.) and other device components may be formed on the lower substrate 8251c to reduce the effects the step differences present. Accordingly, the step differences' effect lower substrate 8251c has less influence on the distribution shape of liquid crystals than that of the color filter layers on the upper substrate 8103.

The abovementioned factors influence individual liquid crystal drops. Accordingly, substrate shape, alignment direction, and patterns formed on the substrate should be considered so as to calculate the dispensing pattern of liquid crystal drops. Factors related to the alignment direction that influence the distribution shape may include rubbing direction or a photo-irradiation and/or polarization direction of irradiated light may.

The following explanation is for embodiments according to the present invention, to which the above factors are substantially applied so as to represent dispensing patterns of liquid crystal displays of various modes.

Figure 66T:
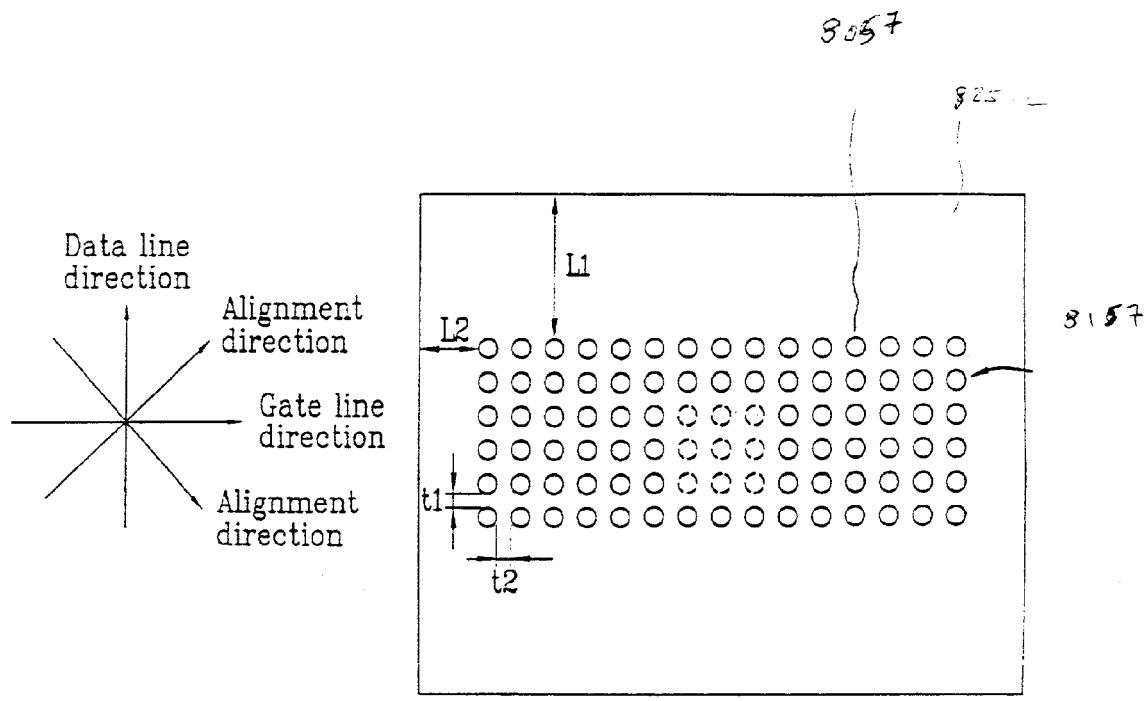

FIG. 66T generally illustrates a dispensing pattern 8157 of a TN mode liquid crystal display (LCD). In the case of a TN mode LCD, alignment directions of alignment layers formed on the first and second substrates are perpendicular to each other. As a result of this orientation the effect that the alignment direction have when bonding the substrates is minimized. Rather, the factors that significantly affect the spreading rate of the liquid crystal include the shape of the panel and the location of devices formed on the panel.

Device patterns on the substrate form step differences. For example, a color filter layer arranged along the data line creates step differences in the gate line direction. Accordingly, the color filter affects the spreading rate of the liquid crystal such that the spreading rate of liquid crystal is greater in the data line direction than in the gate line direction.

As liquid crystal panels are generally rectangular, the distance from the center to any corner of the panel is greater than the distance to any one side of the panel. Accordingly, rectangular dispensing pattern 8157 may be arranged on the panels. The rectangular dispensing pattern still may not be adequate, however, because the spreading rate of the liquid crystal in the data line direction is greater than in the data line direction.

Figure 66U:
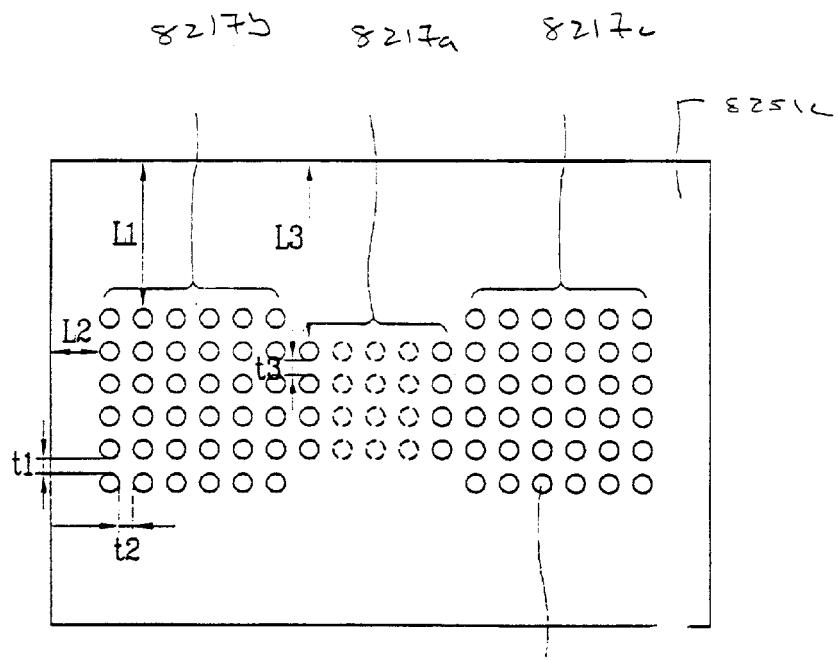

Therefore, as illustrated in FIG. 66U, the dimensions of the dispensing pattern 8217 in the data line direction may be made smaller than the dimensions of the dispensing pattern 8217 in the gate line direction in order to compensate for the aforementioned anisotropic spreading rate.

In one aspect of the present invention, the dispensing pattern 8217 may be formed such that an interval L1 between the dispensing pattern 8217b in the data line direction and a side of the liquid crystal panel 8251c is greater than the other interval L2 between the dispensing pattern in the gate line direction and the side of the liquid crystal panel 8251c. That is, the distance L1 should be greater than the distance L2 (L1>L2).

The dispensing pitch is an interval between adjacent liquid crystal drops 8207 of the dispensing pattern 8217 and influences the spreading rate of the liquid crystal. Generally the liquid crystal drops 8207, arranged within the dispensing pattern 8217, spread isotropically and merge into adjacent liquid crystal drops. As a result, the liquid crystal drops 8207 merge together so as to cover the substrate prior to the bonding of the substrates. However, dropping traces occur if the liquid crystal drops arranged on the substrate do not come into contact with adjacent liquid crystal drops prior to the bonding of the substrates. Dropping traces are a significant reason for the degradation of the liquid crystal panels.

An important factor in preventing the degradation of the liquid crystal panel as well as uniformly distributing the liquid crystal drops is the dispensing pitch. The dispensing pitch of liquid crystal drops depends on the viscosity of the liquid crystal drops and more specifically, on the single dropping amount of liquid crystal drops arranged on the substrate.

For example, in the TN mode liquid crystal display of the present invention, the dispensing pitch is preferably set up as about 9–17 mm. As explained in detail above, the spreading rate of the liquid crystal drops is greater in the data line direction than in the gate line direction. Accordingly, the dispensing pitch t1 in the data line direction should be set up to be greater than t2 in the gate line direction (t1>t2).

In addition, the spreading of the liquid crystal drops 8207 arranged on the substrate may be influenced by the application of pressure to the substrates. The liquid crystal drops arranged on the substrate are spread across the substrate by pressure generated from bonding the upper and lower substrates together. Ideally when bonding the substrates pressure may be uniformly applied to the substrates. However, typically the pressure applied to the central area of the substrate is greater than the pressure applied to the circumferential area of the substrate. Therefore, the liquid crystal drops are arranged in a rectangular dispensing pattern, as shown in FIG. 66U. The liquid crystal reaches the sealant before the liquid crystal drops is hardened because the central portion of the rectangular shape spreads faster in the data line direction (by mutual effect of the speed increasing pattern and pressure).

Although the effect of the pressure differentials may be negligible, such problems should be overcome to remove the degradation of the liquid crystal display. In order to overcome these pressure problems the dispensing pattern of liquid crystal drops as shown in FIG. 66U is utilized.

Referring to the figure, the dispensing pattern 8217 is formed so that a middle portion of the rectangular dispensing pattern is removed in part as shown in the data line direction. In other words, the width of the middle area (width along the data line direction) is smaller that the rest. Forming the dispensing pattern 8217 this way effectively prevents the degradation of liquid crystal display.

As shown in the figure, the dispensing pattern 8217 has a "dumbbell shape." The term "dumbbell shape" is used for convenience of explanation, and is not intended to limit the shape of the dispensing pattern in the present invention. The term "dumbbell-shaped dispensing pattern" means a shape formed by removing a partial middle portion of the dispensing pattern in the data line direction of an initial rectangular dispensing pattern, that is having a narrow width in the data line direction.

In the middle area of the dumbbell-shaped dispensing pattern 8217 is a first dispensing pattern 8217a, which has a width narrower in the data line direction than the widths of the second or third dispensing patterns 8217b or 8217c, respectively. The distance L3 between the first dispensing pattern 8217a and a side of a liquid crystal panel 8205 is greater than distance L1 of the second or third dispensing pattern 8217b or 8217c (L3>L1).

The dispensing pitches t1, t2, and t3 of the dumbbell-shaped dispensing pattern 8217 are formed such that dispensing pitch t1 of the second or third dispensing pattern 8217b or 8217c in the data line direction is longer than dispensing pitch t2 in the gate line direction and dispensing pitch t3 of the first dispensing pattern 8217a in the data line direction is longer than that dispensing pitch p1 of the second or third dispensing pattern 8217b or 8217c.

The rectangular dispensing pattern having a narrow width in the data line direction (dumbbell-shaped dispensing pattern) is utilized for a TN mode liquid crystal display. Thus, enabling prompt and uniform distribution of liquid crystal drops across the substrate.

As explained in detail above for TN mode liquid crystal displays the alignment directions have minimal influence on the overall spreading of the liquid crystal. Accordingly, the dispensing patterns are formed ignoring the affect of the alignment directions. Similarly, the same techniques can be utilized in the VA mode liquid crystal displays. In general VA mode liquid crystal display have no specific alignment direction. The dispensing pattern of the VA mode liquid crystal display can be formed similar to the dispensing pattern used in the TN mode liquid crystal display. That is, a rectangular or dumbbell-shaped dispensing pattern as shown in FIG. 66T or FIG. 66U can be utilized. Therefore, the corresponding explanation of the dispensing pattern of the VA mode liquid crystal display is skipped.

Figure 66V:
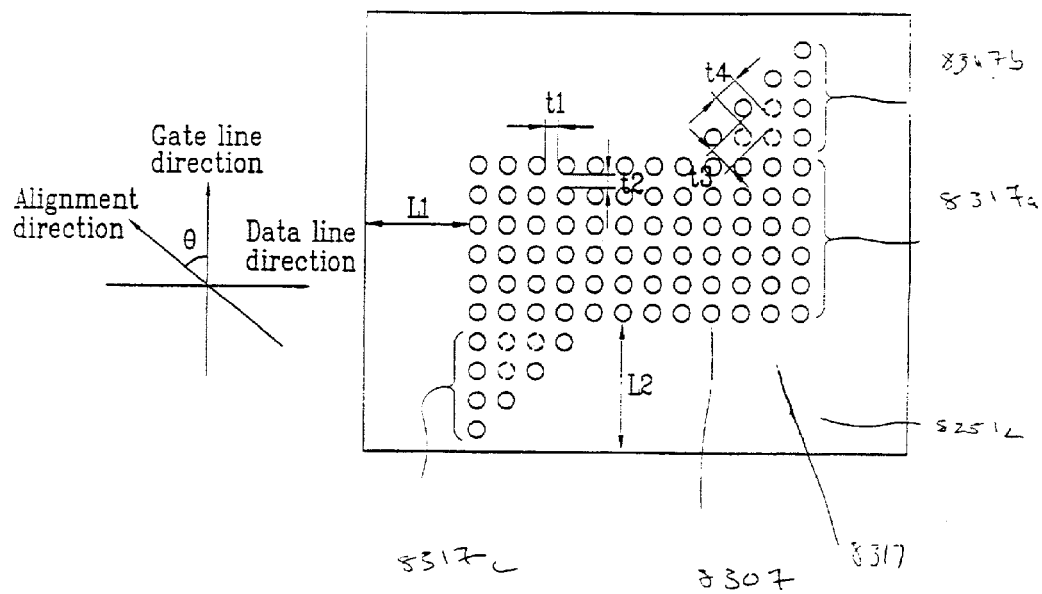

FIG. 66V generally illustrates a dispensing pattern 8317 of an IPS (in-plane switching) mode liquid crystal display. The alignment direction of an alignment layer in an IPS mode liquid crystal display is formed in one direction. As shown in the figure, the alignment direction is formed at an angle θ measured counter-clockwise from the gate line direction. The dispensing pattern 8317 in an IPS mode liquid crystal display depends on the shape of a liquid crystal panel, pattern shape, and the alignment direction.

The dispensing pattern 8317 of the IPS mode liquid crystal can be divided into parts. A first dispensing pattern 8317a in the middle of the dispensing pattern 8317 extends in along the data line direction. Because of the various patterns formed on the substrate the spreading rate of liquid crystal drops in the gate line direction is faster than that the spreading rate in the data line direction. Accordingly, the distance L1 between the dispensing pattern 8317a and a side of a liquid crystal panel is greater than the distance L2 between the dispensing pattern 8317a and the side of the liquid crystal panel (L1>L2).

The spread speed of liquid crystal drops in the data line direction in the TN or VA mode liquid crystal display shown in FIG. 66T or FIG. 66U is faster than that in the gate line direction. Yet, the spread speed of liquid crystal drops in the gate line direction in the IPS mode liquid crystal display is faster. The corresponding reason is explained as follows.

In case of a TN or VA mode liquid crystal display, a color filter layer is arranged along a data line direction and a step difference is formed along a gate line direction. Yet, in an IPS mode liquid crystal display, a color filter layer is arranged along a gate line direction and a step difference is formed along a data line direction. Hence, the dropped liquid crystal drops spread faster along the gate line direction in the IPS mode liquid crystal display. The arrangement of the color filter layer according to the mode is for using effectively a glass plate (i.e. substrate) on which a plurality of liquid crystal panels are formed. In other words, the color filter layer is formed along the gate or data line direction in accordance with the mode of the liquid crystal display in a method of fabricating a liquid crystal display using liquid crystal dropping. It is a matter of course that the arrangement direction of the color filter layer is not limited to a specific direction. More important thing is not whether a direction of a dispensing pattern established in the IPS mode liquid crystal display is an x or y direction but that the dispensing pattern extends in a direction having a slow flow speed of liquid crystal drops (or a direction of step difference of the color filter layer).

Therefore, the first dispensing pattern 8317a extends in the data line direction in the IPS mode liquid crystal display, which is just one of examples for an extending direction of the dispensing pattern, Instead, the first dispensing pattern 8317 can extend in any direction having a slow flow speed of liquid crystal drops.

Besides, the second dispensing patterns 8317b and 8317c extend from both ends of the first dispensing pattern 8317 in directions opposite to each other, respectively. The extending directions of the second dispensing patterns 8317b and 8317c are vertical to the alignment direction. Each of the spread speeds of liquid crystal drops in these directions is slower than the spread speed in the alignment direction, which is compensated by the second dispensing patterns 8317b and 8317c.

The factors having influence on the spread speed of liquid crystal drops in the IPS mode liquid crystal display are the shape of the pattern and the alignment direction. Hence, the two factors should be considered so as to establish the dispensing pitches.

Namely, a pitch t1 in the data line direction, a pitch t2 in the gate line direction, a pitch t3 in the alignment direction, and a pitch t4 in the direction vertical to the alignment direction should be established. Generally, the pitch of the dispensing pattern 8317 of liquid crystal drops of the IPS mode liquid crystal display is about 8–13 mm.

Considering the difference between the spread speeds of liquid crystal drops due to pattern, the pitch t1 in the gate line direction is formed grater than that t2 in the data line direction. Considering the spread speed in the alignment direction, the pitch t3 in the alignment direction should be established to be greater than that t4 in the direction vertical to the alignment direction.

The above-established dispensing pattern of liquid crystal drops has a shape like a lightning facing the data line direction. In other words, the dispensing pattern includes a middle portion on a liquid crystal panel and tail portions in directions opposite to the alignment direction of the alignment layer. In this case, the term "lightning," is used for convenience of explanation, and does not limit the scope of the shape of the dispensing pattern of the present invention.

The substrates are bonded to each other after the liquid crystal drops have been dropped along the above-established dispensing pattern from a liquid crystal dispenser. Therefore, the dropped liquid crystal drops are distributed uniformly on the entire substrate.

The above dispensing pattern is calculated before the liquid crystal drops are dropped. A nozzle is moved along the calculated dispensing pattern so as to drop the liquid crystal drops. The dispensing pattern of liquid crystal drops may be calculated by the shape of the substrate or the shape of a pattern formed on the substrate. The dispenser, although not shown in the drawing, may be connected to a control system so as to carry out the dropping of the dispensing pattern and liquid crystal drops by the control of the control system.

Various kinds of information about a substrate such as substrate area, number of panels formed on the substrate, dropping amount of liquid crystal drops, shape of substrate or panel, rubbing direction carried out on an alignment layer formed on the substrate, shape of pattern formed on the substrate, and the like are inputted to the control system. The control system calculates a total dropping amount of liquid crystal drops to be dropped on the panel or substrate, a dropping number, a single dropping amount, a dispensing pattern based on the inputted information so as to control a driving means (not shown in the drawing) for driving the liquid crystal dispenser and substrate in order to drop the liquid crystal drops on a predetermined position.

Hereinafter, a bonding process is explained.

FIG. 39 illustrates a schematic diagram of a vacuum bonding machine for LCD according to the present invention, FIG. 40 illustrates a bird's-eye view of an auxiliary process means according to the present invention, and FIG. 41 illustrates a layout of a loaded state of an auxiliary process means according to the present invention.

A vacuum bonding device according to the present invention includes a vacuum chamber 210, upper and lower stages 221 and 222, a stage moving stage, a vacuum device 200, and an auxiliary process means 600.

The vacuum chamber 210 is constructed so that a process of bonding the respective substrates is carried out inside the vacuum chamber 210 maintaining a vacuum or atmospheric state inside.

In this case, a first discharge pipe 212, through which an air in the inner space of the vacuum chamber 210 is discharged by receiving an air-sucking force transferred from a vacuum device (high vacuum) 200, is connected to one side of a circumference of the vacuum chamber 210. A second discharge pipe 241, through which an air in the inner space of the vacuum chamber 210 is discharged by receiving an air-sucking force transferred from a vacuum device (low vacuum) 242, is connected to a lower side of the circumference of the vacuum chamber 210. And, a vent pipe 213, through which air or other gas is introduced from an outside to make an inside of the vacuum chamber 210 be at an atmospheric state, is connected to an upper side of the vacuum chamber 210 so as to form/release a vacuum state of the inner space of the vacuum chamber 210.

Moreover, switch valves 212*a*, 241*a*, and 213*a*, which are controlled electronically for opening/closing the corresponding pipes selectively, are installed at the first discharge valve pipe 212, second discharge pipe 241, and vent pipe 213, respectively.

And, the upper and lower stages 221 and 222 constructing the vacuum bonding machine according to the present invention are installed at upper and lower spaces inside the vacuum chamber 210, respectively, so as to confront each other. And, the upper and lower stages 221 and 222 make the respective substrates 10 and 20, which are loaded inside the vacuum chamber 210, adhere thereto by electrostatic force so that the substrates 10 and 20 are maintained to be fixed to the corresponding work positions in the vacuum chamber 210. Besides, the upper and lower stages 221 and 222 are constructed so as to enable selective movements to carry out a bonding between the fixed substrates 10 and 20 respectively.

In this case, a conveying device 300 controls a first arm 310 having a plurality of finger portions 311 so as to load/unload a substrate in/from the vacuum chamber 210.

Moreover, for the fixation of the substrate, the upper stage 221 is provided with a plurality of electrostatic forces generated from at least one electrostatic chuck (ESC) 221*a* loaded thereon. And, a plurality of vacuum holes 221*b* are formed along a circumference of the electrostatic chuck 221*a*. And, the respective vacuum holes 221*b* receive a vacuum force generated from driving a vacuum pump 233.

And, a second substrate support means 400 is installed at each corner of the inside of the vacuum chamber so as to support the second substrate 20 temporarily in a process of making the inside of the vacuum chamber 210 have a vacuum state.

Yet, the second substrate support means 400 is not limited to the above-mentioned shape but can have various shapes enabling to support the second substrate 20 temporarily. And, the second substrate support means 400 can be installed at a portion adjacent to both confronting corners of the upper stage 221 or four confronting corners of each of the stages 221 and 222.

Moreover, at least one electrostatic chuck 222*a* as well as vacuum holes 222*b*(cf. FIG. 42) is loaded on an upper face of the lower stage 222 so as to have the same figure of the bottom face of the upper stage 221. In addition, a first substrate support means 420 for carrying out a loading of a substrate (first substrate) 10 to be loaded in the lower stage 222 is installed so as to be lifted upward and downward.

In this case, the first substrate support means 420 is installed so as to be contacted with a bottom face of the first substrate 10 as well as penetrate the lower stage to operate. A first driving part 421 enabling to lift the first substrate support means 420 is one of an oil pressure cylinder, motor, and the like.

Yet, the first substrate support means 420 is not limited to a specific figure but can have one of various constitutions for loading a substrate.

The stage moving device constructing the bonding machine according to the present invention includes a moving axis 231 coupled with the upper stage 221 so as to drive to move the upper stage 121 upward or downward selectively, a rotational axis 232 coupled with the lower stage 222 so as to rotate the lower stage 222, and a driving motor 224 driving or moving axes coupled with the stages 221 and 222, respectively.

In this case, the stage moving device is not limited to the constitution enabling to move the upper stage 221 upward and downward or rotate the lower stage right and left.

Namely, the stage moving device can be constituted so as to move the lower stage 222 upward and downward as well as rotate the upper stage 221 right and left.

Preferably, an additional axis (not shown in the drawing) is installed at the upper stage 221 additionally so as to enable the corresponding rotation, while an additional moving axis (not shown in the drawing) is installed at the lower stage 222 additionally so as to enable a corresponding upward/downward movement.

The vacuum device 200 constructing the bonding machine according to the present invention plays a role of transferring a sucking force enabling a vacuum state inside the vacuum chamber 210 selectively, and includes a suction pump driven to generate a general air-sucking force.

In this case, a space having the vacuum device 200 inside is formed to be inter-connected to the first discharge pipe 212 of the vacuum chamber 210.

And, the auxiliary process means 600 constructing the boding machine according to the present invention, as shown in FIG. 40, plays role of fixing a bonded substrate in the process of releasing the vacuum state inside the vacuum chamber 210 or pushing the second substrate 20, which is fixed to the upper stage 221 when the vacuum state inside the vacuum chamber 210 is achieved, up to the upper stage 221.

The auxiliary process means 600 includes a rotational axis 610, a support portion 620, and a driving part 630.

In this case, the rotational axis 610 is placed at a position enabling to be lifted and rotate in the vacuum chamber 210, and carry out a selective rotation by the driven driving part 630 so as to dispose the support portion 620 at an upper circumference of the lower stage 222.

And, the support portion 620 is built at one end of the rotational axis 610 in one body, and comes into contact with predetermined portions of the second substrate 20 and conveying device 300 so as to support the second substrate 20, fix the bonded substrate, or support an end of the conveying device 300.

In this case, faces of the support portion 620 coming into contact with the respective substrates 10 and 20 include first and second contact portions 621 and 622, respectively, which are made of a scratch-proof material against a reciprocal contact therebetween such as Teflon or peak.

Yet, instead of installing the respective contact portions 621 and 622 additionally, the respective faces of the support portion 620 can be coated with a coating material such as Teflon and peak.

Besides, the shape of the support portion 620 can have a cubic shape of which length and width are equal to each other, a column shape, or a polyhedral shape. Preferably, the support portion 620 is formed to have a rectangular parallelepiped shape so as to secure a wide area for fixing the respective substrates 10 and 20 thereto.

And, the driving part 630 includes a rotational motor 631 installed outside (or, outside) the vacuum chamber 210 and coupled axially with the rotational axis 610 so as to rotate the rotational axis 610 and an elevating cylinder 632 driving to elevate the rotational axis 610 using an oil pressure.

Instead, the constitutions for rotating the rotational axis 610 and elevating the rotational axis 610 are not limited to the rotational motor 631 and elevating cylinder 632 but can employ various devices or equipments as well.

In this case, an elevating range of the rotational axis 610 elevated by the elevating cylinder 632 can be an operational rang of each role carried out by the auxiliary process means according to the present invention.

Namely, the elevating range of the rotational axis 610 is set up so as to include an operational range for carrying out a role of fixing the bonded substrate in the process of releasing the vacuum state inside the vacuum chamber 210, an operational range for carrying out a role of pushing the second substrate 20 to the upper stage 221 when the vacuum state is achieved inside the vacuum chamber 210, and an operational range for carrying out a role of supporting the ends of the respective fingers 311 of the conveying device 300 in which the corresponding substrate is loaded when the respective substrates 10 and 20 are loaded in the conveying device 300.

If the driving part 630, as proposed in the drawing of the present invention, is installed so as to be located at a lower outer side of the vacuum chamber 210, the rotational axis 610 penetrates the vacuum chamber 210 to be coupled with as well as a sealing is required for the coupling portion between the vacuum chamber 210 and rotational axis 610.

The present invention proposes the position of the above-constituted auxiliary process means 600, as shown in FIG. 41, so that the auxiliary process means 600 is placed at portions adjacent to each corner of long or short sides of the lower stage 222. Yet, the embodiment of the present invention is not limited to such a constitution but includes a constitution enabling the auxiliary process means 600 to operate at a position adjacent to each lateral central side of the lower stage 222 or each corner and lateral central side of the lower stage 222.

In this case, the first substrate support means 420 is explained in detail as follows.

FIG. 42 illustrates a schematic layout of a lower stage receiving a first substrate support means according to the present invention, FIG. 43A illustrates a magnified cross-sectional view of a part 'B' in FIG. 39, FIG. 43B illustrates a constitutional state diagram of a first support installed in a direction vertical to loading/unloading directions of a first substrate and viewed from the loading/unloading directions of the first substrate, and FIG. 44 illustrates a schematic bird's-eye view of the first substrate support means in FIG. 42 for explaining an operational state thereof.

At least one first receiving part 222d is formed at a portion of the top of the lower stage 222 corresponding to a dummy area (not a cell-forming area) of a substrate (hereinafter called "a first substrate") placed on the top of the lower stage. Yet, the location of the first receiving part 222d is not limited to the above-described portion, but can be any place enabling to prevent the droop (distortion) of the first substrate 10. Preferably, the first receiving part 222d can be formed at a portion corresponding to a bottom of the dummy area between cell areas on a top of the first substrate 10.

The first receiving part 222d can be a general key recess or a penetrating hole through the lower stage 222. Besides, the first receiving part 222d may be constructed like a recessed slot so as to have a penetration hole only at a specific portion of the recessed slot.

And, the first substrate support means 420 includes a first support portion 420*a* received inside the first receiving part 222*d* so as to support the first substrate 10 selectively, a first elevating axis 420*c* penetrating the first receiving part 222*d* from a lower side of the lower stage 222 and built in one body of one end of the first support portion 420*a* so as to move the first support portion 420*a* upward and downward selectively, and a first driving part 421 connected to the first elevating axis 420*c* so as to drive to move the first elevating axis 420*c* selectively.

In this case, the first receiving part 222*d* is formed to extend long along a portion corresponding to the dummy area of the first substrate 10 mounted on the top of the lower stage 222 in the same direction of the loading/unloading direction of the first substrate 10, and the first support portion 420*a* is formed long so as to correspond to the figure of the first receiving part 222*d*. This enables the first support portion 420*a* to support stably the portions including the circumference of LCD when such a construction is applied to the fabrication device of large-sized LCD. Therefore, the droop of the circumference is prevented.

Yet, the embodiment of the present invention is not limited to the construction that the first receiving part 222*d* and first support portion 420*a* are formed long so as to be face-contacted with the substrate. Instead, a plurality of protrusions are formed on the top of the first support portion 420*a* so as to minimize a contact area between the substrate and first support portion.

If such a construction cause damage on the substrate due to stress concentration at a local portion of a large-sized substrate, it is preferable that the face-contact construction is preferred so as to prevent the droop of the substrate.

Moreover, at least two of the first receiving parts 222*d* and first support portions 420*a* can be formed along a long or short side of the lower stage 222. Instead, at least one first receiving part 122*d* and one first support portion 420*a* can be formed along long and short sides of the lower stage 222, respectively.

Specifically, the first receiving part 222*d* and the first support portions 420*a* are not always formed in the same direction of the loading/unloading direction. Instead, the first receiving part 222*d* and first support portion 420*a* are formed additionally along the direction vertical to the loading/unloading direction of the first substrate 10 so as to be like one of layout figures such as "=", "≡", "∥", "+", "□", "#", and the like, as failing to be shown in the drawing. Therefore, the first receiving part 222*d* and first support portions 420*a* enable to prevent the droop of both sides of the first substrate 10 to the utmost.

Besides, a supporting position (or, a contact position) for the substrate 10 by the first support portion 420*a* can be any place enabling to prevent the droop of the first substrate 10, and preferably, a portion under the dummy area between the cell areas on the top of the first substrate 10.

In this case, an installment interval between the respective first support portions 420*a*, which are arranged to face the same direction of the loading/unloading direction of the first substrate 10 is determined so as not to interfere at least the moving paths of the respective fingers of a first arm 310.

For instance, when the first arm 310, as shown in FIG. 42, is formed to have three fingers 311 with a predetermined interval therebetween, each of the first support portions 420*a* lies in an interval s made between the respective fingers 311 so as not to interfere the motion of the first arm 310.

Besides, portions of other first support portions 420*b*, which are installed in a direction vertical to the loading/unloading direction of the first substrate 10 and on which the respective fingers 311 of the first arm 310 are loaded, are bent downward so as to prevent the interference with the respective fingers 311. As shown in the drawing of an embodiment of the present invention, a central portion is bent downward so as to prevent the interference with the central finger of the first arm 310 and each side portion is formed to have a length enough not to be contacted with each finger at both sides of the first arm 310 (or, each of the fingers located at both sides of the first arm is formed to have an interval free from interference with the first support portion 420*b*).

Meanwhile, if the first support portions 420*a* and 420*b* are formed long enough to be applied to a device for fabricating a large-sized LCD, both ends of the first support portions 420*a* and 420*b* may droop downwardly.

Accordingly, the present invention additionally proposes that at least two of the first elevating axes 420*c* coupled axially with the first support portions 420*a* and 420*b* and the first driving part 421 driving to elevate the first elevating axes 420*c* are installed at each of the support portions 420*a* and 420*b* so as to confront each other (cf. FIG. 44).

For instance, in aspect of a layout, each of the first elevating axes 420*c* connected to the first driving part 421 is installed at a crossing portion between the respective support portions 420*b* in a vertical direction and the respective support portions 420*a* in a horizontal direction or a corresponding portion between a center and both ends of each of the first support portions 420*a* and 420*b*.

More preferably, in the above construction, faces of the first support portions 420*a* and 420*b* including at least the faces contacted with the first substrate 10 are coated with a coating material (not shown in the drawing) so as to prevent previously various damages such as scratch and the like caused by the contact between the substrate and the first support portions 420*a* and 420*b* when the first support portions 420*a* and 420*b* are contacted with the first substrate 10.

Specifically, the present invention uses Teflon, peak, or an electrical conductor as the coating material, thereby enabling to prevent the scratch on the substrate, impact of shock, and generation of static electricity.

And, the first support portions 420*a* and 420*b* are preferably formed like bar, round pin, hollow polygonal pipe, or the like. Yet, the embodiment according to the present invention is not limited to such figures, but enables to introduce various shapes referring to the respective types.

The first driving part 421 constructing the first substrate support means 420 includes at least one of a step motor and a cylinder moving up and down the elevating axis using a general air or oil pressure. Preferably, the first driving part 421 is fixed to a lower space inside the vacuum chamber 210. And, preferably, the first driving part 421 penetrates a bottom of the vacuum chamber 210 so as to be fixed to a space outside the vacuum chamber 210. Thus, the embodiment of the present invention enables to prevent the interference with various driving equipments and provide easy installment.

For this, the present invention, as shown in FIG. 45, proposes a series of constitutions as follows. At least one second receiving part 222*e* is formed at a top circumference of both sides of the lower stage 222 in a direction perpendicular to the loading/unloading direction of the substrate so as to be like a concave recess or a penetrating form. And, a clamping means 700 is selectively received by the corresponding second receiving parts 222e.

Namely, the clamping means 700 is selectively received in the second receiving part 222e formed to be elevated at both side top circumference of the lower stage 222 so as to support the circumferential portions of the first substrate 10 and the bonded substrates when loading the first substrate 10 or unloading the bonded substrates. Hence, the droop of the corresponding portions is prevented as well.

And, the above-constructed clamping means 700 is received inside the second receiving part 222e while being positioned initially at both sides of the lower stage 222, and includes at least one second support portion 710 supporting both bottom sides of the first substrate 10, a second elevating axis 720 built in one body of the second support portion 710 so as to move selectively the second support portion 710 up and down, and a second driving part 730 connected to the second elevating axis 720 so as to drive to move the second elevating axis 720 up and down selectively.

In this case, the second receiving part 222e is formed to have a predetermined length along a portion corresponding to the dummy area of the first substrate 10 placed on the corresponding both side top circumference of the lower stage 222, and the second support portion 710 is formed to have a length corresponding to the shape of the second receiving part 222e so as to support a circumference of the first substrate 10.

Specifically, the second support portion 710 is formed to have a bent shape so as to provide one face supporting the bottom of the first substrate 10 and the other face supporting a lateral side of the first substrate 10. And, a face contacted with the substrate is coated with a coating material (not shown in the drawing) so as to prevent the substrate damage caused by the contact between the second support portion 710 and the first substrate 10.

In this case, the coating material like that of the first support portions 420a and 420b is one of Teflon, peak, and electric conductor so as to prevent static electricity generated from the contact with the substrate.

And, the second elevating axis 720 and second driving part 730 are formed to have the same construction of the foregoing-described first elevating axis 420c and first driving part 421. Yet, the present invention is not limited to such a construction, of which detailed explanation is skipped.

Moreover, the second support portion 710 in the above construction may be built in one body along an entire circumference of the lower stage 222. Yet, the embodiment according to the present invention proposes that a plurality of the second support portions 710 are provided and separated each other so as to leave a predetermined interval (enough to prevent the droop exceeding a minimum substrate-allowable droop limit) each other.

In this case, one ends of the respective second support portions 710 are built in one body, and at least one second elevating axis 720 and second driving part 730 are installed at the one ends of the second support portions 710 built in one body so as to enable a smooth operation of the respective second support portions 710.

An operational sequence of the above-constructed clamping means 700 inter-operates with the first substrate support means 420.

Namely, the second driving part 730 constructing the clamping means 700 operates simultaneously in connection with the operation of the first driving part 421 constructing the first substrate support means 420 so as to move upward or downward the second elevating axis 720 and second support portion 710 selectively, thereby enabling to support the circumferences of the first substrate 10 and the bonded substrates when the first substrate 10 and the bonded substrates are loaded and unloaded, respectively.

Moreover, the constitution and operational status of the above-explained second substrate support means is as follows.

FIG. 46 illustrates a schematic diagram of a vacuum bonding machine to which a second support means is applied according to the present invention.

A second substrate support means 400 constructing the bonding machine according to the present invention is constructed so as to be contacted with a portion at a dummy area between cell areas formed at the bottom of the second substrate 20. The second substrate support means 400 includes a rotational axis 415 enabling to rotate widely, a support 412, and a driving part 411. And, the second substrate support means 400 is mounted on a portion of the inner bottom of the vacuum chamber 210 adjacent to lateral sides of the lower stage 222.

In this case, it is preferably proposed that the number of the second substrate support means 400 lies between 2 and 10.

Specifically, when a layout of an interior of the vacuum chamber 210 is seen for the second substrate support means 400, one end of the support 412 to which the rotational axis 415 is coupled is placed at the inner bottom, which is an corner portion of a long side (or a short side) of each of the stages 221 and 222 or a portion (or a location leaving a constant interval) adjacent to a central part of a long side (or a short side) of each of the stages 221 and 222, of the vacuum chamber 210. And, the other end of the support 412 is placed so as to confront an inner side of each of the stages.

Namely, the second substrate support means 400 is installed so as to be placed in the vicinity of one of corner portions (or both corner portions) of one lateral side of the lower stage 222 or in the vicinity of one of corner portions (or both corner portions) of the other lateral side of the lower stage 222. Instead, the substrate support means 400 can be installed so as to be placed in the vicinity of a central portion of one or the other lateral side of the lower stage 222, or may be installed at each corner and central portions simultaneously. When the second substrate support means 400 is installed in the vicinity of the central portion of one lateral side (or the other lateral side) of the lower stage 222, it is also able to install a plurality of substrate support means thereon.

In this case, the support 412 constructing the second substrate support means 400 is built in one body of one end of the rotational axis 415. The support 412 is formed to lie long in a diagonal direction from one lateral side of the second substrate 20 fixed to the bottom of the upper stage 221 or in a direction of the other lateral side while carrying out a selective rotational motion by the rotational axis 415. Instead, the bearer is formed to be mounted on a location free from interference on a movement of each of the stages.

Besides, at least one support protrusion 413 is formed at a top of the support 412 so as to reduce a contact area with the second substrate 20 extremely. Specifically, a location of the support protrusion 413, when the support 412 is positioned under the upper stage 221, is adjusted so as to correspond to a portion of a dummy area of the second substrate 20 fixed to the upper stage 221.

In this case, each support protrusion 413 is formed to have the same protruding height. Yet, the protruding height is preferably adjustable so that each support protrusion 413, if necessary, is formed to have different height.

When at least two support protrusions 413 are formed at a top of the support 412, an interval between the two support protrusions 413 is formed to provide a distance enabling to prevent a droop of a substrate to the utmost.

Namely, considering the facts that a loss is inevitable for the formation of many support protrusions 413 for the narrower intervals between the respective support protrusions 413 and that a specific portion of the second substrate 20 on wide intervals between the respective support protrusions 413 may droop, the arrangement interval is determined preferably so as to reduce the above problems to the utmost.

Yet, considering the fact that such an arrangement may vary an optimal interval between support protrusions in accordance with a model or size of each substrate, it is more preferable to form the respective support protrusions of which reciprocal intervals are adjustable so as to be applied to various sizes of the substrates.

And, the location of the second substrate support means 400 according to the present invention may be formed at a portion leaving an interval from one side of one lateral side (i.e. a long or short side) of the lower stage 222, or a middle or an corner portion of the lateral side.

In this case, it is able to determine the constructional location previously in accordance with a size of the substrate, a loading/unloading direction of the substrate and the like. Specifically, the middle and corner portions of the lateral side are preferably determined by a rotational direction of the support 412, a substrate, and a contact position of the support.

Besides, the second substrate support means 400 according to the present invention is preferably mounted at a long side of the lower stage 222 instead of a short side. As an overall layout of the vacuum bonding machine is rectangular, a margin space of the short side is small but that of the long side is sufficient. Thus, it is preferable to install the second substrate support means 400 beside the long side providing the sufficient margin space.

The supports 412 of the second substrate support means 400 installed at the portion where one of the long sides is located may cause interference reciprocally. Therefore, the supports 420 are preferably formed to cross each other.

Yet, the embodiment of the present invention is not limited to the above-described constitutions. Instead, the respective second substrate support means 400 are preferably installed so as to leave constant intervals from the respective middle portions of the respective sides (long and short sides) or corner portions of the lower stage 222, thereby enabling to be free from the interference.

The driving part 411 constructing the second substrate support means 400 includes at least one of a cylinder, which rotates the rotational axis or moves the rotational axis up and down using an air or oil pressure, and a rotational motor which rotates the rotational axis or move the rotational axis up and down using a turning force.

If the driving part 411 includes both of the cylinder and the rotational motor, the cylinder is constructed to move the rotational axis 415 up and down and the rotational motor is constructed to rotate the rotational axis 415 right and left. It is also a matter of course that the cylinder is constructed to rotate the rotational axis 415 right and left and that the rotational motor is constructed to move the rotational axis 415 up and down.

If the position of the support 412 built in one body of the rotational axis 415 is higher than that of the top of the lower stage 222, the driving part just needs the construction of rotating the rotational axis 415 right and left. In this case, it may occur that the loader part 300 causes interference in the process of loading/unloading a substrate. Preferably, an initial position of the support 412 should be lower than that of the top of the lower stage 222, and the driving part includes both constructions of moving the rotational axis 415 up and down and rotating the rotational axis 415 right and left.

And, the present invention also proposes the construction that the driving part is located outside the vacuum chamber 210.

This is for the prevention of the problems that the interference (specifically, the interference occurring when the respective substrates are loaded/unloaded by the respective arms 310 and 320 of the loader part 300) of the respective parts if the driving part is installed in the vacuum chamber 210 and that the inner space of the vacuum chamber 210 should be sufficient.

In this case, the rotational axis 415, to which a driving force of the driving part 411 is transferred, is installed so as to penetrate into the bottom of the vacuum chamber 210, and a sealing (not shown in the drawing) work is carried out on the penetrated portion so as to prevent air inflow/outflow.

In FIG. 46, a pair of the second substrate support means 400 are installed so as to leave a predetermined interval from the corner of each long side of the lower stage 222, thereby enabling to prevent the droop of a specific portion of a second substrate to the utmost. Besides, it is a matter of course that at least three second substrate support means 400 can construct the pair as well.

When the two second substrate support means are installed so as to leave a predetermined interval from a middle portion or an corner portion of one lateral side of the lower stage 222 respectively, a first bearer 417 constructing one 401 of the two second substrate support means is formed to be shorter than a second bearer 416 constructing the other second substrate support means 402. The second substrate support means 401 is installed so as to be closer to the lower stage 222 than the other second substrate support means 402 does. And, first rotational axes 417a and 417b constructing the second substrate support means 401 may be formed so as to be offset reciprocally with second rotational axes 416a and 416b constructing the other second substrate support means 402.

In this case, as shown in the drawing, the second rotational axes 416a and 416b are formed to be closer to a short side of the lower stage 222 than the first rotational axes 417a and 417b do, whereby the second and first rotational axes enable to alternate to operate with each other.

Such a construction prevents the operations from reciprocal interference during the loading to a work position by the rotation of the respective supports 416 and 417.

Specifically, the times of driving the first and second substrate support means 401 and 402 are set up differently, thereby enabling to prevent the reciprocal operations from interference.

A bonding process S113 in a liquid crystal display using the above-constituted bonding machine is explained as follows.

FIG. 47 illustrates a flowchart of an LCD bonding process according to the present invention, and FIGS. 48A to 48E illustrate cross-sectional views of an LC dropping type LCD fabrication process according to the present invention.

A bonding process according to the present invention include the processes of loading two substrates in a vacuum chamber, forming a vacuum in the vacuum chamber, aligning the two substrates, bonding the substrates to each other, venting the vacuum chamber so as to pressurize the bonded substrates, and unloading the bonded substrates from the vacuum chamber.

Figure 48A:
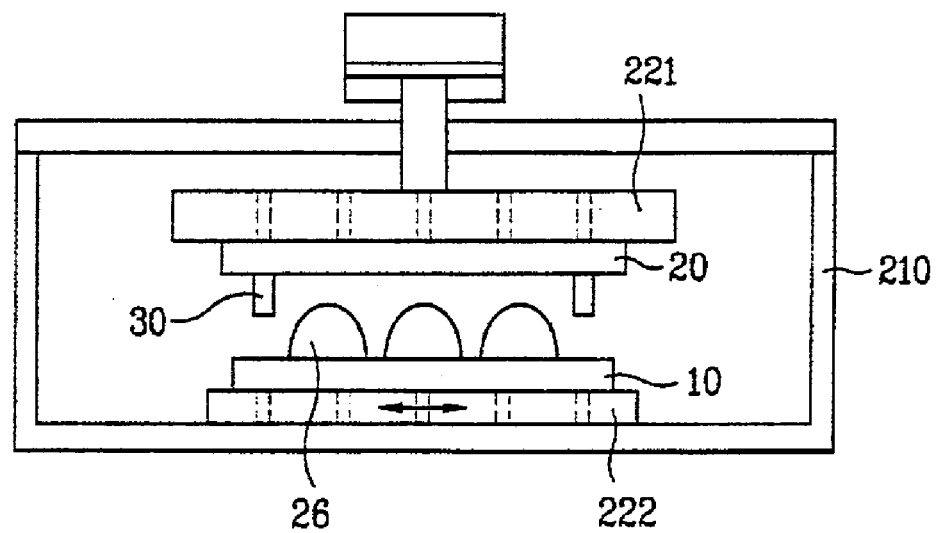

In the loading process, as shown in FIG. 48A, a second substrate 20, which is inverted so that a portion coated with a sealant 30 faces a lower direction, is fixed to an upper stage 221 of a vacuum chamber 210 (S51), and a first glass substrate 10 on which liquid crystals 26 are dropped is fixed to a lower stage 222 of the vacuum chamber 210 (S52). In this case, the vacuum chamber 210 maintains an atmospheric state.

Specifically, the second substrate 20 is inverted by a first arm 310 and fingers 311 of a conveying device 300 so that the portion coated with the sealant 30 faces the lower direction, and then put inside the vacuum chamber 210. While maintaining this status, the upper stage 221 of the vacuum chamber 210 descends so as to fix the second substrate 20 thereto by vacuum suction and then ascends upward. In this case, vacuum suction can be replaced by electrostatic adsorption.

After the fingers 311 of the first arm 310 of the conveying device 300 have left the vacuum chamber 210, the first substrate 10 on which liquid crystals 26 are dropped is placed in the vacuum chamber 210 by the conveying device 300, and then the clamping means (not shown) and first substrate support means 420 ascend so as to separate the first substrate 10 from the conveying device 300. After the conveying device 300 has left the vacuum chamber 210, the clamping means 700 and first substrate support means 420 descend so as to be disposed on the lower stage 222. And, the lower stage 222 fixes the first substrate 10 thereto by vacuum suction. In this case, the vacuum suction can be replaced by electrostatic adsorption as well.

If one substrate on which a TFT array is formed is called the first substrate 10 and the other substrate on which a color filter array is formed is called the second substrate 20, a sealant is coated on the first substrate 10 and liquid crystals are dropped on the second substrate 20. Instead, the sealant is coated on one of the two substrates as well as the liquid crystals are dropped on the sealant-coated substrate. Yet, the substrate on which the liquid crystals are dropped are placed on the lower stage 222, while the other is placed on the upper stage 221.

And, the second substrate support means (glass receiver) 400 is placed right beneath the second substrate 20 fixed to the upper stage 221 so as to support the second substrate 20 (S53). Thus, the second substrate 20 is supported by the second substrate support means 400 in the following manner.

First, the upper stage 221 is dropped or the second substrate support means 400 is lifted upward so that the second substrate support means 400 is placed close to a lower side of the second substrate 20, and then the vacuum force or electrostatic force making the upper stage 221 hold the second substrate 20 is released.

Second, the upper stage 221 is dropped at a predetermined distance primarily, and then the second substrate support means 400 is lifted upward secondarily. Thus, the second substrate support means 400 approaches the lower side of the second substrate 20. The vacuum force or electrostatic force making the upper stage 221 hold the second substrate 20 is then released.

In this case, the reason why the second substrate support means 400 is placed under the second substrate 20 is as follows.

Since a vacuum degree inside the vacuum chamber 210 becomes greater than that of each of the stages while the vacuum chamber 210 forms a vacuum inside when the respective stages 221 and 222 holds the first and second substrates 10 and 20 by vacuum suction, the stages 221 and 222 lose their sucking forces for the first and second substrates 10 and 20. Thus, if the upper stage 221 loses its sucking force, the second substrate 20 adhering to the upper stage 221 comes into fall on the first substrate 10.

In order to prevent the second substrate from falling down on forming a vacuum, the second substrate support means 400 is placed under the second substrate 20 adhering to the upper stage 221, before the vacuum chamber 210 forms a vacuum, so as to support the second substrate 20.

Subsequently, a vacuum state is achieved inside the vacuum chamber 210 (S54). In this case, the vacuum degree of the vacuum chamber 210 varies in accordance with a corresponding liquid crystal mode. Specifically, the vacuum degree of the IPS mode is set up between $1.0 \times 10^{-3}$ Pa and 1 Pa, and that of the TN mode does between $1.1 \times 10^{-3}$ Pa and $10^2$ Pa.

Besides, the vacuum state inside the vacuum chamber 210 can be achieved by two steps. Namely, the substrates are attached to the upper and lower stages 221 and 222, a door of the chamber is closed, and then a first vacuum operation is initiated using a dry vacuum pump. The first vacuum operation having been carried out for a while proceeds to a second vacuum operation using a high vacuum pump.

The reason why the vacuum chamber forms a vacuum through two steps is to prevent a possibility that the substrates in the vacuum chamber may be distorted or moved if the vacuum state inside the vacuum chamber 210 is achieved abruptly.

Once the vacuum state inside the vacuum chamber 210 reaches a predetermined level, the upper and lower stages 21 and 222 fix the first and second glass substrates 10 and 20 thereto, respectively with electrostatic charge(ESC) adsorption(S55), and the second substrate support means 400 is returned to its original position(S56).

In this case, the electrostatic charge adsorption is carried out by applying a negative/positive DC power to at least two plate electrodes formed on a stage. Namely, if a positive or negative voltage is applied to each of the plate electrodes, negative or positive electric charges are induced on the stage. As a conductive layer (transparent electrodes such as common electrode, pixel electrode, etc.) is formed on the substrate, the substrate is adsorbed thereto by a coulombic force generated between the conductive layer and stage. In case that a face of the substrate having the conductive layer is positioned at a side of the stage, a voltage between 0.1 and 1 kV is applied thereto. If the face of the substrate having the conductive layer is positioned at a side confronting the stage, a voltage between 3 and 4 kV is applied thereto. In this case, an elastic sheet can be formed on the upper stage 221.

Having been fixed to the upper and lower stages 221 and 222 by electrostatic charge adsorption, respectively, both of the substrates are aligned(S57).

Such an alignment is carried out in a manner that two kinds of align marks(rough and fine marks) engraved on the first and second substrates 10 and 20 respectively are aligned in order.

Figure 48B:
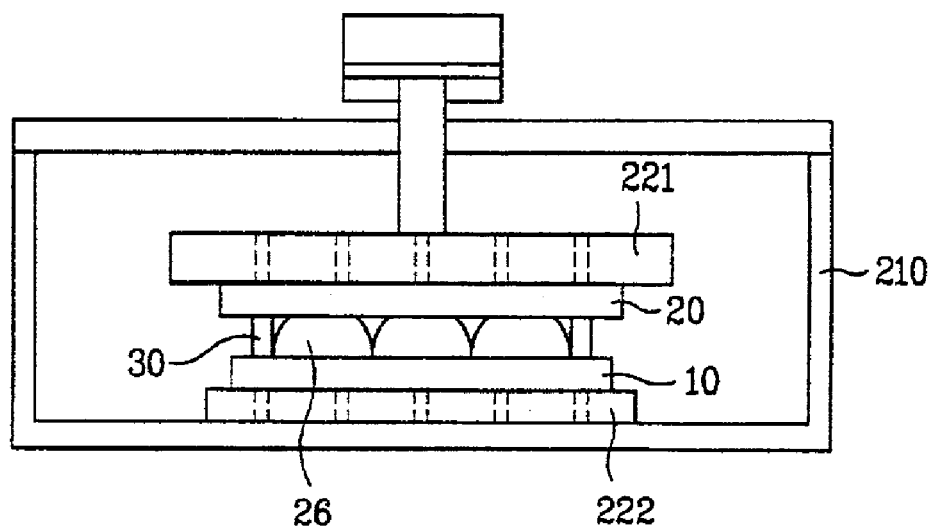
Figure 48C:
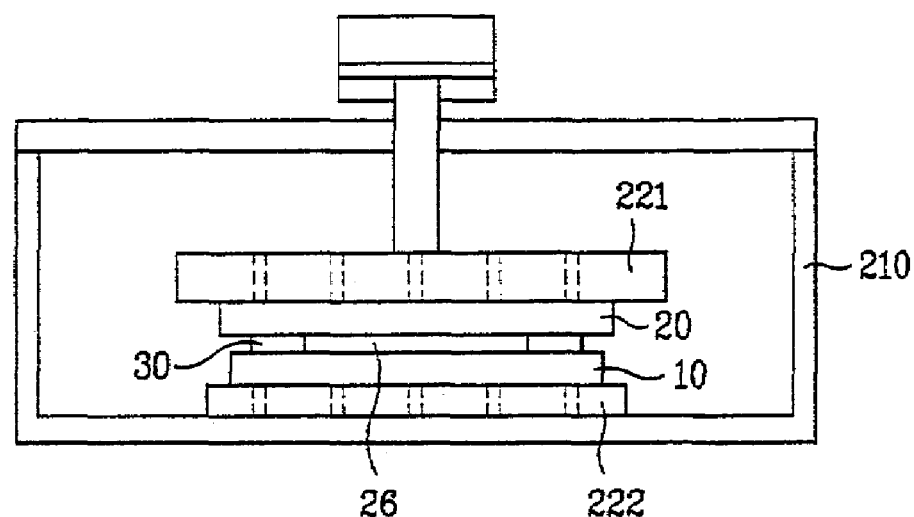

While the two glass substrates 10 and 20 are loaded on the respective stages 221 and 222 by electrostatic adsorption, the upper stage 221, as shown in FIG. 48B and FIG. 48C, is moved down so as to bond the first and second substrates 10 and 20 to each other(first pressurization)(S58). In this case, the bonding is carried out in a manner that the upper or lower stage 221 or 222 is moved in a vertical direction so as to pressurize the substrates. In this case, a moving speed and a pressure of the corresponding stage is varied for pressurization. Namely, the stage is moved at a uniform speed or pressure by the time point that the liquid crystals 26 on the first substrate 10 comes into contact with the second substrate 20 or the sealant 30 of the second substrate 20 comes into contact with the first substrate 10, and then the pressure is increased to a final pressure from the contact time point step by step. Namely, a load cell is installed at an axis of the moving stage so as to recognize the contact time point, and the two substrates 10 and 20 are bonded to each other at various pressures including 0.1 ton at the contact time point, 0.3 ton in a middle step, and 0.4 ton in a last step, and 0.5 ton in a final step.

In this case, the upper stage 221 carries out the substrate bonding by a single axis. Instead, various axes are installed so that each of the axes having an independent load cell (device measuring a pressure) carries out pressurization independently. If the lower and upper stages 222 and 221 fail to have the same level so as to fail to achieve a uniform bonding through the sealant 30, the axis of the corresponding portion is pressurized harder or less so as to achieve the uniform bonding through the sealant 30.

Subsequently, the substrates 10 and 20 are fixed thereto by hardening portions of a dummy sealant and the like in order to prevent a distortion of the substrates 10 and 20 which will be bonded to each other in the following process (S59).

Figure 48D:
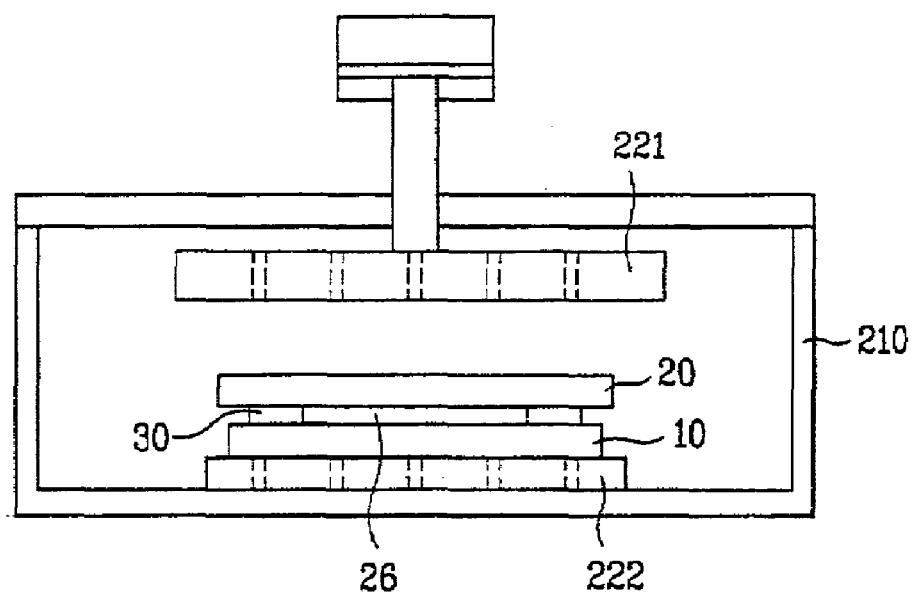
Figure 48E:
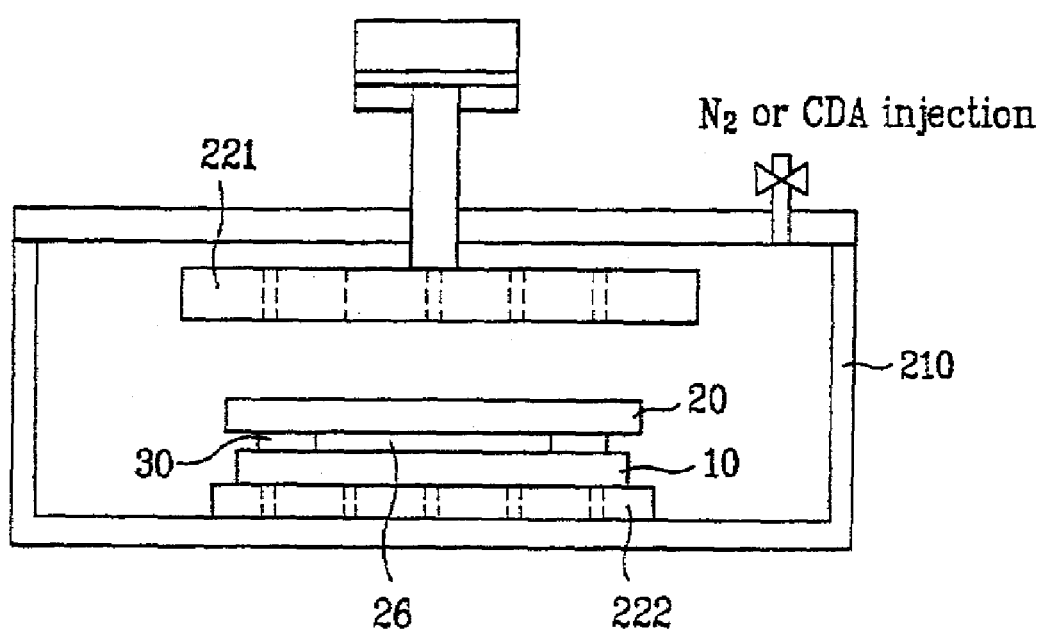

After completion of the above fixation, the electrostatic adsorption is stopped (ESC off). The upper stage 221, as shown in FIG. 48D, is then lifted upward so as to separate the upper stage 221 from the bonded substrates 10 and 20.

In order to make the vacuum chamber 210 atmospheric and pressurize the bonded substrates uniformly, a gas such as nitrogen or a clean dry gas is supplied to the vacuum chamber 210 so as to vent the vacuum chamber 210(S60).

Once the vacuum chamber 210 is vented, a vacuum state is achieved between the first and second substrates 10 and 20 while the vacuum chamber 210 becomes atmospheric. Therefore, the first and second substrate 10 and 20 in vacuum are pressurized by an atmospheric pressure so as to maintain a uniform gap. In this case, the bonded first and second substrates 10 and 20 are pressurized the inputted nitrogen gas or dry air on venting as well as the atmospheric pressure.

It is the most important thing to pressurize the substrates 10 and 20 uniformly on venting the vacuum chamber 210. Pressure should be uniformly applied to the respective portions of the two substrates 10 and 20 so as to establish the same height of the sealant 30 between the substrates 10 and 20 as well as make the liquid crystals 26 spread over all the portions uniformly. Hence, burst blowup failure of the sealant 30 or insufficient charge of liquid crystals is prevented. In order to pressurize all the portions of the substrates on venting the vacuum chamber 210, a venting direction, i.e. which direction a gas vented into the vacuum chamber 210 is vented is very important.

Accordingly, embodiments of the present invention are provided as follows.

First, a plurality of pipes are formed at an upper part of a vacuum chamber so that a gas is injected into the vacuum chamber. Second, a plurality of pipes are formed at a lower part of the vacuum chamber so as to inject a gas into the vacuum chamber. Third, a plurality of pipes are formed at a side of the vacuum chamber so as to inject a gas into the vacuum chamber. Fourth, the above systems are carried out simultaneously. It is preferable that the gas is injected from the upper part of the vacuum chamber. Yet, the venting direction can be determined in accordance with a substrate size, a state of a stage, and the like.

Moreover, both of the substrates 10 and 20 are pressurized by a gas injecting force on venting as well as by the atmospheric pressure. The pressure applied thereto on venting is the atmospheric pressure($10^5$ Pa) or 0.4~3.0 kg/cm$^2$ per unit area(cm$^2$), and preferably, about 1.0 kg/cm$^2$. Yet, a substrate size, an interval between the substrates, a thickness of the sealant, and the like are considered so as to modify the pressure.

At least two gas injection pipes can be formed. Preferably, the number of the gas injection pipes is determined in accordance with the substrate size. More preferably, eight gas injection pipes are formed in this case.

In order to prevent the substrate from swinging on venting the vacuum chamber, a fixing means or system can be used so as to prevent the swing (drift) of the substrate.

When the vacuum chamber is vented abruptly, the substrate swings so that misalignment of the substrate may occur. Hence, the gas can be vented step by step, and a slow valve may be added so as to supply the gas gradually. Namely, the vent is initiated in the vacuum chamber so as to be completed at one time. Instead, a first vent is initiated slowly so as to prevent the swing of the substrate until a predetermined time point is reached. Successively, a second vent of which venting speed is modified is carried out so as to reach the atmospheric pressure faster.

The timing of gas injection is very important as well since the swing or misalignment of the bonded substrates on the stage may be brought about on venting the vacuum chamber.

For the venting time, when the first pressurization is carried out after the completion of alignment so as to form a vacuum state between the two substrates, the vent of the chamber is started. A method of initiating a vent is specifically explained as follows.

First, the vent is initiated after the upper stage has been lifted. Second, the bent is initiated between the initiation and completion of elevating the upper stage so as to reduce a process time.

Third, the vent is initiated as soon as the upper stage is elevated. In this case, the upper stage is lifted upward as a gas or a dry air is blown in through the upper stage. The bonded substrates may be hardly detached from the upper stage or swing to fall down from the lower stage. Hence, the upper stage can be elevated simultaneously as the gas or dry air is blown in so as to separate the substrate from the upper stage easily.

Fourth, when the bonding is achieved, the vent of the vacuum chamber is initiated without moving the upper or lower stage. In this case, the upper stage is moved after the vent of the vacuum chamber has been completed, or the upper stage starts to move before the vent of the vacuum chamber is completed. Moreover, the gas or dry gas is blown in through the upper stage so as to move the upper stage upward. The bonded substrates may be hardly detached from the upper stage or swing to fall down from the lower stage. Hence, the upper stage can be elevated simultaneously as the gas or dry air is blown in so as to separate the substrate from the upper stage easily.

Thereafter, the substrates having been pressurized by the vent are unloaded(S61). Namely, once the vent is completed, the upper stage 221 moves upward so that the pressurized first and second substrates 10 and 20 are unloaded using a loader of a robot. Instead, after the upper stage 221 adsorbs the pressurized first and second substrates 10 and 20 so as to ascend, the loader of the robot unloads the substrates 10 and 20 from the upper stage 221.

In this case, in order to reduce a process time, one of new first and second substrates 10 and 20 on which a next bonding process will be carried out is loaded on the stage, and the pressurized first and second substrates are unloaded. Namely, the second substrate on which the next bonding process will be carried out is placed on the upper stage 221 using the loader of the robot so as to be fixed to the upper stage by vacuum suction(adsorption), and then the pressurized first and second substrates 10 and 20 on the lower stage 222 are unloaded. Instead, the upper stage 221 having the first and second substrates 10 and 20 adhere thereto by suction is lifted upward, the loader of the robot loads the new first substrate 10, on which the next bonding process will be carried out, on the lower stage 222, and then the pressurized first and second substrates are unloaded.

In the above description, a liquid crystal spreading process can be added so as to make the liquid crystals of the bonded substrates spread toward the sealant after the substrates have been bonded to each other before unloading. Or, after completion of the unloading process, in case of the liquid crystals fail to spread, the liquid crystal spreading process can be carried out additionally so that the liquid crystals spread evenly toward the sealant. In this case, the liquid crystal spreading process is carried out at least 10 minutes, and can be carried out under atmosphere or vacuum.

Next, a unit process S14 of UV-hardening the two substrates having been bonded to each other in the bonding machine is explained as follows.

FIG. 49A and FIG. 49B illustrate bird's-eye views for a UV-hardening step in an LCD fabrication process according to the present invention.

Once UV rays are irradiated on an entire surface of the bonded substrate in a UV irradiation process for UV hardening, characteristics of devices formed on the substrate such as thin film transistors and the like are degraded and a pretilt angle of an alignment layer formed for an initial alignment of liquid crystals is changed. Therefore, one embodiment of the present invention relates to UV-ray irradiation carried out on a sealant formed area on the bonded substrates only by screening the rest area using a mask.

Referring to FIG. 49A, a mask 80 is placed over the bonded substrates so as to screen the rest area except the area in which an auxiliary UV hardening sealant 30a and a main UV hardening sealant are formed, and then UV rays are irradiated thereon.

Shown in the drawing is that the mask 80 is disposed over the bonded substrates. Yet, it is also possible that the mask is disposed under the bonded substrates. Moreover, the drawing illustrates only that UV rays are irradiated on a face of a second substrate 20 of the bonded substrates. Instead, it is also available that the bonded substrates are turned over so that UV rays are irradiated on a face of a first substrate 10 of the bonded substrates.

Meanwhile, if UV rays emitted from a UV irradiation device 90 are reflected so as to be applied to an opposite side, the characteristics of TFT, alignment layer, and the like can be degraded. Hence, double masks can be formed over and under the bonded substrates, respectively.

Besides, the auxiliary UV hardening sealant 30a fails to perform a function of a sealant so as to be unnecessary to be hardened. Moreover, an area in which the auxiliary UV hardening sealant 30a is formed will be overlapped with a cell cutting line in a cell cutting process as a post process. Hence, such an area failing to be hardened is more advantageous than is hardened.

Therefore, the rest area except the area having the main UV hardening sealant 30 is screened with the mask, as shown in FIG. 49B, and then UV rays are irradiated thereon so as not to harden the auxiliary UV hardening sealant 30a.

In this case, the mask 80 can be disposed over or under the bonded substrates for UV ray irradiation. Instead, the masks 80(not shown in the drawing) are disposed over and under the bonded substrates for UV ray irradiation, respectively.

Moreover, the mask is formed for UV hardening so as to cut off UV rays to an active area inside the sealant 30 only and apply the UV rays to the sealant and dummy area. In this case, it is more effective that UV rays are irradiated so as not to be applied to a portion, which is screened with a mask or a tape, overlapped with a cell cutting line in the area where auxiliary UV hardening sealant 30a is formed.

In the above process, UV rays are applied to the second or first substrate in accordance with a corresponding LCD mode. Namely, the sealant 30 is hardened by applying UV rays from a second substrate side for IPS mode or from a first substrate side for TN mode. Since the sealant is formed outside a black matrix layer in an IPS mode liquid crystal display panel or on a black matrix layer in a TN mode liquid crystal display panel, UV rays should be irradiated on the sealant more precisely. Even if a cell cutting process can be carried out right after the completion of UV hardening of the bonded substrates, a thermo hardening process S15 is carried out subsequently when the sealant is a UV & thermo hardening resin.

The thermo hardening process is carried out in a manner that the bonded substrates of which UV hardening process has been completed is placed in a thermo hardening furnace so as to be hardened for an hour at about 120° C.

A cell cutting process S16 is then carried out on the substrates, of which UV & thermo hardening process has been completed, by unit panel.

FIG. 50 illustrates an exemplary block diagram of a cutter of a liquid crystal display panel according to an embodiment of the present invention, and FIGS. 51A to 51G illustrate detailed exemplary diagrams of a sequential process carried out in each of the blocks in FIG. 50.

FIG. 52 illustrates an exemplary block diagram of a cutter of a liquid crystal display panel according to another embodiment of the present invention, and FIGS. 53A to 53G illustrate detailed exemplary diagrams of a sequential process carried out in each of the blocks in FIG. 52.

FIG. 54 illustrates another exemplary diagram of suction holes formed at surfaces of first to fourth tables in FIGS. 53A to 53G respectively, and FIG. 55A and FIG. 55B illustrate detailed exemplary diagrams of first and second scribing processes applied thereto through the embodiments according to the present invention.

FIGS. 56A to 56F illustrate detailed exemplary diagrams of a sequential scribing process according to a further embodiment of the present invention.

A cutting device according to one embodiment of the present invention, as shown in FIG. 50, includes a loading unit 800 loading to align first and second substrates 10 and 20 on which a plurality of unit liquid crystal display panels are arranged wherein the first and second substrates 10 and 20 are bonded to each other and hardened, a first scribing unit 810 forming first scribing lines on surfaces of the first and second substrates 10 and 20 through first upper and lower wheels and applying a pressure to at least one portion of the first scribing line through a first roll so as to cut the first and second substrates 10 and 20 in order, a first rotating unit 820 rotating the cut first and second substrates 10 and 20 by 90°, a second scribing unit 830 forming second scribing lines on the surfaces of the first and second substrates 10 and 20 through second upper and lower wheels and applying a pressure to at least one portion of the second scribing line through a second roll so as to cut the first and second substrates 10 and 20 in order, and an unloading unit 840 unloading the unit liquid crystal display panels having been cut by the first and second scribing units 810 and 830 so as to transfer the unit liquid crystal display panels to a device which will carry out a next process.

Meanwhile, FIGS. 51A to 51G illustrate exemplarily subsequent processes carried out in the respective blocks in FIG. 50, which is referred to so as to explain a cutting device of a liquid crystal display panel and method thereof according to one embodiment of the present invention in detail as follows.

Figure 51A:
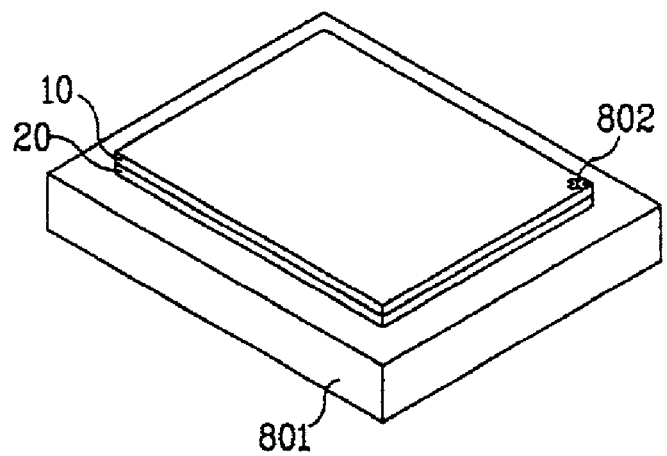

Referring to FIG. 51A, TFT array substrates and color filter substrates are formed on the first and second substrates 10 and 20 bonded to confront each other. In a loading unit 800, the bonded first and second substrates 10 and 20 are loaded on a first table 801, and then aligned through an align mark 802.

In this case, the first substrate 10 as the TFT array substrate is loaded on the first table 801 so as to be placed over the second substrate 20 as the color filter array substrate.

Since gate and data pad parts are formed at one side of right and left directions of the TFT array substrate and one side of upper and lower directions, respectively, the first substrate 10 protrudes wider more than the second substrate 20 so that the substrate having the TFT array is bigger in size than the other substrate having the color filter array. Hence, the substrate is prevented from being damaged when dummy substrates fall down by universal gravitation during the cell cutting process.

Figure 51B:
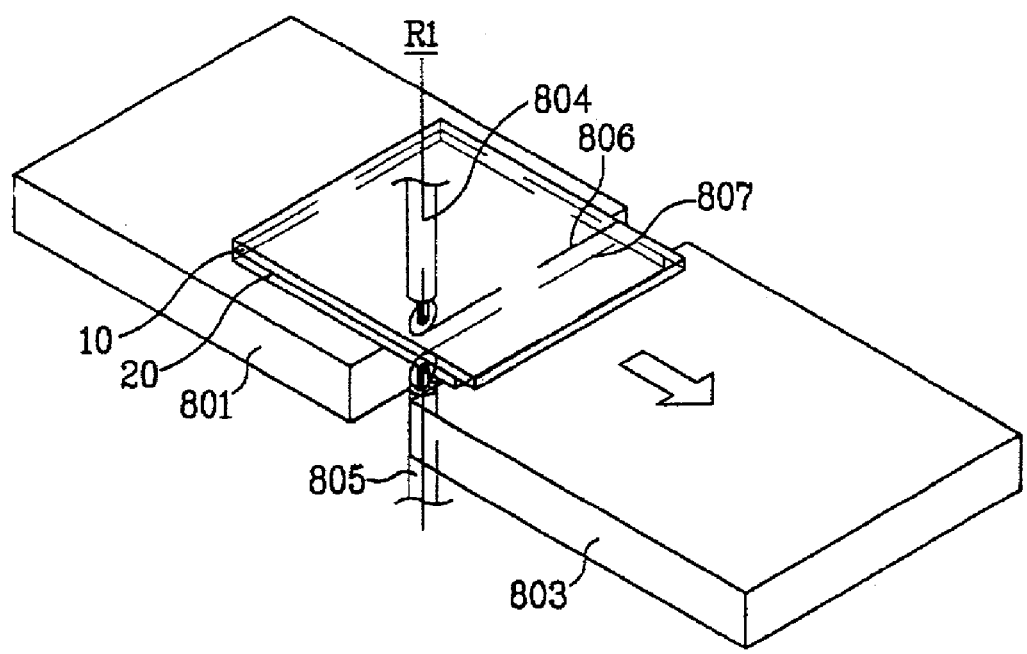

Referring to FIG. 51B, in the first scribing unit 810, the first and second substrates 10 and 20 are moved with a previously set distance so as to be placed between the first table 801 and a second table 803 left apart from the first table 801 with a predetermined space, and simultaneously, first scribing lines 806 and 807 are formed successively on surfaces of the first and second substrates 10 and 20 through first upper and lower wheels 804 and 805 in the space left between the first and second tables 801 and 803, respectively.

In this case, the first upper wheel 804 is left apart from one side of a reference line R1 in the area of the TFT array substrate(first substrate 10), of which one side protrudes out of one corresponding side of the color filter array substrate (second substrate 20), so as to form the first scribing line 806 on the surface of the first substrate 10. And, the first lower wheel 805 is left apart from the reference line R1 with a predetermined distance in an opposite direction corresponding to the first upper wheel 804 so as to form the first scribing line 807 on the surface of the second substrate 20.

Meanwhile, the first upper and lower wheels 804 and 805 are aligned to coincide with each other in the area of the first substrate 10 on which the gate or data pad part is not formed (i.e. area where TFT array substrates fail to protrude out of color filter substrates) so as to form the first scribing lines 806 and 807 on the surfaces of the first and second substrates 10 and 20, respectively.

Figure 51C:
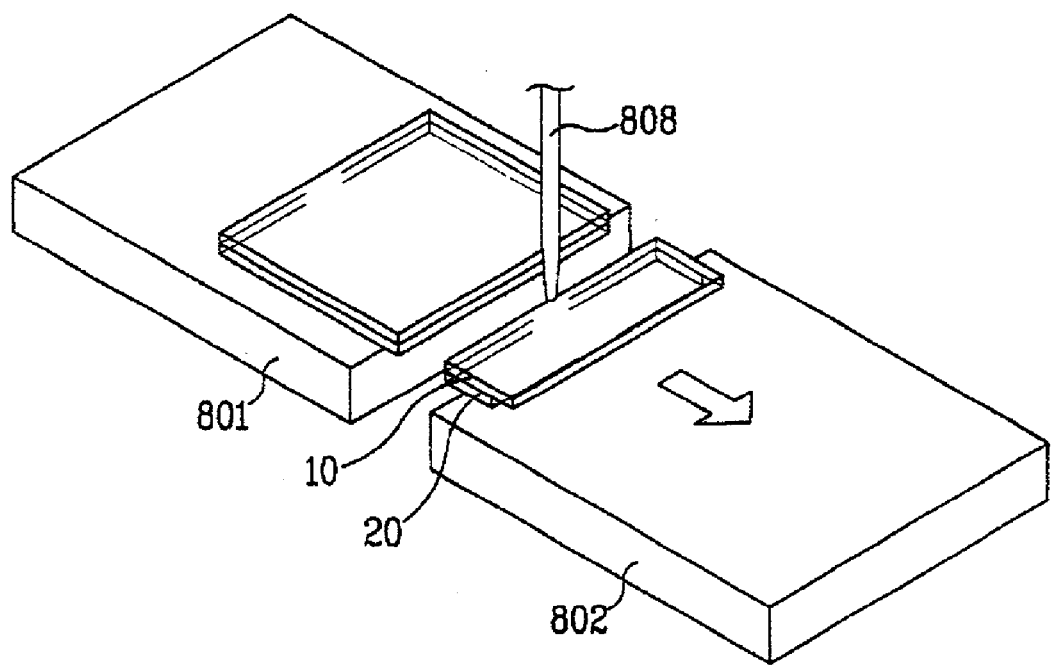

Referring to FIG. 51C, the first and second substrates 10 and 20 are cut in order by applying the pressure through the first roll 808 to portions of the first scribing lines 806 and 807 in the first scribing unit 810, respectively.

The first roll 808 applies the pressure to at least one portion of the first scribing line 806 formed by the first upper wheel 804 simultaneously so as to make a crack propagate through the first scribing lines 806 and 807 on the first and second substrates 10 and 20.

Meanwhile, when the first upper wheel 804 having formed the first scribing line 806 on the surface of the first substrate 10 returns to its original position, the first roll 808 inter-operates with the first upper wheel 804 so as to move to apply the pressure along the first scribing line 806. Therefore, the pressure can be applied to the first scribing line 806 more effectively.

Moreover, the first roll 808 can be applied to the first scribing line formed on the surface of the second substrate 20 independently, or to both of the first scribing lines 806 and 807 formed on the surfaces of the first and second substrates 10 and 20.

As mentioned in the above description, the first roll 808 applies the pressure thereto in a manner of being contacted with the first substrate 10 having the TFT array substrate. Hence, the first roll 808 is preferably made of a urethane material, which is less slippery on a glass substrate, having an excellent electrostatic characteristic as well as a less generation of particles.

Figure 51D:
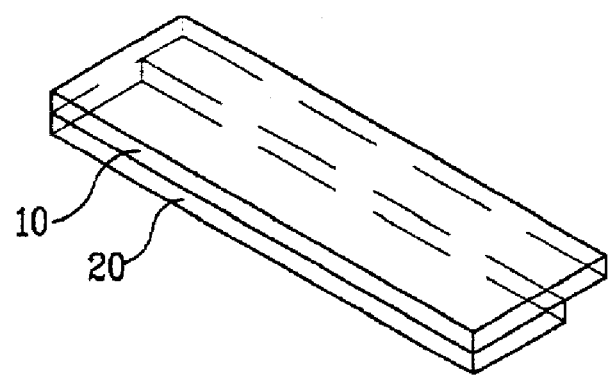

Referring to FIG. 51D, the first and second substrates 10 and 20 having been cut are turned by 90° in the first rotating unit 820.

Figure 51E:
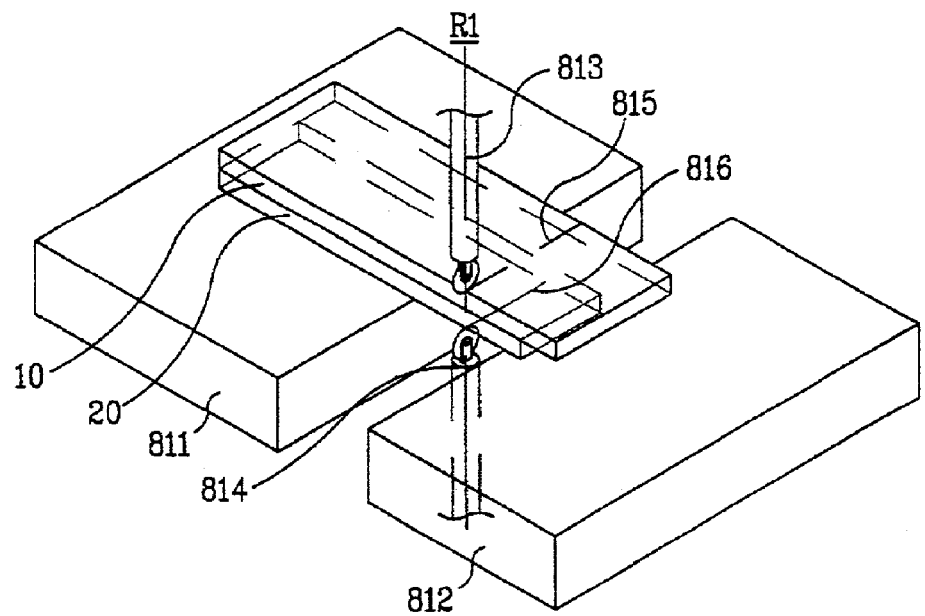

Referring to FIG. 51E, in the second scribing unit 830, the rotated first and second substrates 10 and 20 are moved with a previously set distance so as to be placed between third and fourth tables 811 and 812 left apart from with each other with a uniform distance, and simultaneously, the second scribing lines 815 and 816 are formed in order on the surfaces of the first and second substrates through second upper and lower wheels 813 and 814 in a separated space between the third and fourth tables 811 and 812.

As explained by referring to FIG. 51B like the first upper and lower wheels 804 and 805, the second upper and lower wheels 813 and 814 are left apart from each other with a predetermined distance in directions opposite to each other from the reference line R1 in the area, in which one side of the TFT array substrates (first substrate 10) protrudes out of a corresponding side of the color filter substrates (second substrate 20), so as to form the second scribing lines 815 and 816 on the surfaces of the first and second substrates 10 and 20. And, in the area where the TFT array substrates fail to protrude out of the color filter substrates, the second upper and lower wheels 813 and 814 are aligned to coincide with each other so as to form the second scribing lines 815 and 816 on the surfaces of the first and second substrates 10 and 20.

Figure 51F:
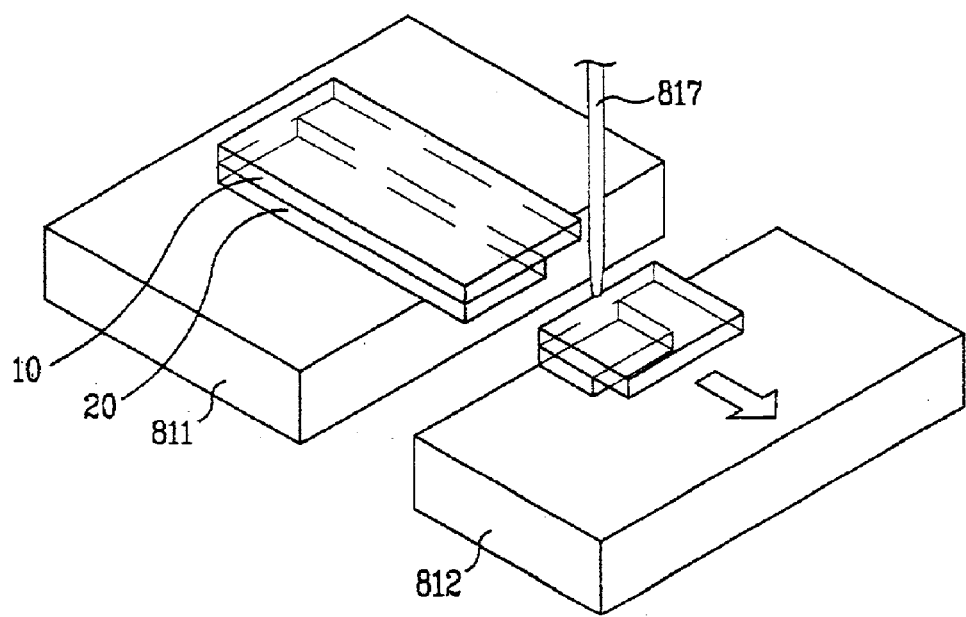

Referring to FIG. 51F, in the second scribing unit 830, the first and second substrates 10 and 20 are cut in order by applying the pressure through the second roll 817 to portions of the second scribing lines 815 and 816, respectively.

The second roll 817, as mentioned in the description by referring to FIG. 51C in detail, applies the pressure to at least one portion of the second scribing line 815 formed by the second upper wheel 813 simultaneously so as to make a crack propagate through the second scribing lines 815 and 816 on the first and second substrates 10 and 20. Meanwhile, when the second upper wheel 813 having formed the second scribing line 815 on the surface of the first substrate 10 returns to its original position, the second roll 813 inter-operates with the second upper wheel 813 so as to move to apply the pressure along the second scribing line 815. Therefore, the pressure can be applied to the second scribing line 815 more effectively. Preferably, the second roll 817 is made of a urethane based material having a small frictional force so as to provide an excellent electrostatic characteristic and generate a small amount of particles.

Figure 51G:
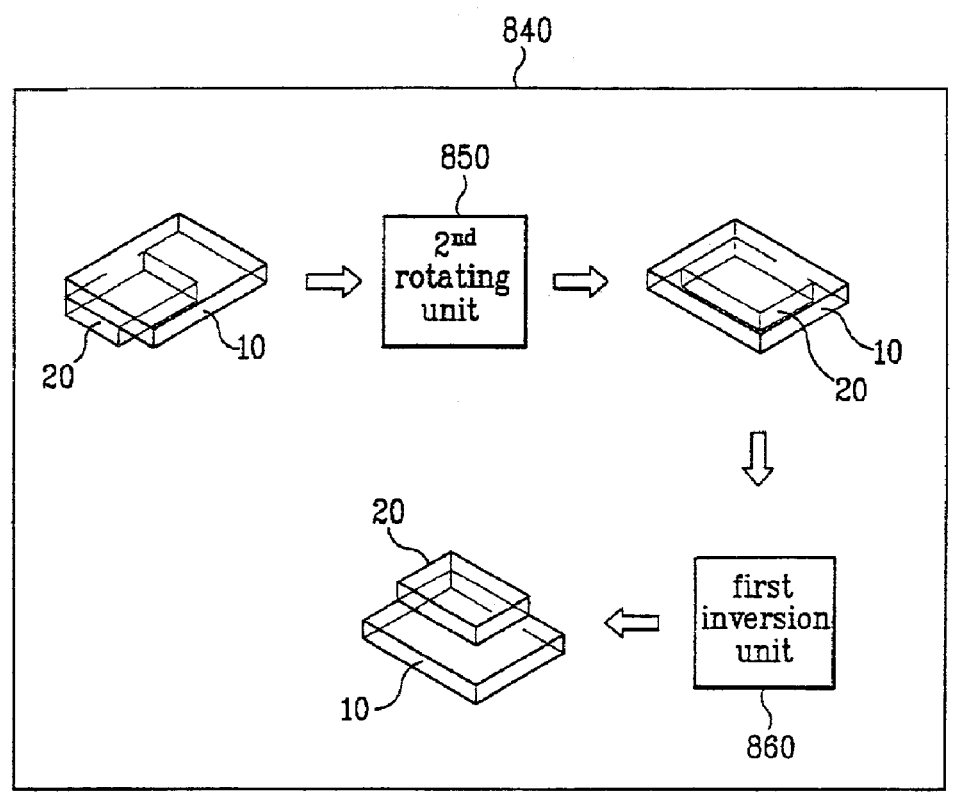

Referring to FIG. 51G, the unloading unit 840 transfers the unit liquid crystal display panels cut in order along the first and second scribing lines 806, 807, 815, and 816 to a device which will carry out a following process.

Compared to a status when the liquid crystal display panels are transferred to the loading unit 800, the sequentially cut unit liquid crystal display panels, as shown in FIG. 51G, are turned by 90°. Hence, the unit liquid crystal display panels are rotated by 90° by inserting a second rotating unit 850 in the unloading unit 840 so as to be unloaded to be transferred to the next device carrying out the following process. Thus, the following process can be carried out conveniently.

Moreover, when the following process requires the unit liquid crystal display panel having the color filter substrate stacked on the TFT array substrate, as shown in FIG. 51G, a first inverting unit 860 is inserted in the unloading unit 840 to invert the unloaded unit liquid crystal display panels so as to be transferred to the device to carry out the following process.

Accordingly, in the liquid crystal display panel cutting device and method thereof according to one embodiment of the present invention, the first and second scribing lines are formed through one rotation and two scribings carried out on the first and second substrates simultaneously, and then the first and second substrates are cut into the unit liquid crystal display panels in a manner of applying the pressure on at least one portions of the first and second scribing lines through the first and second rolls.

Meanwhile, the unit liquid crystal display panels having the TFT array and color filter substrates bonded to confront each other are fabricated on the first and second substrates so as to be left apart from each other uniformly. And, a dummy sealant is formed on a periphery of the first and second substrates failing to have the unit liquid crystal display panels so as to prevent the distortion of the first and second substrates bonded to each other in accordance with a liquid crystal display model.

If the embodiment of the present invention is applied so as to cut the first and second substrates on which the dummy UV hardening sealants 40 and 50 are formed, the cut first and second substrates may hardly be separated from each other.

FIG. 52 illustrates an exemplary block diagram of a liquid crystal display panel cutting device and method thereof enabling effectively to cut and separate the first and second substrates, on which the dummy UV hardening sealants are formed, according to another embodiment of the present invention.

Referring to FIG. 52, a cutting device according to another embodiment of the present invention includes a loading unit 900 loading to align first and second substrates on which a plurality of unit liquid crystal display panels are fabricated, a first scribing unit 910 holding the first and second substrates by suction so as to load the first and second substrates between first and second tables left apart from each other with a predetermined distance and forming first scribing lines on surfaces of the first and second substrates through first upper and lower wheels so as to cut the first and second substrates in order by moving the first and second tables in a direction getting farther each other, a first rotating unit 920 rotating the cut first and second substrates by 90°, a second scribing unit 930 holding the rotated first and second substrates by suction so as to load the first and second substrates between third and fourth tables left apart from each other with a predetermined distance and forming second scribing lines on the surfaces of the first and second substrates through second upper and lower wheels so as to cut the first and second substrates in order by moving the third and fourth tables in a direction getting farther each other, and an unloading unit 940 unloading unit liquid crystal display panels having been cut by the first and second scribing units 910 and 930 so as to transfer the unit liquid crystal display panels to a device which will carry out a next process.

FIGS. 53A to 53G illustrate detailed exemplary diagrams of a sequential process carried out in each of the blocks in FIG. 52. The liquid crystal display panel cutting device and method thereof according to the present invention are explained in detail as follows.

Referring to FIG. 53A, TFT array substrates and color filter substrates are formed on the first and second substrates 10 and 20 bonded to confront each other. In a loading unit 900, the bonded first and second substrates 10 and 20 are loaded on a first table 905, and then aligned through an align mark 906.

In this case, the first and second substrates 10 and 20 are loaded thereon so that the first substrate 10 on which the TFT array substrates are formed is stacked on the second substrate 20 on which color filter substrates are formed. Compared to the case that the first and second substrates are stacked upside down, the shock impacted on the TFT array substrates or color filter substrates during a cutting process of the first and second substrates 10 and 20 can be mitigated.

Referring to FIG. 53B, in the first scribing unit 910, the first and second substrates 10 and 20 are loaded so as to be laid across a space between the first table and a second table 911 left apart from the first table 905, and then adhere thereto by suction through suction holes 912. And, first scribing lines 915 and 916 are formed successively on surfaces of the first and second substrates 10 and 20 through first upper and lower wheels 913 and 914 in the space left between the first and second tables 905 and 911, respectively.

Since gate and data pad parts are formed at one side of right and left directions of the TFT array substrate and one side of upper and lower directions, respectively, one sides of the TFT array substrates formed on the first substrate 10 protrude out of one corresponding sides of the color filter substrates formed on the second substrate 20.

In this case, the first upper wheel 913 is left apart from one side of a reference line R1 in the area of the TFT array substrate (first substrate 10), of which one side protrudes out of one corresponding side of the color filter array substrate (second substrate 20), so as to form the first scribing line 915 on the surface of the first substrate 10. And, the first lower wheel 914 is left apart from the reference line R1 with a predetermined distance in an opposite direction corresponding to the first upper wheel 913 so as to form the first scribing line 916 on the surface of the second substrate 20.

Meanwhile, the first upper and lower wheels 913 and 914 are aligned to coincide with each other in the area of the first substrate 10 on which the gate or data pad part of the TFT array substrates is not formed (i.e. area where TFT array substrates fail to protrude out of color filter substrates) so as to form the first scribing lines 915 and 916 on the surfaces of the first and second substrates 10 and 20, respectively.

Referring to FIG. 53C, the first and second substrates 10 and 20 are cut to be separated by moving the first and second tables 905 and 911 to which the first and second substrates 10 and 20 adhere through the suction holes 912 in directions getting farther from each other along the first scribing lines 915 and 916.

The suction holes 912 are formed on surfaces of the first and second tables 905 and 911 on which the first and second substrates 10 and 20 are laid so as to be left apart from each other uniformly. The suction holes 912 suck air so that the first and second substrates 10 and 20 adhere to the first and second tables 905 and 911 by suction. Hence, the first and second substrates 10 and 20 fail to rock or swing. When the separated first and second substrates are transferred, an air is blown in so as to detach the first and second substrates 10 and 20 from the first and second tables 905 and 911.

Meanwhile, the suction holes 912, as shown in FIG. 54, are formed so as to be like suction portions 1012 having uniform areas on surfaces of the first and second tables 1005 and 1011, thereby enabling to make the first and second substrates adhere thereto more effectively. Besides, it is able to prevent black dot stains generated possibly at the first and second substrates 10 and 20 by the suction holes if a sucking pressure is set up highly.

Referring to FIG. 53D, the first and second substrates 10 and 20 having been cut are turned by 90° in the first rotating unit 920.

Referring to FIG. 53E, in the second scribing unit 930, the rotated first and second substrates 10 and 20 are loaded to be laid across a space between third and fourth tables 931 and 932 left apart from with each other with a uniform distance, and then adhere thereto through suction holes 933. Subsequently, second scribing lines 936 and 937 are formed in order on the surfaces of the first and second substrates 10 and 20 through second upper and lower wheels 934 and 935 in the separated space between the third and fourth tables 931 and 932.

As explained by referring to FIG. 53B like the first upper and lower wheels 913 and 914, the second upper and lower wheels 934 and 935 are left apart from each other with a predetermined distance in directions opposite to each other from the reference line R1 in the area, in which one sides of the TFT array substrates protrude out of corresponding sides of the color filter substrates, so as to form the second scribing lines 936 and 937 on the surfaces of the first and second substrates 10 and 20. And, in the area where the TFT array substrates fail to protrude out of the color filter substrates, the second upper and lower wheels 934 and 935 are aligned to coincide with each other so as to form the second scribing lines 936 and 937 on the surfaces of the first and second substrates 10 and 20.

Referring to FIG. 53F, in the second scribing unit 930, the first and second substrates 10 and 20 are cut to be separated by moving the third and fourth tables 931 and 932 to which the first and second substrates 10 and 20 adhere through the suction holes 933 in directions getting farther from each other along the second scribing lines 936 and 937.

The suction holes 933 formed on the surfaces of the third and fourth tables 931 and 932 are identical to those 912 on the first and second tables 905 and 911 so as to be formed like the suction portions 1012, as shown in FIG. 54, having predetermined areas, respectively.

Referring to FIG. 53G, the unloading unit 940 transfers the unit liquid crystal display panels cut in order along the first and second scribing lines 915, 916, 936, and 937 to a device which will carry out a following process.

Compared to the case that the liquid crystal display panels are transferred to the loading unit 900, the sequentially cut unit liquid crystal display panels, as shown in FIG. 53G, are turned by 90°. Hence, the unit liquid crystal display panels are rotated by 90° by inserting a second rotating unit 950 in the unloading unit 940 so as to be unloaded to be transferred to the next device carrying out the following process. Thus, the following process can be carried out conveniently.

Moreover, when the following process requires the unit liquid crystal display panel having the color filter substrate stacked on the TFT array substrate, as shown in FIG. 53G, a first inverting unit 960 is inserted in the unloading unit 940 to invert the unloaded unit liquid crystal display panels so as to be transferred to the device to carry out the following process.

Accordingly, in the liquid crystal display panel cutting device and method thereof according to another embodiment of the present invention, the first and second scribing lines are formed through one rotation and two scribings carried out on the first and second substrates simultaneously, and then the first and second substrates are cut into the unit liquid crystal display panels in a manner that the first/second tables, on which the first and second substrates are loaded to adhere by suction, the third/fourth tables are moved in directions getting farther from each other.

Meanwhile, the first and second scribing processes for cutting the first and second substrates into the unit liquid crystal display panels according to the embodiments of the present invention should carry out alternately a first cutting process of cutting out to remove dummy areas failing to have the unit liquid crystal display panels from the first and second substrates and a second cutting process of cutting out the areas having the unit liquid crystal display panels from the first and second substrates.

Namely, in the first cutting process, as shown in FIG. 55A, first and second substrates 10 and 20 are moved to be laid across the space between first and second tables 703 and 704 left apart from each other with a predetermined distance, a first scribing line 707 is formed through first upper and lower wheels 705 and 706, and then a pressure is applied to at least a portion of the first scribing line 707 like one embodiment of the present invention or the first and second tables 703 and 704 to which the first and second substrates 10 and 20 adhere are mover in directions getting farther from each other like another embodiment of the present invention so as to cut out dummy areas 709 at one side of the first and second substrates 10 and 20 failing to have unit liquid crystal display panels formed thereon.

In the second cutting process, as shown in FIG. 55B, the first and second substrates 10 and 20, of which dummy areas 709 failing to have the unit liquid crystals are removed by the first cutting process, are moved in a direction of one side so as to be laid across the space between the first and second tables 703 and 704, a second scribing line 708 is formed through the first upper and lower wheels 705 and 706, and then a pressure is applied to at least a portion of the first scribing line 707 using a roll like one embodiment of the present invention or the first and second tables 703 and 704 to which the first and second substrates 10 and 20 adhere are moved in directions getting farther from each other like another embodiment of the present invention so as to cut the first and second substrates 10 and 20 into the unit liquid crystal display panels.

Thereafter, the first cutting process of cutting out the dummy area 709 failing to have the unit liquid crystal display panels from the first and second substrates 10 and 20 is carried out, and then the second cutting process of cutting the first and second substrates 10 and 20 into the unit liquid crystal display panels is carried out repeatedly.

If one embodiment of the present invention is carried out, the dummy areas 709 may fail to be separated from the unit liquid crystal display panels completely in the first or second cutting process when a dummy sealant is formed on the periphery failing to have the unit liquid crystal display panels formed thereon in order to prevent the distortion of the first and second substrates 10 and 20.

Moreover, in another embodiment of the present invention is carried out, an area of the unit liquid crystal display panel is wide enough for the first and second tables 703 and 704 to hold the first and second substrates 10 and 20 by suction. Hence, the unit liquid crystal display panels can be cut in the second cutting process. Yet, since the dummy areas are so narrow that the first and second tables 703 and 704 are unable to hold the first and second substrates 10 and 20 thereon by suction.

FIGS. 56A to 56F are exemplary diagrams according to another further embodiment of the present invention to overcome the above-mentioned problems of the foregoing embodiments of the present invention. A method of cutting a liquid crystal display panel according to another further embodiment of the present invention is explained in detail by referring to the drawings as follows.

Figure 56A:
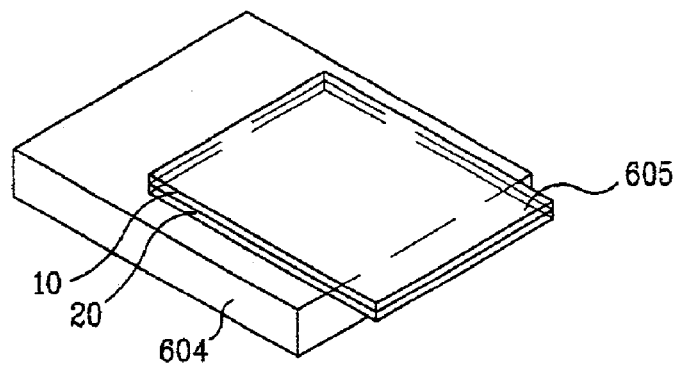

Referring to FIG. 56A, first and second substrates 10 and 20 on which unit liquid crystal display panels are left apart from each other uniformly are loaded on a first table 604, and then are moved to one side to adhere to the first table 604 by suction so that dummy areas failing to have unit liquid crystal display panels formed thereon protrude out of one side of the first table 604.

Figure 56B:
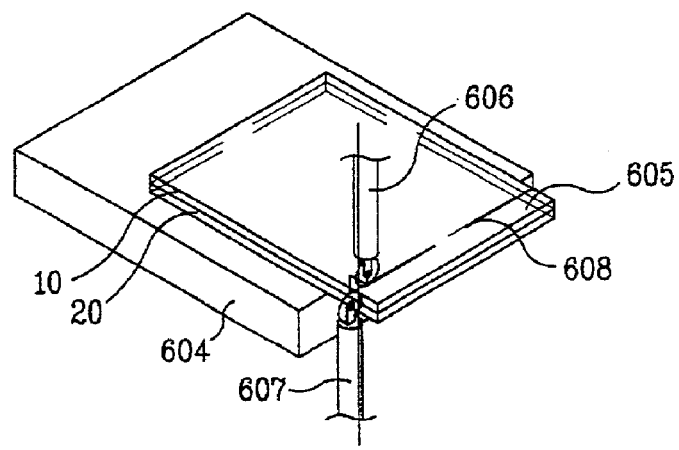

Referring to FIG. 56B, a second scribing line 608 is formed on the surfaces of the first and second substrates 10 and 20 protruding out of the first table 604 through first upper and lower wheels 606 and 607.

Figure 56C:
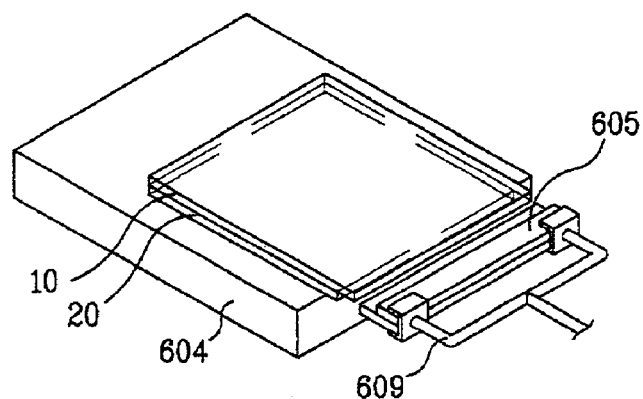

Referring to FIG. 56C, dummy areas 605 failing to have unit liquid crystal display panels formed thereon are removed from the first and second substrates 10 and 20 on which the first scribing line 608 is formed through a robot grip 609.

After the first scribing line 608 has been formed through the first upper and lower wheels 606 and 607 in order to remove the dummy areas 605 from the first and second substrates 10 and 20 through the robot grip 609 more easily, a pressure is applied to at least one portion of the first scribing line 608 through a roll like that of one embodiment of the present invention so as to make a crack propagate through the first scribing line 608.

Meanwhile, as a liquid crystal display panel size is varied in accordance with an LCD model, the robot grip 609 is preferably fabricated so as to enable to control a width using a sub motor and the like. Moreover, if the first substrate 10 having TFT array filters formed thereon is stacked on the second substrate 20 having color filter substrates formed thereon, the TFT array substrate protrudes out of the corresponding color filter substrate in the unit liquid crystal display panel. Hence, the robot grip 609 is fabricated so as to grip the dummy areas 605 at a position lower than those of the first and second substrates 10 and 20. On the contrary, the robot grip 609 is fabricated so as to grip the dummy areas 605 at a position higher than those of the first and second substrates 10 and 20. Therefore, a shock impacted possibly on the unit liquid crystal display panels can be prevented previously. For this, the robot grip 609 is preferably fabricated using the sub motor and the like so as to control a height of the position.

Figure 56D:
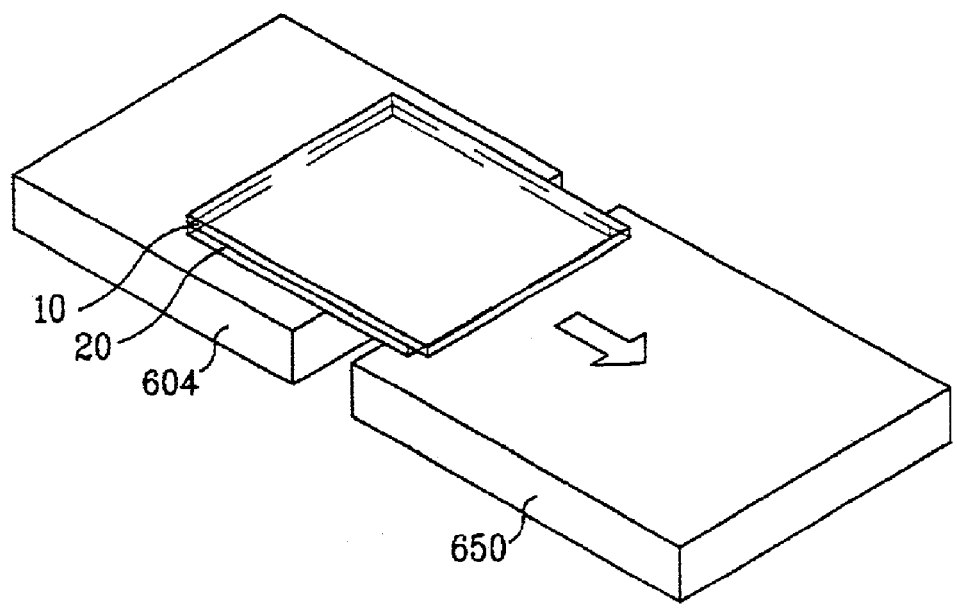

Referring to FIG. 56D, the first and second substrates 10 and 20 from which the dummy areas 605 are removed are moved to one side to adhere thereto by suction so as to be laid across a space between the first table 604 and a second table 650 left apart from the first table 604.

Figure 56E:
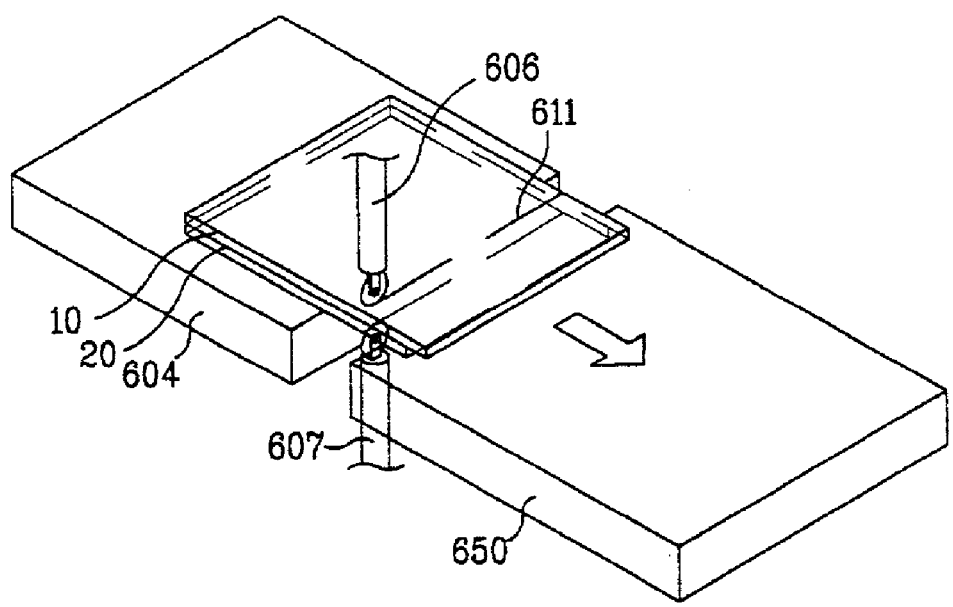

Referring to FIG. 56E, a second scribing line 611 is formed on the surfaces of the first and second substrates 10 and 20 through the first upper and lower wheels 606 and 607 in the separated space between the first and second tables 604 and 650.

Figure 56F:
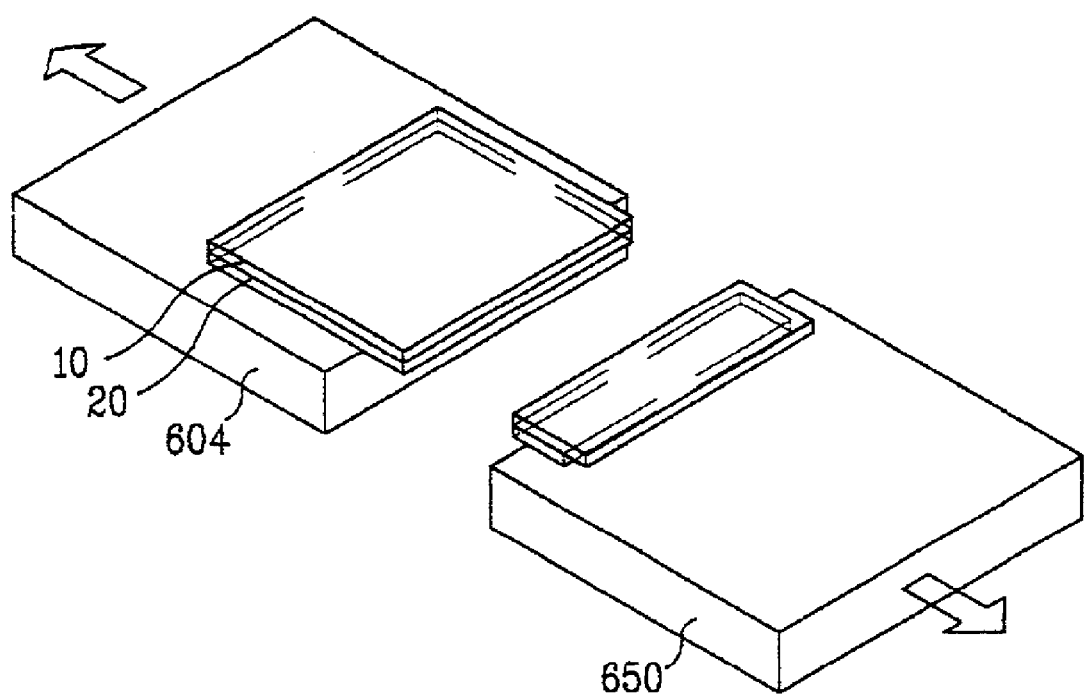

Referring to FIG. 56F, the first and second tables 604 and 650 are moved in directions getting farther from each other so as to cut to separate the unit liquid crystal display panel from the first and second substrates 10 and 20 along the second scribing line 611.

In order to cut to separate the unit liquid crystal display panel from the first and second substrates 10 and 20 more easily by moving the first and second substrates 604 and 650 in the directions getting farther from each other, after the second scribing line 611 has been formed through the first upper and lower wheels 606 and 607, a pressure can be applied to at least one portion of the second scribing line 611 through the roll like one embodiment of the present invention so as to make a crack propagate through the second scribing line 611.

The constitutions of the above-explained respective wheels are explained as follows.

FIG. 57A and FIG. 57B illustrate exemplary embodiments of cutting wheels used in cutting a liquid crystal display panel according to the present invention.

Referring to FIG. 57A and FIG. 57B, a coin-like cutting wheel 60 is made of tungsten carbide (WC) or diamond, and includes a penetrating hole 61 so as to receive a support axis (not shown in the drawings) and sharp-edged blades 62, of which front and back faces are grinded, left apart from each other uniformly along a circumference of the cutting wheel 60 so as to have an uneven structure. The wheel 60 rotates to adhere closely to a glass based liquid crystal display panel at a uniform pressure so as to form a groove of a predetermined depth. Moreover, the cutting wheel 60 having the blades 52 of the uneven structure controls a slip on the liquid crystal display panel, thereby enabling to prevent an abnormal groove from being formed. Besides, the cutting wheel 60 rotating to adhere closely to the liquid crystal display panel gives impact on the liquid crystal display panel, whereby a propagating direction of the crack is preponderated in a uniform direction as well as the liquid crystal display panel is cut by the adhering pressure between the cutting wheel 60 and liquid crystal display panel.

With the above-described method, the substrates having a plurality of unit panels are cut into the unit panels. A grinding process S17 is then carried out on each of the panels.

FIG. 58 illustrates an exemplary diagram of a grinded amount detecting pattern of a liquid crystal display panel according to an embodiment of the present invention, and FIG. 59 illustrates an exemplary diagram of a grinded amount detecting pattern of a liquid crystal display panel according to another embodiment of the present invention.

Referring to FIG. 58, a unit liquid crystal display panel 350 includes an image display unit 313 having liquid crystal cells arranged like a matrix form, a gate pad part 314 connecting gate lines GL1~GLm of the image display unit 313 to a gate driver integrated circuit (not shown in the drawing) applying gate signals thereto, a data pad part 315 connecting data lines DL1~DLn of the image display unit 313 to a data driver integrated circuit applying image information thereto. In this case, the gate and data pad parts 314 and 315 are formed at a circumferential area of a first substrate 10 of which short and long sides protrude out of a second substrate 20.

In each of the areas where the data lines DL1~DLn cross with the gate lines GL1~GLm, although not shown in the drawing, includes are a thin film transistor for switching a corresponding liquid crystal cell is formed, a pixel electrode, and a passivation layer formed on an entire surface so as to protect the data lines DL1~DLn, gate lines GL1~GLm, thin film transistor, and electrodes.

Moreover, as mentioned in the above description, in order to cut off static electricity generated possibly when conductive layers such as data lines DL1~DLn, gate lines GL1~GLm, and electrodes are formed on the first substrate 10, short-circuit wires (not shown in the drawings) are formed at an edge portion of the first substrate 10 so as to short-circuit the conductive layers electrically.

And, on a second substrate 20 of the image display unit 313 formed are a plurality of coated color filters separated from each other by a black matrix by cell area and a common electrode as a counter electrode of a corresponding pixel electrode on the first substrate 10.

As mentioned in the above description, the first and second substrates 10 and 20 confronting each other are left apart from each other uniformly through a cell gap, bonded to each other through a sealing part (not shown in the drawing) formed at a periphery of the image display unit 313, and has a liquid crystal layer formed in the separated space between the first and second substrates 10 and 20.

Meanwhile, tab marks 355A~355J amounting to the uniform number are formed separately on the gate and data pad parts 314 and 315 so as to align precisely contact pins withdrawn from the data lines DL1~DLn, gate lines GL1~GLm, gate and data driver integrated circuits. For instance, as shown in FIG. 58, three tab marks 355A~355C are formed separately on the gate pad part 314, and seven tab marks 355D~355J are formed separately on the data pad part 315.

An edge of the above-explained unit liquid crystal display panel 350 should be grinded obliquely from an end END1 of the unit liquid crystal display panel 350 to a grinding line R1. Yet, as shown in a magnified area EX1 of FIG. 58, an actually grinded line of the unit liquid crystal display panel 350 has a predetermined range of error from the grinding line R1, and it is judged as a grinding failure if the error deviates from an allowable error margin D1, where D1 is about 200 μm.

Presently, a user extracts the grinded unit liquid crystal display panel 350 periodically from a product line, transfers the extracted panel 350 to an additional measuring device, and judges whether the actually grinded line of the unit liquid crystal display panel 350 deviates from the allowable error margin D1 using a camera of high magnifications, a projector, or the like.

In one embodiment of the present invention, as shown in FIG. 58, a grinded amount identification pattern 360 is formed in an arc corresponding to the allowable error margin D1 by taking the grinding line R1 as a reference. In this case, the allowable error limit D1 is set up as ±100 μm. Moreover, if the grinded amount identification pattern 360 is formed on the gate pad part 314, the grinded amount identification pattern 360 is preferably formed simultaneously when the gate lines GL1~GLm are formed. And, if the grinded amount identification pattern 360 is formed on the data pad part 315, the grinded amount identification pattern 360 is preferably formed simultaneously when the data lines DL1~DLn are formed.

Therefore, the judgment whether the actually grinded line of the unit liquid crystal display panel 350 deviates from the allowable error margin D1 can be achieved by visual inspection on the grinded amount identification pattern 360.

Namely, the grinded amount identification pattern 360 of the grinding-completed unit liquid crystal display panel 350 is observed so as to judge as failure of 'insufficient grinding' or 'excessive grinding' if the grinded amount identification pattern 360 is not grinded at all or grinded completely so as to be unidentified.

The liquid crystal display panel grinded amount detection pattern and method of judging grinding failure using the same according to one embodiment of the present invention enable to judge the grinding failure of the unit liquid crystal display panel through visual inspection on the grinded amount identification pattern 360, thereby requiring no additional measuring device as well as enabling to judge the grinding failure for all of the unit liquid crystal display panels 350.

FIG. 59 illustrates an exemplary diagram of a grinded amount detecting pattern of a liquid crystal display panel according to another embodiment of the present invention.

Referring to FIG. 59, a unit liquid crystal display panel 350 includes an image display unit 313 having liquid crystal display cells arranged like a matrix form, a gate pad part 314 connecting gate lines GL1~GLm of the image display unit 313 to a gate driver integrated circuit (not shown in the drawing) applying gate signals thereto, a data pad part 315 connecting data lines DL1~DLn of the image display unit 313 to a data driver integrated circuit applying image information thereto. In this case, the gate and data pad parts 314 and 315 are formed at a circumferential area of a first substrate 10 of which short and long sides protrude out of a second substrate 20.

In each of the areas where the data lines DL1~DLn cross with the gate lines GL1~GLm, although not shown in the drawing, includes are a thin film transistor for switching a corresponding liquid crystal cell is formed, a pixel electrode, and a passivation layer formed on an entire surface so as to protect the data lines DL1~DLn, gate lines GL1~GLm, thin film transistor, and electrodes.

Moreover, as mentioned in the above description, in order to cut off static electricity generated possibly when conductive layers such as data lines DL1~DLn, gate lines GL1~GLm, and electrodes are formed on the first substrate 10, short-circuit wires(not shown in the drawings) are formed at an edge portion of the first substrate 10 so as to short-circuit the conductive layers electrically.

And, on a second substrate 20 of the image display unit 313 formed are a plurality of coated color filters separated from each other by a black matrix by cell area and a common electrode as a counter electrode of a corresponding pixel electrode on the first substrate 10.

Meanwhile, tab marks 355A~355J amounting to the uniform number are formed separately on the gate and data pad parts 314 and 315 so as to align precisely contact pins withdrawn from the data lines DL1~DLn, gate lines GL1~GLm, gate and data driver integrated circuits. For instance, as shown in FIG. 59, three tab marks 355A~355C are formed uniformly on the gate pad part 314 so as to be separated from each other, and seven tab marks 355D~355J are formed uniformly on the data pad part 315 so as to be separated from each other.

An edge of the above-explained unit liquid crystal display panel 350 should be grinded obliquely from an end END1 of the unit liquid crystal display panel 350 to a grinding line R1. Yet, as shown in a magnified area EX1 of FIG. 59, an actually grinded line of the unit liquid crystal display panel 350 has a predetermined range of error from the grinding line R1, and it is judged as a grinding failure if the error deviates from an allowable error limit D1.

In the another embodiment of the present invention, grinded amount identification patterns 360a~360o are formed on an area corresponding to the allowable error margin D1 by taking the grinding line R1 as a reference so as to be separated from each other uniformly.

The grinded amount identification patterns 360a~360o are preferably formed by dividing a distance from the grinding line R1 to the allowable error margin D1 set up as about 100 μm into uniform units so as to be identified through bare eyes.

For instance, as shown in FIG. 59, in case of three grinded amount identification patterns 360g~360i formed on a middle portion so as to be separated uniformly, one area in a direction of the end END1 of the unit liquid crystal display panel is distinguished from the other area in a direction where the tab mark 355J I formed by taking a line coinciding with the grinding line R1 as a boundary.

And, the divided areas of the grinded amount identification patterns 360b~360f as getting closer to an edge of one side from the middle-positioned three grinded amount identification patterns 360g~360i are formed so as to be closer to the tab mark 355J by uniform distance unit. And, the grinded amount identification pattern 360a equal to the grinded amount identification pattern 360b is formed at the most outer periphery.

Moreover, the divided areas of the grinded amount identification patterns 360j~360n as getting closer to an edge of the other side from the middle-positioned three grinded amount identification patterns 360g~360i are formed so as to be closer to the end END1 of the liquid crystal display panel 350 by uniform distance unit. And, the grinded amount identification pattern 360o equal to the grinded amount identification pattern 360n is formed at the most outer periphery.

The grinded amount identification patterns 360a and 360o formed at the most outer peripheries secure a high reliance for the grinding failure judgment, and the middle-positioned three grinded amount identification patterns 360g~360i help to judge easily whether the actually grinded line of the unit liquid crystal display panel 350 coincides with the grinding line R1.

And, numbers(−10, −8, −6, −4, −2, 0, 2, 4, 6, 8, 10) are marked on edges of the area where the tab mark 355J is formed so as to correspond to the grinded amount identification patterns 360a~360o. Hence, it is able to detect the actually grinded amount of the unit liquid crystal display panel 350. In this case, assuming that the allowable error margin D1 is ±100 μm from the cutting line R1, unit of the numbers(−10, −8, −6, −4, −2, 0, 2, 4, 6, 8, 10) is 10 μm.

Therefore, the judgment whether the actually grinded line of the unit liquid crystal display panel 350 deviates from the allowable error margin D1 according to another embodiment of the present invention can be achieved by visual inspection on the grinded amount identification pattern 360.

Namely, the grinded amount identification patterns 360a~360o of the grinding-completed unit liquid crystal display panel 350 are observed so as to judge as failure due to 'excessive grinding' if the grinded amount identification patterns 360a and 360b at one edge side are not observed or 'insufficient grinding' if the grinded amount identification patterns 360n and 360o are not grinded at all.

Moreover, in another embodiment of the present invention, it is able to check the actually grinded line and cutting line R1 of the unit liquid crystal display panel 350 through visual inspection as well as detect the actually grinded amount of the unit liquid crystal display panel 350 within an error range of 20 μm by checking the numbers(−10, −8, −6, −4, −2, 0, 2, 4, 6, 8, 10) corresponding to the grinded amount identification patterns 360a~360o through a camera of high magnifications.

Meanwhile, the grinded amount identification patterns are formed more to set up the divided areas of the grinded amount identification patterns more minutely, thereby enabling to reduce more the error range of 20 μm.

If the allowable error limit D1 having been used as ±100 μm from the cutting line R1 is set up as ±80 μm due to various process reasons, one embodiment of the present invention fails to cope with such a change. Yet, in another embodiment of the present invention, the numbers(−10, −8, −6, −4, −2, 0, 2, 4, 6, 8, 10) corresponding to the grinded amount identification patterns 360a~360o are checked through a camera of high magnifications, thereby enabling to cope with such a change.

After the completion of the grinding process S 17, each of the liquid crystal display panels is inspected(S18).

FIG. 60 illustrates an inspecting device of a liquid crystal display panel according to an embodiment of the present invention, and FIGS. 61A to 61C illustrate exemplary diagrams of an inspection method of a unit liquid crystal display panel using the inspecting device in FIG. 60 according to an embodiment of the present invention sequentially.

Referring to FIG. 60, a liquid crystal display panel inspecting device according to one embodiment of the present invention includes first and second inspection bars 301 and 302 corresponding to long sides(i.e. a side having a data pad part and a confronting side) of a unit liquid crystal display panel 350 so as to inspect a cut state and a distance D1 between the long sides of the unit liquid crystal display panel 350 and third and fourth inspection bars 303 and 304 corresponding to short sides(i.e. a side having a gate pad part and a confronting side) of a unit liquid crystal display panel 350 so as to inspect a cut state and a distance D2 between the short sides of the unit liquid crystal display panel 350.

The first and second inspection bars 301 and 302 check whether remainders remain on the long sides of the unit liquid crystal display panel through a touch system and measure the distance D1 between the long sides of the unit liquid crystal display panel. And, the third and fourth inspection bars 303 and 304 check whether remainders remain on the short sides of the unit liquid crystal display panel through the touch system and measure the distance D2 between the short sides of the unit liquid crystal display panel.

Meanwhile, as a size of the unit liquid crystal display panel 350 varies in accordance with a corresponding model, the first and second inspection bars 301 and 302 and the third and fourth inspection bars 303 and 304 are preferably fabricated to correspond to lengths of the long and short sides of the biggest size of the unit liquid crystal display panel model so as to be applied to all kinds of models of unit liquid crystal display panels. Preferably, the first to fourth inspection bars 301 to 304 measure the distances D1 and D2 between the long sides and the short sides of the unit liquid crystal display panel through a built-in gauge, respectively.

Moreover, the second substrate 20 as the color filter array substrate is bonded on the first substrate as the TFT array substrate, and one side of the first substrate 10 protrudes out of the second substrate 20, which have been explained in the foregoing description.

Therefore, one sides of the long and short sides of the unit liquid crystal display panel 350 have step-like step differences. In order to inspect such a long side of the unit liquid crystal display panel 350, the first inspection bar 301 corresponding to the long side of the unit liquid crystal display panel 350 having the data pad part is formed so as to gear into the long side of the unit liquid crystal display panel 350 having the step-like step difference, and the third inspection bar 303 corresponding to the short side of the unit liquid crystal display panel 350 having the gate pad part is formed so as to gear into the short side of the unit liquid crystal display panel 350 having the other step-like step difference.

A method of inspecting a unit liquid crystal display panel using the above-described inspecting device is explained in detail by referring to FIGS. 61A to 61C as follows.

Referring to FIG. 61A, a unit liquid crystal display panel 350 is loaded on a first table(not shown in the drawing) having first to fourth inspection bars 301 to 304. In this case, a second substrate 20 is stacked on a first substrate 10 so that the unit liquid crystal display panel 350 is loaded. One side of the first substrate 10 protrudes out of the second substrate 20 through the above-explained gate and data pad parts. And, the first and third inspection bars 301 and 303 are formed so as to gear into long and short sides of the unit liquid crystal display panel 350 having the step-like step difference because of the data and gate pad parts.

Referring to FIG. 61B, the first and second inspection bars 301 and 302 check whether remainders remain at the long sides of the unit liquid crystal display panel 350 through a touch system as well as measure a distance D1 between the long sides of the liquid crystal display panel 350.

Referring to FIG. 61C, the third and fourth inspection bars 303 and 304 check whether remainders remain at the short sides of the unit liquid crystal display panel 350 through the touch system as well as measure a distance D2 between the short sides of the liquid crystal display panel 350.

The above-constituted liquid crystal display panel inspecting device according to one embodiment of the present invention measures whether the remainders remain at the long and short sides of the unit liquid crystal display panel 350 by a touch system using the first to fourth inspection bars 301 to 304 and measures the distances D1 and D2 between the long sides and the short sides respectively, thereby requiring no additional measuring device as well as enabling to make pass/fail judgment by measuring sizes of all kinds of unit liquid crystal display panels 350.

FIG. 62 illustrates an inspecting device of a liquid crystal display panel according to another embodiment of the present invention, and FIG. 63A and FIG. 63B illustrate exemplary diagrams of an inspection method of a unit liquid crystal display panel using the inspecting device in FIG. 62 according to another embodiment of the present invention sequentially.

Referring to FIG. 62, a liquid crystal display panel inspecting device according to another embodiment of the present invention includes first and second inspection bars 301 and 302 corresponding to long sides(i.e. a side having a data pad part and a confronting side) of a unit liquid crystal display panel 350 so as to inspect a cut state and a distance D1 between the long sides of the unit liquid crystal display panel 350 and third and fourth inspection bars 303 and 304 corresponding to short sides (i.e. a side having a gate pad part and a confronting side) of the unit liquid crystal display panel 350 so as to inspect a cut state and a distance D2 between the short sides of the unit liquid crystal display panel 350. In this case, compared to one embodiment of the present invention, the fourth inspection bar 304 is fabricated so as to cope with a short side of a smallest model of the unit liquid crystal display panel 350.

Meanwhile, the first to fourth inspection bars 301 to 304 measure the distances D1 and D2 between the long sides and the short sides of the unit liquid crystal display panel through a built-in gauge, respectively.

A method of inspecting a unit liquid crystal display panel using the above-described inspecting device according to another embodiment of the present invention is explained in detail by referring to FIGS. 63A to 63C as follows.

Referring to FIG. 63A, a unit liquid crystal display panel 350 is loaded on a first table(not shown in the drawing) having first to fourth inspection bars 301 to 304. In this case, a second substrate 20 is stacked on a first substrate 10 so that the unit liquid crystal display panel 350 is loaded. One side of the first substrate 10 protrudes out of the second substrate 20 due to the above-explained gate and data pad parts. And, the first and third inspection bars 301 and 303 are formed so as to gear into long and short sides of the unit liquid crystal display panel 350 having the step-like step difference because of the data and gate pad parts.

Referring to FIG. 63B, the first to fourth inspection bars 301 to 304 check whether remainders remain at the long and short sides of the unit liquid crystal display panel 350 through a touch system as well as measure distances D1 and D2 between the long sides and the short sides of the liquid crystal display panel 350, respectively.

Therefore, different from the inspecting device according to one embodiment of the present invention, the liquid crystal display panel inspecting device according to another embodiment of the present invention drives the first to fourth inspection bars 301 to 304 simultaneously so as to check whether remainders remain at the long and short sides of the unit liquid crystal display panel 350 through a touch system as well as measure distances D1 and D2 between the long sides and the short sides of the liquid crystal display panel 350 and measure distances D1 and D2 between the long sides and the short sides of the liquid crystal display panel 350, respectively. Hence, if the first to fourth inspection bars 301 to 304 of the liquid crystal display panel inspecting device according to another embodiment of the present invention are fabricated to have lengths corresponding to the long and short sides of the smallest model of the liquid crystal display panel 350, the first and second inspection bars 301 and 302 are unable to avoid colliding with the third and fourth inspection bars 303 and 304.

Therefore, the fourth inspection bar 304 in another embodiment of the present invention is fabricated so as to cope with a short side of a smallest model of the unit liquid crystal display panel 350, whereby the first to fourth inspection bars 301 to 304 are driven simultaneously so as to prevent the first and second inspection bars 301 and 302 from colliding with the third and fourth inspection bars 303 and 304.

Compared to the inspecting device according to one embodiment of the present invention, the liquid crystal display panel inspecting device according to another embodiment of the present invention can inspect only whether remainders for a portion of the short side of the unit liquid crystal display panel 350 corresponding to the fourth inspection bar 304. Yet, the liquid crystal display panel inspecting device according to another embodiment of the present invention has an advantage that the remainder inspection of the unit liquid crystal display panel 350 and the measurement of the distances D1 and D2 between the long sides and the short sides can be achieved faster than that of one embodiment of the present invention.

The liquid crystal display panel is then completed by the above process using the liquid crystal dropping system.

A system of fabricating a liquid crystal display panel in a liquid crystal display using liquid crystal dropping by the above process is explained as follows.

FIG. 64 illustrates a schematic diagram of an LCD fabrication system using liquid crystal dropping according to the present invention.

Referring to FIG. 64, a liquid crystal fabricating system according to the present invention includes a GAP process line 1500 of dropping liquid crystals on first and second substrates 10 and 20 respectively, printing a sealant, bonding the substrates 10 and 20 each other, and hardening the sealant and an inspection process line 1400 of cutting the bonded substrates into panel units and grinding and inspecting the unit panels.

Moreover, the GAP process line 1500 mainly includes a liquid crystal forming line 1700 dropping liquid crystals on the first substrate, a sealant forming line 1800 forming the sealant on the second substrate, and a bonding and hardening line 1600 bonding the two substrates to each other and hardening the sealant.

And, the liquid crystal forming line 1700 includes a first loader 1100a loading the first substrate 10 wherein a plurality of liquid crystal display panels are designed on the first substrate 10 so that a TFT array process is carried out on each of the panels, a first cleaner 1105a cleaning the first substrate 10 loaded by the first loader 1100a, a first aligner ad rubber 1110a coating an alignment layer on the first substrate 10 cleaned by the first cleaner 1105a and rubbing the alignment layer, a second cleaner 1105b cleaning the first substrate aligned by the first aligner and rubber 1110a, a first buffer 1120a buffering the substrates so as to smooth a next process standby time of each of the substrates cleaned in the second cleaner 1105b, and an liquid crystal(LC) loader 1130 dropping liquid crystals on each panel of the first substrate 10 conveyed from the first buffer 1120a or second cleaner 1105b. And, the present invention further may include a visual inspector for checking an alignment status after the alignment layer has been formed. Considering that a large-sized substrate becomes troubled with moving to the visual inspector, it is advantageous that a handle is attached to a jig for convenience of moving the substrate.

The sealant forming line 1800 includes a second loader 1100b loading a second substrate 20 wherein a plurality of liquid crystal display panels are designed on the second substrate 20 so that a color filter array process is carried out on each of the panels, a third cleaner 1105c cleaning the second substrate 20 loaded by the second loader 1110b, a second aligner and rubber 1110b coating an alignment layer on the second substrate 20 cleaned in the third cleaner 1105c and rubbing the alignment layer, a fourth cleaner 1105d cleaning the second substrate 20 aligned in the second aligner and rubber 1110b, a second buffer 1120b buffering the substrates so as to smooth a next process standby time of each of the substrates cleaned in the fourth cleaner 1105d, an Ag dispenser 1135 dispensing Ag on each panel of the second substrate 20 cleaned in the fourth cleaner 1105d or the second buffer 1120a, a sealant dispenser 1140 dispensing a UV & thermo hardening sealant on a circumferential portion of each of the panels of the second substrate 20 on which Ag is formed in the Ag dispenser 1135, a USC cleaner 1150 cleaning the second substrates 20 on which the sealant is formed in the sealant dispenser 1140, and a first inverter 1160 inverting the second substrate 20 cleaned in the USC cleaner 1150 so that a surface of the second substrate 20 having the sealant formed thereon faces downward.

The bonding and hardening line 1600 includes a bonding machine 1170 bonding the first substrate on which the liquid crystals are dropped and the inverted second substrate on which the sealant is formed to each other in a vacuum state, a UV hardener 1180 irradiating UV rays on the sealant of the first and second substrates 10 and 20 bonded to ach other in the bonding machine 1170 so as to harden the sealant, a second inverter 1190 inverting selectively the first or second substrate UV-hardened in the UV hardener 1180, a thermo hardener 1200 thermo-hardening the sealant of the two substrates hardened in the UV hardener 1180 or inverted in the second inverter 1190, and a first unloader 1210 unloading the substrates thermo-hardened in the thermo hardener 1200.

In this case, although not shown in the drawing, a bonding level inspector inspecting a bonding level and a visual inspector inspecting the bonded substrates with bare eyes are installed between the UV hardener 1180 and second inverter 1190. And, an outside appearance inspector inspecting an outside appearance of the hardened substrates is installed between the thermo hardener 1200 and first unloader 1210.

And, the inspection process line 1400 includes a third loader 1300 loading the bonded two substrates unloaded from the first unloader 1210, a cutter 1310 cutting the bonded two substrates loaded by the third loader 1300 into panel units, an inspector 1320 inspecting a size of each of the panels cut by the cuter 1310, a grinder 1330 grinding a cut edge and shorting bar of each of the panels inspected in the inspector 1320, a final inspector 1340 inspecting acceptable/defective status of each of the panels grinded in the grinder 1330 finally, and a second unloader 1350 shipping the panel judged as acceptable by the final inspector 1340.

In FIG. 64, conveying devices such as conveying robots and conveyer belts are installed between the respective devices(arrows).

In the above description, the first substrate 10 on which the TFT array process is carried out is loaded on the first loader 1100a, and the second substrate 20 on which the color filter array process is carried out is loaded on the second loader 1100b. On the contrary, in accordance with a mode (IPS, TN, VA) of a liquid crystal display to be fabricated, the first substrate 10 on which the TFT array process is carried out can be loaded on the second loader 1100b, and the second substrate 20 on which the color filter array process is carried out can be loaded on the first loader 1100a.

Accordingly, the system for fabricating a liquid crystal display using liquid crystal dropping and method of fabricating a liquid crystal display using the same have the following advantages or effects.

First, the first and second substrates are bonded to each other in a manner that liquid crystals are dropped on the first substrate and sealant is coated on the second substrate. Therefore, the present invention enables to balance between an LC dropping process time and a sealant coating process time, thereby reducing a process time before the bonding.

Second, the LC dropping amount is compensated so as to be dropped precisely. Therefore, the present invention enables to reduce a process time as well as improve productivity.

Third, the dummy column spacer is formed in the dummy area so as to prevent LC from being contacted with the sealant before the sealant is hardened completely. Therefore, the present invention enables to improve yield and quality of product.

Fourth, the openings are formed at the dummy column spacer so that LC moves to the corners of the substrate through the openings. Therefore, the present invention enables to prevent the corner areas of the substrates from being charged with LC insufficiently.

Fifth, the auxiliary sealant is printed on coating the main sealant, thereby enabling to prevent the sealant from conglomerating at a start time point of sealant coating.

Sixth, as LC and sealant are formed on different substrates, respectively, the substrate having the sealant can be cleaned so as to prevent particle contamination.

Seventh, both of the scribing and breaking processes are carried out simultaneously when the bonded & hardened two substrates are cut into the unit panels, thereby enabling to reduce a process time.

Eighth, the constitutions of the substrate support means and the like in the bonding machine enable to support central portion of the substrates, thereby enabling to fabricate liquid crystal displays using substrates equal to or bigger than 1000×1200 mm$^2$.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for forming liquid crystal to liquid crystal display panel using a liquid crystal dispensing device, comprising:
    inputting data:
    calculating a single drop amount of the liquid crystal based on the dropping amount calculated by a dropping amount calculation unit and the input data;
    calculating a number of drops of the liquid crystal based on the dropping amount calculated by the dropping amount calculation unit and the input data; and
    calculating a dropping position and a dispensing pattern of the liquid crystal with a dispensing pattern calculation unit based on the calculated single drop amount of the liquid crystal, the calculated numbers of drops of the liquid crystal, and a mode of the liquid crystal.

2. The method of claim 1, wherein the dispensing pattern calculation unit calculates the dispensing pattern according to a shape of the liquid crystal display panel area, a shape of the array pattern on the liquid crystal display panel, and an alignment direction on the liquid crystal display panel.

3. The method of claim 1, wherein the liquid crystal display panel area is a Twisted Nematic mode panel area.

4. The method of claim 3, wherein the dispensing pattern calculated by the dispensing pattern calculation unit is a dumbbell shaped pattern.

5. The method of claim 4, wherein compensating the central portion of the dumbbell performs the compensation of the dispensing pattern.

6. The method of claim 1, wherein the liquid crystal display panel area is a In Plane Switching mode panel area.

7. The method of claim 6, wherein the dispensing pattern calculation unit is a lightning shaped pattern having tail portions in the opposite direction of the alignment direction.

8. The method of claim 7, wherein the tail portion of the lightning performs the compensation of the dispensing pattern.

9. The method of claim 7, wherein the dispensing pattern calculated by the dispensing pattern calculation unit includes:
    a first dispensing pattern in the central portion of the liquid crystal display panel area; and
    a second dispensing pattern in the substantially perpendicular direction of the alignment direction.

10. The method of claim 9, wherein the compensating of the dispensing pattern unit is performed by the second dispensing pattern.

11. The method of claim 1, wherein the liquid crystal display panel area is a Vertical Alignment mode panel area.

12. The method of claim 11, wherein the dispensing pattern calculation unit is at least one of a dumbbell shaped pattern and a rectangular shaped pattern.

13. The method of claim 12, wherein compensating the central portion of dumbbell shaped pattern or rectangular shaped pattern performs the compensation of the dispensing pattern.

14. The method of claim 1, wherein the liquid crystal dispensing device includes: a liquid crystal container for containing the liquid crystal to be dispensed onto the first substrate; a nozzle disposed on a lower portion of the liquid crystal container, the nozzle including a main body portion, a discharging portion projecting from a lower surface of the main body portion for dispensing liquid crystal, a protecting unit formed near the discharging portion to protect the discharging portion;
    a needle sheet disposed on the lower portion of the liquid crystal container, the needle sheet having a discharging hole through which the liquid crystal is discharged;
    needle member disposed in the liquid crystal container, the needle member being moveable between a down position where an end of the needle member contacts the needle sheet to block flow of the liquid crystal through the discharging hole of the needle sheet and an up position where the needle is separated from the needle sheet;
    a first spring member to bias the needle member toward the down position;
    a solenoid system for generating a magnetic force to move the needle member to the up position when the solenoid system is actuated; and
    a gas supply to provide a gas pressure to drive the liquid crystal through the nozzle when the needle member is in the up position.

15. The method of claim 14, wherein the liquid crystal container is made of a metal.

16. The method of claim 15, wherein the metal is a stainless steel.

17. The method of claim 14, wherein the liquid crystal dispensing unit further comprises a case in which the liquid crystal container is received.

18. The method of claim 17, wherein the liquid crystal container is made of polyethylene and the case is made of a metal.

19. The method of claim 14, wherein the protecting unit includes a protecting wall formed around the discharging portion.

20. The method of claim 14, wherein the liquid crystal dispensing unit further comprises a fluoro resin layer on the surface of the nozzle.

21. The method of claim 14, wherein the needle member includes:
    a first needle;
    a second needle connected to the first needle; and
    a fixing unit for fixing the first and second needles.

22. The method of claim 21, wherein the needle member further comprises a first spring fixing unit for fixing the first spring, the first spring fixing unit is formed in the second needle.

23. The method of claim 21, wherein the second needle has a protrusion and the first needle has a groove in which the protrusion is inserted, thereby the first and second needles are connected each other.

24. The method of claim 21, wherein the first and second needle is separable.

25. The method of claim 14, wherein the first spring member includes:
a first spring mounted at the end of the second needle; and
a tension controlling structure for controlling the tension of the first spring.

26. The method of claim 25, wherein the tension controlling structure includes:
a first spring receiving unit for receiving the first spring; and
a tension controlling unit inserted into the first spring receiving unit to control the tension of the first spring.

27. The method of claim 26, wherein the first spring member further comprises a tension fixing unit for fixing the tension controlling unit to fix the first spring in the predetermined length.

28. The method of claim 14, wherein the liquid dispensing unit further comprises a magnetic bar amounted above the first spring member in the predetermined interval, the magnetic bar generating the magnetic force to move the needle member in the up position when the electric power is applied to the solenoid system.

29. The method of claim 28, wherein the magnetic bar is made of the material selected from a group consisting of ferromagnetic material and soft magnetic material.

30. The method of claim 28, wherein the solenoid system includes a solenoid coil around the magnetic bar.

31. The method of claim 28, wherein the liquid crystal dispensing unit further comprises a second spring member mounted in the end of the magnetic bar, the second spring member driving the magnetic bar in the lower direction to return the needle to the down position.

32. The method of claim 31, wherein the second spring member includes:
a second spring mounded in the magnetic bar; and
a second spring receiving unit for receiving the second spring.

33. The method of claim 1, further comprising:
applying electric power to a solenoid coil from an electric power supply unit to move the needle to the up position;
providing a gas pressure to the liquid crystal dispensing unit from a gas supply unit to drive the liquid crystal through a discharging hole; and
controlling the electric power supply unit and the gas supply unit such that a predetermined dropping amount of liquid crystal is dispensed onto a substrate.

34. The method of claim 1, further comprising:
moving one of the substrate and the liquid crystal dispensing device in accordance with the dispensing pattern.

35. The method of claim 1, further comprising displaying the input data, the calculated dropping amount of the liquid crystal, the calculated dispensing pattern, and a dropping status of the liquid crystal.

36. The method of claim 1, further comprising:
compensating the dropping amount of the liquid crystal when a measured dropping amount of the liquid crystal being dropped is different from the dropping amount of the liquid crystal calculated.

37. The method of claim 36, wherein compensating the dropping amount includes:
measuring the dropping amount of the liquid crystal;
calculating a compensating amount of the liquid crystal by comparing the measured dropping amount with the calculated dropping amount of the liquid crystal; and
calculating a dispensing pattern compensation for compensating the dispensing pattern of the liquid crystal based on the calculated compensating amount.

38. The method of claim 37, wherein calculating a compensating amount includes:
comparing a dropping amount setting with the measured dropping amount; calculating a difference value between the dropping amount setting and the measured dropping amount; and
calculating an error value of dropping amount to compensate for the difference value calculated.

39. The method of claim 1, wherein inputting data includes providing to the dropping amount calculation unit liquid crystal display panel size data, liquid crystal characteristic information, and spacer height data.

* * * * *